United States Patent
Choi et al.

(10) Patent No.: US 12,184,427 B2
(45) Date of Patent: *Dec. 31, 2024

(54) METHOD AND APPARATUS FOR TRANSMITTING AND RECEIVING DOWNLINK DATA CORRESPONDING TO RESOURCE ALLOCATION INFORMATION AND INDICATOR IN MOBILE COMMUNICATION SYSTEM

(71) Applicant: Samsung Electronics Co., Ltd., Gyeonggi-do (KR)

(72) Inventors: Seunghoon Choi, Gyeonggi-do (KR); Jeongho Yeo, Gyeonggi-do (KR); Youngwoo Kwak, Gyeonggi-do (KR); Taehyoung Kim, Seoul (KR); Donghan Kim, Gyeonggi-do (KR); Jinyoung Oh, Seoul (KR); Hoondong Noh, Gyeonggi-do (KR); Yongjun Kwak, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 86 days.

This patent is subject to a terminal disclaimer.

(21) Appl. No.: 16/320,858

(22) PCT Filed: Jul. 28, 2017

(86) PCT No.: PCT/KR2017/008181
§ 371 (c)(1),
(2) Date: Jan. 25, 2019

(87) PCT Pub. No.: WO2018/021881
PCT Pub. Date: Feb. 1, 2018

(65) Prior Publication Data
US 2019/0165894 A1 May 30, 2019

(30) Foreign Application Priority Data

Jul. 29, 2016 (KR) .................. 10-2016-0097530
Aug. 11, 2016 (KR) .................. 10-2016-0102607
(Continued)

(51) Int. Cl.
*H04L 5/00* (2006.01)
*H04B 17/24* (2015.01)
(Continued)

(52) U.S. Cl.
CPC .......... *H04L 1/1854* (2013.01); *H04B 17/24* (2015.01); *H04J 11/00* (2013.01); *H04L 1/0067* (2013.01);
(Continued)

(58) Field of Classification Search
CPC ... H04L 1/1812; H04L 1/1854; H04L 5/0094; H04L 1/1893; H04L 5/0053;
(Continued)

(56) References Cited

U.S. PATENT DOCUMENTS 11,337,186 B2 * 5/2022 Park ............... H04W 72/543
2012/0230272 A1 * 9/2012 Kim ............... H04L 5/0053
370/329

(Continued)

FOREIGN PATENT DOCUMENTS

CN 103733587 4/2014
CN 103875259 6/2014
(Continued)

OTHER PUBLICATIONS

PCT/ISA/210 Search Report issued on PCT/KR2017/008181 (pp. 7).

(Continued)

*Primary Examiner* — Un C Cho
*Assistant Examiner* — Lalita W Pace
(74) *Attorney, Agent, or Firm* — The Farrell Law Firm, P.C.

(57) ABSTRACT

Disclosed are a communication method for merging, with an IoT technology, a 5G communication system for supporting a data transmission rate higher than that of a 4G system, and a system therefor. The present disclosure can be applied to an intelligent service (for example, smart home, smart building, smart city, smart car or connected car, healthcare, digital education, retail business, security and safety-related services, and the like) on the basis of a 5G communication technology and an IoT-related technology. The present embodiment provides a method and an apparatus for a delay reduction mode operation of a base station and a terminal, and the base station of the present invention can: transmit, to the terminal, first information related to hybrid ARQ (HARQ) timing by means of higher layer signaling; trans-
(Continued)

mit, to the terminal, scheduling information and second information related to the HARQ timing; transmit, to the terminal, data scheduled by the scheduling information; and receive, from the terminal, positive reception acknowledgement or negative reception acknowledgement (ACK/NACK) information with respect to the data according to the HARQ timing, which is determined on the basis of the first information and the second information.

12 Claims, 75 Drawing Sheets

(30) Foreign Application Priority Data

| | | |
|---|---|---|
| Sep. 29, 2016 | (KR) | 10-2016-0125902 |
| Oct. 7, 2016 | (KR) | 10-2016-0129990 |
| Nov. 29, 2016 | (KR) | 10-2016-0160051 |
| Feb. 3, 2017 | (KR) | 10-2017-0015364 |

(51) Int. Cl.

| | |
|---|---|
| *H04J 11/00* | (2006.01) |
| *H04L 1/00* | (2006.01) |
| *H04L 1/1812* | (2023.01) |
| *H04L 1/1829* | (2023.01) |
| *H04L 1/1867* | (2023.01) |
| *H04W 24/10* | (2009.01) |
| *H04W 72/1273* | (2023.01) |
| *H04W 72/23* | (2023.01) |
| *H04W 72/50* | (2023.01) |
| *H04L 27/26* | (2006.01) |

(52) U.S. Cl.
CPC .......... *H04L 1/1812* (2013.01); *H04L 1/1887* (2013.01); *H04L 1/1893* (2013.01); *H04L 5/0044* (2013.01); *H04L 5/0053* (2013.01); *H04L 5/0055* (2013.01); *H04L 5/0094* (2013.01); *H04W 24/10* (2013.01); *H04W 72/1273* (2013.01); *H04W 72/23* (2023.01); *H04W 72/535* (2023.01); *H04L 27/2602* (2013.01)

(58) Field of Classification Search
CPC . H04L 1/1887; H04L 5/0055; H04L 27/2602; H04L 1/0067; H04L 1/0013; H04L 1/0068; H04L 1/08; H04L 5/0044; H04L 5/0046; H04L 27/2608; H04J 11/00; H04J 11/0023; H04J 2211/005; H04B 17/24; H04W 24/10; H04W 72/042; H04W 72/1273; H04W 72/23; H04W 72/535; H04W 72/04; H04W 72/11; H04W 72/115; H04W 72/40; H04W 72/121; H04W 72/1263; H04W 72/231; H04W 72/232

See application file for complete search history.

(56) References Cited

U.S. PATENT DOCUMENTS

| | | |
|---|---|---|
| 2013/0039290 A1 | 2/2013 | Harrison et al. |
| 2013/0242947 A1 | 9/2013 | Chen et al. |
| 2014/0086197 A1* | 3/2014 | Yang .............. H04B 7/2656 370/329 |
| 2014/0092792 A1* | 4/2014 | Kim .............. H04L 5/0023 370/280 |
| 2014/0105150 A1* | 4/2014 | Kim .............. H04L 5/001 370/329 |
| 2014/0105919 A1 | 4/2014 | Robinson et al. |
| 2014/0112280 A1 | 4/2014 | Lee et al. |
| 2014/0146769 A1 | 5/2014 | Ahn et al. |
| 2014/0153515 A1 | 6/2014 | Chun et al. |
| 2014/0206375 A1 | 7/2014 | Ohta et al. |
| 2014/0293842 A1* | 10/2014 | He .............. H04B 7/0695 370/280 |
| 2014/0307694 A1 | 10/2014 | Zeng et al. |
| 2014/0334416 A1 | 11/2014 | Ko et al. |
| 2014/0348125 A1 | 11/2014 | Zhao et al. |
| 2015/0009927 A1 | 1/2015 | Larsson et al. |
| 2015/0155979 A1 | 6/2015 | Guo et al. |
| 2015/0189516 A1 | 7/2015 | Seo et al. |
| 2015/0208387 A1 | 7/2015 | Awad et al. |
| 2015/0208392 A1* | 7/2015 | Park .............. H04B 7/024 370/329 |
| 2015/0215905 A1* | 7/2015 | Park .............. H04W 76/00 370/329 |
| 2015/0256307 A1 | 9/2015 | Nagata et al. |
| 2015/0365928 A1 | 12/2015 | Lee et al. |
| 2016/0021565 A1 | 1/2016 | Kim et al. |
| 2016/0021606 A1 | 1/2016 | Gupta |
| 2016/0080136 A1 | 3/2016 | Yang et al. |
| 2016/0081077 A1 | 3/2016 | Li et al. |
| 2016/0135156 A1 | 5/2016 | Lee et al. |
| 2016/0241363 A1 | 8/2016 | Noh et al. |
| 2017/0251466 A1* | 8/2017 | Astely .............. H04L 5/0055 |
| 2017/0280429 A1* | 9/2017 | Shen .............. H04W 72/20 |
| 2017/0317791 A1 | 11/2017 | Wiberg et al. |
| 2017/0332365 A1* | 11/2017 | Lin .............. H04W 72/0406 |
| 2017/0332377 A1* | 11/2017 | Tseng .............. H04W 24/00 |
| 2017/0332397 A1* | 11/2017 | Li .............. H04L 1/1861 |
| 2018/0027537 A1 | 1/2018 | Yang |
| 2018/0049189 A1* | 2/2018 | Hugl .............. H04W 72/0446 |
| 2018/0376495 A1* | 12/2018 | Lee .............. H04W 48/12 |
| 2018/0376497 A1* | 12/2018 | You .............. H04L 5/0055 |
| 2019/0141679 A1* | 5/2019 | He .............. H04L 5/0053 |
| 2019/0208505 A1 | 7/2019 | Shih et al. |
| 2019/0281499 A1* | 9/2019 | Larsson .............. H04W 28/16 |

FOREIGN PATENT DOCUMENTS

| | | |
|---|---|---|
| CN | 104106231 | 10/2014 |
| CN | 104170297 | 11/2014 |
| CN | 104995961 | 10/2015 |
| CN | 105191174 | 12/2015 |
| CN | 105210342 | 12/2015 |
| CN | 105308892 | 2/2016 |
| CN | 105471561 | 4/2016 |
| JP | 2014-072694 | 4/2014 |
| JP | 2015-529022 | 10/2015 |
| JP | 2016-106478 | 6/2016 |
| KR | 1020140110964 | 9/2014 |
| WO | WO 2014/107850 | 7/2014 |
| WO | WO 2015/046811 | 4/2015 |
| WO | WO 2016/072892 | 5/2016 |
| WO | WO 2016/111527 | 7/2016 |
| WO | WO 2017/135737 | 8/2017 |

OTHER PUBLICATIONS

PCT/ISA/237 Written Opinion issued on PCT/KR2017/008181 (pp. 5).
LG Electronics et al., WF on minimum HARQ Timing, R1-165872, 3GPP TSG RAN WG1 Meeting #85, Nanjing, China, May 30, 2016, 7 pages.
Intel Corporation, "Downlink Control Signaling Design for Shorten TTI", R1-164160, 3GPP TSG-RAN WG1 #85, May 23-27, 2016, 5 pages.
Panasonic, "Control Signalling Placement Design for Relay Nodes", R1-094517, 3GPP TSG RAN WG1 Meeting #59, Nov. 9-13, 2009, 3 pages.
Intel Corporation, "Support of Discontinuous Resource Mapping for NB-IoT DL", R1-161949, 3GPP TSG RAN WG1 NB-IoT Ad-Hoc Meeting #2, Mar. 22-24, 2016, 5 pages.
European Search Report dated May 29, 2019 issued in counterpart application No. 17834822.3-1219, 8 pages.

(56) References Cited

OTHER PUBLICATIONS

U.S. Office Action dated Nov. 16, 2020 issued in counterpart U.S. Appl. No. 16/843,208, 18 pages.
U.S. Office Action dated Jun. 15, 2021 issued in counterpart U.S. Appl. No. 16/843,208, 27 pages.
Chinese Office Action dated Jul. 9, 2021 issued in counterpart application No. 201780046857.9, 9 pages.
Japanese Office Action dated Aug. 17, 2021 issued in counterpart application No. 2018-567654, 9 pages.
Chinese Office Action dated Dec. 29, 2020 issued in counterpart application No. 201780046857.9, 12 pages.
Chinese Office Action dated Oct. 8, 2021 issued in counterpart application No. 202010234447.0, 10 pages.
Japanese Office Action dated Apr. 5, 2022 issued in counterpart application No. 2018-567654, 6 pages.
Japanese Office Action dated Nov. 22, 2022 issued in counterpart application No. 2018-567654, 6 pages.
Korean Office Action dated Jul. 22, 2022 issued in counterpart application No. 10-2016-0129990, 12 pages.
U.S. Office Action dated Mar. 1, 2023 issued in counterpart U.S. Appl. No. 16/843,208, 23 pages.
Chinese Office Action dated Jul. 24, 2023 issued in counterpart application No. 202111052725.1, 9 pages.
U.S. Final Office Action dated Jul. 28, 2023 issued in counterpart U.S. Appl. No. 16/843,208, 23 pages.
U.S. Office Action dated Jul. 19, 2024 issued in counterpart U.S. Appl. No. 16/843,208, 23 pages.
Sharp, "DRS Design for LAA", R1-154067, 3GPP TSG RAN WG1 #82, Aug. 24-28, 2015, 4 pages.
Qualcomm Incorporated, "DL Channel Design for Shortened TTI", R1-163068, 3GPP TSG RAN WG1 #84bis, Apr. 11-15, 2016, 7 pages.
Qualcomm Incorporated, "DL Channel Design for Shortened TTI", R1-164458, 3GPP TSG RAN WG1 #85, May 23-27, 2016, 7 pages.
KR Decision of Patent dated Jan. 30, 2024 issued in counterpart application No. 10-2017-0015364, 10 pages.
U.S. Office Action dated Feb. 27, 2024 issued in counterpart U.S. Appl. No. 16/843,208, 24 pages.
Indian Hearing Notice dated Jan. 18, 2024 issued in counterpart application No. 201937003318, 2 pages.
Indian Hearing Notice dated Mar. 4, 2024 issued in counterpart application No. 202038015098, 2 pages.

* cited by examiner

FIG. 3
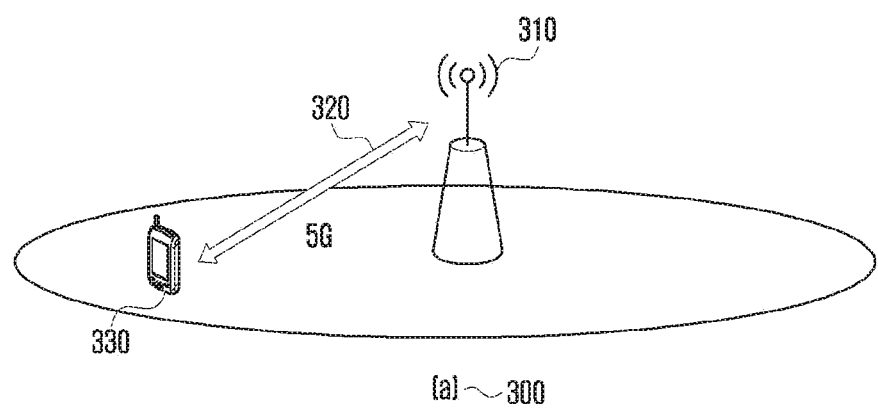
(a) ~300
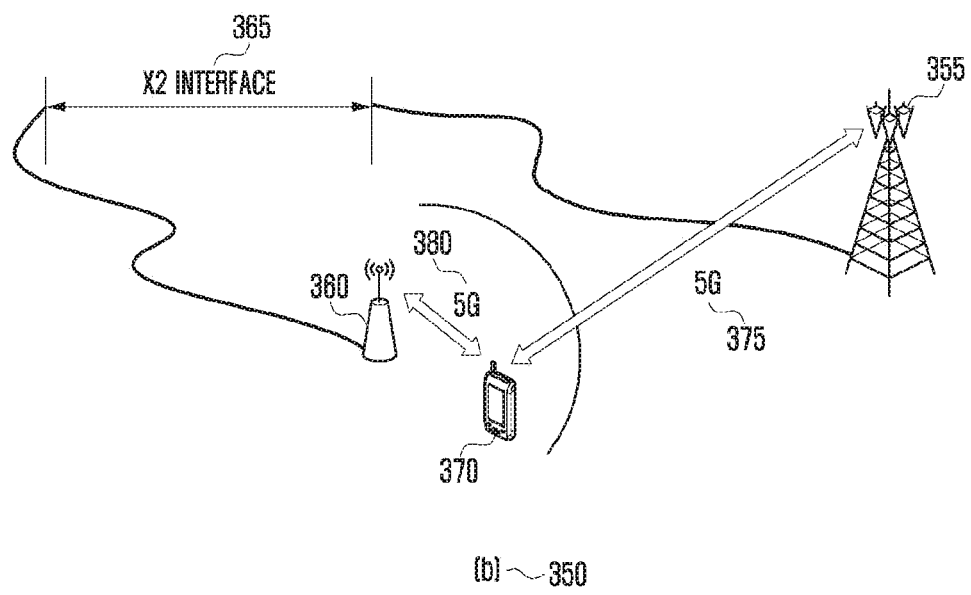
(b) ~350

FIG. 4
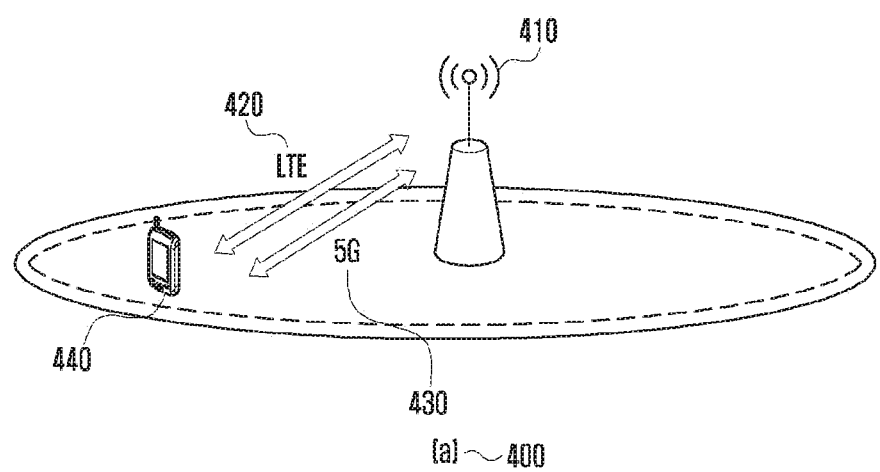
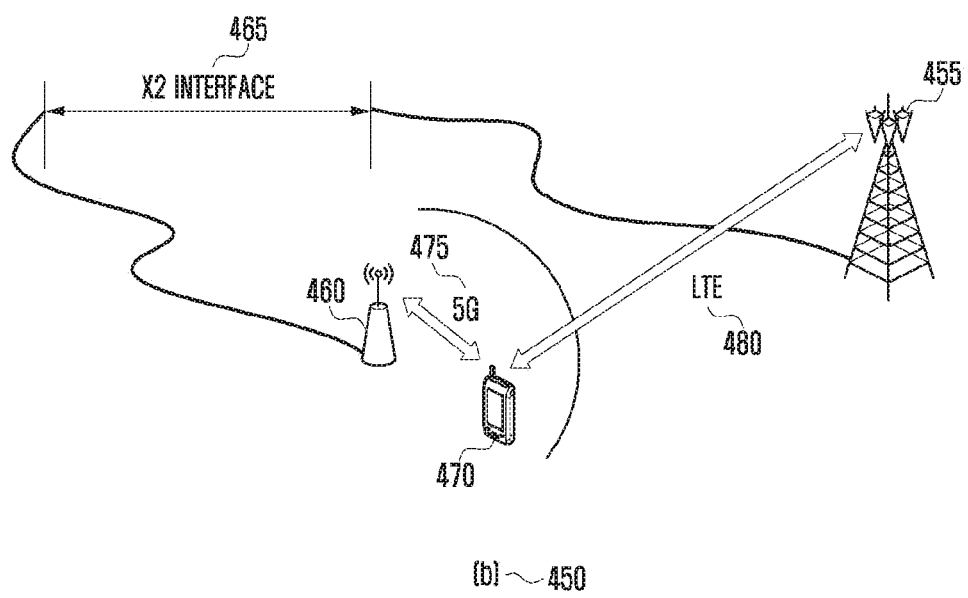

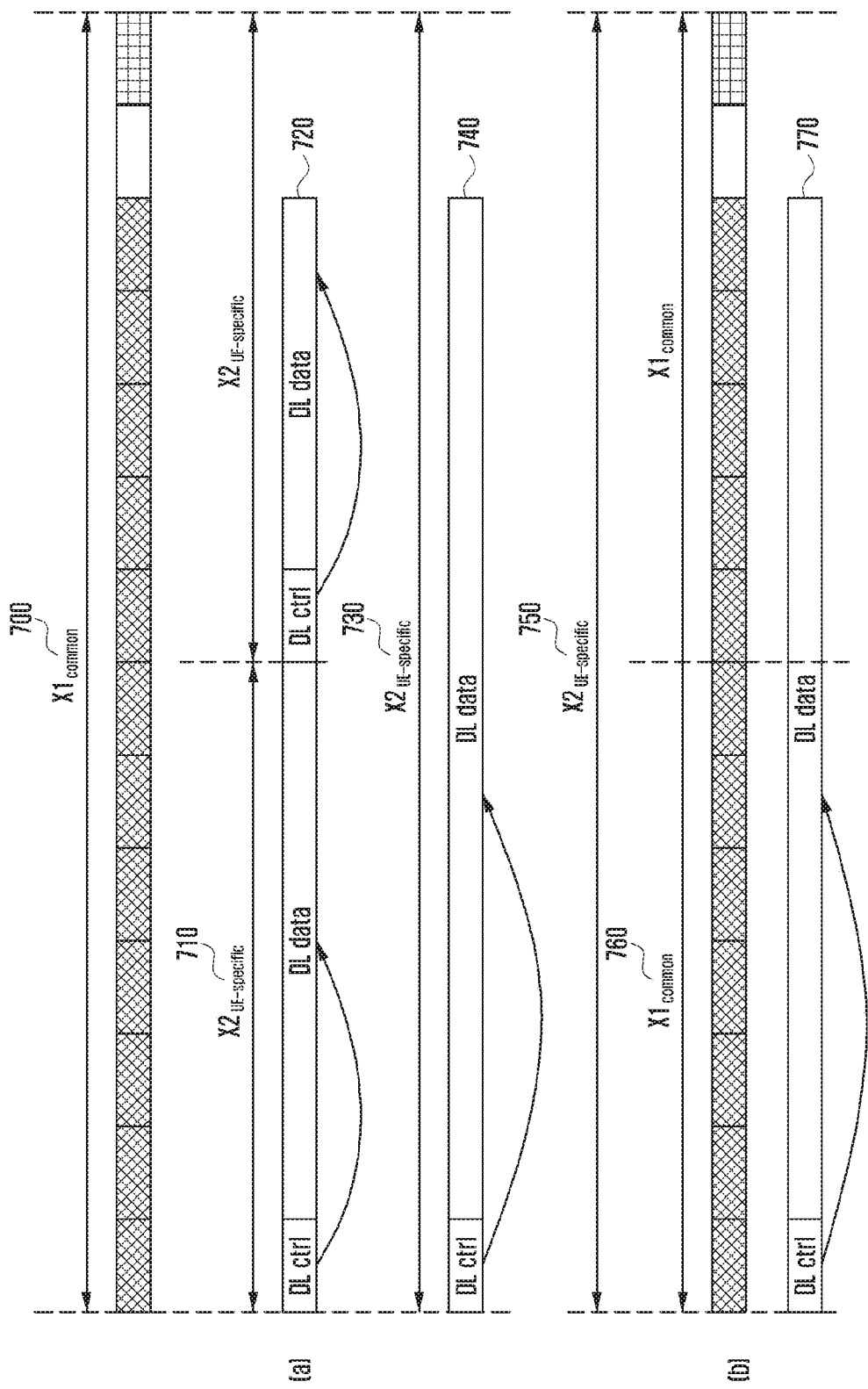

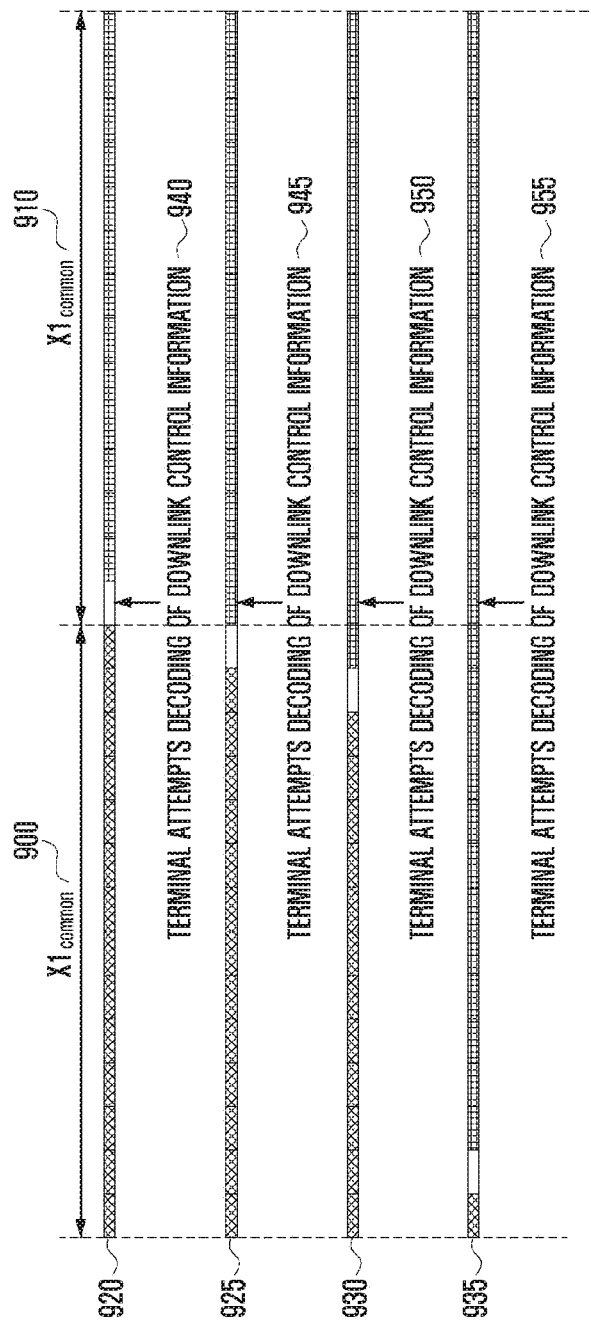

FIG. 22

METHOD AND APPARATUS FOR TRANSMITTING AND RECEIVING DOWNLINK DATA CORRESPONDING TO RESOURCE ALLOCATION INFORMATION AND INDICATOR IN MOBILE COMMUNICATION SYSTEM

PRIORITY

This application is a National Phase Entry of PCT International Application No. PCT/KR2017/008181 which was filed on Jul. 28, 2017, and claims priority to Korean Patent Application Nos. 10-2016-0097530, 10-2016-0102607, 10-2016-0125902, 10-2016-0129990, 10-2016-0160051, and 10-2017-0015364, which were filed on Jul. 29, 2016, Aug. 11, 2016, Sep. 29, 2016, Oct. 7, 2016, Nov. 29, 2016, and Feb. 3, 2017, respectively, the content of each of which is incorporated herein by reference.

TECHNICAL FIELD

The present disclosure relates to a wireless communication system, and more particularly, to a channel and interference measurement method by a base station and a terminal for efficiently measuring the channel and interference characteristics which differ depending on supported services, a channel state information processing method, and channel state information report method and apparatus.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

On the other hand, in a new radio access technology (NR) that is a new 5G communication technology, it has been designed to freely multiplex various services on time and frequency resources, and thus waveform and numerology, and reference signals can be dynamically or freely allocated in accordance with a need for the corresponding services. There is a need for various methods for satisfying the requirements of such a 5G communication system.

DISCLOSURE OF INVENTION

Technical Problem

An aspect of the present disclosure is to provide a method and an apparatus for providing data transmission and reception for a 5G-oriented communication service. In particular, an aspect of the present disclosure is to provide a method for operating a transmission time interval having various lengths, and a method and an apparatus by a base station and a terminal for transmitting and receiving data in order to satisfy 5G-oriented communication services having various requirements.

Another aspect of the present disclosure is to propose a method for allocating various services, such as enhanced mobile broadcast (eMBB), massive machine type communication (mMTC), ultra-reliable and low-latency communications (URLLC), and forward compatible resource (FCR), and a method and an apparatus for reporting channel state information optimized to the respective services in order to measure and report the channel state information and interference characteristics which differ depending on the characteristics of the corresponding services during support of the various services.

Still another aspect of the present disclosure is to propose an operation method and an apparatus therefor in accordance with a delay reduction mode of a base station and a terminal in case where it is possible to reduce time required for signal processing of the base station and the terminal in an LTE system using an FDD or TDD.

Yet still another aspect of the present disclosure is to provide a control channel structure that can be flexibly configured to satisfy wireless communication requirements of a 5G system.

Solution to Problem

In accordance with an aspect of the present disclosure to solve the above-described problems, a method for a base station in a mobile communication system includes transmitting first information related to hybrid ARQ (HARQ) timing to a terminal through higher layer signaling; transmitting scheduling information and second information related to the HARQ timing to the terminal; transmitting data scheduled by the scheduling information to the terminal; and receiving from the terminal positive reception acknowledgement or negative reception acknowledgement (ACK/NACK) information with respect to the data in accordance with the HARQ timing determined based on the first information and the second information.

In accordance with another aspect of the present disclosure, a method for a terminal in a mobile communication system includes receiving first information related to hybrid ARQ (HARQ) timing from a base station through higher layer signaling; receiving scheduling information and second information related to the HARQ timing from the base station; receiving data scheduled by the scheduling information from the base station; and transmitting to the base station positive reception acknowledgement or negative reception acknowledgement (ACK/NACK) information with respect to the data in accordance with the HARQ timing determined based on the first information and the second information.

In accordance with still another aspect of the present disclosure, a base station in a mobile communication system includes a transceiver configured to transmit and receive signals; and a controller configured to control to transmit first information related to hybrid ARQ (HARQ) timing to a terminal through higher layer signaling, transmit scheduling information and second information related to the HARQ timing to the terminal, transmit data scheduled by the scheduling information to the terminal, and receive from the terminal positive reception acknowledgement or negative reception acknowledgement (ACK/NACK) information with respect to the data in accordance with the HARQ timing determined based on the first information and the second information.

In accordance with yet still another aspect of the present disclosure, a terminal in a mobile communication system includes a transceiver configured to transmit and receive signals; and a controller configured to control to receive first information related to hybrid ARQ (HARQ) timing from a base station through higher layer signaling, receive scheduling information and second information related to the HARQ timing from the base station, receive data scheduled by the scheduling information from the base station, and transmit to the base station positive reception acknowledgement or negative reception acknowledgement (ACK/NACK) information with respect to the data in accordance with the HARQ timing determined based on the first information and the second information.

Further, the first information may indicate a plurality of possible values related to the HARQ timing, and the second information may be information indicating one of the plurality of possible values. The possible value related to the HARQ timing may be a value directly indicating a difference between a transmission time interval at which the data is transmitted and a transmission time interval at which the ACK/NACK information is received, or an offset value applied to the difference. A format of the ACK/NACK information may be determined based on the number of pieces of the data corresponding to the ACK/NACK information.

Advantageous Effects of Invention

According to the aspects of the present disclosure as described above, a method and an apparatus for providing data transmission and reception for a 5G-oriented communication service are provided. Specifically, a method for operating a transmission time interval having various lengths and a method and an apparatus by a base station and a terminal for transmitting and receiving data are provided to satisfy 5G-oriented communication services having various requirements. Through this, the transmission time interval having various lengths can be efficiently multiplexed and operated in one system. Further, according to the aspect of the present disclosure, in case where various services are supported, other channel state information can be reported in accordance with types of the corresponding services and services causing interference occurrence. Through such a report of the channel state information, a base station and a terminal can perform efficient data transmission and reception based on the channel state information.

Further, according to an operation method by a base station and a terminal in a delay reduction mode according to the aspects of the present disclosure, it is possible to reduce the delay time during transmission of uplink and downlink data.

Further, according to the aspect of the present disclosure, a 5G communication system simultaneously supporting various services having different requirements can be effectively operated through providing of a control channel structure having a flexible structure for transmitting a downlink control signal.

BRIEF DESCRIPTION OF DRAWINGS

FIGS. 3 and 4 are diagrams illustrating an embodiment of a communication system to which the present disclosure is applied;

FIGS. 7, 8A, and 8B are diagrams illustrating the (1-1)-th embodiment proposed in the present disclosure;

FIGS. 9 and 10 are diagrams illustrating the (1-2)-th embodiment proposed in the present disclosure;

FIGS. 20, 21, and 22 are diagrams illustrating such downlink resource allocation types 0, 1, and 2, respectively;

MODE FOR THE INVENTION

Figure 1:
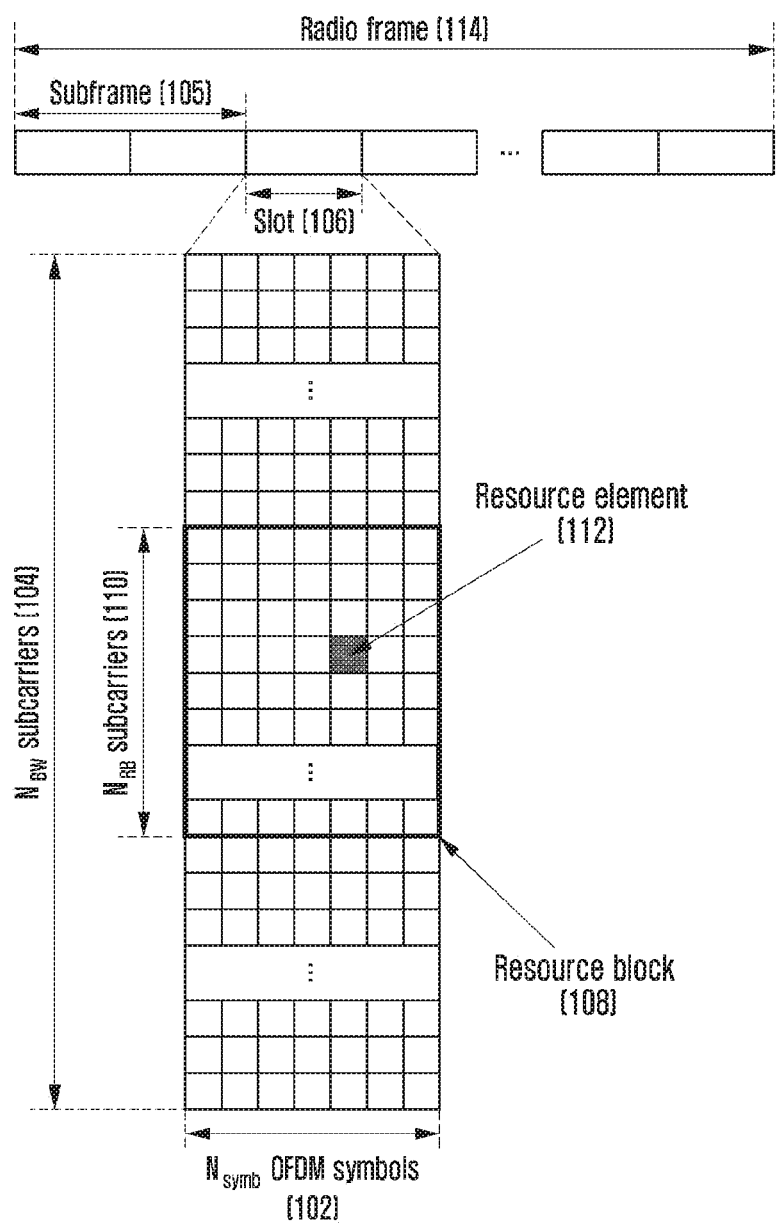
FIG. 1 is a diagram illustrating the basic structure of a downlink time-frequency domain that is a radio resource region in which data or a control channel of an LTE system is transmitted.

Hereinafter, embodiments of the present disclosure will be described in detail with reference to the accompanying drawings.

In explaining the embodiments, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Also, in the embodiments, "~unit" may include one or more processors.

First Embodiment

In general, a mobile communication system has been developed to provide a voice service while securing user activity. However, the mobile communication system has gradually extended its domain up to data service providing in addition to the voice service, and at present, it has been developed up to the level capable of providing a high-speed data service. However, since resource shortage phenomenon occurs under the current mobile communication system and users require higher-speed services, there has been a need for a more developed mobile communication system.

As one system that has been developed as the next-generation mobile communication system to meet such a need, standardization work for long term evolution (LTE) is in progress in the $3^{rd}$ Generation Partnership Project (3GPP). The LTE is a technology implementing high-speed packet based communication having a transmission speed of about 100 Mbps at maximum. For this, various schemes have been discussed, for example, a scheme for reducing the number of nodes located on a communication path through simplification of a network structure and a scheme for maximally approaching radio protocols to radio channels.

The LTE system adopts a hybrid automatic repeat request (HARQ) scheme in which a physical layer retransmits corresponding data if decoding failure occurs during initial transmission. According to the HARQ scheme, a receiver transmits information (negative acknowledgement (NACK)) for notifying a transmitter of decoding failure if the receiver is unable to accurately decode data, and the transmitter may make a physical layer retransmit the corresponding data. The receiver may combine the data that is retransmitted by the transmitter with the previous data of which the decoding has failed to heighten the data reception performance. Further, if the receiver has accurately decoded the data, the receiver may transmit information (acknowledgement (ACK)) for notifying the transmitter of decoding success, and thus the transmitter can transmit new data.

FIG. 1 is a diagram illustrating the basic structure of a downlink time-frequency domain that is a radio resource region in which data or a control channel of an LTE system is transmitted.

Referring to FIG. 1, a horizontal axis represents a time domain, and a vertical axis represents a frequency domain. In the time domain, the minimum transmission unit is an OFDM symbol, and $N_{symb}$ OFDM symbols 102 constitute one slot 106, and two gathered slots constitute one subframe 105. The length of the slot is 0.5 ms, and the length of the subframe is 1.0 ms. Further, a radio frame 114 is a time-domain unit that is composed of 10 subframes. In the frequency domain, the minimum transmission unit is a subcarrier, and the transmission bandwidth of the whole system is composed of $N_{BW}$ subcarriers 104 in total.

In the time-frequency domain, the basic unit of resources is a resource element (RE) 112 that may be expressed by an OFDM symbol index and a subcarrier index. A resource block (RB) (or physical resource block (PRB)) 108 is defined by $N_{symb}$ successive OFDM symbols 102 in the time domain and NR successive subcarriers 110 in the frequency domain. Accordingly, one RB 108 is composed of $N_{symb} \times N_{RB}$ REs 112.

In general, the minimum transmission unit of data is the RB unit. In the LTE system, it is general that $N_{symb}=7$, $N_{RB}=12$, and $N_{BW}$ is in proportion to the bandwidth of the system transmission band. The data rate is increased in proportion to the number of RBs that are scheduled in the terminal. The LTE system defines and operates 6 transmission bandwidths. In case of an FDD system that operates to discriminate a downlink and an uplink by means of the frequency, the downlink transmission bandwidth and the uplink transmission bandwidth may differ from each other. A channel bandwidth represents an RF bandwidth that corresponds to the system transmission bandwidth. Table 1 below presents the corresponding relationship between the system transmission bandwidth and the channel bandwidth defined in the LTE system. For example, the LTE system having 10 MHz channel bandwidth has the transmission bandwidth that is composed of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information is transmitted within initial N OFDM symbols in the subframe. In general, N={1, 2, 3}. Accordingly, in accordance with the amount of control information to be transmitted to the current subframe, the value N is varied for each subframe. The control information includes a control channel transmission interval indicator indicating how many OFDM symbols the control information is transmitted through, scheduling information on downlink data or uplink data, and HARQ ACK/NACK signal.

In the LTE system, the scheduling information on the downlink data or the uplink data is transferred from the base station to the terminal through downlink control information (DCI). The uplink (UL) means a radio link on which the terminal transmits data or a control signal to the base station, and the downlink (DL) means a radio link on which the base station transmits data or a control signal to the terminal. The DCI is defined in various formats, and the respective formats are applied depending on whether the DCI is scheduling information on uplink data (UL grant) or scheduling information on downlink data (DL grant), whether the DCI is a compact DCI having a small size of the control information, whether spatial multiplexing using multiple antennas is applied, and whether the DCI is a DCI for power control. For example, DCI format 1 that is the scheduling control information on the downlink data (DL grant) is configured to include at least the following control information.

Resource allocation type 0/1 flag: This notifies of whether a resource allocation scheme is of type 0 or type 1. The type 0 allocates resources in the unit of a resource block group (RBG) through application of a bitmap scheme. In the LTE system, the basic unit of scheduling is an RB that is expressed as time and frequency domain resource, and the RBG is composed of a plurality of RBs, and becomes the basic unit of scheduling in the type 0 scheme. The type 1 allocates a specific RB in the RBG.

Resource block assignment: This notifies of an RB that is allocated for data transmission. An expressed resource is determined in accordance with the system bandwidth and the resource allocation scheme.

Modulation and coding scheme (MCS): This notifies of a modulation scheme that is used for data transmission and the size of a transport block that is data to be transmitted.

HARQ process number: This notifies of a process number of HARQ.

New data indicator: This notifies of whether data transmission is HARQ initial transmission or retransmission.

Redundancy version: This notifies of a redundancy version of HARQ.

Transmission power control (TCP) command for a physical uplink control channel (PUCCH): This notifies of a transmission power control command for a PUCCH that is an uplink control channel.

The DCI passes through a channel coding and modulation process, and is transmitted on a physical downlink control channel (PDCCH) that is a downlink physical control channel or enhanced PDCCH (EPDCCH).

In general, the DCI is independently channel-coded with respect to each terminal, and is configured as an independent PDCCH to be transmitted. In the time domain, the PDCCH is mapped and transmitted during the control channel transmission interval, and the frequency domain mapping location of the PDCCH is determined by an Identifier (ID) of each terminal, and is spread and transmitted over the whole system transmission band.

The downlink data is transmitted on a physical downlink shared channel (PDSCH) that is a downlink physical data channel. The downlink data on the PDSCH is transmitted after the control channel transmission period, and scheduling information, such as a detailed mapping location of data in the frequency domain and the modulation scheme, is indicated by the DCI being transmitted through the PDCCH.

Through an MCS composed of 5 bits among the control information constituting the DCI, the base station notifies the terminal of the modulation scheme that is applied to the downlink data to be transmitted to the terminal and a transport block size (TBS) of data to be transmitted. The TBS corresponds to the data size before channel coding for error correction is applied to the data (this may be understood as a transport block), which the base station intends to transmit.

The modulation scheme supported in the LTE system is quadrature phase shift keying (QPSK), 16 quadrature amplitude modulation (16QAM), or 64QAM, and respective modulation orders $Q_m$ correspond to 2, 4, and 6. That is, in case of the QPSK modulation, 2 bits per symbol may be transmitted, and in case of the 16QAM modulation, 4 bits per symbol may be transmitted. Further, in case of the 64QAM modulation, 6 bits per symbol may be transmitted.

Hereinafter, PDCCH transmission may be mixedly used with DCI transmission on the PDCCH, and PDSCH transmission may be mixedly used with downlink data transmission on the PDSCH. In 3GPP LTE Release 10, as compared with LTE Release 8, bandwidth extension technology has been adopted to support higher data transmission rate. The above-described technology called bandwidth extension or carrier aggregation (CA) can increase the data transmission rate as much as the extended band as compared with an LTE Release 8 terminal that transmits data in one band.

Each of the respective bands is called a component carrier (CC), and the LTE Release 8 terminal is prescribed to have one component carrier with respect to the downlink or the uplink. Further, the downlink component carrier and the uplink component carrier connected through system information block (SIB)-2 are tied to be called a cell. The SIB-2 connection relationship between the downlink component carrier and the uplink component carrier is transmitted as a system signal or higher layer signal. The terminal supporting the CA may receive the downlink data and may transmit the uplink data through a plurality of serving cells.

Further, in Release 10, if the base station is in a situation where it is difficult for the base station to transmit the PDCCH to a specific terminal in a specific serving cell, it may transmit the PDCCH in another serving cell, and may configure a carrier indicator field (CIF) as a field notifying that the corresponding PDCCH indicates data transmission on a PDSCH of another serving cell or a physical uplink shared channel (PUSCH). The CIF may be configured to the terminal supporting the CA. The CIF is determined to indicate another serving cell through addition of 3 bits to the DCI in the specific serving cell, and the CIF is included in the DCI only in case of performing cross carrier scheduling. If the CIF is not included, the cross carrier scheduling is not performed. If the CIF is included in downlink resource allocation information (it may be mixedly used with DL assignment, DL grant, and DCI), the CIF is defined to indicate a serving cell to which the PDSCH that is scheduled by the downlink resource allocation information is to be transmitted, whereas if the CIF is included in uplink resource allocation information (it may be mixedly used with UL grant and DCI), the CIF is defined to indicate a serving cell to which the PUSCH that is scheduled by the uplink resource allocation information is to be transmitted.

As described above, in LTE Release 10, the carrier aggregation that is the bandwidth extension technology is defined, and a plurality of serving cells may be configured to the terminal. Further, the terminal periodically or aperiodically transmits channel information on the plurality of serving cells to the base station for data scheduling of the base station. The base station schedules and transmits data for each carrier, and the terminal transmits HARQ A/N feedback for the data transmitted for each carrier to the base station. In LTE Release 10, it is designed to transmit the A/N feedback of 21 bits at maximum, and if the transmission of the A/N feedback overlaps the transmission of the channel information in one subframe, it is designed to transmit the A/N feedback and to drop the channel information. In LTE Release 11, it is designed to transmit the A/N feedback of 22 bits at maximum and channel information of one cell according to PUCCH format 3 on the transmission resource of the PUCCH format 3 through multiplexing of the A/N feedback and the channel information of one cell.

In LTE Release 13, maximally 32 serving cell configuration scenarios are assumed, and the number of serving cells is extended up to 32 at maximum using not only licensed bands but also unlicensed bands. Further, in LTE Release 13, in consideration of the situation where the number of licensed bands, such as LTE frequency band, is limited, technology capable of providing an LTE service in an unlicensed band, such as 5 GHz band, has been introduced, and this is called a licensed assisted access (LAA). In the LAA, an LTE cell that is a licensed band is operated as a P cell and an LAA cell that is an unlicensed band is operated as an S cell through application of the CA technology in the LTE. Accordingly, like the LTE, feedback generated in the LAA cell that is an S cell should be transmitted only from the P cell, and in the LAA cell, downlink subframes and uplink subframes can be freely applied. Unless separately described in the description, LTE may be called to include the whole LTE evolved technology, such as LTE-A and LAA.

On the other hand, new radio access technology (NR) that is a beyond LTE communication system and a 5G wireless cellular communication system (hereinafter, referred to as "5G system" in the description) are required to freely reflect various requirements of users and service providers, and thus the 5G system should support services that satisfy various requirements.

Accordingly, in the 5G system, various 5G-oriented services, such as enhanced mobile broadband (eMBB), massive machine type communication (mMTC), and ultra-reliable and low latency communications (URLLC), may be defined as technology to satisfy the requirements selected for respective 5G-oriented services, among requirements, such as 20 Gbps of the terminal maximum transmission speed, 500 km/h of the terminal maximum speed, 0.5 ms of the maximum delay time, and 1,000,000 UEs/km$^2$ of the terminal connection density.

For example, in order to provide an eMBB service in the 5G system, it is required for one base station to provide 20 Gbps of the terminal maximum transmission speed on downlink and to provide 10 Gbps of the terminal maximum transmission speed on uplink. At the same time, bodily sensed terminal average transmission speed should be increased. In order to satisfy the requirements as described above, there is a need for improvement of transmission/reception technology including more improved multiple-input multiple-output (MIMO) transmission technology.

At the same time, in order to support an application service, such as Internet of things (IoT) in the 5G system, an mMTC service is under consideration. In order to efficiently provide the Internet of things, the mMTC requires massive terminal connection support, terminal coverage improvement, improved battery time, and terminal cost reduction. Since the Internet of things is attached to various sensors and machines to provide communication functions, it is necessary to support a large number of terminals (e.g., 1,000,000 UEs/km$^2$) in the cell. Further, since there is high possibility that due to the service characteristics, the terminal is located in a shaded area, such as underground of a building or an area that cannot be covered by the cell, a wider coverage than the coverage provided by the eMBB is required. There is a high possibility that the mMTC is configured as a cheap terminal, and since it is difficult to frequently exchange the battery of the terminal, a very long battery life time is required.

Last, in case of the URLLC, it is a service used for remote control of a robot or machine device, industry automation, unmanned aerial vehicle, remote health care, and emergency situation alarm, and thus it is necessary to provide communication having low latency and ultra-reliability. For example, the URLLC should satisfy the maximum delay time that is shorter than 0.5 ms, and also should satisfy a packet error rate that is equal to or lower than $10^{-5}$. Accordingly, for the URLLC, transmission time interval (TTI) that is shorter than that of a 5G service, such as eMBB, should be provided, and design requirements in which wide resources should be allocated in the frequency band should be satisfied.

Services considered in the 5G wireless cellular communication system as described above should be provided as one framework. That is, for efficient resource management and control, it is preferable that respective services are not independently operated, but are integrally controlled and transmitted as one system.

Figure 2:
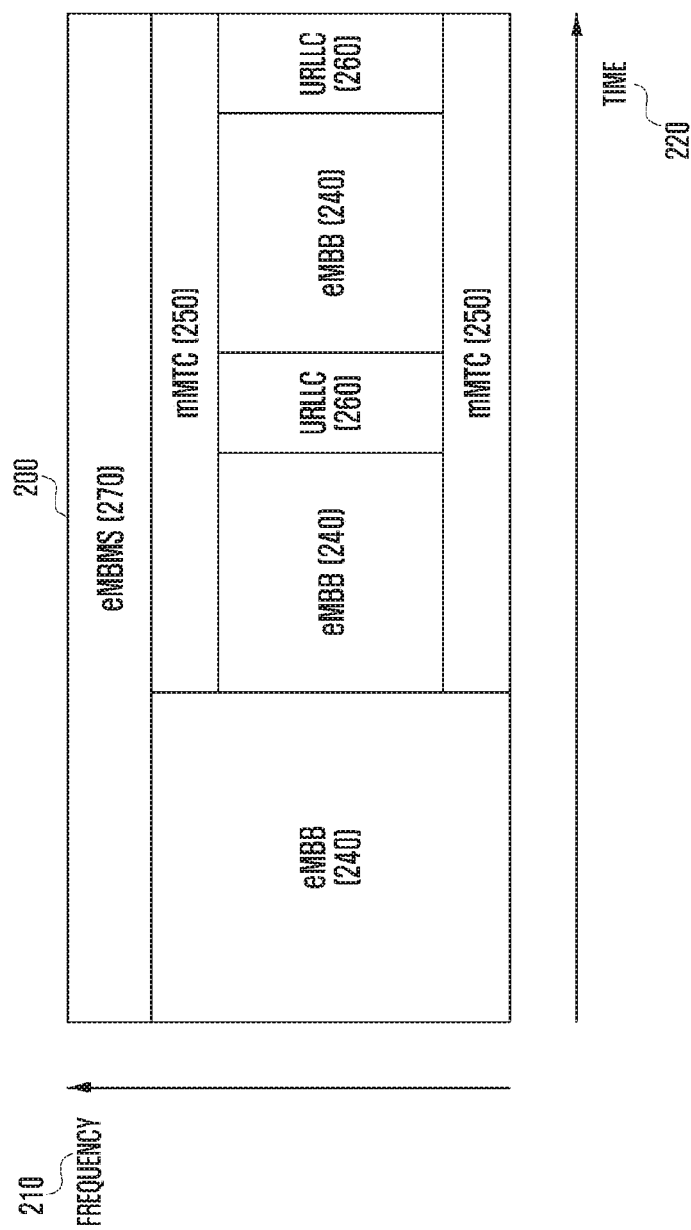
FIG. 2 is a diagram illustrating an example in which services that are considered in a 5G system are multiplexed and transmitted to one system.

FIG. 2 is a diagram illustrating an example in which services being considered in a 5G system are multiplexed through one system to be transmitted.

In FIG. 2, frequency-time resource 200 used in the 5G system may be composed of a frequency axis 210 and a time axis 220. In FIG. 2, it is exemplified that services of eMBB 240, mMTC 250, and URLLC 260 are operated by a 5G base station in one framework. Further, as a service that may be additionally considered in the 5G system, enhanced mobile broadcast/multicast service (eMBMS) 270 for providing cellular communication-based broadcasting services may be considered. The services being considered in the 5G system, such as eMBB 240, mMTC 250, URLLC 260, and eMBMS 270, may be multiplexed to be transmitted through time-division multiplexing (TDM) or frequency division multiplexing (FDM) in one system frequency bandwidth operated in the 5G system, and spatial division multiplexing may also be considered.

In case of eMBB 240, it is preferable to occupy and transmit the maximum frequency bandwidth at a certain specific time to provide increased data transmission speed as described above. Accordingly, in the service of eMBB 240, it is preferable that the service is TD-multiplexed with other services in the system transmission bandwidth 200 to be transmitted, but the service may also be FD-multiplexed with other services in the system transmission bandwidth in accordance with necessity of other services.

In case of mMTC 250, in order to secure a wide coverage in contrast with other services, an increased transmission interval is required, and the coverage can be secured through repeated transmission of the same packet in the transmission interval. At the same time, in order to reduce terminal complexity and terminal costs, the transmission bandwidth that can be received by the terminal is limited. In consideration of such requirements, it is preferable that mMTC 250 is FD-multiplexed with other services in the transmission system bandwidth 200 of the 5G system to be transmitted.

In order to satisfy ultra-low latency requirements requested by the service, it is preferable that URLLC 260 has a short transmission time interval (TTI) as compared with other services. At the same time, in order to satisfy ultra-reliability requirements, it is necessary to have a low coding rate, and thus it is preferable to have a wide bandwidth on the frequency side. In consideration of the requirements of the URLLC 260, it is preferable that the URLLC 260 is TD-multiplexed with other services in the transmission system bandwidth 200 of the 5G system.

As described above, in order to satisfy various requirements of the 5G system, the necessity of various services have been described, and requirements for the representatively considered services have been described.

On the other hand, even in case of multiplexing services and technologies for forward 5G phase 2 or beyond 5G into 5G operating frequencies in the 5G system, there exist requirements to provide the 5G phase 2 or beyond 5G technology and services so that there is no backward compatibility problem in operating the previous 5G technologies. The above-described requirement conditions are called forward compatibility, and technologies for satisfying the forward compatibility should be considered in case of designing the initial 5G system.

In the initial LTE standardization stage, consideration of the forward compatibility is unprepared, and thus there may be limitations in providing a new service in the LTE framework. For example, in case of the enhanced machine type communication (eMTC) applied in LTE Release 13, the terminal can perform communication only in the frequency band corresponding to 1.4 MHz regardless of the system bandwidth provided by a serving cell in order to reduce the terminal costs through reduction of the terminal complexity. Accordingly, the terminal that supports the eMTC cannot receive the PDCCH transmitted over the full band of the existing system bandwidth, and thus it is not possible to receive a signal at the time interval when the PDCCH is transmitted.

Accordingly, the 5G communication system should be designed so that services considered after the 5G communication system efficiently coexist with the 5G communication system. In the 5G communication system, for forward compatibility, resources should be able to be freely allocated and services should be able to be transmitted so that services to be considered forward can be freely transmitted in the time-frequency resource region supported in the 5G communication system.

In order to satisfy the requirements required by the respective services, the respective services as described above may have different transmission/reception techniques and transmission/reception parameters. For example, the respective services may have different numerologies in accordance with the respective service requirements. Here, the numerology includes a cyclic prefix (CP) length, sub-carrier spacing, OFDM symbol length, and transmission time interval (or transmit time interval) (TTI) in a communication system based on orthogonal frequency division multiplexing (OFDM) or orthogonal frequency division multiple access (OFDMA).

As an example in which the services have different numerologies, eMBMS 270 may have a long CP length as compared with other services. Since eMBMS 270 transmits a broadcasting-based upper traffic, the same data can be transmitted in all cells. In this case, as seen from the terminal, if signals received from a plurality of cells arrive to be delayed within the CP length, the terminal can receive and decode all the signals, and thus a single frequency network diversity gain can be obtained. Accordingly, even the terminal located on a cell boundary can receive broadcasting information without coverage limitations. However, if the CP length is relatively long as compared with that of other services having different CP lengths, waste due to a CP overhead occurs. Accordingly, a long OFDM symbol length as compared with that of other services is required, and thus a narrower subcarrier spacing as compared with that of other services is required.

Further, as an example in which different numerologies are used between services in the 5G system, in case of the URLLC, since a short TTI is required as compared with that of other services, a shorter OFDM symbol length may be required, and at the same time, a wider subcarrier spacing may be required.

On the other hand, the frequency range in which the 5G system is considered to operate reaches several GHz to several tens of GHz, and in the several GHz band having low frequency, a frequency division duplex (FDD) is preferred rather than a time division duplex (TDD), and in the several tens of GHz band having high frequency, it is considered that the TDD is more suitable than the FDD. In case of multiplexing various 5G services in one TDD carrier, services having different transmission time intervals may require different frame structures (i.e., uplink or downlink frame), and there is a need for schemes for a base station to multiplex services having different transmission time intervals and for a terminal to decode the services transmitted to the germinal in the respective transmission time intervals.

Hereinafter, preferred embodiments of the present disclosure will be described in detail with reference to the accompanying drawings. In the accompanying drawings, it is to be noted that the same reference numerals are used for the same constituent elements. Further, a detailed description of known functions and configurations will be omitted if it obscures the subject matter of the present disclosure.

Further, in describing embodiments of the present disclosure in detail, LTE and 5G systems will be the main subject. However, the main subject of the present disclosure may also be applied to other communication systems having similar technical backgrounds or channel types through slight modifications thereof in a range that does not greatly deviate from the scope of the present disclosure through the judgment of those skilled in the art to which the present disclosure pertains.

Hereinafter, a 5G communication system in which 5G cells operate in a standalone manner or a 5G communication system in which 5G cells are combined with other standalone 5G cells through dual connectivity or CA to operate in a non-standalone manner will be described.

FIGS. 3 and 4 are diagrams illustrating embodiments of a communication system to which the present disclosure is applied. Schemes proposed in the present disclosure can be applied to the system of FIG. 3 and the system of FIG. 4 in all.

Referring to FIG. 3, (a) 300 of FIG. 3 shows a case where a 5G cell 320 operates in a standalone manner in one base station 310 in a network. A terminal 330 is a 5G capable terminal having a 5G transmission/reception module. The terminal 330 acquires synchronization through a synchronization signal transmitted from a 5G standalone cell 320, receives system information, and then attempts a random access to a 5G base station 310. The terminal 330 transmits and receives data through the 5G cell 320 after establishing a radio resource control (RRC) connection with the 5G base station 310. In this case, the duplex type of the 5G cell 320 is not limited. In the system of (a) of FIG. 3, the 5G cell may be provided with a plurality of serving cells.

Next, (b) 350 of FIG. 3 shows a case where a 5G standalone base station 355 and a 5G non-standalone base station 360 for increasing the data rate are installed. A terminal 370 is a 5G capable terminal having a 5G transmission/reception module for performing 5G communication with a plurality of base stations. The 5G capable terminal may be a terminal supporting only one 5G service, or a terminal supporting a plurality of 5G services. The terminal supporting only one 5G service can support one numerology, and the terminal supporting the plurality of 5G services can support a plurality of numerologies.

The terminal 370 acquires synchronization through a synchronization signal transmitted from the 5G standalone base station 355, receives system information, and then attempts a random access to the 5G standalone base station 355. The terminal 370 additionally configure a 5G non-standalone cell 380 after establishing an RRC connection with the 5G standalone base station 355, and transmits and receives data through the 5G standalone base station 355 or the 5G non-standalone base station 360. In this case, cell 320 after establishing a radio resource control (RRC) connection with the 5G base station 310. In this case, the duplex type of the 5G standalone base station 355 or the 5G non-standalone base station 360 is not limited, and it is assumed that the 5G standalone base station 355 and the 5G non-standalone base station 360 are connected through an ideal backhaul network or a non-ideal backhaul network. Accordingly, in case of having the ideal backhaul network 365, rapid X2 communication between base stations becomes possible. In the system of (b) of FIG. 3, a 5G cell may be provided with a plurality of serving cells.

Next, referring to FIG. 4, (a) 400 of FIG. 4 shows a case where an LTE cell 420 and a 5G cell 430 coexist in one base station 410 in a network. A terminal 440 may be an LTE capable terminal having an LTE transmission/reception module, a 5G capable terminal having a 5G transmission/reception module, or a terminal having both the LTE transmission/reception module and the 5G transmission/reception module. The 5G capable terminal having the 5G transmission/reception module may be a terminal supporting only one 5G service, or a terminal supporting a plurality of 5G services. The terminal supporting only one 5G service can support one numerology, and the terminal supporting the plurality of 5G services can support a plurality of numerologies.

The terminal 440 acquires synchronization through a synchronization signal transmitted from an LTE cell 420 or a 5G cell 430, receives system information, and then transmits and receives data through the base station 410, the LTE cell 420, or the 5G cell 430. In this case, the duplex type of the LTE cell 420 or the 5G cell 430 is not limited. If the LTE cell is a P cell, uplink control information is transmitted through the LTE cell 420, whereas if the 5G cell is a P cell, the uplink control information is transmitted through the 5G cell 430. In the system of (a) of FIG. 4, the LTE cell and the 5G cell may be provided with a plurality of serving cells, and may support 32 serving cells in all.

It is assumed that the base station 410 is provided with both the LTE transmission/reception module (system) and the 5G transmission/reception module (system) in the network, and the base station 410 can manage and operate in real time the LTE system and the 5G system. If resources are divided in terms of time, and the LTE system and the 5G system are operated at different times, the base station can dynamically select time resource allocation of the LTE system and the 5G system. The terminal 440 receives from the LTE cell 420 or the 5G cell 430 a signal indicating allocation of resources (time resources, frequency resources, antenna resources, or spatial resources) dividedly operated through the LTE cell and the 5G cell, and thus can be aware of what resources data transmission/reception on the LTE cell 420 and the 5G cell 530 is performed through.

Next, (b) of FIG. 4 shows a case where an LTE macro base station 455 for a wide coverage and a 5G small base station 460 for the data rate increase are installed in a network. A terminal 470 may be an LTE capable terminal having an LTE transmission/reception module, a 5G capable terminal having a 5G transmission/reception module, or a terminal having both the LTE transmission/reception module and the 5G transmission/reception module. The 5G capable terminal having the 5G transmission/reception module may be a terminal supporting only one 5G service, or a terminal supporting a plurality of 5G services. The terminal supporting only one 5G service can support one numerology, and the terminal supporting the plurality of 5G services can support a plurality of numerologies.

The terminal 470 acquires synchronization through a synchronization signal transmitted from the LTE base station 455 or the 5G base station 460, receives system information, and then transmits and receives data through the LTE base station 455 and the 5G base station 460. In this case, the duplex type of the LTE macro base station 455 or the 5G small base station 460 is not limited. If the LTE cell is a P cell, uplink control information is transmitted through an LTE cell 480, and if the 5G cell is a P cell, the uplink control information is transmitted through a 5G cell 475. In this case, it is assumed that the LTE base station 455 and the 5G base station 460 have an ideal backhaul network or a non-ideal backhaul network. Accordingly, in case of having the ideal backhaul network 465, rapid X2 communication between base stations becomes possible, and thus it is possible for the 5G base station 460 to receive in real time related control information from the LTE base station 455 through the X2 communication even if the uplink transmission is performed only with respect to the LTE base station 455. In the system of (b) of FIG. 4, the LTE cell and the 5G cell may be provided with a plurality of serving cells, and may support 32 serving cells in all.

The base station 455 or 460 can manage and operate in real time the LTE system and the 5G system. If resources are divided in terms of time and the LTE system and the 5G system are operated at different times, the LTE base station can dynamically allocate time resources of the LTE system and the 5G system, and can transmit the signal to the 5G base station 460 through an X2 interface (and the reverse thereof is also possible). The terminal 470 receives from the LTE base station 455 or the 5G base station 460 a signal indicating allocation of resources (time resources, frequency resources, antenna resources, or spatial resources) dividedly operated through the LTE cell and the 5G cell, and thus can be aware of what resources data transmission/reception on the LTE cell 480 and the 5G cell 475 is performed through.

On the other hand, if the LTE base station 455 and the 5G base station 460 have a non-ideal backhaul network 465, X2 communication between early base stations is not possible. Accordingly, it is possible for the base station 455 or 460 to semi-statically operate the LTE system and the 5G system. For example, if the base station 455 divides resources in terms of time and operates the LTE system and the 5G system at different times, time resources of the LTE system and the 5G system are allocated, and the signal is pre-transmitted to another base station 460 through X2 interface, so that the resources of the LTE system and the 5G system can be discriminated from each other (and the reverse thereof is also possible). The terminal 470 receives a signal indicating allocation of the resources (time resource, frequency resource, antenna resource, or spatial resource) for dividedly operating the LTE cell and the 5G cell from the LTE base station 455 or the 5G base station 460 (and the reverse thereof is also possible), and thus can be aware of what resources data transmission/reception on the LTE cell 480 and the 5G cell 475 is performed through.

Figure 5:
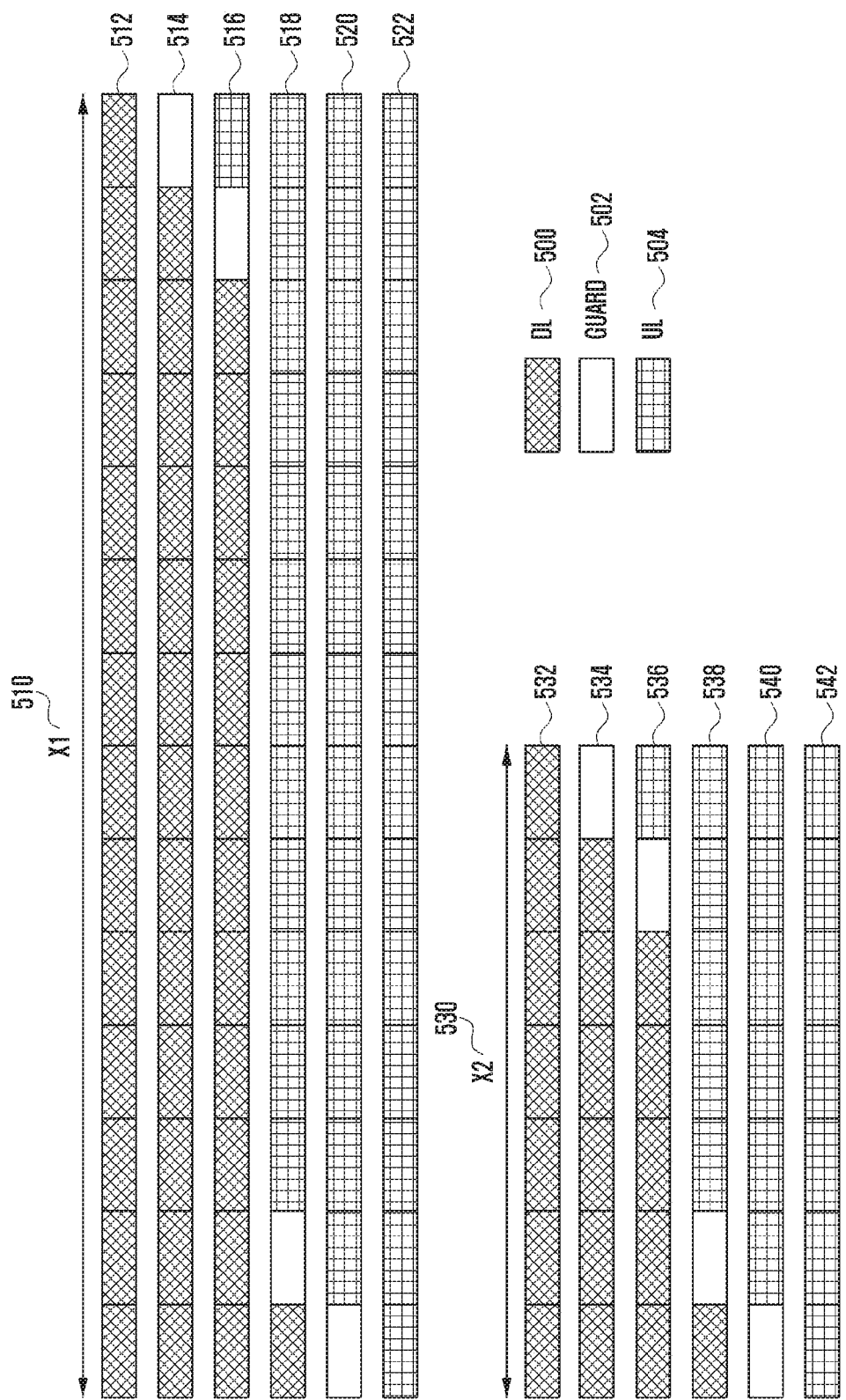
FIG. 5 is a diagram illustrating subframe structures proposed in an embodiment.

Next, FIG. 5 is a diagram illustrating subframe structures proposed in an embodiment of the present disclosure. Through an upper end and a lower end of FIG. 5, subframe structures in transmission time intervals that various services can have in a 5G communication system will be described.

The upper end and the lower end X1 510 and X2 530 of FIG. 5 illustrate various transmission time intervals that can be used by a specific service or a terminal of the specific service, and subframe structures 512 to 522 and 532 to 542 in respective transmission time intervals are illustrated in FIG. 5. For example, X1 may be 1 ms, and X2 may be 0.5 ms. X1 and X2 are to explain relative transmission time intervals, and in a 5G communication system, only one transmission time interval may be used, or at least one or more transmission time intervals X1, X2, X3, . . . may be multiplexed and used. In the present disclosure, a unit of signals transmitted at one transmission time interval is called a subframe, a slot, or a mini-slot, and a subframe is composed of at least one DL symbol 500, guard symbol 502, or UL symbol 504. If OFDM is used for a symbol, such a symbol may be defined as an OFDM symbol, and the length of the OFDM symbol may differ depending on the subcarrier spacing, CP length, and bandwidth size.

What subframes 514, 516, 518, 520, and 522 are to be used is indicated to a terminal by a base station, and the terminal acquires information related to the subframes 514, 516, 518, 520, and 522, that is, when and what subframes are to be used, through an higher layer signal or a physical signal. The location and the number of respective subframes 514, 516, 518, 520, and 522 may be configured in advance by the higher layer signal, and the terminal may acquire related information. Further, the location and the number of the respective subframes may be indicated by the physical signal, and the terminal may acquire the kind of a next subframe in each subframe or previous subframe.

First, a DL symbol 500, guard symbol 502, or UL symbol 504, which is a constituent element constituting each subframe, will be described.

Each subframe is composed of at least one DL symbol 500, guard symbol, or UL symbol 504, and the DL symbol 500 is used to transmit control information and downlink data. If symbols located on both sides of the guard symbol are in different directions (i.e., UL and DL) in one subframe or in consideration of two successive subframes, the guard symbol 502 is used to secure RF switching time of a terminal or a base station and to absorb a delay time due to a distance between the terminal and the base station in the guard symbol 502. Further, the guard symbol 502 is used to secure the processing time of the terminal having capability of receiving downlink data in one subframe and transmitting uplink control information for the downlink data. The number of guard symbols 502 in the subframe is predetermined by the base station in consideration of the RF switching times of terminals existing in the cell and a cell radius, and the terminal may acquire from the base station information on the number of guard symbols in the subframe through the higher layer signal. The UL symbol 504 is used to transmit the uplink control information and uplink data. The number of UL symbols 504 in one subframe is predetermined by the base station in consideration of the uplink control information caused by the cell radius and the coverage of the uplink data transmission, and the terminal may acquire from the base station information on the number of UL symbols in one subframe through the higher layer signal.

Next, each subframe structure corresponding to a transmission time interval X1 510 is as follows.

A subframe 512 is composed of only DL symbols 500.

A subframe 514 is composed of DL symbols 500 and a guard symbol 502.

A subframe 516 is composed of DL symbols 500, a guard symbol 502, and a UL symbol 504. The subframe 516 has a structure capable of performing transmission/reception of the downlink control information and the downlink data and transmission/reception of the uplink control information for the downlink data in the same subframe.

A subframe 518 is composed of a DL symbol 500, a guard symbol 502, and UL symbols 504. The subframe 518 has a structure capable of performing transmission/reception of the downlink control information and the downlink data indicated as the downlink control information in the same subframe.

A subframe 520 is composed of a guard symbol 502 and UL symbols 504.

A subframe 522 is composed of only UL symbols 504.

Next, each subframe structure corresponding to a transmission time interval X2 530 is as follows.

A subframe 532 is composed of only DL symbols 500.

A subframe 534 is composed of DL symbols 500 and a guard symbol 502.

A subframe 536 is composed of DL symbols 500, a guard symbol 502, and a UL symbol 504. The subframe 536 has a structure capable of performing transmission/reception of the downlink control information and the downlink data and transmission/reception of the uplink control information for the downlink data in the same subframe.

A subframe 538 is composed of a DL symbol 500, a guard symbol 502, and UL symbols 504. The subframe 538 has a subframe structure capable of performing transmission/reception of the downlink control information and the uplink data indicated as the downlink control information in the same subframe.

A subframe 540 is composed of a guard symbol 502 and UL symbols 504.

A subframe 542 is composed of only UL symbols 504.

Next, through FIG. 6, a problem occurring when various transmission time intervals are multiplexed in one carrier will be described.

Figure 6:
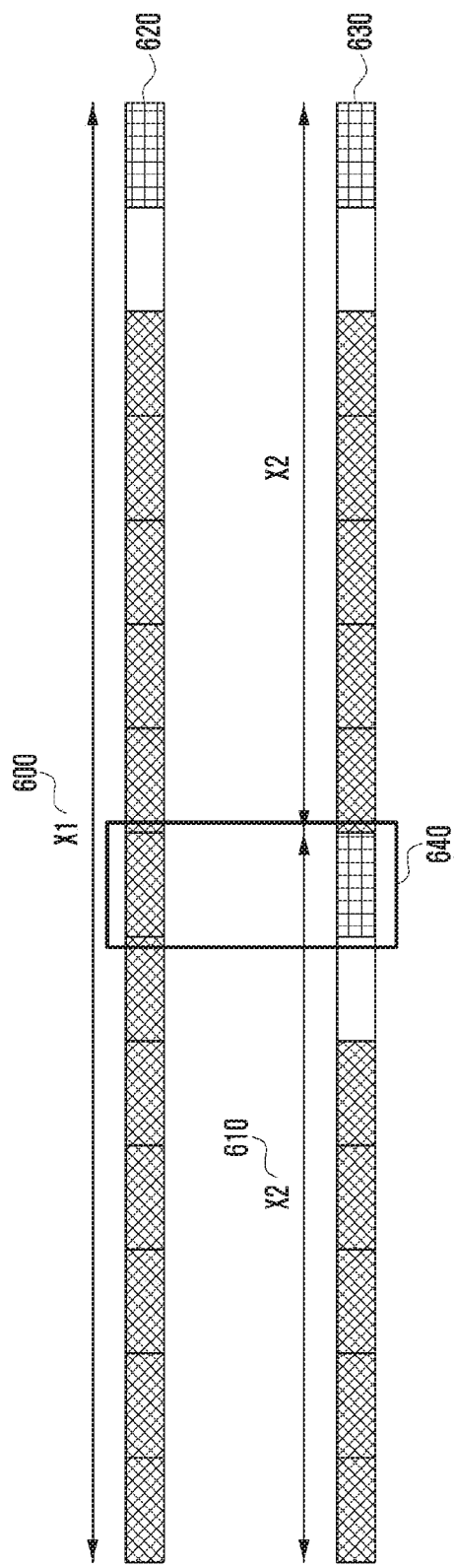
FIG. 6 is a diagram illustrating a problem intended to be solved in the present disclosure.

FIG. 6 is a diagram illustrating a problem intended to be solved in the present disclosure.

FIG. 6 illustrates a situation where a subframe 620 by a transmission time interval X1 600 and a subframe 630 by X2 610 having a different transmission time interval from the transmission time interval X1 600 are mixed and multiplexed in one carrier, particularly, in a TDD carrier.

The subframe by the transmission time interval X1 600 is composed of DL symbols, a guard symbol, and a UL symbol, and the subframe by X2 is also composed of DL symbols, a guard symbol, and a UL symbol. In an example of FIG. 6, since the length of X1 is twice the length of X2, it can be known that the subframe length by X1 corresponds to two subframe lengths by X2.

In this case, the DL symbols of the subframe 620 by X1 exist at the same time as the time of the Ul symbols in the subframes 630 configured by X2 (640). That is, reception of downlink data of a terminal provided with a service based on X1 is performed at the same time as the time of transmission of uplink data of a terminal provided with a service based on X2. In this case, the reception of the downlink data of the terminal provided with the service based on X1 may be interfered with the transmission of the uplink data of the terminal provided with the service based on X2, and the base station should simultaneously perform the reception of the uplink data based on X2 and the transmission of the downlink data based on X1.

There is a need for schemes to avoid problems related to the interference occurrence and hardware complexity for performing bidirectional simultaneous data transmission and reception by the base station. The present disclosure proposes a scheme for solving the above-described problem and a scheme for multiplexing the various transmission time intervals.

Figure 8A:
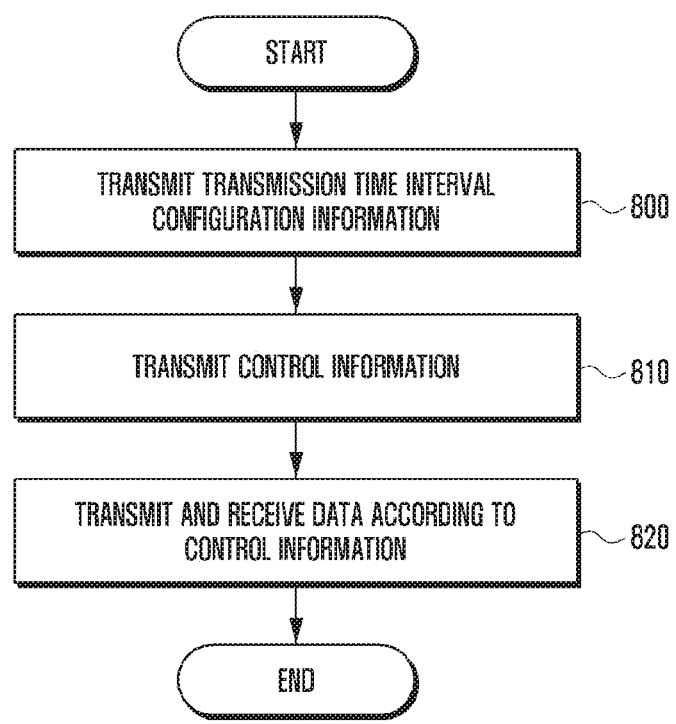
Figure 8B:
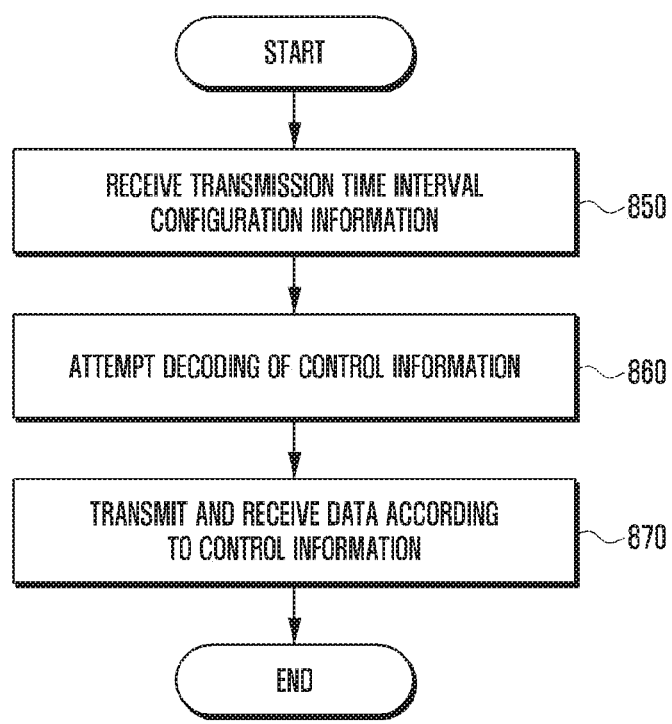

FIGS. 7, 8A, and 8B are diagrams illustrating the (1-1)-th embodiment proposed in the present disclosure.

FIG. 7 is a diagram illustrating an example in which a subframe structure is notified through a common transmission time interval and a dedicated transmission time interval, and control information and data transmission in accordance with the subframe structure is performed in the dedicated transmission time interval.

As illustrated in (a) of FIG. 7, a common transmission time interval 700 and a dedicated transmission time interval 710 are respectively configured. The common transmission time interval 700 is a transmission time interval for determining a subframe structure to be used by a base station and all terminals in a cell in the common transmission time interval 700, and the dedicated transmission time interval may be configured based on the common transmission time interval. That is, the length of the common transmission time interval may be configured as a multiple of the length of the dedicated transmission time interval. The common transmission time interval is applied to all terminals in the cell, and the dedicated transmission time interval may be applied to a terminal that actually transmits and receives data. Since even a terminal to which uplink/downlink data transmission/reception has not been configured by the base station may require communication with the base station, it is necessary to configure the common transmission time interval.

The subframe structure may be preconfigured for a predetermined time and may be indicated to the terminal, and in this case, the subframe structure may be transmitted through an higher layer signal including a system signal and an RRC signal. Further, the subframe structure may be changed at each common transmission time interval to be indicated to the terminal, and in this case, the subframe structure may be transmitted through a physical signal. If the physical signal for indicating the subframe structure is transmitted, a terminal decoding operation for discovering the subframe structure (i.e., for receiving subframe structure information) may be performed in accordance with the common transmission time interval 700. For example, the current subframe structure or the subframe structure for the next common transmission time interval may be determined through control information transmission of the base station at the first symbol at which the common transmission time interval 700 starts, and the terminal may acquire the subframe structure through decoding of the control information at the first symbol at which each common transmission time interval 700 starts. The subframe structure includes the subframe structure as described above with reference to FIG. 5.

The dedicated transmission time interval 710 is a transmission time interval for transmitting the control information to the terminal and transmitting the data information, and it is possible to configure dedicated transmission time intervals 710 having different lengths for each service. For example, at 720, the dedicated transmission time interval 710 has a length corresponding to a half of the common transmission time interval 700, and in accordance with the lengths, the control information including the subframe structure information and the data information scheduled by the control information are transmitted. The subframe structure information may include subframe structure information for the dedicated transmission time interval. Further, at 730, the dedicated transmission time interval 730 has the same length as the length of the common transmission time interval 700, and in accordance with the lengths, the control information including the subframe structure information and the data information scheduled by the control information are transmitted.

Through (b) of FIG. 7, an example in which the base station and the terminal operate in a manner that a common transmission time interval and the dedicated transmission time interval are defined differently from those in (a) of FIG. 7 will be described. In FIG. 7, a common transmission time interval 760 and a dedicated transmission time interval 750 are respectively configured. In this case, the length of the dedicated transmission time interval may be configured as a multiple of the length of the common transmission time interval.

As illustrated in (b) of FIG. 7, the common transmission time interval 760 may mean a period in which the terminal should attempt to decode a signal transmitted by the base station in order to discover the location in which the subframe structure used at the dedicated transmission time interval starts. The subframe structure may be changed at each dedicated transmission time interval, and such a change may be indicated to the terminal. In this case, the subframe structure may be transmitted through a physical signal. If the physical signal is transmitted, a terminal decoding operation for discovering the location where the subframe structure starts (i.e., for receiving the subframe structure information) may be performed in accordance with the common transmission time interval 760. For example, the start location of the current subframe structure or the subframe structure for the next common transmission time interval may be determined through the control information transmission of the base station at the first symbol at which the common transmission time interval 760 starts, and the terminal may acquire the location where the subframe structure of the dedicated transmission time interval through decoding of the control information at the first symbol at which each common transmission time interval 760 starts. The subframe structure includes the subframe structure as described above with reference to FIG. 5.

The dedicated transmission time interval 760 is a transmission time interval for transmitting the control information to the terminal and transmitting the data information, and it is possible to configure dedicated transmission time intervals 750 having different lengths for each service. For example, at 770, the dedicated transmission time interval 750 has a length corresponding to twice the common transmission time interval 760, and in accordance with the lengths, the control information including the subframe structure information and the data information scheduled by the control information are transmitted.

FIGS. 8A and 8B are diagrams illustrating base station and terminal procedures with respect to the method as described above with reference to (a) of FIG. 7.

FIG. 8A is a diagram illustrating a base station procedure according to the (1-1)-th embodiment of the present disclosure.

At operation 800, the base station transmits transmission time interval configuration information to the terminal. As illustrated in (a) of FIG. 7, the transmission time interval configuration information includes information related to a common transmission time interval and a dedicated transmission time interval, and the configuration information is transmitted to the terminal through an higher layer signal or a physical signal including a system signal or/and an RRC signal. Further, the subframe structure may be predetermined for a predetermined time, and may be transmitted to the terminal through the higher layer signal or the physical signal including the system signal or/and the RRC signal.

At operation 810, the base station transmits control information including data scheduling information for a 5G service to the terminal. The control information may include a subframe structure in accordance with the common transmission time interval. The control information may have a subframe structure for the current common transmission time interval or the next common transmission time interval. Further, the control information may include subframe structure information for the dedicated transmission time interval. The control information may be transmitted at the first symbol of the subframe. Further, the data scheduling information includes scheduling information for all services considered for the 5G system as described above, and the scheduling information includes information indicating a frequency resource or a time resource for data transmission of 5G services. The data scheduling information may be transmitted by the higher layer signal or the physical signal.

At operation 820, the base station transmits and receives data with the terminal in accordance with the control information for the 5G services. The control information may include the subframe structure as described above at operation 810. In this case, the base station transmits and receives data with the terminal in accordance with the indicated subframe structure.

FIG. 8B is a diagram illustrating a terminal procedure according to the (1-1)-th embodiment of the present disclosure.

At operation 850, the terminal receives transmission time interval configuration information from the base station. As described above with reference to (a) of FIG. 7, the transmission time interval configuration information includes information related to a common transmission time interval and a dedicated transmission time interval, and the configuration information is transmitted to the terminal through an higher layer signal or a physical signal including a system signal or/and an RRC signal. Further, the subframe structure may be predetermined for a predetermined time, and may be transmitted to the terminal through the higher layer signal or the physical signal including the system signal or/and the RRC signal.

At operation 860, the terminal attempts to receive from the base station control information including data scheduling information for a 5G service. The control information may include a subframe structure in accordance with the common transmission time interval. The control information may have a subframe structure for the current common transmission time interval or the next common transmission time interval. Further, the control information may include subframe structure information for the dedicated transmission time interval. The control information may be transmitted at the first symbol of the subframe. Further, the data scheduling information includes scheduling information for all services considered for the 5G system as described above, and the scheduling information includes information indicating a frequency resource or a time resource for data transmission of 5G services. The data scheduling information may be transmitted by the higher layer signal or the physical signal.

At operation 870, the terminal transmits and receives data with the base station in accordance with the control information for the 5G services. The control information may include the subframe structure as described above at operation 860, and in this case, the terminal transmits and receives data with the base station in accordance with the indicated subframe structure.

Figure 10:
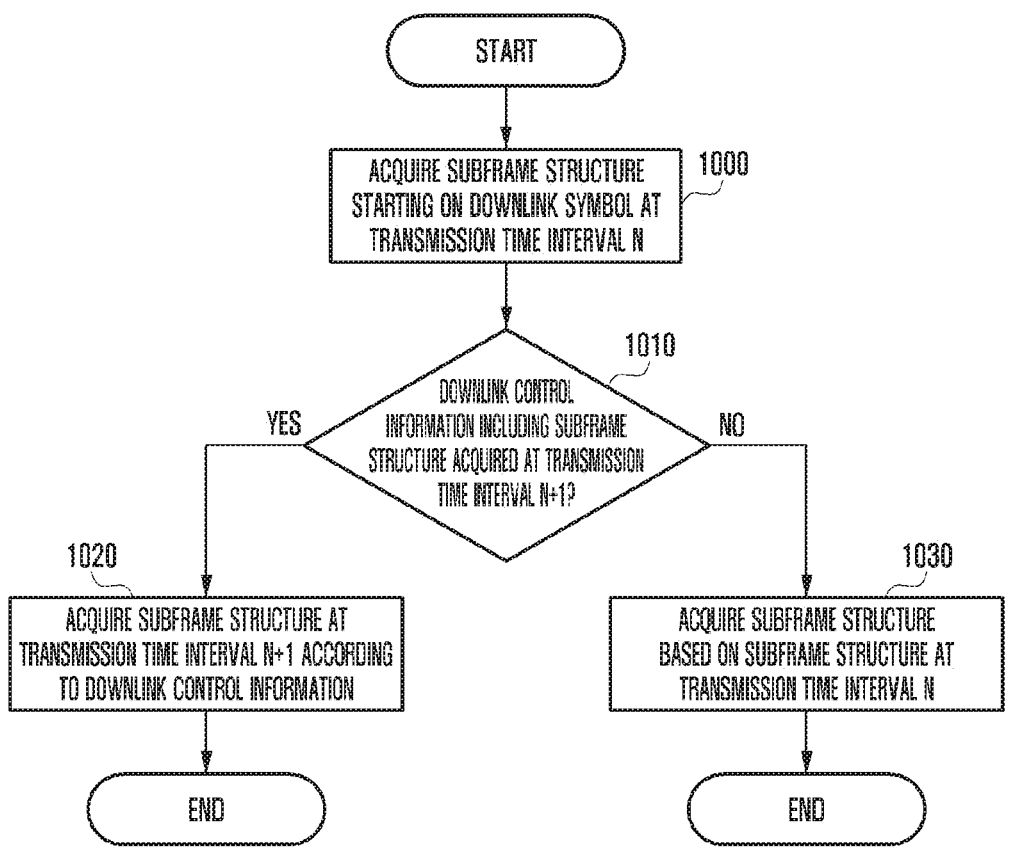

FIGS. 9 and 10 are diagrams illustrating the (1-2)-th embodiment proposed in the present disclosure.

Through FIG. 9, a method will be described, in which a base station notifies a terminal of a subframe structure for a common transmission time interval, and if the first symbol of the subframe is a UL symbol on which downlink control information is unable to be transmitted, the base station determines the next subframe structure based on the previous subframe structure. This method may be applied to a case where the corresponding subframe structure is notified for each subframe, and the terminal can be aware of the current subframe structure through decoding of the signal for transmitting the subframe structure.

Referring to FIG. 9, a common transmission time interval 900 or 910 is configured, and the subframe structure having the length of the common transmission time interval is determined. The subframe structure starting from a DL symbol at the previous common transmission time interval 900 is determined and indicated to the terminal, and if the subframe structure at the next common transmission time interval 910 starts from the UL symbol, control information for notifying the terminal of the subframe structure starting from the Ul symbol is unable to be transmitted to the terminal. In this case, the terminal may determine the subframe structure transmitted at the next common transmission time interval 910 based on the subframe structure of the previous common transmission time interval 900.

For example, at 920, if the subframe structure of the previous common transmission time interval 900 is composed of only the DL symbols, the subframe structure of the next common transmission time interval 910 should start from a guard symbol between the DL symbol and the UL symbol. Accordingly, if the downlink control information cannot be acquired although the terminal attempts decoding of the downlink control information including the subframe structure (940), it can be known that 910 has the UL subframe structure composed of the guard symbol and the UL symbol.

Further, at 925, if the subframe structure of the previous common transmission time interval 900 is composed of the DL symbol and the guard symbol, the subframe structure of the next common transmission time interval 910 should start from the UL symbol. Accordingly, if the downlink control information cannot be acquired although the terminal attempts decoding of the downlink control information including the subframe structure (945), it can be known that 910 has the UL subframe structure composed of only the UL subframe structure.

Further, at 930, if the subframe structure of the previous common transmission time interval 900 is composed of a DL symbol, a guard symbol, and a UL symbol, the subframe structure of the next common transmission time interval 910 should start from the UL symbol. Accordingly, if the downlink control information cannot be acquired although the terminal attempts decoding of the downlink control information including the subframe structure (950), it can be known that 910 has the UL subframe structure composed of only the UL symbol.

Further, at 935, if the subframe structure of the previous common transmission time interval 900 is composed of a DL symbol, a guard symbol, and a UL symbol, the subframe structure of the next common transmission time interval 910 should be a subframe structure starting from the UL symbol. Accordingly, if the downlink control information cannot be acquired although the terminal attempts decoding of the downlink control information including the subframe structure (955), it can be known that 910 has the UL subframe structure composed of only the UL symbol.

FIG. 10 is a diagram illustrating a terminal procedure according to the (1-2)-th embodiment as described above with reference to FIG. 9.

At operation 1000, the terminal acquires from the base station the subframe structure starting from a DL symbol at transmission time interval n. The subframe structure starting from the DL symbol may be one of the subframe structures presented in FIG. 5. As described above with reference to (a) of FIG. 7, the transmission time interval configuration information includes information related to the common transmission time interval and the dedicated transmission time interval, and the configuration information is transmitted to the terminal through a higher layer signal or a physical signal including a system signal and/or an RRC signal. Further, the subframe structure may be predetermined for a predetermined time, and may be transmitted to the terminal through the higher layer signal or the physical signal including the system signal and/or the RRC signal.

At operation 1010, the terminal determines whether to acquire the downlink control information by attempting reception of the downlink control information including the subframe structure from the base station at transmission time interval n+1. The control information may include the subframe structure in accordance with the common transmission time interval, and the control information may be the subframe structure for the current common transmission time interval or the next common transmission time interval. The control information may be transmitted at the first symbol of the subframe.

If the terminal has succeeded in receiving the downlink control information at operation 1010, the terminal, at operation 1020, acquires the subframe structure of the transmission time interval n+1 included in the downlink control information.

If the terminal has not succeeded in receiving the downlink control information at operation 1010, the terminal, at operation 1030, acquires the subframe structure of the transmission time interval n+1 based on the subframe structure of the transmission time interval n. A detailed method follows the method as described above with reference to FIG. 9.

Figure 11:
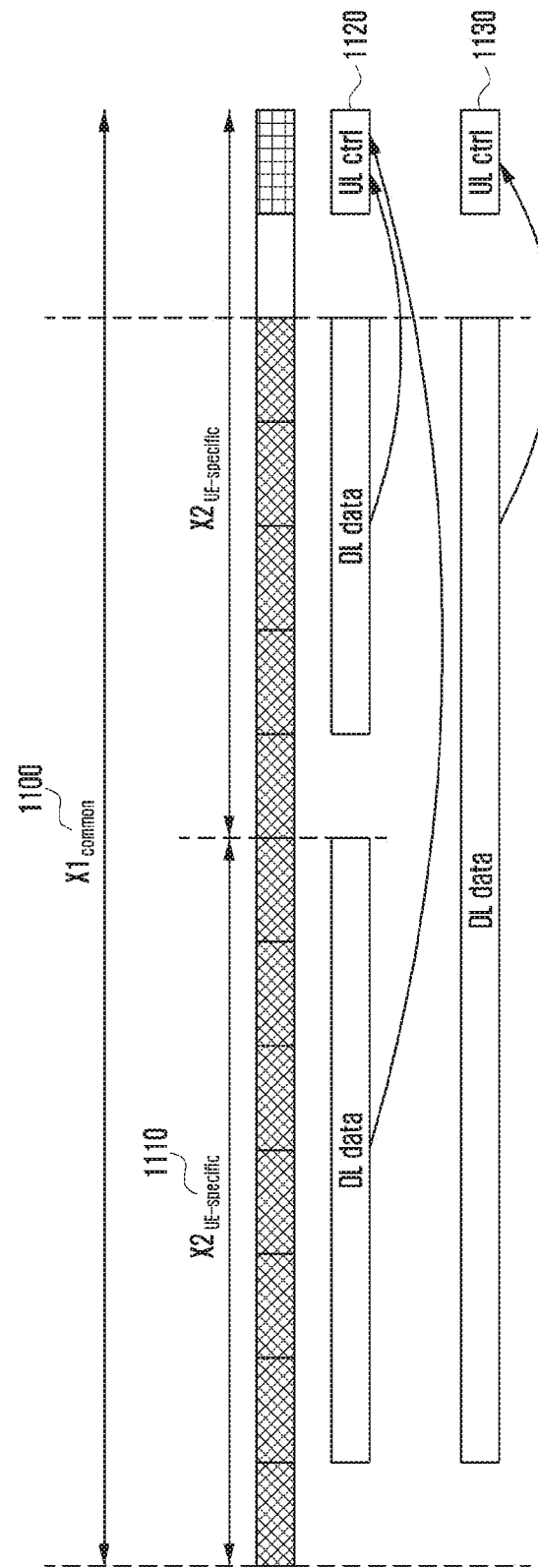
FIGS. 11, 12A, and 12B are diagrams illustrating the (1-3)-th embodiment proposed in the present disclosure.
Figure 12A:
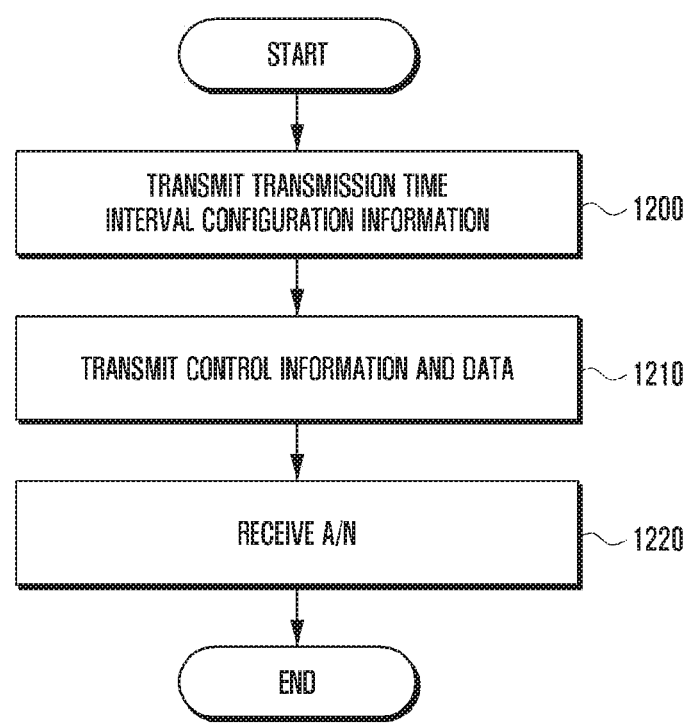
Figure 12B:
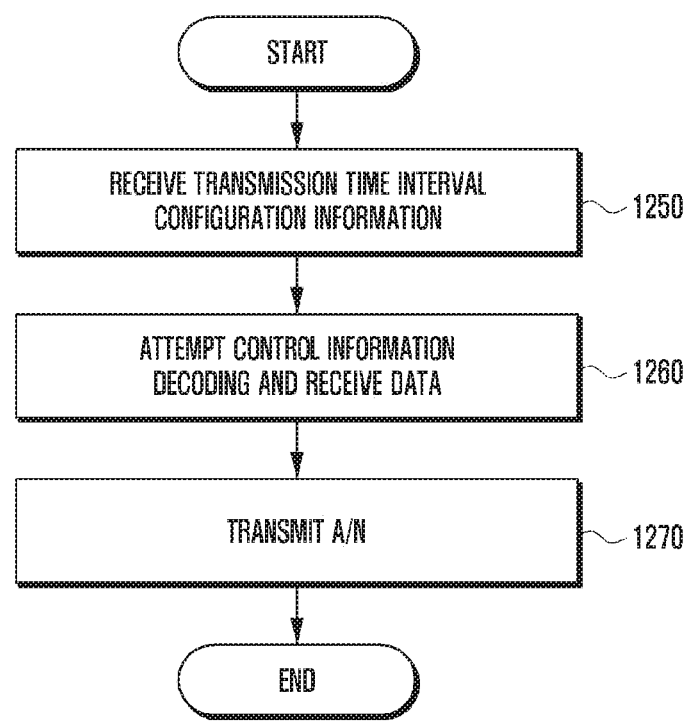

FIGS. 11, 12A, and 12B are diagrams illustrating the (1-3)-th embodiment proposed in the present disclosure.

Through FIG. 11, a method will be described, in which a base station notifies a terminal of a subframe structure through a common transmission time interval and a dedicated transmission time interval and performs downlink data transmission in accordance with the subframe structure at the dedicated transmission time interval, and the terminal transmits uplink feedback information indicating whether the data has been properly received.

Referring to FIG. 11, a common transmission time interval 1100 and a dedicated transmission time interval 1110 may follow those as described above with reference to (a) and (b) of FIG. 7. Uplink feedback information 1120 for downlink data transmitted in accordance with a subframe structure at a dedicated transmission time interval and uplink feedback information 1130 for data transmitted in accordance with a subframe structure according to the length of the common transmission time interval may be multiplexed to be transmitted at the same time.

A first method for multiplexing uplink feedback information is that a terminal transmits feedback information on respective UL control channels for feedback transmission for the data transmitted between the different transmission time intervals. In this case, if the power of the terminal is insufficient, the terminal may first adjust the power with respect to the feedback for the data corresponding to the dedicated transmission time interval to protect the feedback for the data to be transmitted at the common transmission time interval.

Another method for multiplexing uplink feedback information is that a terminal transmits feedback information on one UL control channel for feedback transmission for the data transmitted between the different transmission time intervals, and multiplexes the feedback information with a fixed length. If the terminal misses specific data, the base station does not know what data the terminal has transmitted the feedback for, and thus the above-described problem can be solved by fixing a payload size of the feedback for the data transmitted at different transmission time intervals and by fixing the location of the corresponding feedback.

FIGS. 12A and 12B are diagrams illustrating base station and terminal procedures with respect to the method as described above with reference to FIG. 11.

First, a base station procedure according to the (1-3)-th embodiment of the present disclosure will be described based on FIG. 12A.

At operation 1200, the base station transmits transmission time interval configuration information to the terminal. As described above with reference to (a) of FIG. 7, the transmission time interval configuration information includes information related to a common transmission time interval and a dedicated transmission time interval, and the configuration information is transmitted to the terminal through a higher layer signal or a physical signal including a system signal and/or an RRC signal. Further, the subframe structure may be predetermined for a predetermined time, and may be transmitted to the terminal through the higher layer signal or the physical signal including the system signal or/and the RRC signal.

At operation 1210, the base station transmits to the terminal control information including data scheduling information for a 5G service and data. The control information may include a subframe structure in accordance with the common transmission time interval, and the control information may have a subframe structure for the current common transmission time interval or the next common transmission time interval. The control information may be transmitted at the first symbol of the subframe. Further, the data scheduling information includes scheduling information for all services considered for the 5G system as described above, and the scheduling information includes information indicating a frequency resource or a time resource for data transmission of 5G services. The data scheduling information may be transmitted by the higher layer signal or the physical signal. The base station transmits and receives data in accordance with the subframe structure indicated by the control information.

At operation 1220, the base station receives a feedback for data transmitted at operation 1210. The feedback reception follows the method as described above through FIG. 11.

Next, a terminal procedure according to the (1-3)-th embodiment of the present disclosure will be described based on FIG. 12B.

At operation 1250, the terminal receives transmission time interval configuration information from the base station. As described above with reference to (a) of FIG. 7, the transmission time interval configuration information includes information related to a common transmission time interval and a dedicated transmission time interval, and the configuration information is transmitted to the terminal through a higher layer signal or a physical signal including a system signal and/or an RRC signal. Further, the subframe structure may be predetermined for a predetermined time, and may be transmitted to the terminal through the higher layer signal or the physical signal including the system signal and/or the RRC signal.

At operation 1260, the terminal receives from the base station control information including data scheduling information for a 5G service and data. The control information may include a subframe structure in accordance with the common transmission time interval. The control information may have a subframe structure for the current common transmission time interval or the next common transmission time interval. The control information may be transmitted at the first symbol of the subframe. Further, the data scheduling information includes scheduling information for all services considered for the 5G system as described above, and the scheduling information includes information indicating a frequency resource or a time resource for data transmission of 5G services. The data scheduling information may be transmitted by the higher layer signal or the physical signal. The terminal transmits and receives data in accordance with the subframe structure of the control information.

At operation 1270, the terminal transmits a feedback for the data received at operation 1260. The feedback information follows the method as described above through FIG. 11.

Figure 13:
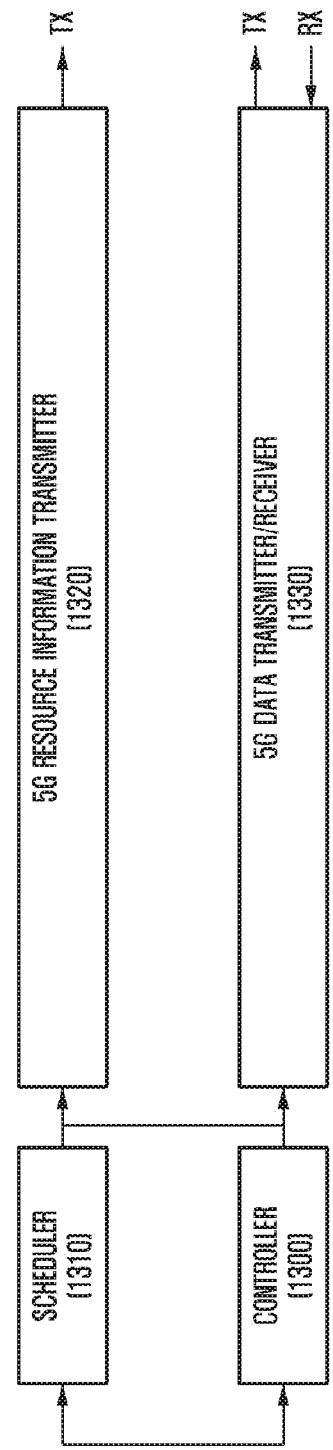
FIG. 13 is a diagram illustrating the configuration of a base station device according to the present disclosure.

FIG. 13 is a diagram illustrating the configuration of a base station device according to the present disclosure.

Referring to FIG. 13, in accordance with the subframe structure according to FIG. 5 of the present disclosure, the (1-1)-th, (1-2)-th, and (1-3)-th embodiments of the present disclosure according to FIGS. 7, 9, and 11, and a base station procedure according to the embodiments, a controller 1300 transmits control information, controls data transmission and reception, and transmits the control information and data to the terminal through a 5G resource information transmitter 1320, and a scheduler 1310 schedules 5G data on a 5G resource and transmits and receives 5G data with a 5G terminal through a 5G data transmitter/receiver 1330.

Figure 14:
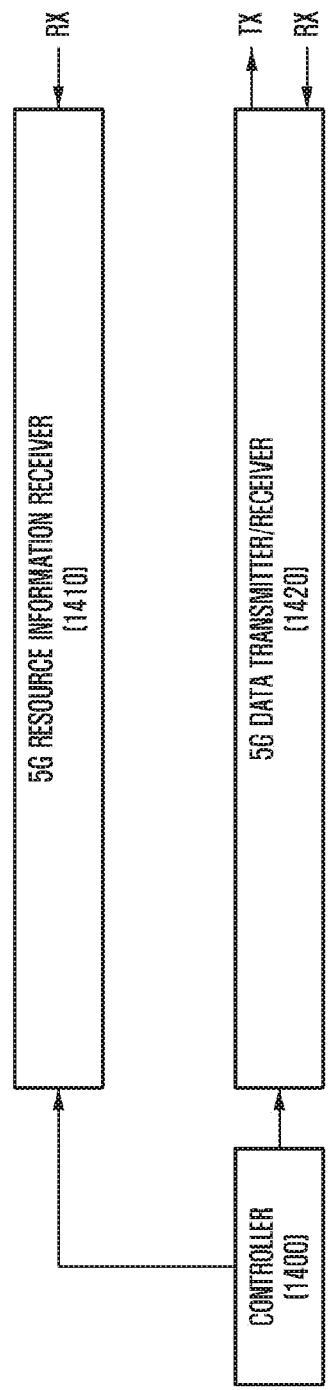
FIG. 14 is a diagram illustrating the configuration of a terminal device according to the present disclosure.

FIG. 14 is a diagram illustrating the configuration of a terminal device according to the present disclosure.

Referring to FIG. 14, in accordance with the subframe structure according to FIG. 5 of the present disclosure, the (1-1)-th, (1-2)-th, and (1-3)-th embodiments of the present disclosure according to FIGS. 7, 9, and 11, and a terminal procedure according to the embodiments, the terminal device receives control information and data from a base station by 5G resource information receiver 1410, and a controller 1400 transmits and receives 5G data scheduled on an allocated 5G resource with a 5G base station through a 5G data transmitter/receiver 1420.

Second Embodiment

The present disclosure relates to a general wireless mobile communication system, and more particularly, to a method for mapping reference signals in a wireless mobile communication system adopting a multiple access scheme using a multi-carrier, such as an orthogonal frequency division multiple access (OFDMA).

At present, a mobile communication system has been developed to a high-speed and high-quality wireless packet data communication system in order to provide data services and multimedia services over initial voice oriented services. For this, several standardization groups, such as 3GPP, 3GPP2, and IEEE, are proceeding with 3rd-generation evolved mobile communication system standardization work adopting a multiple access method using multi-carriers. Recently, various mobile communication standards, such as 3GPP long term evolution (LTE), 3GPP2 ultra mobile broadband (UMB), and IEEE 802.16m, have been developed to support high-speed and high-quality wireless packet data transmission services based on a multiple access method using multi-carriers.

The existing 3rd-generation evolved mobile communication systems, such as LTE, UMB, and 802.16m, are based on the multi-carrier multiple access method, adopt a multiple input multiple output (MIMO) to improve transmission efficiency, and are featured to use various technologies, such as beam-forming, adaptive modulation and coding (AMC), and channel sensitive scheduling. The various technologies as described above improve the system capacity performance through improvement of the transmission efficiency through methods for concentrating transmission powers transmitted from several antennas in accordance with the channel quality, adjusting the amount of data being transmitted, and selectively transmitting data to users with good channel quality.

Since such techniques mostly operate based on channel state information between a base station (BS) (or an evolved Node B (eNB)) and a terminal (or user equipment (UE) or a mobile station (MS)), it is necessary for the eNB or UE to measure the channel state between the base station and the terminal, and in this case, a channel status indication reference signal or a channel state information reference signal (CSI-RS) is used. The above-described eNB means a downlink transmitter and uplink receiver located in a predetermined place, and one eNB performs transmission/reception for a plurality of cells. In one mobile communication system, a plurality of eNBs are geometrically distributed, and each of the plurality of eNBs performs transmission/reception for the plurality of cells.

The existing 3rd-generation and 4th-generation mobile communication systems, such as LTE and LTE-Advanced (LTE-A), use MIMO technology to transmit data using a plurality of transmission/reception antennas for extension of the data rate and system capacity. The MIMO technology makes it possible to spatially separate and transmit a plurality of information streams using a plurality of transmission/reception antennas. Such spatial separation and transmission of the plurality of information streams may be called spatial multiplexing.

In general, how many information streams spatial multiplexing can be applied to may differ depending on the number of antennas of a transmitter and a receiver. In general, how many information streams the spatial multiplexing can be applied to is called a rank of the corresponding transmission. In case of the MIMO technology that is supported in the standards up to LTE-A Release 11, spatial multiplexing is supported with respect to a case where 16 transmission antennas and 8 reception antennas are provided, and up to 8 ranks are supported at maximum.

In case of a new radio access technology (NR) that is the 5th-generation mobile communication system currently being discussed, the design target of the system is to support various services, such as enhanced mobile broadband (eMBB), massive machine type communication (mMTC), and ultra-reliable and low latency communications (URLLC), as described above, and in order to achieve the target, the reference signal to be always transmitted is minimized and is aperiodically transmitted to flexibly use time and frequency resources.

Hereinafter, embodiments of the present disclosure will be described in detail with reference to the accompanying drawings.

In the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Also, in the embodiments, "~unit" may include one or more processors.

In the following description, although an NR system, a long term evolution (LTE) system, and an LTE-advanced (LTE-A) system are exemplarily described, the present disclosure can be applied to other communication systems using a licensed band and an unlicensed band without any separate addition and subtraction.

Figure 15:
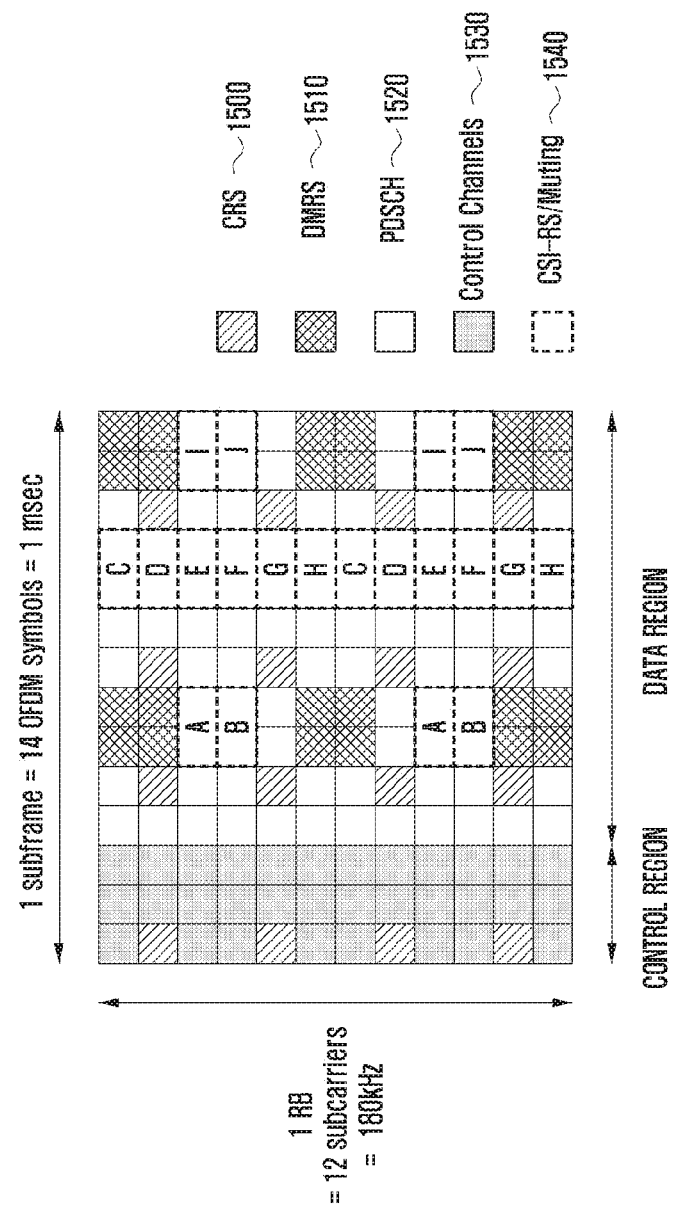
FIG. 15 is a diagram illustrating radio resources of one subframe and one resource block that are the minimum units of downlink scheduling in LTE AND LTE-A systems.

FIG. 15 is a diagram illustrating radio resources of one subframe and one resource block (RB) that are the minimum units of downlink scheduling in LTE and LTE-A systems.

A radio resource as illustrated in FIG. 15 is composed of one subframe on a time axis and one RB on a frequency axis. The radio resource is composed of 12 subcarriers in a frequency domain and 14 OFDM symbols in a time domain to have 168 inherent frequencies and time locations in total.

In the LTE and LTE-A systems, each of the inherent frequencies and time locations as shown in FIG. 15 is called a resource element (RE).

On the radio resource as illustrated in FIG. 15, different kinds of plural signals may be transmitted as follows.

1. Cell specific reference signal (CRS) 1500: This is a reference signal periodically transmitted for all terminals belonging to one cell, and a plurality of terminals may commonly use the CRS.

2. Demodulation reference signal (DMRS) 1510: This is a reference signal transmitted for a specific terminal, and it is transmitted only in case where data is transmitted to the corresponding terminal. The DMRS may be composed of 8 DMRS antenna ports in total. In the LTE and LTE-A systems, ports 7 to 14 correspond to DMRS antenna ports, and the respective antenna ports maintain orthogonality so that no interference occurs between them using code division multiplexing (CDM) or frequency division multiplexing (FDM).

3. Physical downlink shared channel (PDSCH) 1520: This is a data channel transmitted to a downlink, and it is used for a base station to transmit traffic to a terminal. The PDSCH is transmitted using an RE in which a reference signal is not transmitted in a data region of FIG. 15.

4. CSI-RS 1540: This is a reference signal transmitted for terminals belonging to one cell, and it is used to measure a channel state. A plurality of CSI-RSs may be transmitted to one cell.

5. Other control channels (physical hybrid-ARQ indicator channel (PHICH), physical control format indicator channel (PCFICH), and physical downlink control channel (PDCCH)) 1530: These control channels are used to provide control information that is necessary for a terminal to receive downlink data on the PDSCH or to transmit positive reception acknowledgement (ACK) or negative reception acknowledgement (NACK) for operating a hybrid ARQ (HARQ) for uplink data transmission.

In addition to the above-described signals, in the LTE-A system, muting may be configured so that CSI-RSs transmitted by other base stations can be received by terminals in the corresponding cell without interference. The muting may be applied in a location in which the CSI-RSs can be transmitted, and in general, a terminal receives a traffic signal through jumping over the corresponding radio resource. In the LTE-A system, the muting may be called zero-power CSI-RS as another term. This is because due to the characteristic of the muting, the muting is applied to the location of the CSI-RS and there is no transmission power for the corresponding radio resource.

Referring to FIG. 15, the CSI-RSs may be transmitted using parts of locations indicated as A, B, C, D, E, F, G, H, I, and J in accordance with the number of antennas that transmit the CSI-RSs. Further, the muting may also be applied to parts of the locations indicated as A, B, C, D, E, F, G, H, I, and J. In particular, the CSI-RSs may be transmitted on 2, 4, and 8 REs in accordance with the number of antenna ports for transmission. In FIG. 15, if the number of antenna ports is 2, the CSI-RSs are transmitted to a half of a specific pattern, whereas if the number of antenna ports is 4, the CSI-RSs are transmitted to the whole of the specific pattern. If the number of antenna ports is 8, the CSI-RSs are transmitted using two patterns.

In contrast, the muting is always performed in the unit of one pattern. That is, the muting may be applied to a plurality of patterns, but if the location of the muting does not overlap the location of the CSI-RS, it cannot be applied to only a part of one pattern. However, only in case where the location of the CSI-RS overlaps the location of the muting, the muting can be applied to only a part of one pattern. However, only in case where the CSI-RS location and the muting location overlap each other, the muting can be applied to only a part of one pattern.

In case where the CSI-RSs for two antenna ports are transmitted, two REs connected together on a time axis transmit signals of respective antenna ports, and the signals of the respective antenna ports are discriminated from one another by orthogonal codes. Further, if the CSI-RSs for four antenna ports are transmitted, signals for two additional antenna ports are transmitted in the same method further using two REs added to the CSI-RSs for the two antenna ports. Transmission of the CSI-RSs for 8 antenna ports is performed in the same manner. In case of CSI-RSs supporting 12 and 16 antenna ports, transmission resources are configured through combination of three CSI-RS transmission locations for the four existing antenna ports or through combination of two CSI-RS transmission locations for eight antenna ports.

Further, a terminal can be allocated with channel state information—interference measurement (CSI-IM) or interference measurement resource (IMR) together with the CSI-RSs from the base station, and the CSI-IM resources have the same resource structure and location as those of the CSI-RSs supporting 4 antenna ports. The CSI-IM is a resource for a terminal that receives data from one or more base stations to accurately measure interference from an adjacent base station. For example, if it is desired to measure the amount of interference when the adjacent base station transmits data and the amount of interference when the adjacent base station does not transmit the data, the base station configures a CSI-RS and two CSI-IM resources. The base station can effectively measure the amount of interference exerted by the adjacent base station in a manner that it makes the adjacent base station always transmit a signal on one CSI-IM whereas it makes the adjacent base station always not transmit the signal on the other CSI-IM.

Table 2 below shows an RRC field forming CSI-RS configuration. This includes contents of RRC configuration for supporting a periodic CSI-RS in a CSI process.

TABLE 2

| CSI-RS config | CSI-IM config | CQI report config | Etc |
|---|---|---|---|
| No antenna ports Resource config Time and frequency position in a subframe Subframe config Periodicity and subframe offset Qcl-CRS-info (QCL Type B) CRS information for CoMP | Resource config Time and frequency position in a subframe Subframe config Periodicity and subframe offset | Periodic Mode, resource, periodicity, offset . . . Aperiodic Mode . . . PMI/RI report RI reference CSI process SubframePattern | $P_C$ Codebook subset restriction |

Configuration for channel state report based on the periodic CSI-RS in the CSI process locations of the CSI-RS REs. Here, through configuration of the number of antennas, it is transmitting the CSI-RS. Table 3 is for configuration of resource config currently supported in the LTE, and Table 4 is for configuration of subframe config.

TABLE 3

| CSI reference signal configuration | Number of CSI reference signals configured | | | | | |
|---|---|---|---|---|---|---|
| | 1 or 2 | | 4 | | 8 | |
| | (k', l') | $n_S$ mod 2 | (k', l') | $n_S$ mod 2 | (k', l') | $n_S$ mod 2 |
| Frame structure type 1 and 2    0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (6, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only    20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Through Tables 3 and 4, a terminal can identify the frequency and time location, period, and offset for configuring CSI-RS. Qcl-CRS-info configures quasi co-location information for CoMP.

CSI-IM config is to configure the frequency and time location of the CSI-IM for measuring interference. Since CSI-IM is always configured based on four ports, it is not necessary to configure the number of antenna ports, and resource config and subframe config are configured in the same manner as the CSI-RS.

CQI report config is information to configure how the channel state report is to be performed using the corresponding CSI process. The corresponding configuration may include periodic and aperiodic channel state report configuration, precoding matrix indicator (PMI) and rank indicator (RI) report configuration, RI reference CSI process configuration, and subframe pattern configuration.

The subframe pattern is to configure a measurement subframe subset for supporting channels having different characteristics in terms of time and interference measurement in case of measuring the channel and interference received by the terminal. The measurement subframe subset has been first introduced to estimate the channel state by reflecting different interference characteristics between an almost blank subframe (ABS) and a general subframe that is not the ABS in enhanced inter-cell interference coordination (eICIC). Thereafter, in order to measure the different channel characteristics between the subframe always operating as a downlink in enhanced interference mitigation and traffic adaptation (eIMTA) and the subframe that can be dynamically converted into an uplink, the measurement subframe subset has been developed to an improved type capable of configuring and measuring two IMRs. Table 5 and Table 6 represent measurement subframe subsets for supporting eICIC and eIMTA.

TABLE 5

```
CQI-ReportConfig-r10 ::= SEQUENCE {
    cqi-ReportAperiodic-r10         CQI-ReportAperiodic-r10 OPTIONAL,   -- Need ON
    nomPDSCH-RS-EPRE-Offset         INTEGER (-1..6),
    cqi-ReportPeriodic-r10          CQT-ReportPeriodic-r10 OPTIONAL,    -- Need ON
    pmi-RI-Report-r9                ENUMERATED (setup) OPTIONAL,        -- Cond
                                    PMIRIPCell
    csi-SubframePatternConfig-r10   CHOICE {
```

TABLE 5-continued

| relase | NULL, |
|---|---|
| setup | SEQUENCE { |
| csi-MeasSubframeSet1-r10 | MeasSubframePattern-r10 |
| csi-MeasSubframeSet2-r10 | MeasSubframePattern-r10 |
| } | |
| } | OPTIONAL -- Need ON |
| } | |

TABLE 6

| CQI-ReportConfig-v1250 ::= | SEQUENCE { | | |
|---|---|---|---|
| csi-SubframePatternConfig-r12 | CHOICE { | | |
| release | NULL, | | |
| setup | SEQUENCE { | | |
| csi-MeasSubframeSets-r12 | BIT STRING (SIZE (10)) | | |
| } | | | |
| } | | OPTIONAL, | -- Need ON |
| cqi-ReportBoth-v1250 | CQI-ReportBoth-v1250 | OPTIONAL, | -- Need ON |
| cqi-ReportAperiodic-v1250 | CQI-ReportAPeriodic-v1250 | OPTIONAL, | -- Need ON |
| altCQI-Table-r12 | ENUMERATED { | | |
| | allSubframes, csi-SubframeSet1, | | |
| | csi-SubframeSet2, spare1} | OPTIONAL | -- Need OP |
| } | | | |

The eICIC measurement subframe subset supported in LTE is configured using csi-MeasSubframeSet1-r10 and csi-MeasSubframeSet2-r10. MeasSubframePattern-r10 referred by the corresponding field is as shown in Table 7 below.

TABLE 7

```
-- ASN1START
MeasSubframePattern-r10 ::= CHOICE {
    subframePatternFDD-r10      BIT STRING (SIZE (40)),
    subframePatternTDD-r10      CHOICE {
        subframeConfig1-5-r10   BIT STRING (SIZE (20)),
        subframeConfig0-r10     BIT STRING (SIZE (70)),
        subframeConfig6-r10     BIT STRING (SIZE (60)),
        ...
    },
    ...
}
-- ASN1STOP
```

In the field as described above, MSB on the left side means subframe #0, and in case where the field is "1", it means that the subframe indicated by the corresponding bit is included in the measurement subframe subset. Unlike the eICIC measurement subframe subset for configuring respective subframe sets through the respective fields, the eIMTA measurement subframe subset indicates that the corresponding subframe belongs to the first subframe set if the field is "0", whereas it indicates that the corresponding subframe belongs to the second subframe set if the field is "1". Accordingly, in eICIC, the corresponding subframe may not be included in two subframe sets, but in case of the eIMTA subframe set, the corresponding subframe should be included in any one of the two subframe sets.

In addition, there may be information, such as Pc that means a power ratio between a PDSCH required for the terminal to generate channel state report and a CSI-RS RE, and codebook subset restriction configuring what codebook is to be used. Pc and the codebook subset restriction is configured by p-C-AndCBSRList field of Table 8 including two P-C-AndCBSR fields in the form of a list, and the respective fields mean configuration of the respective subframe subsets.

TABLE 8

| CSI-Process-r11 ::= | SEQUENCE { |
|---|---|
| ... | |
| p-C-AndCBSR List-r11 | SEQUENCE (SIZE (1..2)) OF P-C-AndCBSR-r11 |
| ... | |
| } | |

TABLE 9

| P-C-AndCBSR-r11 ::= SEQUENCE { | |
|---|---|
| p-C-r11 | INTEGER (-8..15), |
| codebookSubsetRestriction-r11 | BIT STRING |
| } | |

The Pc may be defined as in mathematical expression 1 below, and may indicate a value between −8 to 15 dB.

$$P_c = \frac{PDSCH\ EPRE}{CSI\text{-}RS\ EPRE} \qquad \text{[Mathematical expression 1]}$$

The base station can variably control the CSI-RS transmission power for various purposes, such as channel estimation accuracy improvement, and the terminal can be aware of how low or how high the transmission power to be used for data transmission is as compared with the transmission power used for the channel estimation through the reported Pc. As described above, even if the base station changes the CSI-RS transmission power, the terminal can calculate an accurate channel quality indicator (CQI) to be reported to the base station.

The codebook subset restriction is a function in which the base station enables the terminal not to report code points of the codebook supported by the standard to the base station in accordance with the number of CRS or CSI-RS antenna ports. The codebook subset restriction can be configured by a codebookSubsetRestriction field included in AntennaInfoDedicated of Table 110 below.

TABLE 10

| AntennaInfoDedicated ::=<br>transmissionMode | SEQUENCE {<br>ENUMERATED {<br>tm1, tm2, tm3, tm4, tm5, tm6,<br>tm7, tm8-v920), | |
|---|---|---|
| codebookSubsetRestriction | CHOICE { | |
| n2TXAntenna-tM3 | BIT STRING (SIZE (2)), | |
| n4TXAntenna-tM3 | BIT STRING (SIZE (4)), | |
| n2TXAntenna-tM4 | BIT STRING (SIZE (6)), | |
| n4TXAntenna-tM4 | BIT STRING (SIZE (64)), | |
| n2TXAntenna-tM5 | BIT STRING (SIZE (4)), | |
| n4TXAntenna-tM5 | BIT STRING (SIZE (16)), | |
| n2TXAntenna-tM6 | BIT STRING (SIZE (4)), | |
| n4TXAntenna-tM6 | BIT STRING (SIZE (16)), | |
| } OPTIONAL, | | -- Cond TM |
| ue-TransmitAntennaSelection<br>release<br>setup<br>}<br>} | CHOICE{<br>NULL,<br>ENUMERATED {closedLoop, openLoop} | |
| AntennaInfoDedicated-r10 ::=<br>transmissionMode-r10 | SEQUENCE {<br>ENUMERATED {<br>tm1, tm2, tm3, tm4, tm5, tm6, tm7, tm8-v920,<br>tm9-v1020, tm10-v1130, spare6, spare5, spare4,<br>spare3, spare2, spare1), | |
| codebookSubsetRestriction-r10 | BIT STRING     OPTIONAL, | -- Cond TMX |
| ue-TransmitAntennaSelection<br>release<br>setup<br>}<br>} | CHOICE(<br>NULL,<br>ENUMERATED {closedLoop, openLoop} | |

The codebookSubsetRestriction field is composed of a bitmap, and the size of the bitmap is equal to the number of code points of the corresponding codebook. Accordingly, each bitmap indicates each code point, and if the corresponding value is "1", the terminal can report the corresponding code point to the base station through PMI, whereas if the corresponding value is "0", the terminal cannot report the corresponding code point to the base station through PMI. For reference, a precoder index having high MSB indicates a precoder index having low LSB (e.g., "0").

In a cellular communication system, the base station should transmit a reference signal to the terminal in order to measure a downlink channel state. In case of an LTE-A system, the terminal measures a channel state between the base station and the terminal itself using the CRS or CSI-RS transmitted by the base station. The channel state basically has some requisites that should be considered, and here, it includes the amount of interference in a downlink. The amount of interference in the downlink includes an interference signal and thermal noise generated by antennas that belong to an adjacent base station, and it plays an important role in determining the channel situation of the downlink.

As an example, if a base station having one transmission antenna transmits a signal to a terminal having one reception antenna, the terminal should determine energy per symbol that can be received through the downlink and the amount of interference to be simultaneously received in a section in which the corresponding symbol is received using the reference signal received from the base station, and should determine the energy per symbol to interference density ratio (Es/Io). The determined Es/Io is converted into a data transmission speed or a value corresponding to the data transmission speed, and is reported to the base station in the form of a CQI to enable the base station to determine at what data transmission speed the base station is to perform data transmission to the terminal in the downlink.

In the LTE-A system, the terminal feeds information on the channel state of the downlink back to the base station so that the feedback information can be used for downlink scheduling of the base station. That is, the terminal measures the reference signal that the base station transmits to the downlink, and feeds extracted information based on the reference signal back to the base station in the form defined in the LTE and LTE-A standards. In the LTE and LTE-A systems, information that the terminal feeds back to the base station is briefly classified into three kinds as follows.

> Rank indicator (RI): This is the number of spatial layers that the terminal can receive in the current channel state.
>
> Precoding matrix indicator (PMI): This is an indicator of a precoding matrix to which the terminal prefers in the current channel state.
>
> Channel quality indicator (CQI): This is the maximum data rate at which the terminal can receive data in the current channel state. The CQI may be replaced by a signal to interference and noise ratio (SINR) that can be used similarly to the maximum data rate, the maximum error correction code rate and modulation method, and data efficiency per frequency.

The RI, PMI, and CQI have meanings in association with one another. As an example, precoding matrices supported in LTE and LTE-A systems are differently defined per rank. Accordingly, although the PMI value when RI has a value of "1" and the PMI value when RI has a value of "2" are equal to each other, they are differently interpreted. Further, the terminal determines the CQI on the assumption that the rank value and the PMI value that the terminal itself reported to the base station have been applied from the base station. That is, if the rank is RI_X and the applied precoding matrix is PMI_Y in case where the terminal has reported RI_X, PMI_Y, and CQI_Z to the base station, it means that the terminal can receive the data rate corresponding to the CQI_Z. As described above, the terminal assumes in what transmission method the terminal performs transmission to the base station when calculating the CQI, and thus it can obtain an optimum performance when performing actual transmission in the corresponding transmission method.

Figure 16:
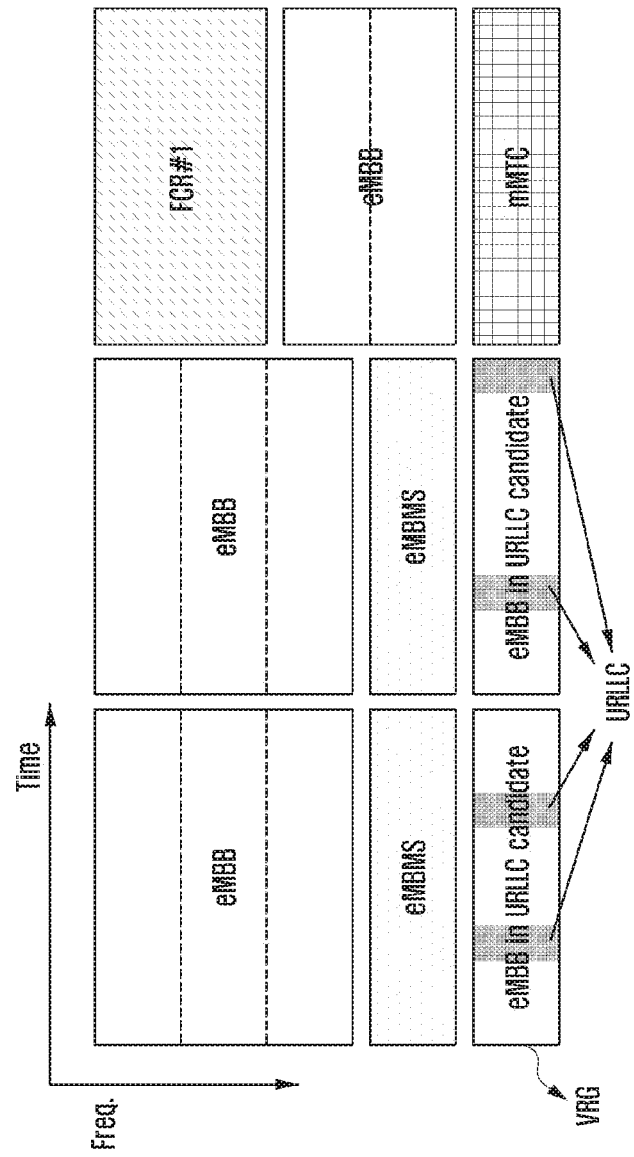
FIG. 16 is a diagram illustrating an example in which data of eMBB, URLLC, and mMTC that are services considered in an NR system are allocated on frequency-time resources together with forward compatible resources.

FIG. 16 is a diagram illustrating an example in which data of eMBB, URLLC, and mMTC that are services considered in an NR system are allocated on frequency-time resources together with forward compatible resource (FCR).

Referring to FIG. 16, if URLLC data is generated and URLLC transmission is necessary while eMBB and mMTC services are allocated on a specific frequency band to be transmitted, a portion previously allocated with eMBB and mMTC is emptied, and the URLLC data is transmitted. Among the services, since it is important that the URLLC requires a short delay time, the URLLC data may be allocated to a part of the resource on which the eMBB is allocated to be transmitted, and the eMBB resource may be known to the terminal in advance. For this, in a frequency-time resource on which the eMBB data and the URLLC data overlap each other, the eMBB data may not be transmitted, and thus the transmission performance of the eMBB data may be lowered. That is, in the above-described case, eMBB data transmission failure due to the URLLC allocation may occur. In this case, the length of the transmission time interval (TTI) used for the URLLC transmission may be shorter than the TTI length used for the eMBB or mMTC transmission.

Figure 17:
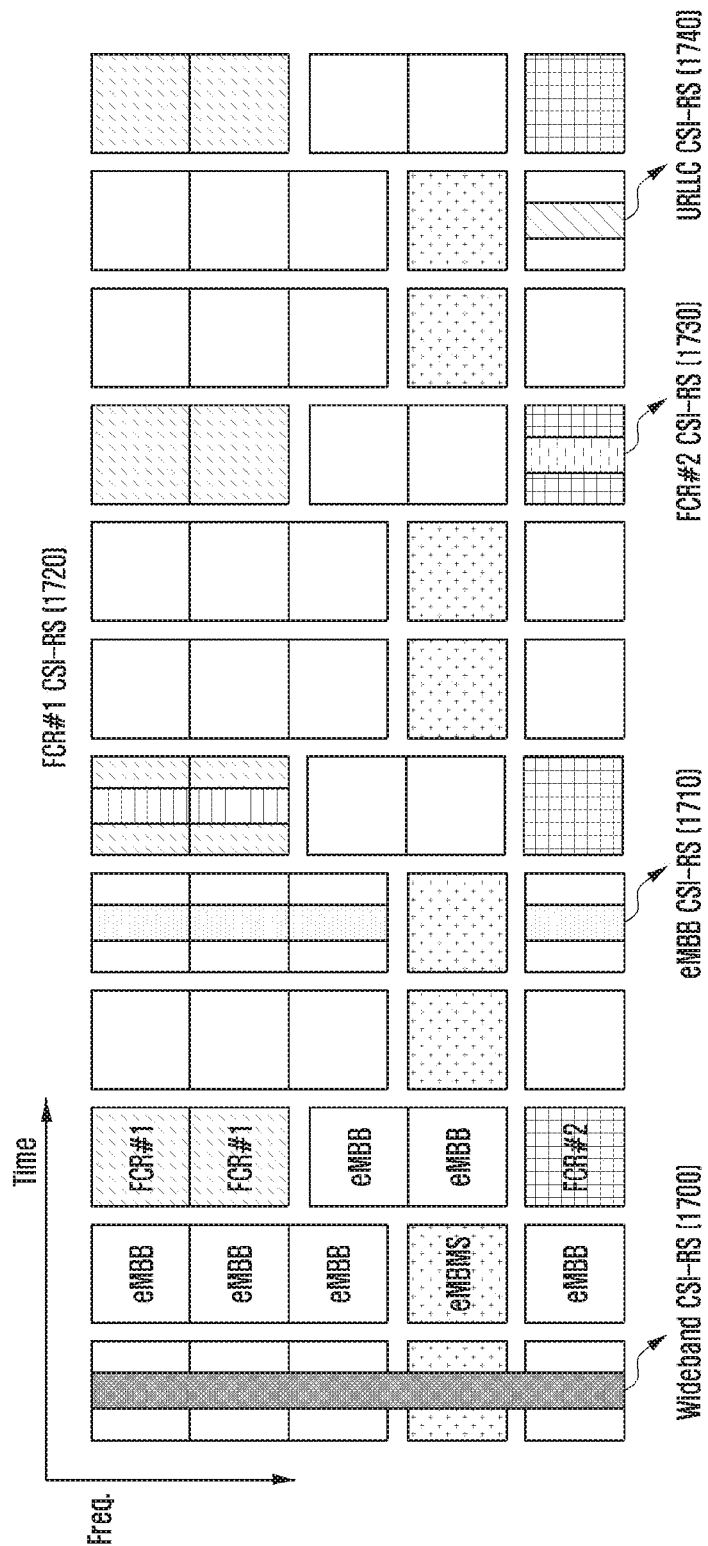
FIG. 17 is a diagram illustrating an assumed case where respective services are multiplexed on time-frequency resources in an NR system.

FIG. 17 is a diagram illustrating an assumed case where respective services are multiplexed on time-frequency resources in an NR system.

Referring to FIG. 17, in order to obtain initial channel state information for a terminal like 1700, a base station may allocate the CSI-RS to the full band or plural bands. Since such CSI-RS of the full band or plural bands (wideband CSI-RS) causes a large amount of reference signal overhead to occur, it may be disadvantageous in optimizing the system performance, but if there is not channel state information previously obtained, the CSI-RS of the full band or plural bands may be essential.

After transmission of the CSI-RS of the full band or plural bands, respective services may be provided with different requirements for services, and accordingly, accuracy of the necessary channel state information and update necessity may also differ. Accordingly, after obtaining the initial channel state information, the base station may trigger subband CSI-RS 1710, 1720, and 1730 for services on the corresponding band in accordance with necessity occurrence for respective services. Although FIG. 17 exemplifies that the CSI-RS for one service is transmitted at one time point, it is also possible to transmit the CSI-RS for a plurality of services if needed.

As described above with reference to FIGS. 16 and 17, services of the corresponding band may also differ in accordance with the change of time and frequency resources of the base station, and in consideration of this, various channels and interference situation should be considered.

Figure 18:
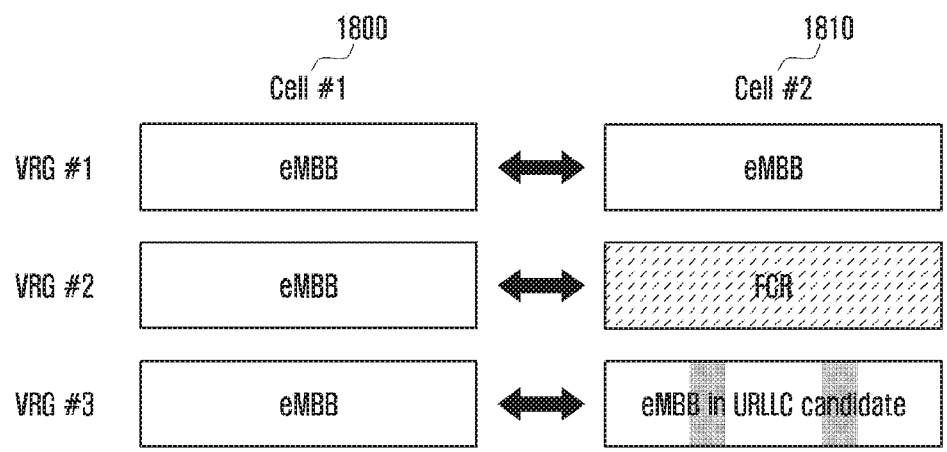
FIG. 18 is a diagram illustrating a service of an interference cell and a corresponding interference situation change in accordance with a time-frequency resource change from the viewpoint of eMBB.

FIG. 18 is a diagram illustrating a service of an interference cell and a corresponding interference situation change in accordance with a time-frequency resource change from the viewpoint of eMBB.

Referring to FIG. 18, one rectangle means a vertical resource group (VRB) that is a basic unit of time-frequency resources that the base station configures to the terminal. In FIG. 18, VRG resources of a first cell 1800 are all configured as eMBBs. In this case, another cell (second cell) 1810 may operate respective VRG resources as eMBB, FCR, and URLLC candidate resources. On the resources of the second cell, a signal transmission method may differ as the need arises, and thus the characteristic of interference exerted on the first cell may also differ.

For example, in case of URLLC, high reliability is necessary, and thus a large number of resources may be used for the corresponding service as compared with the amount of data being transmitted. Further, URLLC data has high priority as compared with other services, and thus a corresponding terminal preferentially occupies the resources at a time when the URLLC should be transmitted. Accordingly, in the corresponding VRG of the first cell, the change of the frequency band may be relatively small as compared with the VRG in which the eMBB acts as interference, and thus interference prediction of the base station may be relatively easy. Further, if a service of the interference resource is mMTC although it is not included in FIG. 18, a terminal having a relatively low power repeatedly transmits a signal for coverage improvement, and thus the interference amount may be small as compared with a case where the service of the interference resource is URLLC to cause the data transmission of the eMBB terminal to be relatively profitable.

Although it is assumed that all resources of the first cell are configured for the eMBB transmission in FIG. 18, signal and interference measurement is also necessary on the assumption that the corresponding resources have been configured for FCR or URLLC and mMTC services, and thus there is a need for a channel state measurement and report method capable of reflecting such a situation.

Further, for effective coordinated multipoint (CoMP) operation and subband beamformed (BF) CSI-RS operation, there is a need for the signal and interference measurement in accordance with the time-frequency resources.

Figure 19:
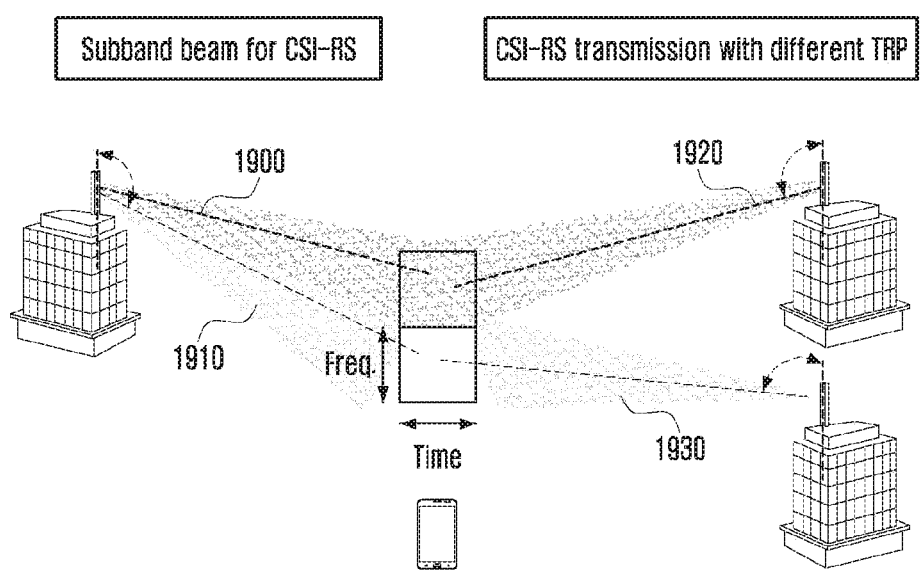
FIG. 19 is a diagram illustrating an example in which a base station transmits CSI-RS in order to effectively measure and report channel state information in an NR system.

FIG. 19 is a diagram illustrating an example in which a base station transmits CSI-RS in order to effectively measure and report channel state information in an NR system.

Optimum beam directions may differ for respective frequency bands, and thus it may be effective to transmit different analog and digital beams in accordance with the respective frequency bands. In case of analog beams, it is not possible to transmit different signals for the respective frequency bands due to hardwired restriction, but in case of digital beams, it is sufficient to make the corresponding signal have different phases, and thus as indicated by 1900 and 1910, the base station can transmit different beams for the respective frequency bands, and based on this, the base station can transmit the CSI-RS. Further, in addition to the different beam directions, it is also possible for transmission reception points (TRPs) located in different geographical positions to transmit the CSI-RS.

In case of the existing LTE system, the CSI-RS has been designed on the assumption that the same signal is transmitted over the full band, and in order to apply different services, beams, or CoMP scenarios to different time-frequency resources as described above, there is a need for a method for CSI-RS transmission/reception and channel state information feedback that is different from the existing method.

One physical resource block (PRB) or a plurality of PRBs may be provided to support channel state measurement and report on the eMBB, URLLC, or mMTC resources for respective services and different beams and CoMP scenarios. The corresponding PRB units may be called service group (SG), service resource group (SRG), vertical group (VG), vertical resource group (VRG), frequency resource block group (FRG), physical resource block group (PRG), and multiple PRB group (MPG). Further, the above-described configuration may be considered simultaneously with respect to the time and frequency resources, and in this case, the corresponding resources may be called time and frequency resource block group (TFRG). In the following description of the present disclosure, explanation will be made based on the VRG in a state where the VRG can be replaced by all terms as described above and similar terms.

The VRG resource configuration unit as described above should be designated in accordance with the time and frequency resources. In this case, the time resource unit may be defined as one value in the standards, or may be configured through RRC signaling. In case where the time resource unit is defined as one value on the standards, the service conversion unit of a plurality of cells may be configured as one value, and in case of the interference exerted on the signal of the base station transmitting data, the service conversion units also coincide with each other. Accordingly, the terminal and the base station can relatively easily predict the change of the corresponding interference.

However, if the time resource unit is defined as one small time unit (e.g., one slot or subframe) when the base station does not require frequent service conversion on the time resource, unnecessary configuration overhead may be increased. Further, even in an opposite case, if the time resource unit is defined as a large time unit (e.g., several tens of milliseconds (ms)) in the same manner, the service is unable to be flexibly converted on the time resource as the need arises in the base station, and thus the system performance may be deteriorated and the service requirements may not be satisfied. Accordingly, it is required to determine the corresponding time resource unit in consideration of this.

In case of configuring the time resource unit through RRC signaling, a plurality of base stations or TRPs can freely convert the corresponding time service unit, and thus the base station and the terminal can freely configure and use the corresponding time unit to match the requirements of the corresponding system. However, in order to satisfy this, terminal implementation becomes complicated, and from the viewpoint of the terminal, another cell is also used by changing the time unit in accordance with the requirement of the service, and thus it may be relatively difficult to predict the interference. Accordingly, it is preferable to limit the corresponding configurable time unit to specific values only. Table 11 below exemplifies a service unit designation field for such VRG configuration.

TABLE 11

```
VRGInfo ::=    SEQUENCE {
   ...
   timeResourceGran       ENUMERATED {5, 10, 20, 40}
   ...
}
```

In the above-described example, the base station may configure to the terminal one of 5 ms, 10 ms, 20 ms, and 40 ms as the size of the corresponding time resource, and based on this, the terminal may grasp the size and figures of the VRG time resource and may operate to match the grasped information. In the above-described example, the figures of the time unit that the base station can configure to the terminal may be changed. Although it is exemplified that the figures are configured in the unit of ms, the corresponding unit may be one of various units, such as TTI or subframe. Further, although it is exemplified that direct figures are configured, it is also possible to make indirect configuration, such as type A or type B, rather than the direct figures, and in this case, the time unit may be included in the corresponding type configuration.

As described above, the VRG size configuration on frequency axis may be defined as one value on the standards or may be configured through RRC signaling. In case of defining the frequency size as one value on the standards, the service conversion unit can be configured as one value on the frequency axis with respect to a plurality of cells, and thus the service conversion unit of the interference also coincides with that of the signal of the base station for transmitting the data. Accordingly, the terminal and the base station can relatively easily predict the change of the corresponding interference. However, if the frequency resource unit is defined as one small frequency unit (e.g., one PRB) when the base station does not require frequent service conversion on the frequency resource, unnecessary configuration overhead may be increased. Further, even in an opposite case, if the frequency resource unit is defined as a large frequency resource unit (e.g., several tens of PRBs) in the same manner, the service is unable to be flexibly converted on the frequency resource as the need arises in the base station, and thus the system performance may be deteriorated and the service requirements may not be satisfied. Accordingly, it is required to determine the corresponding frequency resource unit in consideration of this.

In case of configuring the frequency resource unit through the standards as described above, an efficient frequency resource unit may differ depending on the size of the system band. In other words, if the system band is relatively small, it is important to efficiently multiplex the corresponding band through subdivision of the frequency band, whereas if the system band is sufficient, it may be preferable to efficiently use the frequency band through brief division of the frequency band rather than increasing the configuration overhead through subdivision of the frequency band. Such a method may be applied to the system band or bandwidth part, and the bandwidth part means a part of the whole system band that can be used by a specific terminal. Table 12 below indicates an example in which the VRG size is varied on the frequency band in accordance with the size of the system band in a state where the corresponding frequency resource is exemplified as the VRG. In the table below, the system band may be understood as the bandwidth part.

TABLE 12

| System Bandwidth ($N_{RB}^{DL}$) | VRG Size in frequency (PRBs) |
|---|---|
| ≤10 | 5 |
| 11-26 | 10 |
| 27-63 | 20 |
| 64-110 | 30 |
| 110-120 | 40 |
| 120-150 | 50 |
| 150-200 | 60 |
| 200-300 | 70 |
| 300-500 | 80 |

In Table 12 as above, the VRG size is varied in accordance with the configured system band, and based on the VRG having the service unit of the frequency band, the base station may configure the terminal to support another service or vertical (this may be understood to call a service supported in the 5G system) for each VRG. In this case, Table 12 exemplifies that the VRG size is changed in accordance with the system band configuration, and direct figures of the system band range and the VRG size in the table as above may differ from each other.

Further, the VRG service unit can be configured through the RRC signaling also in the frequency unit. In this case, a plurality of base stations or TRPs can freely convert the corresponding frequency service unit, and thus the base station and the terminal can freely configure and use the corresponding frequency unit to match the requirement of the corresponding system. However, in order to satisfy this, terminal implementation becomes complicated, and from the viewpoint of the terminal, another cell is also used by changing the frequency service unit in accordance with the requirement of the service, and thus it may be relatively difficult to predict the interference. Accordingly, it is preferable to limit the corresponding configurable frequency unit to specific values only. Table 13 below exemplifies a service unit designation field for such VRG configuration on the frequency axis.

TABLE 13

```
VRGInfo ::=    SEQUENCE {
    ...
    frequencyResourceGran    ENUMERATED {5, 10, 20, 40}
    ...
}
```

In the above-described example, the base station may configure to the terminal one of 5 PRB, 10 PRB, 20 PRB, and 40 PRB as the size of the corresponding frequency resource, and based on this, the terminal may grasp the size and figures of the VRG frequency resource and may operate to match the grasped information. In the above-described example, the figures of the frequency unit that the base station can configure to the terminal may be changed. Although it is exemplified that the figures are configured in the unit of PRB, the corresponding unit may be one of various units, such as resource block group (RBG) or subband. Further, although it is exemplified that direct figures are configured, it is also possible to make indirect configuration, such as type A or type B, rather than the direct figures, and in this case, the frequency unit may be included in the corresponding type configuration. Further, in case of indirect configuration, such as type A or type B, not only the frequency unit but also the time unit may be included in the corresponding indirect configuration.

Based on the VRG time and frequency resource sizes as described above, the number of VRGs supported by the corresponding system can be calculated, and this may be as in mathematical expression 2 below.

$$\text{Number of } VRG = \qquad \text{[Mathematical expression 2]}$$

$$\text{Number of } VRG \text{ in time} \times$$

$$\text{Number of } VRG \text{ in frequency} =$$

$$\left\lceil \frac{\text{Number of subframes in a frame}}{FRG \text{ granularity (subframes) in time}} \right\rceil \times$$

$$\left\lceil \frac{\text{System Bandwidth}}{FRG \text{ Size in frequency}} \right\rceil$$

In the mathematical expression as above, the number of VRGs is expressed through division of the number of subframes in one frame unit by a subframe in the VRG time unit, but the subframe that is the corresponding unit may be expressed in various units, such as ms or TTI. The number of VRGs on the frequency is also expressed through division of the system band that is expressed by PRB figures by the number of PRBs that is the VRG unit on the frequency, but the corresponding PRB can be expressed by various figures, such as RBG or subband. Further, in the above-described example, if the number of VRGs in the time band is "1", the number of corresponding VRG resources may be expressed by the number of VRGs on the frequency resource only.

Based on the mathematical expression 2, the base station may directly or indirectly configure the service or vertical corresponding to the corresponding VRG based on the calculated number of VRGs. The corresponding configuration may be performed by individually providing configuration fields to all VRG resources or by dividedly providing the configuration fields for each time and frequency. Table 14 below exemplifies a case where the configuration fields are individually provided to all VRG resources.

TABLE 14

```
VRGInfo ::=    SEQUENCE {
    ...
    VRGtypeConfig            BIT STRING
    ...
}
```

The size of the bitmap for configuring the service type of the VRG resource may be calculated by multiplying the number of VRGs that can be calculated in the mathematical expression 2 by the number of configurable bits for VRGs. Since this method can configure the VRG types for VRG configurations, it is possible to configure the service or vertical with respect to all possible combinations, but a large-sized bitmap is necessary for the corresponding configuration, and thus the configuration overhead is increased. Such disadvantage is maximized in case of configuring the service or vertical for each band or band combination in consideration of carrier aggregation (CA) or another band. The method has been exemplified on the assumption that all VRGs of the corresponding system are configured at a time, but such configuration field may be divided for VRGs to be provided.

In order to reduce the configuration overhead, the service type configuration of the VRG resources may be separately performed for possible VRG resources for resources. In other words, the VRGs in the time unit and the VRGs in the frequency unit may be separately configured. Table 15 below exemplifies a case where the configuration fields are provided for each time and frequency.

TABLE 15

```
VRGInfo ::=    SEQUENCE {
   ...
   VRGtypeConfig1          BIT STRING,
   VRGtypeConfig2          BIT STRING
   ...
}
```

In Table 15, respective fields are configuration fields for VRG resources for each time and frequency. Through this, the overhead for the VRG configuration can be reduced. For example, if configuration fields for all VRG resources exist in case where there are 10 VRG resources for each time and frequency, overhead of 200 bits is necessary on the assumption that the corresponding configuration field is of 2 bits. However, if the configuration is dividedly made for each time and resource, and one bit is configured with respect to the time resource and two bits are configured with respect to the frequency resource, 10 bits and 20 bits are necessary, and thus total 30 bits are necessary for the configuration.

In case of dividing the time and frequency resources as described above, the corresponding time or frequency resource can indicate whether one resource configuration permits configuration of other resources. Table 16 below indicates such one-bit configuration.

TABLE 16

| VRG Type indication field | Type |
|---|---|
| 0 | Not configurable |
| 1 | Configurable |

For example, if one-bit configuration is possible using the field of Table 16 with respect to the time resource, the one-bit indicates whether the corresponding time resource is configurable as various services. In this case, if the corresponding resource is not configurable, the corresponding resource may belong to a specific service, for example, such as eMBB, and if such a service is not configurable in the standards, the eMBB or a value corresponding to the eMBB may be assumed and expressed. Further, it is also possible to select one of eMBB, mMTC, and eMBMS through the RRC field as a basic service for such a non-configurable time resource notify the terminal and to notify the terminal of the selected one. Although it is exemplified that whether the time resource is configurable or non-configurable is configured with one bit using the table, and an individual service is configured with respect to the frequency resource, it is also possible to configure the frequency resource by one bit and to configure the individual service with respect to the time resource on the contrary. Further, in the above-described example, "not configurable" is inscribed, but it is also possible to inscribe the explanation of the corresponding field as "eMBB", "mMTC", or "eMBMS", and if it is configurable, it is also possible to follow the value of the corresponding detailed configuration.

Table 17 and Table 18 below exemplifies configuration of a VRG service in accordance with a VRG configuration field having a size of 2 bits or 3 bits or a field for directly configuring the vertical.

TABLE 17

| VRG Type indication field | Type |
|---|---|
| 00 | eMBB |
| 01 | eMBMS |
| 10 | URLLC(or URLLC candidate) |
| 11 | FCR |

TABLE 18

| VRG Type indication field | Type |
|---|---|
| 000 | eMBB |
| 001 | eMBMS type1 |
| 010 | eMBMS type2 |
| 011 | URLLC(or URLLO candidate) |
| 100 | mMTC |
| 101 | FCR |
| 110 | V2X |
| 111 | Reserved |

Using predetermined tables, such as Table 17 and Table 18, the service type for each VRG can be directly configured. Such a configuration method can be used for all VRG configuration fields as described above and all VRG configuration fields dividedly configured in accordance with time and frequency resources. As can be known from Table 17 and Table 18, if a large amount of bits is used when the VRG type is directly configured, the corresponding service type can be notified in more detail, and the corresponding field may be reserved for services which may be necessary in future using a "reserved" field. However, since the increase of such indication information causes the increase of the corresponding configuration overhead, it is necessary to make determination through determination of the efficiency of the service configuration in contrast with the overhead increase.

Further, in case of the direct configuration method as described above, the type of the corresponding service is preconfigured to the terminal, and thus it is advantageous that the terminal can expect the operation for the corresponding service and optimize the operation of the terminal in accordance with the expectation. Further, as inscribed with respect to the eMBMS in Table 18, a plurality of types (e.g., eMBMS type 1 and eMBMS type 2) can be supported with respect to only one service. For example, in case of the eMBMS, the terminal can be configured with different types with respect to two or more MBSFN regions, and in this case, configurations, such as modulation and coding schemes (MCS) of the corresponding region may differ from each other even if two VRGs operate for the same eMBMS service. The base station can support the different service configurations through such a plurality of configurations.

In case of the channel state information, URLLC has different operational requirements as compared with eMBB. In other words, although the eMBB operates at a block error rate (BLER) of 10%, the URLLC may require high reliability, such as $1 \times 10^{-5}$ due to its characteristic, and thus it may operate with error probability of $10^{-5}$. However, in case of the current CQI of the LTE system, it is determined that the terminal reports to the base station an MCS that is operable as BLER of 10%, and it is not suitable to link adaptation for the URLLC operation. Accordingly, in case where the corresponding VRG is configured for the URLLC service, the terminal may report to the base station information, such as CQI that suits the corresponding service, or MCS and coding rate.

In addition to the CQI having different reliability for the URLLC, the CSI for the URLLC can support a CQI table for supporting lower modulation order and coding rate. Tables 19, 20, and 21 are a CQI table for 64QAM-based data transmission, a CQI table for 256QAM-based data transmission, and a CQI table for NB-IOT support in an LTE-A system.

TABLE 19

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

TABLE 20

| CQI index | modulation | code rate × 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |
| 14 | 256 QAM | 885 | 6.9141 |
| 15 | 256 QAM | 948 | 7.4063 |

TABLE 21

| CQI index | modulation | code rate × 1024 $XR^{CSI}$ | efficiency |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16 QAM | 378 | 1.4766 |
| 9 | 16 QAM | 490 | 1.9141 |
| 10 | 16 QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

The tables 19, 20, and 21 can be used as examples of a middle data rate, high data rate, and low data rate or a data rate for high reliability. Accordingly, in case of the channel state information configured or used for the eMBB, all the plurality of CQI tables can be configured. However, in case of the channel state information used for the URLLC, it may not be necessary to consider high modulation order or coding rate in consideration of the high reliability required by the URLLC. Accordingly, the channel state information for the URLLC is configurable only by the CQI table (i.e., table maximally supporting 64QAM or 16QAM) maximally supporting the middle or low data rate among the plurality of CQI tables.

Further, in case of the URLLC, it is necessary to apply low modulation order and coding rate for transmission having high reliability, and for this, MCS having high reliability may be configured to the terminal. The base station may indicates such MCS to the terminal, and for this, an MCS table having high reliability may be newly defined.

Configuration of such CQI table (and MCS table) can be supported using the following methods.

CQI table configuration method 1 having high reliability can configure a CQI table to be directly used through an independent RRC field configuration.

CQI table configuration method 2 having high reliability can indirectly configure a CQI table through RRC field configuration that is configured together with the CQI having high reliability.

CQI table configuration method 3 having high reliability can configure a CQI table to be directly used through an independent downlink control information (DCI) field configuration.

CQI table configuration method 4 having high reliability can indirectly configure a CQI table through DCI field configuration that is configured together with the CQI having high reliability.

Specifically, the CQI table configuration method 1 is a method for configuring a CQI table to be used through independent RRC field configuration directly. In this case, the above-described CQI considering high reliability can be configured based on a configuration field which is independent of the MCS configuration. This method has the advantage that the base station can freely configure the CQI table that is necessary for the corresponding URLLC transmission in accordance with the corresponding implementation. Further, this method enables the terminal to report the channel state report based on the CQI table that differs depending on the terminal for the URLLC transmission.

The CQI table configuration method 2 is a method for indirect configuration through an RRC field configuring both the CQI and the MCS having high reliability. The URLLC requires both the application of the low modulation order and coding rate and the CQI indicating high reliability. Accordingly, in case of dividedly configuring the MCS having high reliability and the CQI having high reliability, overhead for the configuration may be increased, and thus simultaneous configuration thereof can be performed. That is, if the RRC field is configured, it can be understood that both the MCS table having high reliability and the CQI having high reliability are configured. In this case, unlike the CQI table configuration method 1, only one CQI table predefined in the standards can be configured among the plurality of tables.

The CQI table configuration method 3 is a method for configuring a CQI table to be directly used through independent DCI field configuration. In this case, the above-described CQI considering high reliability can be configured based on the configuration field which is independent of the MCS configuration. This method has the advantage that the base station can freely configure the CQI table that is necessary for the corresponding URLLC transmission in accordance with the corresponding implementation. Further, if needed, the base station dynamically changes the eMBB and URLLC or a target data rate of the eMBB, and makes the terminal report the channel state information.

The CQI table configuration method 4 is a method for indirect configuration through a DCI configuration configuring both the CQI and the MCS having high reliability. The URLLC requires both the low modulation order and coding rate and the CQI indicating high reliability. Accordingly, in case of dividedly configuring the MCS having high reliability and the CQI having high reliability, overhead for the configuration may be increased. Accordingly, simultaneous configuration thereof can be performed. That is, if information indicating use of the CQI having high reliability is included in the DCI, it can be understood that both the MCS table having high reliability and the CQI having high reliability are configured. In this case, if needed, the base station dynamically changes the eMBB and URLLC or a target data rate of the eMBB, and makes the terminal report the channel state information. In this case, unlike the CQI table configuration method 1, only one CQI table predefined in the standards can be configured among the plurality of tables.

Although three CQI tables have been exemplified, a larger number of CQI tables may exist. Further, although it is exemplified that the CQI table supporting high data rate supports up to 256QAM, it may further support 1024QAM. In addition, although it is exemplified that the CQI table for providing high reliability supports 16QAM at maximum, it may support only a lower modulation order, for example, only QPSK.

In addition, in case of reporting the channel state information for the URLLC, ranks permitted for the report may be limited. In the same manner as the MCS, it is difficult to secure high reliability in performing data transmission based on a high rank. Accordingly, by limiting the rank used to report the channel state information for the URLLC, the amount of information required for the channel state information report can be reduced. Such a configuration method becomes possible through the following methods.

RI limitation configuration method 1 for URLLC is a method for directly configuring limitation through independent RRC field configuration.

RI limitation configuration method 2 for URLLC is a method for indirectly configuring limitation through RRC field configuration that is configured together with CQI having high reliability.

RI limitation configuration method 3 for URLLC is a method for directly configuring limitation through codebook subset limit RRC field configuration.

RI limitation configuration method 4 for URLLC is a method for directly configuring rank limitation through independent DCI field configuration.

RI limitation configuration method 5 for URLLC is a method for indirectly configuring limitation through DCI field configuration that is configured together with CQI having high reliability.

Specifically, the RI limitation configuration method 1 for URLLC is a method for directly configuring RI limitation through independent RRC field configuration. In this case, the RI limitation can be configured based on CQI and CQI table configuration in consideration of high reliability as described above and the independent configuration field. This method has the advantage that the base station can freely configure the RI limitation required for the corresponding URLLC transmission in accordance with the corresponding implementation.

The RI limitation configuration method 2 for URLLC is a method for indirectly configuring the RI limitation through RRC field configuration for configuring both the high-reliability CQI and CQI table and the RI limitation. In case of the URLLC, both the low modulation order and coding rate and the high-reliability CQI and RI limitation may be necessary at the same time. Accordingly, if they are dividedly configured, overhead for the configuration may be increased. Accordingly, by simultaneously configuring the high-reliability CQI and the RI limitation, the terminal can support the channel state information report for the URLLC. In this case, the corresponding RI limitation can support the RI predefined in the standards, for example, one of 2 and 3. That is, the terminal can feed the RI of 2 or 3 back to the base station.

The RI limitation configuration method 3 for URLLC is a method for indirectly configuring the RI limitation through codebook subset limit RRC field configuration. That is, the RI limitation configuration method 3 is a configuration method so as not to perform feedback of all PMI in accordance with the RI not to be fed back (using the same method as the eMBB service), and may support the PMI and RI limitation configuration.

The RI limitation configuration method 4 for URLLC is a method for directly configuring the RI limitation through independent DCI field configuration. In this case, the RI limitation can be configured based on CQI in consideration of high reliability as described above and the independent configuration field. This method has the advantage that the base station can freely configure the CQI table required for the corresponding URLLC transmission in accordance with the corresponding implementation. Further, if needed, the base station dynamically changes the eMBB and URLLC or a target data rate of the eMBB, and makes the terminal report the channel state information.

The RI limitation configuration method 5 for URLLC is a method for indirectly configuring the RI limitation through DCI field configuration for configuring both the high-reliability CQI and CQI table and the RI limitation. In case of the URLLC, both the low modulation order and coding rate and the high-reliability CQI and RI limitation may be necessary at the same time. Accordingly, if they are dividedly configured, overhead for the configuration may be increased. Accordingly, by simultaneously configuring the high-reliability CQI and the RI limitation, the terminal can support the channel state information report for the URLLC. In this case, if needed, the base station dynamically changes the eMBB and URLLC or a target data rate of the eMBB, and makes the terminal report the channel state information.

In this case, the corresponding RI limitation can support the RI predefined in the standards, for example, only one of 2 and 3.

Further, a separate transport block size (TBS) table for supporting URLLC transmission may be supported. The terminal may receive the modulation order and coding rate for data transmission transferred through MCS together with data scheduling resource information, and such MCS information may be used for the terminal to obtain TBS size information that is necessary for decoding of downlink data transmission. Configuration of such a TBS table may be independently configured through DCI or RRC configuration, and may be configured together with CQI for URLLC transmission having high reliability as described above, CQI table, MCS table, or RI limitation configuration.

In addition, a transmission technique for the corresponding URLLC data transmission may be limited. As described above, since the corresponding data transmission requires high transmission reliability, a diversity-based transmission technique, for example, a diversity transmission technique based on transmission diversity or large delay cyclic delay diversity (CDD), precoder-cycling, or semi-open-loop or beam-based diversity transmission technique may be advantageous, rather than spatial multiplexing based transmission technique. In the same manner as the TBS configuration, such a transmission technique may be independently configured through DCI or RRC configuration, and may be configured together with CQI for URLLC transmission having high reliability as described above, CQI table, MCS table, RI limitation configuration, or TBS table configuration.

Further, the above-described methods may be used for other services. For example, in case of mMTC, CQI having high reliability may not be necessary, but low-transmission rate CQI table and MCS configuration, TBS table configuration, RI limitation configuration, and transmission technique limitation may be necessary. Accordingly, in order to support the corresponding techniques to such terminals, the corresponding table may be called a CQI or a CQI table or an MCS table or a TBS table for high transmission rate, middle transmission rate, low transmission rate, high reliability, middle reliability, and low reliability rather than a URLLC-dedicated CQI table or mMTC CQI table. In addition, the corresponding table may be inscribed as alternative CQI, alternative CQI table, alternative MCS table, or alternative TBS table. Further, in addition, the corresponding table may also be expressed as CQI and CQI table I, II, and III, or MCS table I, II, and III, or TBS table I, II, and III.

As another example, if the corresponding service is configured as eMBMS in the terminal, it may be configured not to report the channel state information. The eMBMS that is a service specified for broadcasting does not use link adaptation, and should make it possible for all terminals in the corresponding area to receive corresponding data. Accordingly, even a terminal having the lowest SINR uses the MCS that matches the corresponding terminal so that the terminal can receive data. Considering this, the channel state information report may not be necessary in the corresponding band. If the channel state information report is not performed in accordance with the service configuration as described above, information of the corresponding RI, PMI, and CQI may be excluded from the information transmission, or may be fixed to a specific bit, such as "0". By minimizing the amount of the channel state information being transferred to an uplink, the coverage in which the corresponding information can be transmitted and the transmission performance can be improved, and the system performance can be efficient.

As described above, the direct service configuration method as described above has the advantage that it can transmit a control signal, data, and channel state information through the method optimized to the corresponding service, and thus the corresponding system can be efficiently used. However, it may be necessary to reserve many fields on the assumption that services will be newly introduced in future for an NR system, and thus it is required to secure a sufficient number of reserved fields. However, in this case, overhead of the corresponding field configuration may be excessively increased. Table 17 and Table 18 as described above exemplify the direct service type configuration for VRG, and the direct corresponding field values and services may differ from each other. Further, although the above-described tables exemplify fields using 2 bits and 3 bits, the actual number of bits in the field may differ from that in the tables.

Table 22 below is a table indicating indirect VRG set configuration through a VRG configuration field having a size of 2 bits.

TABLE 22

| VRG Type indication field | Type |
|---|---|
| 00 | Service set 1 |
| 01 | Service set 2 |
| 10 | Service set 3 |
| 11 | Service set 4 |

Unlike the direct VRG service type configuration as described above, a method in Table 22 is a method for designating and using indirect service sets. The base station is not required to support all service types, but may use several services if needed. In case of using the method of Table 17 and Table 18, all base stations should use configuration bits in accordance with all service types, and thus configuration overhead is increased. Accordingly, if the indirect service set type is notified as described above, the configuration overhead can be minimized, and the base station can enjoy the corresponding VRG effect through tying and managing VRGs into a set. However, in order to perform the above-described specified operation for services, additional configuration to designate the corresponding services for each service set is necessary. For example, in case of configuring the fields as mentioned in Table 17 or Table 18 for each service set, the service type can be directly configured for each service set without the necessity of supporting the whole fields for all VRGs, and using this, the configuration overhead can be minimized.

Further, using not only the type but also an additional field for the corresponding service, the channel state information specified to the service, such as URLLC can be configured. Table 23 exemplifies such an additional field.

TABLE 23

```
VRGInfo : :=    SEQUENCE {
    ...
    AlternativeFeedbackForURLLC    ENUMERATED {true}    OPTIONAL,    -- Need ON
    FCR-config                     ENUMERATED {true}    OPTIONAL,    -- Need ON
    AdvancedCSI                               ENUMERATED {true}    OPTIONAL,    -- Need ON
    ...
}
```

As described above, by separately adding a field for URLLC or FCR configuration in the VRG configuration field as described above, it is possible to make the terminal support a feedback according to URLLC or related operation through the corresponding field configuration. In this case, AdvancedCSI field uses more overhead, but may be configured for the eMBB operation as a field for providing improved channel state information to provide accurate information.

Further, the direct VRG service type configuration and the indirect type configuration as mentioned above may be combined with each other to be used. For example, the eMBB can be frequently used as a service commonly used in all base stations. Accordingly, a method is also possible, in which field 00 indicates the eMBB to directly configure the eMBB, and the remaining three fields are used as a service set. Table 23 as described above exemplifies indirect service type configuration for the VRG, and expression of the corresponding indirect field may differ. Further, although Table 23 exemplifies the field using 2 bits, the number of bits in an actual field may differ from that in the table as described above.

In order to manage the VRG configuration information as described above, the base station may add an identifier (ID) for identifying the VRG to the VRG configuration information of the corresponding field. Table 24 exemplifies such an ID field.

TABLE 24

| VRGInfo ::= | SEQUENCE { | |
|---|---|---|
| | VRGInfoId | VRGInfoId, |
| | ... | |
| } | | |

Through the VRG configuration ID, the base station can easily configure or trigger the corresponding VRG-related information in case of using periodic CSI-RS and channel state information report or aperiodic CSI-RS and channel state information report through aperiodic trigger. That is, in case of configuring aperiodic trigger transmission, aperiodic CSI-RS configuration, or channel state information report to the terminal, the base station can indicate a specific VRG through configuration of the ID together. The ID may be one selected from "0" to the maximum number of pieces of configurable VRG information.

As described above, the service or vertical allocation in the frequency-time resources can be supported to be configured in the unit of VRG, and such configuration can be dynamically configured through semi-static configuration through RRC signaling or downlink control information (this can be exemplified as group DCI or common DCI) for simultaneously transferring the control information to terminals of a specific group. In case of supporting semi-static configuration through the RRC signaling, since the service or vertical allocation in the time-frequency resources is constant for a long period, the interference situation change is not great, and thus neighboring base stations can well grasp the interference situation of the corresponding cell.

However, in such a method, the adaptive period according to the traffic characteristic change of the corresponding TRP is long, and thus the performance for the service or vertical support may be deteriorated. For example, in case of a base station that does not require mMTC or URLLC transmission, pre-allocation of such resources may cause deterioration of the system performance. Accordingly, by configuring all resources as eMBB resources, such system performance deterioration can be prevented. However, if it is required for the corresponding base station to suddenly perform transmission of URLLC or the like, it is not possible to support the corresponding service before reconfiguration of the corresponding RRC signaling, and if there is a possibility that such a situation occurs, the corresponding base station should configure in advance somewhat resources as URLLC service resources (or resources for services excluding the eMBB) to cause the performance of the corresponding base station to deteriorate. If it is possible to dynamically configure in advance resources for other services through the downlink control information, it is possible to cope with such traffic occurrence in relatively short time, and thus the amount of time and frequency resources to be secured in advance may be small. Accordingly, relatively high system performance can be obtained, but control signal overhead through DCI or the like occurs. Such group DCI is transmitted between the base station and the terminal at a predetermined time, and may be scrambled and transmitted based on the configured group radio network temporary identifier (RNTI).

In order to trigger the aperiodic CSI-RS transmission for the VRG and the channel state information report, the base station may transmit information on the corresponding VRG set to the terminal. Table 25 and Table 26 below exemplify fields for triggering the aperiodic CSI-RS transmission for the VRG set and the channel state information report.

TABLE 25

| Value of request field | Description |
|---|---|
| 000 | No aperiodic CSI is triggered |
| 001 | Wideband CSI-RS and corresponding aperiodic CSI report is triggered |
| 010 | CSI-RS for VRG ID 0 |
| 011 | CSI-RS for VRG ID 1 |
| 100 | CSI-RS for VRG ID 2 |
| 101 | CSI-RS for VRG ID 3 |
| 110 | CSI-RS for VRG ID 4 |
| 111 | CSI-RS for VRG ID 5 |

TABLE 26

| Value of request field | Description |
|---|---|
| 000 | No aperiodic CSI is triggered |
| 001 | Aperiodic CSI-RS end corresponding aperiodic CSI report is triggered for a set of VRG(s) for serving cell c |
| 010 | Aperiodic CSI-RS and corresponding aperiodic CSI report is triggered for a $1^{st}$ set of VRG(s) |
| 011 | Aperiodic CSI-RS and corresponding aperiodic CSI report is triggered for a $2^{nd}$ set of VRG(s) |
| 100 | Aperiodic CSI-RS and corresponding aperiodic CSI report is triggered for a $3^{rd}$ set of VRG(s) |
| 101 | Aperiodic CSI-RS and corresponding aperiodic CSI report is triggered for a $4^{th}$ set of VRG(s) |
| 110 | Aperiodic CSI-RS and corresponding aperiodic CSI report is triggered for a $5^{th}$ set of VRG(s) |
| 111 | Aperiodic CSI-RS and corresponding aperiodic CSI report is triggered for a $6^{th}$ set of VRG(s) |

Table 25 indicates a method for making it possible to trigger aperiodic CSI-RS transmission and channel state information report for each wideband CSI-RS or VRG ID based on the preconfigured VRG configuration information and the corresponding ID. This method has the advantage that it can transmit the CSI-RS to the corresponding VRG only for services to be transmitted as needed, but it has the disadvantage that plural pieces of downlink control information should be transmitted in order for a plurality of VRGs to trigger the CSI-RS.

Table 26 indicates a method for triggering CSI-RS and related channel state information report based on a preconfigured VRG configuration information set.

TABLE 27

```
CSI-RS_CQI-ReportAperiodic-v1310   ::=         SEQUENCE {
    trigger010                     BOOLEAN,
    trigger011                     BOOLEAN,
    trigger100                     BOOLEAN,
    trigger101                     BOOLEAN,
    trigger110                     BOOLEAN,
    trigger111                     BOOLEAN
}
```

In Table 27, respective trigger fields (e.g., trigger 010 and trigger 011) are information indicating VRG in which CSI-RS and channel state information report is to be performed through the corresponding trigger. For example, if first and second bits of trigger 010 are set to "1", the remaining bit is "0", and a request field value in Table 26 is 010, the CSI-RS and channel state information report may be performed in VRGs corresponding to VRG ID #0 and VRG ID #1. In the above-described example, it is assumed that the number of VRG configurations is equal to the number of bits of a trigger (i.e., the number of VRG IDs is equal to the number of trigger bits), but such fields may differ from those in the above-described example, and may be dynamically configured to terminals of a specific group through group DCI or common DCI. Table 28 below exemplifies such fields.

TABLE 28

| Value of request field | Description |
|---|---|
| 00 | No aperiodic CSI is triggered |
| 01 | Aperiodic CSI-RS and corresponding aperiodic CSI report is triggered for a set of VRG(s) for serving cell c |
| 10 | Aperiodic CSI-RS and corresponding aperiodic CSI report is triggered for a $1^{st}$ possible set of VRG(s) |
| 11 | Aperiodic CSI-RS and corresponding aperiodic CSI report is triggered for a $2^{nd}$ possible set of VRG(s) |

As indicated in Table 28, the base station can transfer 2 bits to the terminal through DCI being transmitted, and the corresponding 2 bits may indicate the lowest index and the highest index among three possible VRGs. In this case, the base station may notify the terminal of possible VRG set through the DCI, and the size of the corresponding bitmap may be equal to the number of VRG set configurations. For example, if the base station transfers "01001000" and "00110000" for the first set and the second set through the group DCI, the terminal recognizes configurations of the base station through which triggering of a VRG corresponding to ID #0 and a VRG corresponding to ID #1 is possible in the first set, and triggering of VRGs corresponding to ID #2 and ID #3 is possible in the second set. Accordingly, based on this, the terminal receives CSI-RSs for VRG #1 and VRG #4 if the trigger bit that is set to "01" is transmitted, and receives CSI-RSs for VRG ID #2 and VRG ID #3 if the trigger bit that is set to "11" is transmitted.

As described above, a configuration field as indicated in Table 29 below can be used for CSI-RS transmission, IMR resource configuration, and channel state report configuration.

TABLE 29

```
VRGInfo ::=    SEQUENCE {
    ...
    csi-RS-ConfigNZPId          CSI-RS-ConfigNZPId,
    csi-IM-ConfigId             CSI-IM-ConfigId,
    cqi-ReportPeriodicProcId-r11    INTEGER (0..maxCQI-ProcExt-r11)    OPTIONAL,    -- Need OR
    cqi-ReportAperiodicProc-r11     CQI-ReportAperiodicProc-r11        OPTIONAL,    -- Need OR
    ...
}
```

The corresponding field as in Table 29 above may include CSI-RS configuration and CSI-IM configuration, and if the corresponding configuration supports aperiodic CSI-RS, the corresponding configuration may include the number of antenna ports for a non-precoded (NP) CSI-RS, the numbers of antennas for dimensions (directions) N1 and N2, oversampling factors for dimensions O1 and O2, one subframe config for transmitting plural CSI-RSs, and a plurality of resource configs for configuring locations. If the corresponding configuration supports periodic CSI-RS, subframe config information may be additionally included in the corresponding information. Information on the number of antenna ports of CSI-RS may be fixed to the standards, and in the same manner as CSI-RS, if the corresponding resource is aperiodic, it may include only resource config, whereas if the corresponding resource is periodic, subframe config information may be additionally included in the corresponding information.

As described above, a case where the CSI-RS transmission and channel state information report are perform for VRGs has been explained, but unlike this, in order to support the mentioned VRG, the corresponding configuration may be supported by a measurement subset. In case of the CSI-RS and channel state information report allocation for VRGs as mentioned above, the base station may configure even a region in which data is not transmitted to the terminal, and this allocation may be a waste of resources. Accordingly, for efficient resource usage, the CSI-RS configuration and channel state information report configuration may be separated from the VRG configuration. In this case, the VRG configuration may act as a measurement subset during measurement of the indirect channel state report. Table 30 below exemplifies VRG configuration for the measurement subset operation.

TABLE 30

```
VRGInfo ::=   SEQUENCE {
  ...
  p-C-r13                      INTEGER (-8..15),
  cbsr-Selection-r13           CHOICE{
    codebookSubsetRestriction        BIT STRING,
    nonPrecoded-r13                  SEQUENCE {
      codebookSubsetRestriction1-r13       BIT STRING,
      codebookSubsetRestriction2-r13       BIT STRING
    },
    beamformedKN-r13                 SEQUENCE {
      codebookSubsetRestriction3-r13       BIT STRING
    },
    beamformedKN-r13                 SEQUENCE {
      codebookSubsetRestriction-r13        BIT STRING
    }
  },
  ...
}
```

As described above, for the measurement subset operation, individual codebook subset limitation and Pc configuration may be supported. Accordingly, in case where the VRG configuration is applied as the measurement subset, as in the above-described example, the codebook subset limitation and Pc may be configured in the individual VRG configuration field. The terminal may individually report a CSI-RS resource indicator (CRI) and precoding type indicator (PTI), RI, PMI, and CQI based on the configured measurement subset, and as described above, the channel states, such as CRI, RI, PTI, and CQI, may differ from each other depending on the service type configuration or corresponding feedback type configuration. This method has the advantage that additional overhead is not necessary except for the VRG configuration for the subset limitation, but it has the disadvantage that if the interference situation is changed due to reasons, such as a service change of another cell in the corresponding VRG, it is not possible to additionally reflect such an interference situation change.

Further, for measurement of the interference change caused by another service in the VRG as described above, beam direction, and CoMP scenarios, the measurement subset may be supported in the VRG. For such support, it is preferable that the CSI-RS and channel state information report trigger for VRGs as mentioned in Table 25 to Table 28 is used. Such VRG subframe subset configuration method may support independent fields for subsets in the respective VRGs, and may support a separate field. Table 31 below exemplifies a case where independent fields for measurement subsets will be supported for the measurement subset in the VRG permitted up to three.

TABLE 31

```
VRGinfo ::=    SEQUENCE {
  ...
  setup                        SEQUENCE {
    VRG-MeasSubset1              MeasVRGPattern,
    VRG-MeasSubset2              MeasVRGPattern,
    VRG-MeasSubset3              MeasVRGPattern,
  }                              OPTIONAL,    -- Need ON,
  p-C-AndCBSRList              p-C-AndCBSRList,
  ...
}
```

Unlike the existing measurement subframe subset configuration, two or more interference situations exist in the frequency domain, and thus two or more subset configurations may exist in the VRG. That is, the subset configuration may be configured on not only the time resources but also the frequency resources. Further, for the individual Pc and codebook subset limitation configuration for subsets, a list of the corresponding configurations may be indicated, and in this case, the list of the corresponding configurations is the same as the number of configured VRG measurement subsets. In the above-described example, a case where the configuration fields are provided for the respective measurement subsets has been exemplified, but, unlike the above-described example, it is also possible to support two measurement subsets with one field. However, in this case, since only two measurement subsets can be supported, measurable interference situations may be limited, and to prevent this, an additional configuration field may be provided to support four measurement subsets.

Since it may be difficult for all terminals to support the plurality of VRG configurations, the terminal may notify the base station of UE capability with respect to the corresponding configuration. Table 32 below exemplifies fields for such UE capability report.

TABLE 32

```
VRG-BeamformedCapabilities ::=    SEQUENCE {
  VRG-Max                           INTEGER (1..8),
  MeasurementSubsetMax              INTEGER (1..8),
}
```

As described above, the terminal may notify the base station of the number of VRGs that can be supported by the terminal and supportable measurement subsets for VRGs. Through this, the terminal implementation can be easily performed, and the corresponding service can be supported more flexibly. If such capability indication is not supported, the corresponding implementation becomes difficult, and this may cause the NR terminal implementation to be complicated with the increase of the terminal costs.

As mentioned above with reference to FIG. 17, in order to obtain the initial channel state and long-term channel state information, CSI-RS transmission may be necessary with respect to the full band or the whole system band to which the terminal is allocated, and in order to obtain the channel state information for services later, CSI-RS transmission may be necessary with respect to a subband that is a partial band. Accordingly, such two CSI-RS types may be configured, and they may be called CSI-RS type A and CSI-RS type B.

The CSI-RS type A supports CSI-RS transmission with respect to the full band or the whole system band to which the terminal is allocated. Accordingly, based on such CSI-RS type A, the terminal can obtain the initial channel state and long-term channel state information. Accordingly, for the CSI-RS type A, resource config as described above in Table 2 is necessary. In case of the aperiodic CSI-RS, subframe config including the period and subframe offset information is not necessary, but in case of semi-persistent CSI-RS, the subframe config can be maintained as it is, and in addition, the number of repetitions for reception beam determination can be configured during CSI-RS transmission.

In contrast, unlike the CSI-RS type A, the CSI-RS type B requires configuration of a partial band. Accordingly, in case of the CSI-RS type A, the CSI-RS transmission for the full system band is always assumed, but in case of the CSI-RS type B, a method for partial band configuration may be necessary. Accordingly, in consideration of this, configuration for supporting CSI-RS allocation to a specific subband or bandwidth part, RBG, discontinuous RB, and continuous RB. This method may be supported as a bitmap for each subband or bandwidth part, or RBG, and may be supported using downlink resource allocation type 0, 1, or 2 of the LTE system.

Figure 20:
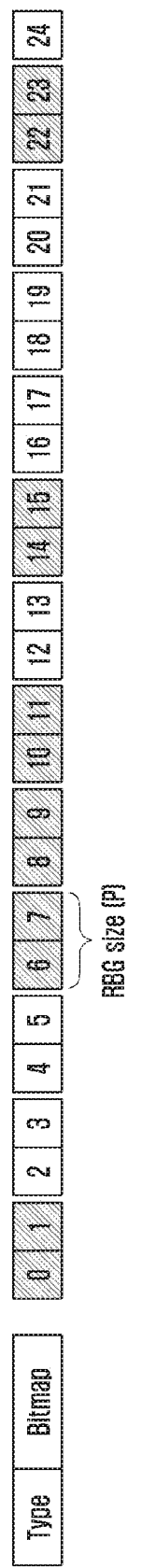
Figure 21:
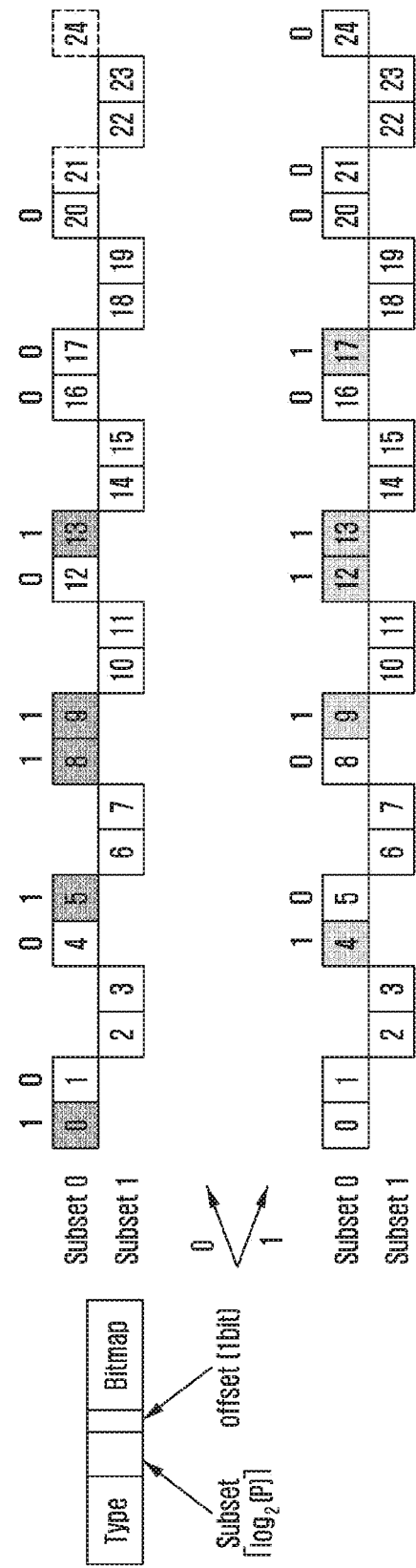

FIGS. 20, 21, and 22 are diagrams illustrating such downlink resource allocation types 0, 1, and 2, respectively. Further, it is also possible to support CSI-RS type B using an uplink resource allocation method.

The downlink resource allocation type 0 in LTE system is a method for allocating resources in the unit of an RBG determined in accordance with the system band. In order to allocate resources based on type 0, the base station first uses bits for notifying of the corresponding resource allocation type. Further, for actual resource allocation, the terminal may be allocated with the corresponding RBG using a bitmap having a size of $\lceil N_{RB}^{DL}/P \rceil$ based on the system band size, and may receive downlink data on the corresponding resource. In the same manner, in order to notify the terminal of whether to transmit aperiodic CSI-RS to the corresponding RBG, the base station may configure the aperiodic CSI-RS for each RBG using the corresponding method.

The downlink resource allocation type 1 is a method for allocating and transmitting aperiodic CSI-RS to specific discontinuous RB. Since this method supports the aperiodic CSI-RS transmission for each discontinuous RB, it has the advantage that flexibility becomes high in using the resource. In order to allocate the resource using type 1, the base station first uses bits for notifying of the corresponding resource allocation type. Further, in case of allocating the resource for RBs with respect to the full band, signaling overhead is excessively increased, and thus the corresponding resource may be divided into two resources to be transmitted. Further, type 1 uses the same amount of signaling as that of type 0, and for this, the terminal may be allocated with the corresponding RB using $\lceil \log_2(P) \rceil$ bits for subset selection included in the bitmap having the size of $\lceil N_{RB}^{DL}/P \rceil$ used in type 1 and a bitmap having a size of $(\lceil N_{RB}^{DL}/P \rceil - \lceil \log_2(P) \rceil - 1)$ excluding one bit for offset selection, and may receive downlink data on the corresponding resource. Using the method of the downlink resource allocation type 1, the base station may transmit the aperiodic CSI-RS to the terminal. In this case, the base station may configure the aperiodic CSI-RS to the terminal using RRC or L1 signaling. Further, in allocating the discontinuous RB, unlike the downlink data allocation, the corresponding aperiodic CSI-RS transmission does not require unnecessary information transmission for the CSI-RS transmission, such as MCS for code words, and thus the base station may use bits included in DCI that is larger than the downlink resource allocation for the aperiodic CSI-RS allocation configuration. In this case, it is also possible to perform allocation using the bitmap of the whole subset size excluding offset bits.

In order to allocate a resource based on the downlink resource allocation type 2, the base station first uses one bit for notifying whether the corresponding resource allocation is performed in localized virtual resource block (LVRB) type or distributed virtual resource block (DVRB) type. Based on this, the base station notifies of the location of RB at which resource allocation starts and the length of allocated resource through a resource indication value (RIV). In this case, the start location and length may be obtained as in mathematical expression 3 in accordance with a DCI format.

[Mathematical expression 3]

$$RIV = \begin{cases} N_{RB}^{DL}(L_{CRBs} - 1) + RB_{start} & (L_{CRBs} - 1) \le \lfloor N_{RB}^{DL}/2 \rfloor \\ N_{RB}^{DL}(N_{RB}^{DL} - L_{CRBs} + 1) + \\ (N_{RB}^{DL} - 1 - RB_{start}) & \text{otherwise} \end{cases}$$

$$RIV = \begin{cases} N'^{DL}_{VRB}(L'_{CRBs} - 1) + RB'_{start} & (L'_{CRBs} - 1) \le \lfloor N'^{DL}_{VRB}/2 \rfloor \\ N'^{DL}_{VRB}(N'^{DL}_{VRB} - L'_{CRBs} + 1) + \\ (N'^{DL}_{VRB} - 1 - RB'_{start}) & \text{otherwise} \end{cases}$$

where $RB'_{start} = RB_{start}/N_{RB}^{step}$ $$L'_{CRBs} = L_{CRBs} / N_{RB}^{step}$$

$$N'^{DL}_{VRB} = \lfloor N^{DL}_{VRB} / N_{RB}^{step} \rfloor$$

In this case, resource allocation bits being used are $\lceil \log_2 (N_{RB}^{DL}(N_{RB}^{DL}+1)/2) \rceil$ and $\lceil \log_2(\lfloor N_{VRB,gap1}^{DL}/N_{RB}^{step} \rfloor \cdot (\lfloor N_{VRB,gap1}^{DL}/N_{RB}^{step} \rfloor+1)/2) \rceil$ bits.

In addition, in the same manner as the CSI-RS type A, the CSI-RS type B also requires resource config as described above with reference to Table 2. In case of the aperiodic CSI-RS, subframe config including a period and subframe offset information is not required, but in case of the semi-persistent CSI-RS, the subframe config can be maintained as it is, and in addition, the number of repetitions for reception beam determination can be configured.

Accordingly, if the corresponding CSI-RS configuration is type A, the terminal receives the corresponding CSI-RS on the assumption that the corresponding CSI-RS is transmitted in the system full band. If the CSI-RS configuration is type B, the terminal receives the corresponding CSI-RS on the assumption that the corresponding CSI-RS is transmitted in the partial band of the system. The CSI-RS type configuration may be indirectly configured depending on whether the subband transmission configuration as described above exists.

The CSI-RS type A and the CSI-RS type B may have different pseudo colocation support for CoMP transmission in accordance with their characteristics. As described above, the CSI-RS type A is transmitted on the full band. Accordingly, it is very useful in estimating delay-related information (delay spread and average delay), but it is not suitable to estimation of Doppler information (Doppler spread and Doppler shift) since the number of times of transmission on a time resource of the corresponding transmission is not sufficient. Accordingly, the CSI-RS type A may be used to estimate only the delay-related information. In contrast, the CSI-RS type B is suitable to Doppler information estimation in consideration of its short transmission period, but is not suitable to the delay-related information estimation. Accordingly, the CSI-RS type B may be used only for Doppler information estimation.

In order for the terminal to estimate a demodulation reference signal (DMRS), both the above-described delay information and Doppler information are necessary. In an LTE system, since the base station transmits CRS and CSI-RS to the terminal, and the corresponding CRS and CSI-RS are always transmitted with a short period using the full band, it is easy to acquire the delay-related information and Doppler information only with the corresponding information. However, in the NR system, since CRS does not exist and two types of CSI-RSs may exist as described above, the delay-related information and the Doppler information can be estimated through configuration of plural pieces of CSI-RS information together, such as the CSI-RS type A and the CSI-RS type B, instead of the CRS, from PDSCH RE mapping and quasi-colocation indicator (PQI) information for providing information between the existing CRS and CSI-RS.

The channel state information reported based on the CSI-RS type A and the CSI-RS type B may also differ from each other. The CSI-RS type A provides information on a channel that is changed in a relatively long period. As a method for reporting the channel state information in the CSI-RS type A, there are methods for reporting the channel state information including only the system band and information in a long period, and for reporting the channel state information including the system band information, subband information, and information in long and short periods in all.

The first method for reporting the channel state information using the CSI-RS type A is for the terminal to report only the system band and long-period information, and in this case, the terminal can report to the base station only information on RI, first PMI (W1), wideband second PMI (W2), and wideband CQI. Based on this, the terminal may report the allocated whole system, whole band, and long-term channel state information. Further, since the full band channel state information is unable to satisfy the service of an allocated specific part, it can support only one kind of CQI as a representative. Such a CQI may not be the CQI for respective services to be described later, but may be a CQI having a target of eMBB CQI, that is, 10% of BLER.

The second method is for the terminal to simultaneously report subband information together with the first method. Since this method can provide more information as compared with the first method, the base station can be aware of the channel state information for each subband even without additionally transmitting the CSI-RS type B for the subband information, and thus the transmission efficiency and information amount can be increased.

In addition, in the CSI-RS type A, explicit CSI can be supported. The explicit CSI means that the terminal directly transfers covariance matrix that is a long-term information of the channel to the base station. Accordingly, it is preferable that the information is supported through the CSI-RS type A. In an LTE system, the channel state information is reported one by one for each terminal, and in the NR system, a wider system band can be supported, and thus it is also possible to report a plurality of RIs, first PMIs, and CQIs through division of the whole system band into parts.

As compared with the CSI-RS type A, the CSI-RS type B provides channel information that is changed in a relatively short period. Accordingly, the corresponding CSI-RS type B should necessarily include the second PMI (W2) and the subband CQI report. Further, the channel state information specified to a specific service to be described hereinafter may be supported. In this case, RI can also be included, and this is because supportable ranks may differ for services. For example, in case of URLLC transmission or a control channel, high reliability is necessary, and in this case, the information amount can be reduced and reliability can be heightened through lowering of the supported rank.

In reporting the channel state information for the CSI-RS type B, the terminal may use the RI and the subband CQI as relative values. For example, the value can be indicated as an offset in tables below. Table 33, Table 34, and Table 35 are exemplary to report the RI and the CQI as such relative values.

TABLE 33

| Spatial differential CQI value | Offset level |
|---|---|
| 0 | 0 |
| 1 | 1 |

TABLE 33-continued

| Spatial differential CQI value | Offset level |
| --- | --- |
| 2 | 2 |
| 3 | ≥3 |
| 4 | ≤−4 |
| 5 | −3 |
| 6 | −2 |
| 7 | −1 |

TABLE 34

| Spatial differential RI value | Offset level |
| --- | --- |
| 0 | 0 |
| 1 | −1 |

TABLE 35

| Spatial differential RI value | Offset level |
| --- | --- |
| 0 | 0 |
| 1 | 1 |
| 2 | −1 |
| 3 | −2 |

In case of reporting the channel state information using such relative values, the bit amount can be reduced as compared with a case of reporting the whole CQI or RI. In particular, in Table 34, the RI can be reported with a small amount of bits for the service having high reliability.

In addition to the RI and the CQI as described above, the second PMI reported based on the CSI-RS type B may be based on the first PMI reported based on the CSI-RS type A. Further, if there are plural pieces of first PMI reported in the CSI-RS type A, the terminal can report subband second PMI and subband CQI based on the first PMI corresponding to the corresponding subband being configured and reported.

Further, the CSI-RS type A may be inscribed as other titles, such as coverage CSI-RS, cell-specific CSI-RS, wideband CSI-RS, and full bandwidth (BW) CSI-RS, and the CSI-RS type B may be inscribed as UE-specific CSI-RS, UE-specific beamformed CSI-RS, and partial BW CSI-RS. Further, it is also possible to express the CSI-RS with various terms, such as measurement RS, beam RS, and beam measurement RS.

Figure 23:
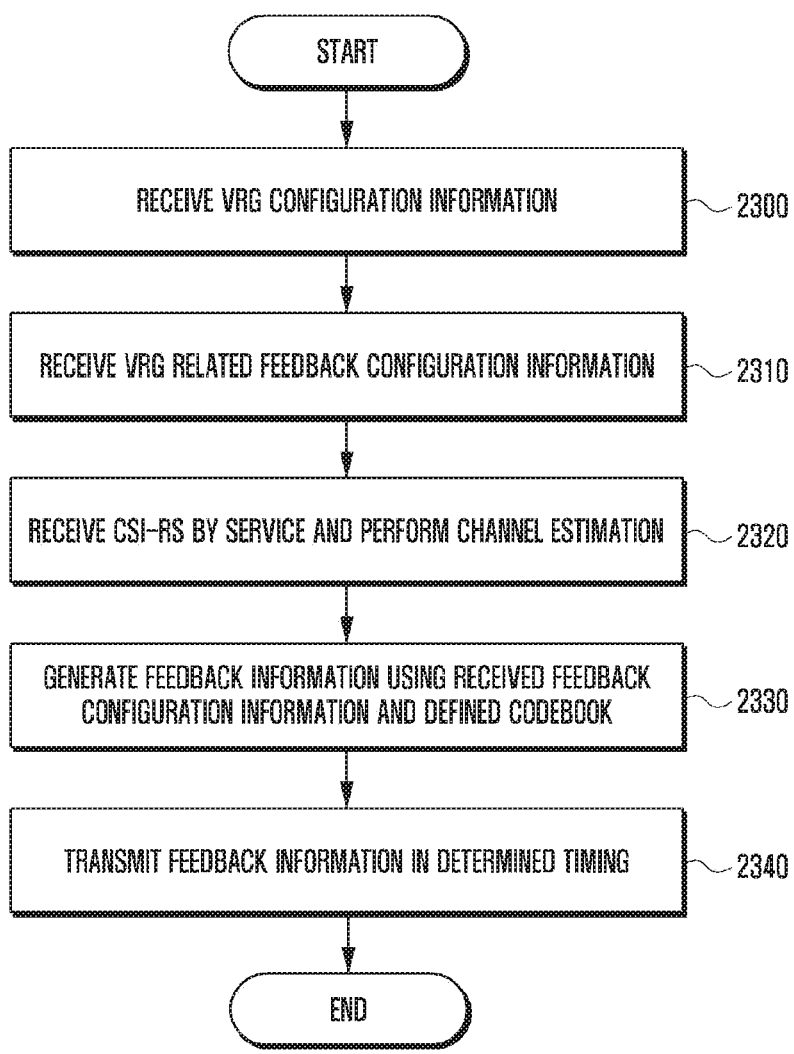
FIG. 23 is a diagram illustrating an operation of a terminal according to an embodiment of the present disclosure.

FIG. 23 is a diagram illustrating an operation of a terminal according to an embodiment of the present disclosure.

Referring to FIG. 23, the terminal, at operation 2300, receives configuration information on VRG configuration. Through such information, at least one of VRG-related ID, time or/and frequency resource locations of respective VRGs, service type, service set, support feedback type, and VRG measurement subset can be configured. Further, based on the received configuration information, the terminal can identify at least one of the number of antenna ports for an NP CSI-RS, the numbers of antennas for dimensions N1 and N2, oversampling factors for dimensions O1 and O2, one subframe config for transmitting plural CSI-RSs, a plurality of resource configs for configuring locations, information related codebook subset limitation, information related to CSI report, CSI process index, and transmission power information Pc. Thereafter, at operation 2310, the terminal receives one piece of feedback configuration information based on the CSI-RS location. The corresponding information may configure PMI and/or CQI period and offset, RI period and offset, CRI period and offset, feedback or non-feedback for the wideband/subband, and submode. At operation 2320, the terminal receives the CSI-RS based on the corresponding information, and based on this, estimates a channel between a base station antenna and a terminal reception antenna. At operation 2330, the terminal generates RI, PMI, and CQI as feedback information using the received feedback configuration based on the estimated channel, and based on this, can select an optimum CRI. Thereafter, at operation 2340, the terminal transmits the feedback information to the base station in the determined feedback timing in accordance with base station feedback configuration and aperiodic channel state report trigger to complete a channel feedback generation and report process.

Figure 24:
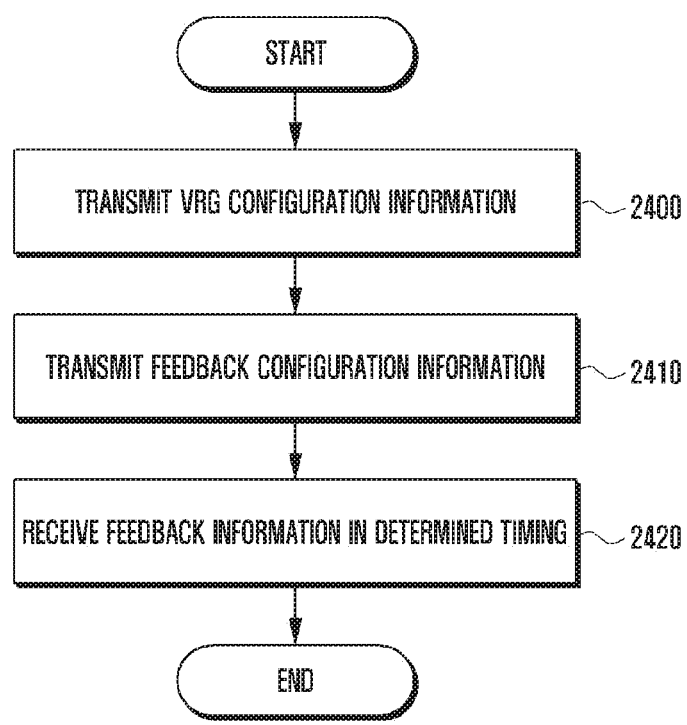
FIG. 24 is a diagram illustrating an operation of a base station according to an embodiment of the present disclosure.

FIG. 24 is a diagram illustrating an operation of a base station according to an embodiment of the present disclosure.

Referring to FIG. 24, the base station, at operation 2400, transmits to the terminal configuration information on VRG for channel measurement. Through the configuration information, at least one of time and/or frequency resource locations of respective VRGs, service type, service set, support feedback type, and VRG measurement subset can be configured, and in order to transmit the CSI-RS based on this, at least one of the number of antenna ports for an NP CSI-RS, the numbers of antennas for dimensions N1 and N2, oversampling factors for dimensions O1 and O2, one subframe config for transmitting plural CSI-RSs, a plurality of resource configs for configuring locations, information related codebook subset limitation, information related to CSI report, CSI process index, and transmission power information Pc may be included in the configuration information. Thereafter, at operation 2410, the base station transmits to the terminal feedback configuration information based on at least one CSI-RS. The corresponding information may configure PMI and/or CQI period and offset, RI period and offset, CRI period and offset, feedback or non-feedback for the wideband/subband, and submode. Thereafter, the base station transmits the configured CSI-RS to the terminal, the terminal estimates a channel for each antenna port, and based on this, estimates an additional channel for virtual resources. The terminal determines the feedback, and generates and transmits to the base station corresponding CRI, PMI, RI, and CQI. Accordingly, at operation 2420, the base station receives the feedback information from the terminal in the determined timing, and uses the feedback information in determining the channel state between the terminal and the base station.

Figure 25:
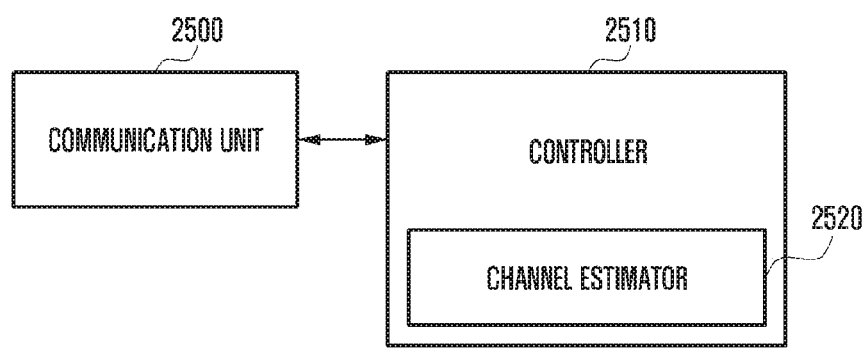
FIG. 25 is a block diagram illustrating the internal structure of a terminal according to an embodiment of the present disclosure.

FIG. 25 is a block diagram illustrating the internal structure of a terminal according to an embodiment of the present disclosure.

Referring to FIG. 25, the terminal includes a communication unit 2500 and a controller 2510. The communication unit 2500 transmits/receives data to/from outside (e.g., base station). Here, the communication unit 2500 may transmit feedback information to the base station under the control of the controller 2510. The controller 2510 controls states and operations of all constituent elements constituting the terminal. Specifically, the controller 2510 generates the feedback information in accordance with the information allocated from the base station. Further, the controller 2510 controls the communication unit 2500 to feed generated channel information back to the base station in accordance with timing information allocated from the base station. For this, the controller 2510 may include a channel estimator 2520. The channel estimator 2520 determines locations of time and frequency resources of the corresponding VRG through VRG service and feedback information received from the base station, and identify necessary feedback information through the related CSI-RS and feedback allocation information. Based on the feedback information, the channel estimator 2520 estimates the channel using the received CSI-RS.

Although FIG. 25 illustrates an example in which the terminal is composed of the communication unit 2500 and the controller 2510, the configuration of the terminal is not limited thereto, and various configurations may be further provided in the terminal in accordance with the function performed by the terminal. For example, the terminal may further include a display unit configured to display the current state of the terminal, an input unit configured to receive an input of a signal for performing the function from a user, and a storage unit configured to store data generated in the terminal. Further, it is illustrated that the channel estimator 2520 is included in the controller 2510, but is not limited thereto. The controller 2510 may control the communication unit 2500 to receive from the base station configuration information for at least one reference signal resource. Further, the controller 2510 may measure the at least one reference signal and may control the communication unit 2500 to receive from the base station feedback configuration information for generating the feedback information in accordance with the result of the measurement.

Further, the controller 2510 may measure the at least one reference signal received through the communication unit 2500, and may generate the feedback information in accordance with the feedback configuration information. Further, the controller 2510 may control the communication unit 2500 to transmit the generated feedback information to the base station in the feedback timing in accordance with the feedback configuration information. Further, the controller 2510 may receive the CSI-RS from the base station, generate the feedback information based on the received CSI-RS, and transmit the generated feedback information to the base station. In this case, the controller 2510 may select a precoding matrix for each antenna port group of the base station, and may further select one additional precoding matrix based on the relationship between the antenna port groups of the base station.

Further, the controller 2510 may receive the CSI-RS from the base station, generate the feedback information based on the received CSI-RS, and transmit the generated feedback information to the base station. In this case, the controller 2510 may select one precoding matrix for all antenna port groups of the base station. Further, the controller 2510 may receive the feedback configuration information from the base station, receive the CSI-RS from the base station, generate the feedback information based on the received feedback configuration information and the received CSI-RS, and transmit the generated feedback information to the base station. In this case, the controller 2510 may receive additional feedback configuration information based on the feedback configuration information corresponding to respective antenna port groups of the base station and the relationship between the antenna port groups.

Figure 26:
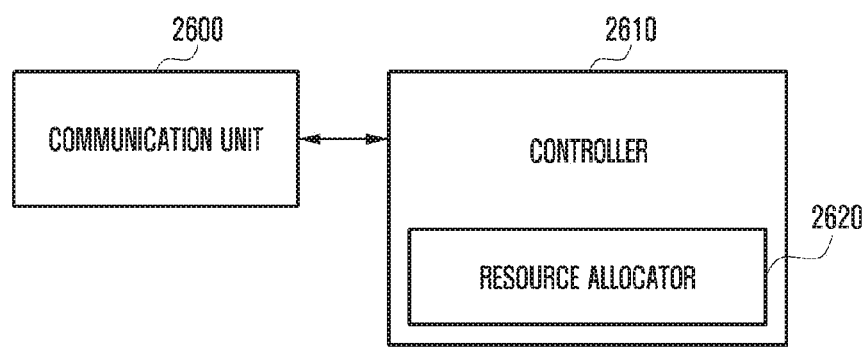
FIG. 26 is a block diagram illustrating the internal structure of a base station according to an embodiment of the present disclosure.

FIG. 26 is a block diagram illustrating the internal structure of a base station according to an embodiment of the present disclosure.

Referring to FIG. 26, the base station includes a controller 2610 and a communication unit 2600. The controller 2610 controls states and operations of all constituent elements constituting the base station. Specifically, the controller 2610 allocates to the terminal related configuration for the terminal to acquire VRG information and a CSI-RS resource for channel estimation of the terminal, and allocates a feedback resource and feedback timing to the terminal. For this, the controller 2610 may further include a resource allocator 2620. Further, the base station allocates feedback configuration and feedback timing so that feedbacks from several terminals do not collide with each other, receives and analyzes configured feedback information in the corresponding timing. The communication unit 2600 transmits and receives data, a reference signal, and feedback information to/from the terminal. Here, under the control of the controller 2610, the communication unit 2600 transmits a CSI-RS to the terminal through allocated resources, and receives the feedback for channel state information from the terminal. Further, the communication unit transmits the reference signal based on CRI, RI, PMI partial information, and CQI obtained from the channel state information transmitted by the terminal.

As described above, it is illustrated that the resource allocator 2620 is included in the controller 2610, but is not limited thereto. The controller 2610 may control the communication unit 2600 to transmit to the terminal configuration information for at least one reference signal, or may generate the at least one reference signal. Further, the controller 2610 may control the communication unit 2600 to transmit to the terminal feedback configuration information for generating the feedback information in accordance with the result of the measurement. Further, the controller 2610 may control the communication unit 2600 to transmit the at least one reference signal to the terminal and to receive the feedback information transmitted from the terminal in the feedback timing in accordance with the feedback configuration information. Further, the controller 2610 may transmit the feedback configuration information to the terminal, transmit the CSI-RS to the terminal, and receive from the terminal the feedback information generated based on the feedback configuration information and the CSI-RS. In this case, the controller 2610 may transmit additional feedback configuration information based on the feedback configuration information corresponding to respective antenna port groups of the base station and the relationship between the antenna port groups. Further, the controller 2610 may transmit the beamformed CSI-RS to the terminal based on the feedback information, and may receive the feedback information generated based on the CSI-RS from the terminal.

Third Embodiment

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system.

In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive MIMO, full dimension MIMO (FD-MIMO), array antennas, analog beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and MTC have been implemented by techniques for beam-forming, MIMO, and array antennas, which correspond to the 5G communication technology. As the big data processing technology as described above, application of a cloud radio access network (cloud RAN) would be an example of convergence between the 5G technology and the IoT technology.

In such a communication system, a plurality of services may be provided to users, and in order to provide such a plurality of services to users, there is a need for a method and an apparatus capable of providing the respective services in the same time period to match the characteristics.

Hereinafter, embodiments of the present disclosure will be described in detail with reference to the accompanying drawings.

The wireless communication system has escaped from an initial voice-oriented service providing system, and has been developed as a broadband wireless communication system that provides high-speed and high-quality packet data services in accordance with the communication standards, such as high speed packet access (HSPA) of 3GPP, long term evolution (LTE) or evolved universal terrestrial radio access (E-UTRA), LTE-advanced (LTE-A), high rate packet data (HRPD) of 3GPP2, ultra-mobile broadband (UMB), and 802.16e of IEEE. Further, for the 5G wireless communication system, 5G or new radio (NR) communication standards have been made.

In the wireless communication system including the 5th generation as described above, at least one service of enhanced mobile broadband (eMBB), massive machine type communications (mMTC), and ultra-reliable and low-latency communications (URLLC) may be provided to a terminal. The above-described services may be provided to the same terminal during the same time period. In an embodiment below, eMBB may be a service that takes aim at high-speed transmission of high-capacity data, mMTC may be a service that takes aim at minimization of a terminal power and connection of plural terminals, and URLLC may be a service that takes aim at high reliable and low-latency signal transmission, but are not limited thereto. The three kinds of services as described above may be primary scenarios in an LTE system or post-LTE 5G or new radio or next radio (NR) system. If a situation in which a base station should transmit URLLC data in a specific transmission time interval (TTI) occurs in a state where the base station is scheduled to transmit data that corresponds to an eMBB service to a certain terminal at the TTI, the base station may not transmit a part of the eMBB data in a frequency band in which the eMBB data has already been scheduled and transmitted, but may transmit the generated URLLC data in the frequency band. The eMBB-scheduled terminal and the URLLC-scheduled terminal may be the same terminal or different terminals. In this case, since a part of the eMBB data that has already been scheduled and transmitted may not be transmitted, a possibility that the eMBB data is lost is increased. Accordingly, it is necessary to provide a method for processing a signal that is received from the eMBB-scheduled terminal or the URLLC-scheduled terminal and a method for receiving the signal.

Hereinafter, exemplary embodiments of the present disclosure will be described in detail with reference to the accompanying drawings. In describing the present disclosure, a detailed description of related functions or configurations will be omitted if it is determined that it obscures the disclosure in unnecessary detail. Further, terms to be described later are terms defined in consideration of their functions in the present disclosure, but may differ depending on intentions of a user or an operator, or customs. Accordingly, they should be defined on the basis of the contents of the whole description of the present disclosure.

Hereinafter, the base station is the subject that performs resource allocation to the terminal, and may be called as an eNode B, Node B, base station (BS), radio access unit, base station controller, or node on a network. The terminal may include user equipment (UE), mobile station (MS), cellular phone, smart phone, computer, or a multimedia system capable of performing a communication function. In the present disclosure, a downlink (DL) is a radio transmission path of a signal that is transmitted from the base station to the terminal, and an uplink (UL) means a radio transmission path of a signal that is transmitted from the terminal to the base station.

Hereinafter, although an embodiment of the present disclosure is described in a state where an LTE or LTE-A system is exemplified, it is also possible to apply the embodiment of the present disclosure even to other communication systems having similar technical backgrounds or channel types. For example, the 5th generation mobile communication system (5G, new radio, or NR) that are developed after LTE-A may be included therein. Further, the embodiment of the present disclosure may also be applied to other communication systems through partial modifications thereof in a range that does not greatly deviate from the scope of the present disclosure by the judgment of those skilled in the art.

In the LTE system that is a representative example of the broadband wireless communication systems, a downlink (DL) adopts an orthogonal frequency division multiplexing (OFDM) scheme, and an uplink (UL) adopts single carrier frequency division multiple access (SC-FDMA) scheme. The uplink means a radio link on which a terminal (or user equipment (UE)) or a mobile station (MS) transmits data or a control signal to a base station (BS) (or eNode B), and the downlink means a radio link on which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

The LTE system adopts a hybrid automatic repeat request (HARQ) scheme in which a physical layer retransmits the corresponding data if decoding failure occurs during initial data transmission. According to the HARQ scheme, a receiver may transmit information (negative acknowledgement (NACK)) for notifying of a decoding failure to a transmitter if the receiver is unable to accurately decode the data, and the transmitter may make the physical layer retransmit the corresponding data. The receiver may combine the data that is retransmitted from the transmitter with the previous data of which the decoding has failed to heighten the data reception performance. Further, if the receiver has accurately decoded the data, the receiver may transmit information (acknowledgement (ACK)) for notifying the transmitter of decoding success, and the transmitter can transmit new data.

Figure 27:
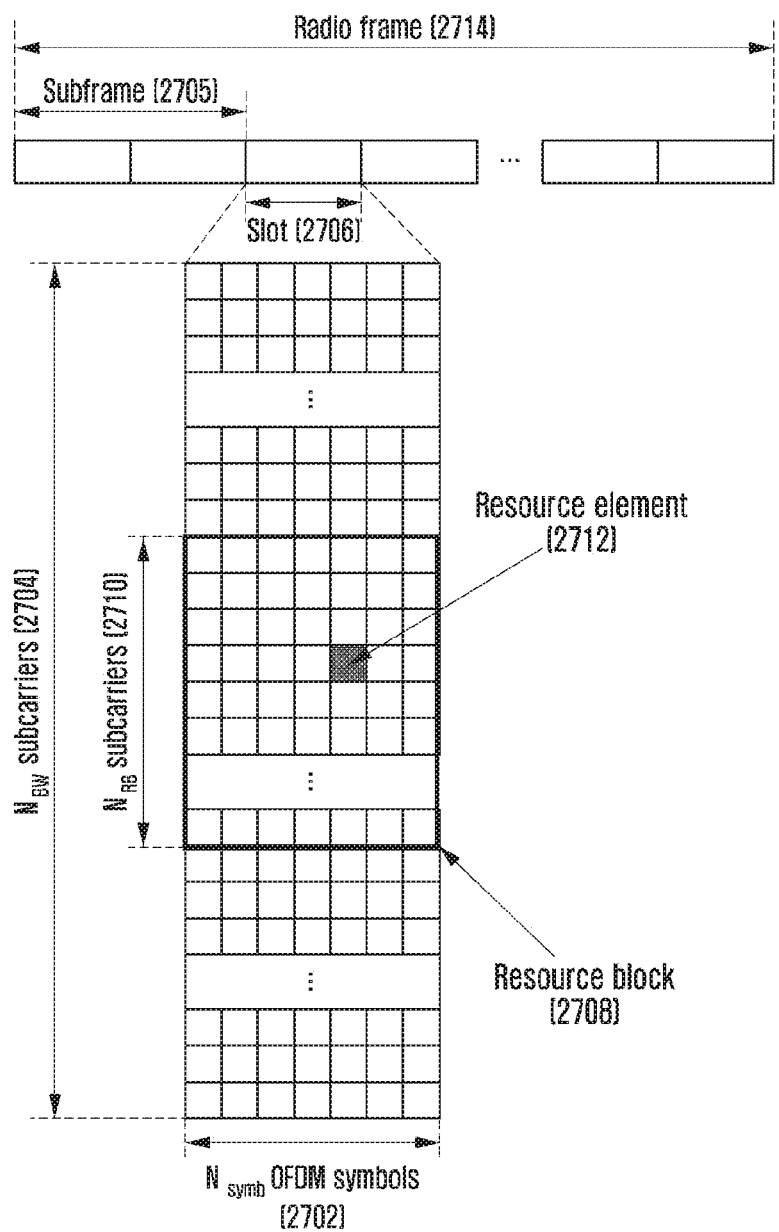
FIG. 27 is a diagram illustrating the basic structure of a time-frequency domain that is an uplink radio resource region in an LTE system or a system similar thereto.

FIG. 27 is a diagram illustrating the basic structure of a time-frequency domain that is a radio resource region of a downlink in an LTE system or a system that is similar to the LTE system.

Referring to FIG. 27, a horizontal axis represents a time domain, and a vertical axis represents a frequency domain. In the time domain, the minimum transmission unit is an OFDM symbol, and $N_{symb}$ OFDM symbols 2702 constitute one slot 2706, and two slots constitute one subframe 105. The length of the slot is 0.5 ms, and the length of the subframe is 1.0 ms. Further, a radio frame 2714 is a time domain region that is composed of 10 subframes. In the frequency domain, the minimum transmission unit is a subcarrier, and the transmission bandwidth of the whole system is composed of $N_{BW}$ subcarriers 2704 in total. However, such numerical values may be variably applied.

In the time-frequency domain, the basic unit of resources is a resource element (RE) 2712 that may be expressed by an OFDM symbol index and a subcarrier index. A resource block (RB) (or physical resource block (PRB)) 2708 may be defined by $N_{symb}$ successive OFDM symbols in the time domain and $N_{RB}$ successive subcarriers 2710 in the frequency domain. Accordingly, in one slot, one RB 2708 may include $N_{symb} \times NR$ REs 2712.

In general, the minimum transmission unit of data is the RB unit. In the LTE system, it is general that $N_{symb}=7$, $N_{RB}=12$, and $N_{BW}$ is in proportion to the bandwidth of the system transmission band. The data rate is increased in proportion to the number of RBs that are scheduled in the terminal. The LTE system defines and operates 6 transmission bandwidths. In case of a frequency division duplex (FDD) system that operates to discriminate a downlink and an uplink by means of the frequency, the downlink transmission bandwidth and the uplink transmission bandwidth may differ from each other. A channel bandwidth represents an RF bandwidth that corresponds to the system transmission bandwidth. Table 36 below presents the corresponding relationship between the system transmission bandwidth and the channel bandwidth defined in the LTE system. For example, the LTE system having 10 MHz channel bandwidth has the transmission bandwidth that is composed of 50 RBs.

TABLE 36

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within initial N OFDM symbols in the subframe. In general, N={1, 2, 3}. Accordingly, in accordance with the amount of control information to be transmitted to the current subframe, the value N is varied for each subframe. The control information includes a control channel transmission interval indicator indicating how many OFDM symbols the control information is transmitted through, scheduling information on downlink data or uplink data, and HARQ ACK/NACK signal.

In the LTE system, the scheduling information on the downlink data or the uplink data is transferred from the base station to the terminal through downlink control information (DCI). The uplink (UL) means a radio link on which the terminal transmits data or a control signal to the base station, and the downlink (DL) means a radio link on which the base station transmits data or a control signal to the terminal. The DCI is defined in various formats, and is determined depending on whether the DCI is scheduling information on uplink data (UL grant) or scheduling information on downlink data (DL grant), whether the DCI is a compact DCI having a small size of the control information, whether spatial multiplexing using multiple antennas is applied, and whether the DCI is a DCI for power control. For example, DCI format 1 that is the scheduling control information on the downlink data is configured to include at least the following control information.

Resource allocation type 0/1 flag: This notifies of whether a resource allocation scheme is of type 0 or type 1. The type 0 allocates resources in the unit of a resource block group (RBG) through application of a bitmap scheme. In the LTE system, the basic unit of scheduling is an RB that is expressed as time and frequency domain resource, and the RBG is composed of a plurality of RBs, and becomes the basic unit of scheduling in the type 0 scheme. The type 1 allocates a specific RB in the RBG.

Resource block assignment: This notifies of an RB that is allocated for data transmission. An expressed resource is determined in accordance with the system bandwidth and the resource allocation scheme.

Modulation and coding scheme (MCS): This notifies of a modulation scheme that is used for data transmission and the size of a transport block that is data to be transmitted.

HARQ process number: This notifies of a process number of HARQ.

New data indicator: This notifies of whether data transmission is HARQ initial transmission or retransmission.

Redundancy version: This notifies of a redundancy version of HARQ.

Transmission power control (TCP) command for a physical uplink control channel (PUCCH): This notifies of a transmission power control command for a PUCCH that is an uplink control channel.

The DCI passes through a channel coding and modulation process, and is transmitted on a physical downlink control channel (PDCCH) that is a downlink physical control channel or enhanced PDCCH (EPDCCH).

In general, the DCI is independently channel-coded with respect to each terminal, and is configured as an independent PDCCH to be transmitted. In the time domain, the PDCCH is mapped and transmitted during the control channel transmission interval, and the frequency domain mapping location of the PDCCH is determined by an Identifier (ID) of each terminal, and is spread and transmitted over the whole system transmission band.

The downlink data is transmitted on a physical downlink shared channel (PDSCH) that is a downlink physical data channel. The downlink data on the PDSCH is transmitted after the control channel transmission period, and scheduling information, such as a detailed mapping location of data in the frequency domain and the modulation scheme, is indicated by the DCI being transmitted through the PDCCH.

Through an MCS composed of 5 bits among the control information constituting the DCI, the base station notifies the terminal of the modulation scheme that is applied to the downlink data to be transmitted to the terminal and a transport block size (TBS) of data to be transmitted. The TBS corresponds to the data size before channel coding for error correction is applied to the data (this may be understood as a transport block), which the base station intends to transmit.

The modulation scheme supported in the LTE system is quadrature phase shift keying (QPSK), 16 quadrature amplitude modulation (16QAM), or 64QAM, and respective modulation orders $Q_m$ correspond to 2, 4, and 6. That is, in case of the QPSK modulation, 2 bits per symbol may be transmitted, and in case of the 16QAM modulation, 4 bits per symbol may be transmitted. Further, in case of the 64QAM modulation, 6 bits per symbol may be transmitted. Further, in accordance with system modification, the modulation scheme of 256QAM or more may be used.

Figure 28:
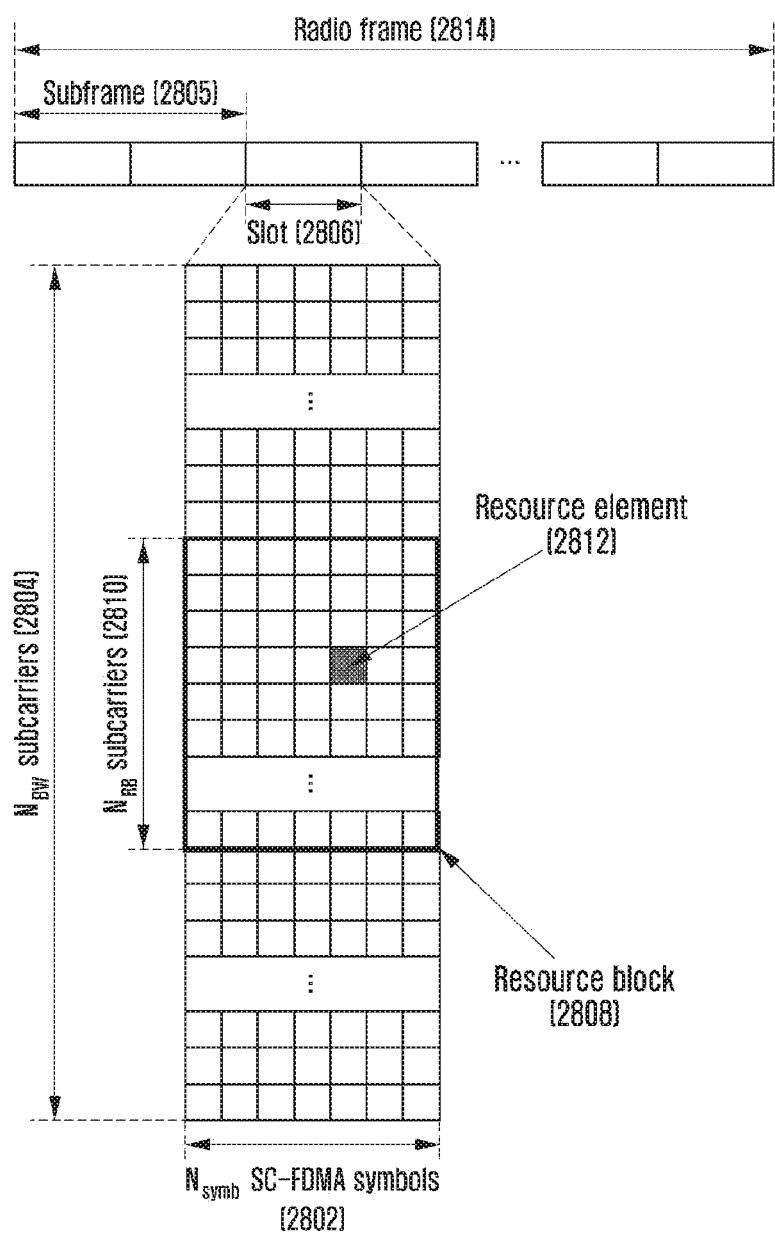
FIG. 28 is a diagram illustrating the basic structure of a time-frequency domain that is an uplink radio resource region in an LTE-A system.

FIG. 28 is a diagram illustrating the basic structure of a time-frequency domain that is a radio resource region in an LTE-A system.

Referring to FIG. 28, a horizontal axis represents a time domain, and a vertical axis represents a frequency domain. In the time domain, the minimum transmission unit is a SC-FDMA symbol 2802, and $N_{symb}$ SC-FDMA symbols may constitute one slot 2806. Further, two slots constitute one subframe 2805. In the frequency domain, the minimum transmission unit is a subcarrier, and the transmission bandwidth 2804 of the whole system is composed of $N_{BW}$ subcarriers in total. $N_{BW}$ may have a value that is in proportion to the system transmission bandwidth.

In the time-frequency domain, the basic unit of resources is a resource element (RE) 2812 that may be defined by an SC-FDMA symbol index and a subcarrier index. A resource block pair (RB pair) 2808 may be defined by $N_{symb}$ successive SC-FDMA symbols in the time domain and $N_{RB}$ successive subcarriers in the frequency domain. Accordingly, one RB is composed of $N_{symb} \times N_{RB}$ REs. In general, the minimum transmission unit of data or control information is an RB unit, and in case of a physical uplink control channel (PUCCH), it is mapped to the frequency domain corresponding to 1 RB, and is transmitted for one subframe.

In the LTE system, the timing relationship may be defined among a physical downlink shared channel (PDSCH) that is a downlink physical data channel, a physical downlink control channel (PDCCH) including semi-persistent scheduling release (hereinafter SPS release), a PUCCH that is an uplink physical control channel in which HARQ ACK/NACK corresponding to enhanced PDCCH (EPDCCH) is transmitted, and a physical uplink shared channel (PUSCH) that is an uplink physical data channel. As an example, in the LTE system operating as the FDD, downlink data on the PDSCH transmitted from the (n−4)-th subframe or HARQ ACK/NACK corresponding to the PDCCH or EPDCCH including the SPS release may be transmitted on the PUCCH or PUSCH from the n-th subframe. Hereinafter, control information transmission on the PDCCH or PUCCH may be expressed as PDCCH transmission or PUCCH transmission, and data or control information transmission on the PDSCH or PUSCH may be expressed as PDSCH transmission or PUSCH transmission.

In the LTE system, the downlink HARQ adopts an asynchronous scheme in which a data retransmission time is not fixed. That is, if the base station receives a feedback of the HARQ NACK from the terminal with respect to initial transmission data transmitted by the base station, the base station freely determines the transmission time of the retransmission data through a scheduling operation. The terminal performs buffering with respect to data determined as an error as the result of decoding the reception data for the HARQ operation, and then performs combining with next retransmission data.

If the PDSCH including the downlink data transmitted from the base station is received in subframe n, the terminal transmits the uplink control information including HARQ ACK or NACK of the downlink data in subframe n+k to the base station through the PUCCH or PUSCH. In this case, "k" may be differently defined in accordance with the FDD or time division duplex (TDD) of the LTE system and the subframe configuration. As an example, in the case of an FDD LTE system, "k" is fixed to "4". On the other hand, in the case of a TDD LTE system, "k" may be changed in accordance with the subframe configuration and the subframe number. Further, during data transmission through a plurality of carriers, the "k" value may be differently applied in accordance with the TDD configuration of each carrier. In case of the TDD, the "k" value is determined in accordance with TDD UL/DL configuration as in Table 37 below.

TABLE 37

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, unlike the downlink HARQ, the uplink HARQ adopts a synchronous HARQ scheme in which the data transmission time is fixed. That is, the uplink/downlink timing relationship among a PUSCH, a preceding PDCCH, and a physical hybrid indicator channel (PHICH) that is a physical channel on which downlink HARQ ACK/NACK corresponding to the PUSCH is transmitted may be determined by the following rule.

If the terminal receives a PDCCH including uplink scheduling control information that is transmitted from the base station in subframe n or a PHICH on which the downlink HARQ ACK/NACK is transmitted, the terminal transmit uplink data corresponding to the control information through the PUSCH in subframe n+k. In this case, "k" may be differently defined in accordance with the FDD or TDD of the LTE system and the configuration thereof. As an example, in the case of the FDD LTE system, "k" may be fixed to "4". On the other hand, in the case of the TDD LTE system, "k" may be changed in accordance with the subframe configuration and the subframe number. Further, during data transmission through a plurality of carriers, the "k" value may be differently applied in accordance with the TDD configuration of each carrier. In case of the TDD, the "k" value is determined in accordance with the TDD UL/DL configuration as in Table 38 below.

TABLE 38

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Further, HARQ ACK/NACK information for the PUSCH transmitted by the terminal in subframe n is transmitted from the base station to the terminal through the PHICH in subframe n+k. In this case, the "k" may be differently defined in accordance with the FDD or TDD of the LTE system and the configuration thereof. As an example, in the case of the FDD LTE system, "k" may be fixed to "4". On the other hand, in the case of the TDD LTE system, "k" may be changed in accordance with the subframe configuration and the subframe number. Further, during data transmission through a plurality of carriers, the "k" value may be differently applied in accordance with the TDD configuration of each carrier. In case of the TDD, the "k" value is determined in accordance with the TDD UL/DL configuration as in Table 39 below.

TABLE 39

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | 4 | | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

As described above, the wireless communication system has been described based on the LTE system, and the contents of the present disclosure are not limited to the LTE system, but may be applied to various wireless communication system, such as NR and 5G systems. Further, in an embodiment, in the case of applying the present disclosure to a different wireless communication system, the "k" value may be changed and applied to even a system using a modulation scheme corresponding to the FDD.

Figure 29:
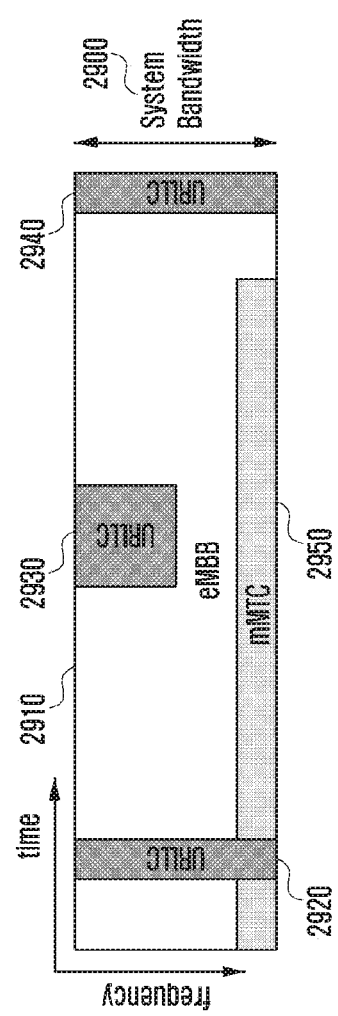
FIGS. 29 and 30 are diagrams illustrating an example in which data for eMBB, URLLC, and mMTC that are services considered in a 5G or NR system are allocated on frequency-time resources.
Figure 30:
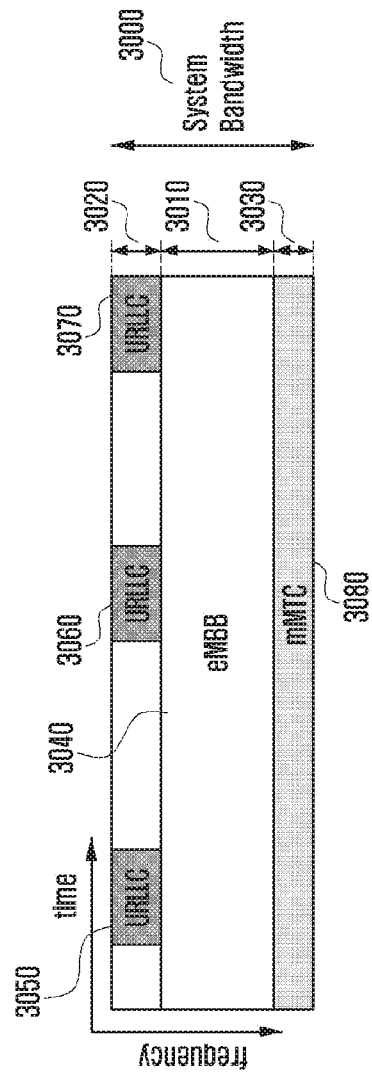

FIGS. 29 and 30 are diagrams illustrating an example in which data for eMBB, URLLC, and mMTC that are services considered in a 5G or NR system are allocated on frequency-time resources.

Referring to FIGS. 29 and 30, a scheme in which frequency and time resources are allocated for information transmission in respective systems will be described.

First, FIG. 29 illustrates an example in which data for eMBB, URLLC, and mMTC are allocated in the whole system frequency band 2900. If URLLC data 2920, 2930, and 2940 are to be generated and transmitted while eMBB 2910 and mMTC 2950 are allocated and transmitted in a specific frequency band, a transmitter can transmit the URLLC data 2920, 2930, and 2940 without emptying or transmitting a portion in which the eMBB 2910 and the mMTC 2950 have already been allocated. Since it is necessary to reduce a delay time with respect to the URLLC during the service, the URLLC data 2920, 2930, and 2940 may be allocated to a portion of an eMBB-allocated resource 2900 to be transmitted. Of course, if the URLLC is additionally allocated to the eMBB-allocated resource to be transmitted, eMBB data may not be transmitted in duplicate frequency-time resources, and thus transmission performance of the eMBB data may be lowered. That is, an eMBB data transmission failure due to the URLLC allocation may occur.

Referring to FIG. 30, in respective subbands 3010, 3020, and 3030 that are obtained through division of the whole system frequency band 3000, a transmitter can transmit services and data. Information related to subband configuration may be predetermined, and this information may be transmitted from the base station to the terminal through higher layer signaling. Further, the base station or a network node may provide services to the terminal without transmitting separate subband configuration information through optional division of the frequency band into subbands. FIG. 30 illustrates a case where the subband 3010 is used for eMBB data transmission, the subband 3020 is used for URLLC data transmission, and the subband 3030 is used for mMTC data transmission.

In the whole embodiments, the length of a transmission time interval (TTI) used for URLLC transmission may be shorter than the length of the TTI used for transmission of the eMBB or mMTC. Further, a response to the information related to the URLLC may be transmitted earlier than that of the eMBB or mMTC, and thus the URLLC-related information can be transmitted and received with low latency.

Figure 31:
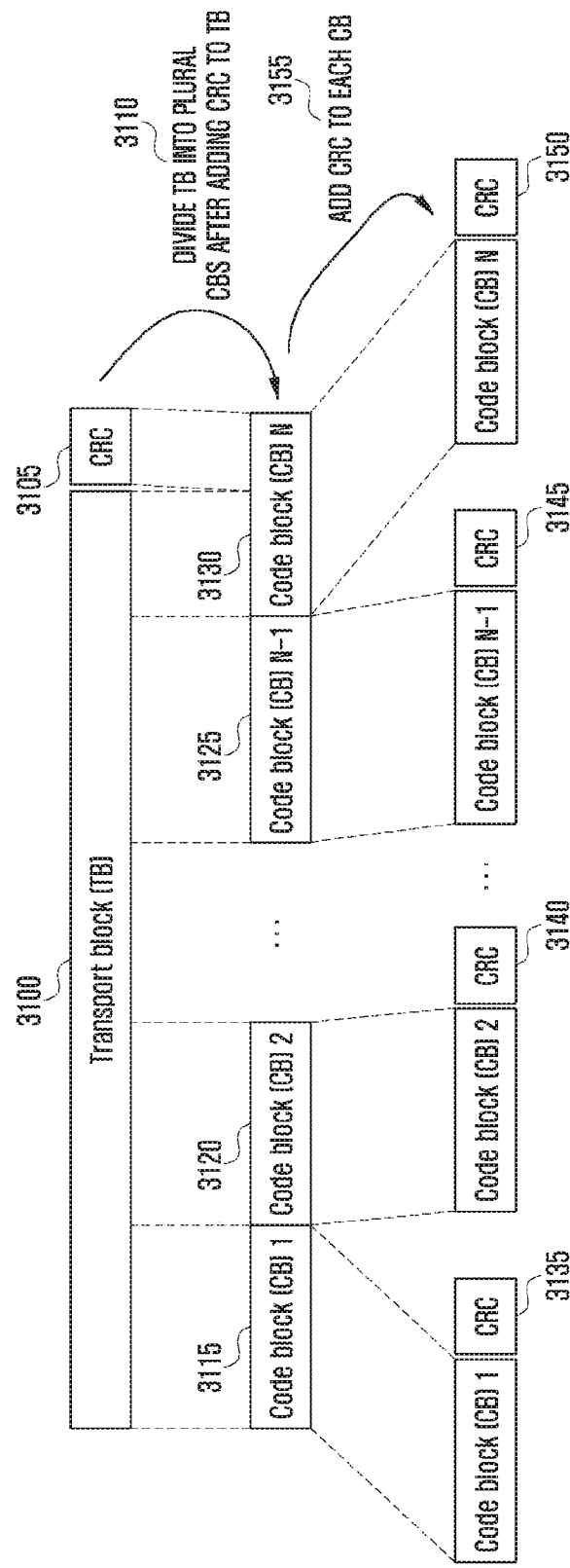
FIG. 31 is a diagram illustrating a process in which one transport block is divided into several code blocks and cyclic redundancy check bits are added thereto.

FIG. 31 is a diagram illustrating a process in which one transport block is divided into several code blocks (CBs) and cyclic redundancy check (CRC) bits are added thereto.

Referring to FIG. 31, a CRC 3105 may be added to the last or head portion of one TB 3100 to be transmitted in an uplink or a downlink. The CRC may have a pre-fixed number of bits, such as 16 bits or 24 bits, or a variable number of bits in accordance with the channel situation. The CRC may be used to determine whether channel coding has succeeded. Blocks 3100 and 3105 having a TB added with the CRC may be divided into several code blocks 3115, 3120, 3125, and 3130 (3110). The maximum size of the code block may be predetermined to be divided, and in this case, the last code block 3130 may be larger or smaller than other code blocks, or the transmitter may match the length of the code block so that the length of the code block becomes equal to the length of other code blocks through addition of "0", a random value, or "1". The CRCs 3135, 3140, 3145, and 3150 may be added to the divided code blocks (3155). The CRC may be composed of 16 bits, 24 bits, or a pre-fixed number of bits, and may be used to determine whether channel coding has succeeded. However, the CRC 3105 that is added to the TB and the CRCs 53135, 3140, 3145, and 3150 added to the code blocks may be omitted in accordance with the kind of channel codes to be applied to the code blocks. For example, if a low-density parity-check (LDPC) code, rather than a turbo code, is applied to the code blocks, the CRCs 3135, 3140, 3145, and 3150 may be added to the code blocks as they are even in case of applying the LDPC code. Further, even in case of using a polar code, the CRC may be added or omitted.

Figure 32:
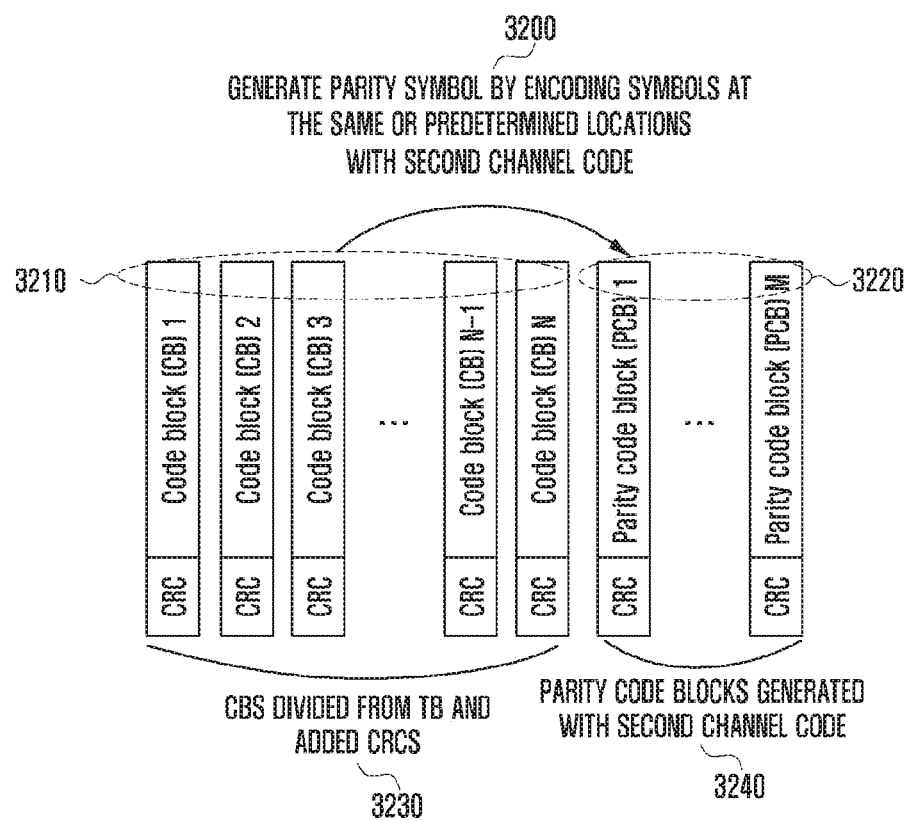
FIG. 32 is a diagram illustrating a signal transmission type used in an outer code.
Figure 33:
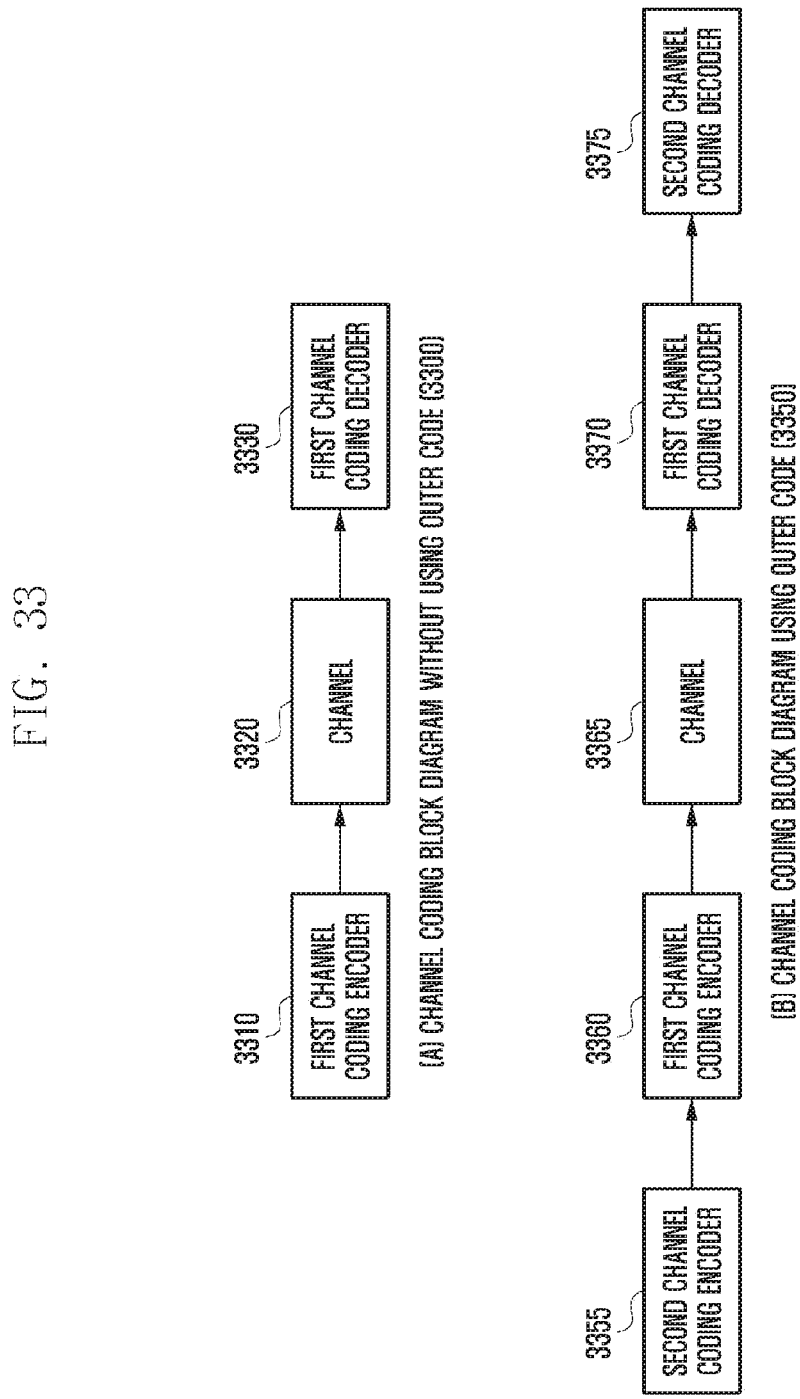
FIG. 33 is a block diagram illustrating the structure of a communication system in which the outer code is used.

FIG. 32 is a diagram illustrating a signal transmission type used in an outer code, and FIG. 33 is a block diagram illustrating the structure of a communication system in which the outer code is used.

Referring to FIGS. 32 and 33, a method for transmitting a signal using an outer code will be described.

FIG. 32 illustrates a case where one transport block is divided into several code blocks, and parity bits or symbols 3220 that are in the same locations in the respective code blocks are encoded with a second channel code to generate parity bits or symbols 3220 (3200). Thereafter, CRCs may be added to the code blocks and parity code blocks generated through encoding with the second channel code (3230 and 3240). Whether to add the CRCs may differ depending on the kind of the channel codes. For example, if a turbo code is used as a first channel code, the CRCs 3230 and 3240 are added, but thereafter, the respective code blocks and the parity code blocks may be encoded through first channel code encoding.

Referring to FIG. 33, if the outer code is used (3300), data to be transmitted passes through a second channel coding encoder 3355. A channel code used for the second channel coding may be, for example, a Reed-Solomon code, a Bose-Chaudhuri-Hocquenghem (BCH) code, a raptor code, or a parity bit generation code. Thereafter, bits or symbols having passed through the second channel coding encoder 3355 pass through a first channel coding encoder 3360. A channel code used for the first channel coding may be a convolutional code, an LDPC code, a turbo code, or a polar code. If the channel-coded symbols pass through a channel 3365 and are received in a receiver, the receiver side may successively operate a first channel coding decoder 3370 and a second channel coding decoder 3375 based on a received signal. The first channel coding decoder 3370 and the second channel coding decoder 3375 may perform operations corresponding to the first channel coding encoder 3370 and the second channel coding encoder 3375.

In contrast, if the outer code is not used (3350), only the first channel coding encoder 3310 and the first channel coding decoder 3330 are used in a transceiver, but the second channel coding encoder and the second channel coding decoder are not used. Even if the outer code is not used, the first channel coding encoder 3310 and the first channel coding decoder 3330 may be configured in the same manner as the case where the outer code is used.

Hereinafter, an eMBB service is called a first type service, and eMBB data is called first type data. The first type service or the first type data is not limited to the eMBB, but may correspond to even a case where high-speed data transmission is required or broadband transmission is performed. Further, an URLLC service is called a second type service, and URLLC data is called second type data. The second type service or the second type data is not limited to the URLLC, but may correspond even to another system requiring a low latency time, high-reliability transmission, or both the low latency time and the high-reliability transmission. Further, an mMTC service is called a third type service, and mMTC data is called third type data. The third type service or the third type data is not limited to the mMTC, but may correspond to a case where low speed or wide coverage, or low power consumption is required. Further, in explaining an embodiment, it may be understood that the first type service may include or may not include the third type service.

In order to transmit the three kinds of services or data as described above, physical layer channel structures that are used for respective types may differ from each other. For example, at least one of transmission time interval (TTI) length, frequency resource allocator, control channel structure, and data mapping methods may differ. Although three kinds of services and three kinds of data have been described, more kinds of services and the corresponding data may exist, and even in this case, the contents of the present disclosure could be applied.

The terms "physical channel" and "signal" in the LTE or LTE-A system in the related art may be used to explain a method and an apparatus proposed in an embodiment. However, the contents of the present disclosure may be applied to any wireless communication system that is not the LTE or LTE-A system.

As described above, an embodiment proposes a detailed method for defining transmission/reception operations of a terminal and a base station for transmission of first, second, and third type services or data, and operating terminals, in which different types of services or data are scheduled, together in the same system. In the present disclosure, first, second, and third type terminals indicate terminals in which first, second, and third type services or data are scheduled. In an embodiment, the first, second, and third type terminals may be the same terminals or different terminals.

In a following embodiment, at least one of HARQ ACK/NACK on the PHICH, an uplink scheduling grant signal, and a downlink data signal is called a first signal. Further, in the present disclosure, at least one of an uplink data signal for the uplink scheduling grant and an HARQ ACK/NACK for the downlink data signal is called a second signal. That is, among signals that a base station transmits to a terminal, a signal that expects a response from the terminal may be the first signal, and a response signal of the terminal that corresponds to the first signal may be the second signal. Further, in an embodiment, a service of the first signal may be at least one service of eMBB, URLLC, and mMTC, and the second signal may also correspond to at least one of the above-described services. For example, in LTE and LTE-A systems, DCI format 0 or 4 transmitted on PDCCH or ACK/NACK on PHICH may be the first signal, and the second signal corresponding to the first signal may be uplink data transmitted on PUSCH. Further, for example, in LTE and LTE-A system, downlink data transmitted on PDSCH may be the first signal, and PUCCH or PUSCH including HARQ ACK/NACK information for the downlink data may be the second signal. Accordingly, in the above-described case, the terminal receives the first signal, and the base station receives the second signal. Further, the downlink control signal may be the first signal, and the second signal may be the downlink data scheduled by the downlink control signal. In the above-described case, a portion explained in the present disclosure may be modified and applied to a case where both the first signal and the second signal are received by the terminal.

In a following embodiment, the TTI length of the first signal is a time value related to transmission of the first signal, and may indicate the length of time in which the first signal is transmitted. Further, in the present disclosure, the TTI length of the second signal is a time value related to transmission of the second signal, and may indicate the length of time in which the second signal is transmitted. Further, in the present disclosure, the second signal transmission timing is information on when the terminal transmits the second signal, and when the base station receives the second signal, and it may be the second signal transmission/reception timing.

Further, in an embodiment, if it is assumed that the terminal transmits the second signal at the (n+k)-th TTI when the base station transmits the first signal at the n-th TTI, a case where the base station notifies the terminal of the timing to transmit the second signal to the terminal may be the same as a case where the base station notifies the terminal of the "k" value. Further, if it is assumed that the terminal transmits the second signal at the (n+4+a)-th TTI when the base station transmits the first signal at the n-th TTI, a case where the base station notifies the terminal of the timing to transmit the second signal to the terminal may be the same as a case where the base station notifies the terminal of an offset value "a". The offset can be defined in various methods, such as n+3+a and n+5+a, instead of the n+4+a, and in the same manner, the offset value "a" may be defined in various methods even with respect to the n+4+a value mentioned in the present disclosure.

Although the contents of the present disclosure are described based on the FDD LTE system, they can be applied even to a TDD system and an NR system.

Hereinafter, in the present disclosure, higher layer signaling is a signal transfer method in which the base station transfers a signal to the terminal using a downlink data channel of a physical layer, or the terminal transfers a signal to the base station using an uplink data channel of a physical layer, and may be mentioned as RRC signaling, PDCP signaling, or a MAC control element (MAC CE).

In the present disclosure, although a method has been described, in which a terminal or a base station determines a method for determining the timing to transmit the second signal after receiving the first signal, various methods for transmitting the second signal become possible. As an example, although the timing, in which the terminal transmits to the base station HARQ ACK/NACK information corresponding to the downlink data after receiving the downlink data on the PDSCH, follows the method according to the present disclosure, the method for selecting a PUCCH format used to transmit ACK/NACK information, selecting a PUCCH resource, or mapping HARQ ACK/NACK information to the PUSCH may follow the method of the LTE system in the related art.

In the present disclosure, a normal mode is a mode in which the first and second signal transmission timing used in the LTE and LTE-A systems in the related art is used, and in the normal mode, a signal processing time of about 3 ms including a timing advance (TA) can be secured. For example, in a FDD LTE system operating in a normal mode, transmission of the second signal with respect to the first signal received by the terminal in subframe n is performed by the terminal in subframe n+4.

On the other hand, in the present disclosure, a latency reduction mode is a mode in which transmission timing of the second signal with respect to the first signal is made to be earlier than or to be equal to that in a normal mode, and in this mode, the latency can be reduced. In the latency reduction mode, transmission/reception timing can be controlled in various methods.

In the present disclosure, although description will be made based on a case where lengths of transmission time intervals used in the normal mode and the latency reduction mode are equal to each other, the contents of the present disclosure can be applied even to a case where the length of the TTI in the normal mode is different from the length of the TTI in the latency reduction mode.

One of important bases of performance of a cellular wireless communication system is packet data latency. For this, in the LTE system, signal transmission/reception is performed in the unit of a subframe having the TTI of 1 ms. The LTE system operating as described above can support a terminal having the transmission time interval shorter than 1 ms (shortened-TTI, shorter-TTI UE, hereinafter, shortened-TTI terminal). It is expected that the shortened-TTI terminal is suitable to a voice over LTE (VoLTE) service in which latency is important and a service such as remote control. Further, the shortened-TTI terminal is expected as means capable of realizing the mission-critical Internet of things (IoT) based on a cellular communication system.

In the current LTE and LTE-A systems, the base station and the terminal are designed to perform transmission and reception in the unit of a subframe having the TTI of 1 ms. In order to support the shortened-TTI terminal operating at the TTI shorter than 1 ms in an environment where the base station and the terminal operating at the TTI of 1 ms exist, it is necessary to define transmission/reception operations discriminated from those of a general LTE and LTE-A terminal. Accordingly, the present disclosure can be applied to a detailed method for operating both a general LTE and LTE-A terminal and a shortened-TTI terminal in the same system.

In the present disclosure, the latency reduction mode may correspond to an operation of performing data transmission and reception using the shortened-TTI. Further, in the present disclosure, shortened-TTI, shorter-TTI, shortened TTI, shorter TTI, short TTI, sTTI, mini-slot, and sub-slot have the same meaning, and may be mixedly used. In the present disclosure, the shortened TTI or mini-slot may be a unit that is transmitted with OFDM symbols the number of which is smaller than 14 or 7. Further, in the present disclosure, normal-TTI, normal TTI, subframe TTI, legacy TTI, and slot TTI have the same meaning, and may be mixedly used. In the present disclosure, a channel for a downlink control signal for shortened TTI may be called sPDCCH, and may be mixedly used with the PDCCH for shortened TTI. In the present disclosure, a channel for downlink data for shortened-TTI may be called sPDSCH, and may be mixedly used with the PDSCH for shortened-TTI. Further, in the present disclosure, a channel for uplink data for shortened-TTI may be called sPUSCH, and may be mixedly used with the PUSCH for shortened-TTI. Further, in the present disclosure, a channel for an uplink control signal for shortened-TTI may be called sPUCCH, and may be mixedly used with the PUCCH for shortened-TTI.

In the present disclosure, although a transmission/reception method for the system using the shortened-TTI has been described, it will be apparent to a person having a typical wireless communication knowledge that the present disclosure can be applied to a transmission/reception method for the purpose of latency reduction to transmit the uplink or downlink HARQ feedback in a shorter time than the time of the LTE system in the related art based on the TTI length of 1 ms.

Although the present disclosure has been described mainly based on a case where the base station configures a latency reduction mode to the terminal, it will be possible to apply the present disclosure even if there is not latency reduction mode configuration.

(3-1)-th Embodiment

Figure 34:
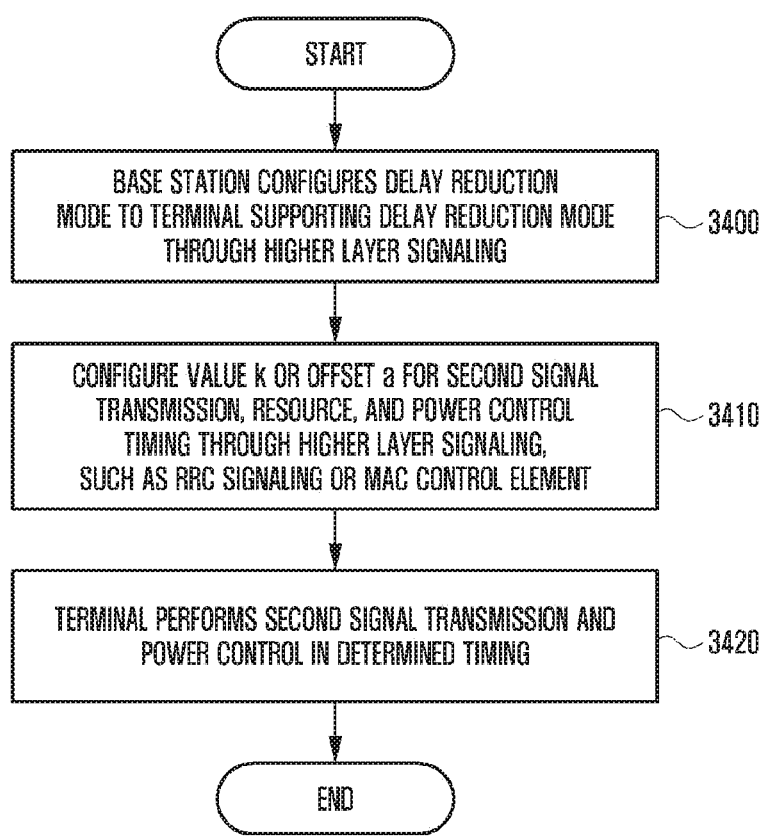
FIG. 34 is a diagram illustrating the (3-1)-th embodiment.

The (3-1)-th embodiment corresponds to a method in which the base station notifies the terminal that the base station operates in a latency reduction mode through higher layer signaling, and accordingly the terminal determines the second signal transmission, resources, and power control timing in accordance with configuration of higher layer signaling. FIG. 34 illustrates the (3-1)-th embodiment.

The base station configures a latency reduction mode to the terminal through higher layer signaling (3400). The higher layer signaling may be RRC signaling or MAC control element. The base station transfers transmission timing information of the second signal following the first signal to the terminal through the higher layer signaling (3410). Thereafter, the terminal transmits the second signal in the determined timing in accordance with the transmission timing information, and in the second signal transmission timing of the terminal, the base station receives the second signal and performs decoding (3420).

As already described above, if it is assumed that the terminal transmits the second signal at the (n+k)-th TTI when the base station transmits the first signal at the n-th TTI, a case where the base station notifies the terminal of the timing to transmit the second signal to the terminal may be the same as a case where the base station notifies the "k" value. Further, if it is assumed that the terminal transmits the second signal at the (n+4+a)-th TTI when the base station transmits the first signal at the n-th TTI, a case where the base station notifies the terminal of the timing to transmit the second signal to the terminal may be the same as a case where the base station notifies an offset value "a". The offset can be defined in various methods, such as n+3+a and n+5+a, instead of n+4+a as described above.

Specifically, the terminal receives the "k" value or the offset value "a" for the second signal transmission timing from the base station through the higher layer signaling (3410), and thereafter, if the terminal receives the first signal at the n-th TTI, it transmits the second signal corresponding to this to the base station at the (n+k)-th TTI or (n+4+a)-th TTI in accordance with the transmission timing information (3420).

Further, when determining the "k" value or the offset value "a" for the second signal transmission timing, the base station may determine the "k" value or the "a" value with reference to terminal capability that the terminal reports to the base station.

The "k" value or the offset "a" notified through the upper signaling may not be one specific value, but may be a set composed of several values. The terminal may use one value of the set of "k" values or offsets a transferred through the higher layer signaling in determining the second signal transmission timing. The one value of the set may be selected in accordance with a specific bit of DCI transmitted together when the first signal is transferred from the base station, or may be optionally selected by the terminal.

Further, in case of the TDD system, information being notified through the higher layer signaling may be a set of "k" values or offsets "a" determined based on specific TDD UL/DL configuration and TTI index value.

For example, if the higher layer signaling for configuration of the latency reduction mode and parameter transfer is transferred as MAC control element, the base station and the terminal can clearly know when the higher layer signaling is applied, and if the base station configures the latency reduction mode configuration as the MAC control element to the terminal in subframe n, for example, it may be possible to apply the latency reduction mode from subframe n+6.

Although the operations of the terminal and the base station have been described based on the latency reduction mode, it may be possible to apply them even if the current mode is not the latency reduction mode. For example, it may be possible to apply them in case of transferring to the terminal the second signal transmission timing with respect to the first signal in the 5G communication system.

(3-2)-th Embodiment

Figure 35:
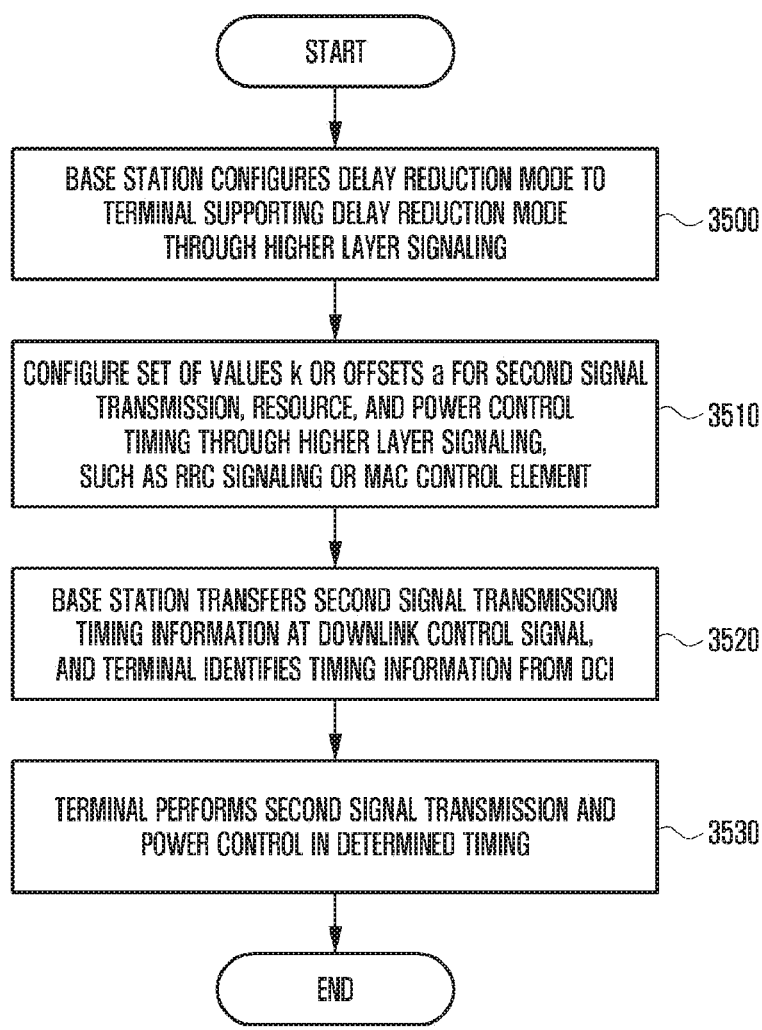
FIG. 35 is a diagram illustrating the (3-2)-th embodiment.

The (3-2)-th embodiment provides a method in which the base station determines the timing for the terminal to transmit the second signal through DCI and the timing to start power control for the terminal, and FIG. 35 illustrates the (3-2)-th embodiment.

The base station configures a latency reduction mode to the terminal through higher layer signaling (3500). The base station determines the timing in which the terminal transmits the second signal, and transfers the timing to the terminal using specific x bits in transmitted DCI when the terminal transmits the first signal (3510). The bit number x may be determined as 1, 2, or 3. The size of x bits and the transmission timing indicated by the information may be pre-allocated through the higher layer signaling configuration. That is, the base station may transfer the "k" value indicated by HARQ timing bits 00, 01, 10, and 11 in Table 40 below or an offset value "a" to the terminal through the higher layer signaling. In the determined second signal transmission timing, the base station receives and decodes the second signal.

After decoding the downlink control signal, the terminal identifies the specific x bits in the DCI, and identifies the "k" value or the offset value "a" for the second signal transmission timing from the specific x bit value (3520). Thereafter, if the first signal is received at the n-th TTI, the terminal transmits the second signal corresponding to the first signal to the base station at the (n+k)-th TTI or (n+4+a)-th TTI (3530).

As an example, if x is 2, that is, if 2 bits of the DCI is information for the second signal transmission timing, the base station may notify of the "k" value for the second signal transmission timing as follows.

TABLE 40

| HARQ timing bits | k |
|---|---|
| 00 | 4 |
| 01 | 5 |
| 10 | 6 |
| 11 | 7 |

Further, the base station may notify of an offset value a for the second signal transmission timing as in Table 41 below.

TABLE 41

| HARQ timing bits | a |
|---|---|
| 00 | −1 |
| 01 | 0 |
| 10 | 1 |
| 11 | 2 |

Such values in Table 40 and Table 41 are merely exemplary, and may be changed to be applied.

Further, in case of determining the "k" value or the offset value "a" for the second signal transmission timing, the base station may determine the value with reference to terminal capability that the terminal reports to the base station.

(3-2-1)-th Embodiment

Figure 36:
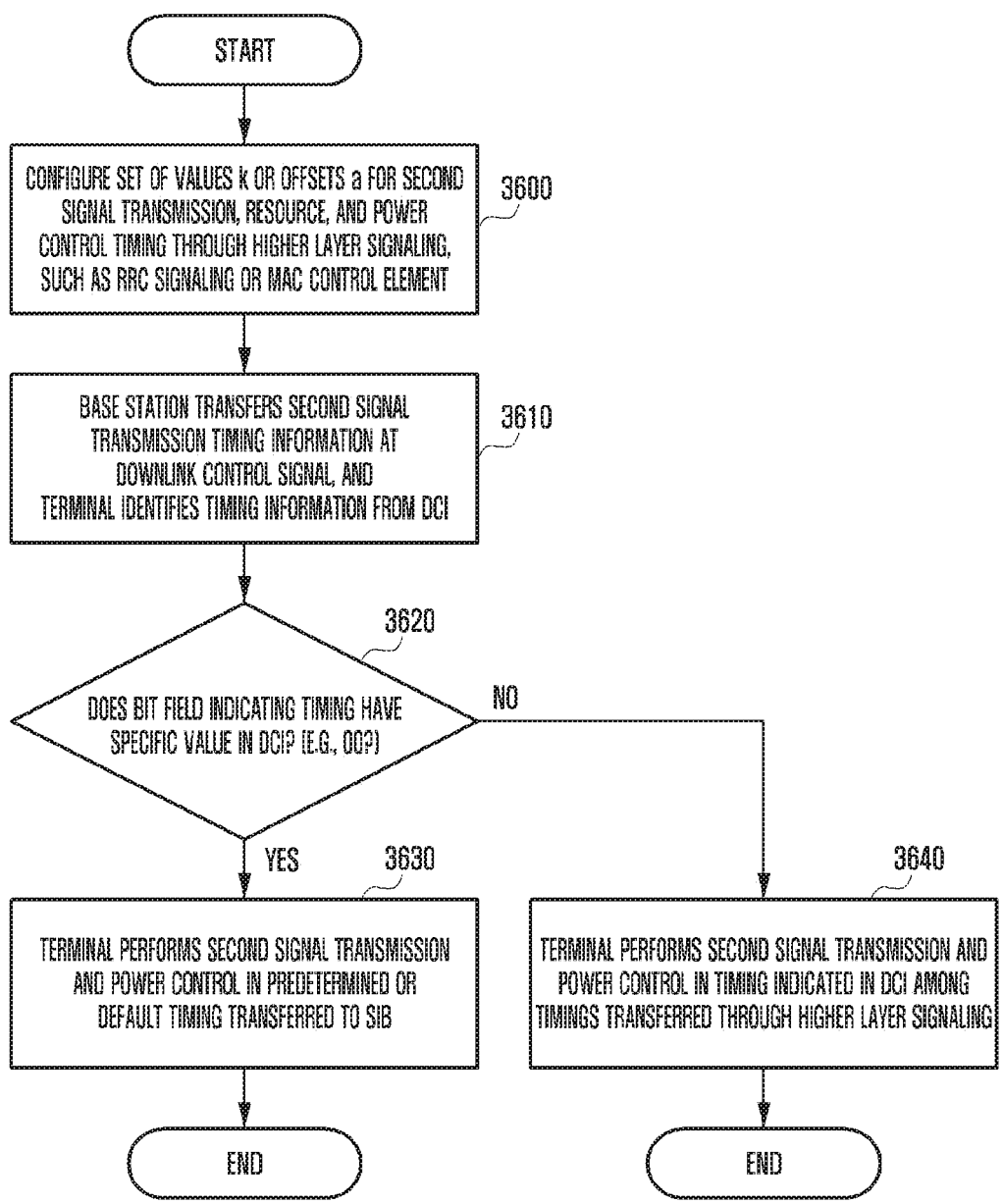
FIG. 36 is a diagram illustrating the (3-2-1)-th embodiment.

The (3-2-1)-th embodiment provides a method in which if the base station indicates to the terminal the timing in which the second signal is transmitted from the terminal through the DCI or the timing in which power control starts in the (3-2)-th embodiment, one of HARQ timing values transferred through the higher layer signaling always uses a fixed value. FIG. 36 is a diagram illustrating the (3-2-1)-th embodiment. The fixed value may be default timing.

The base station transfers to the terminal a set of values that may be the "k" value or offset value "a" for the second signal transmission through the higher layer signaling (3600). The base station determines the timing in which the terminal transmits the second signal, and transmits the timing to the terminal using specific x bits in transmitted DCI when the terminal transmits the first signal, and the terminal identifies a bit field of the timing information from the detected DCI (3610). The bit number x may be determined as 1, 2, or 3.

The size of x bits and the transmission timing indicated by the information may be pre-allocated through the higher layer signaling. That is, the base station may transfer the "k" value indicated by HARQ timing bits 01, 10, and 11 in the table below or an offset value "a" to the terminal through the higher layer signaling. However, a specific value of the HARQ timing bit is not transferred from the higher layer signaling, but may be predetermined between the base station and the terminal or may be transferred from the system information block (SIB). For example, if the timing bit is 00, the "k" value or the offset value "a" may be the timing transferred from the SIB. The timing transferred from the SIB may be called default timing. In contrast, if the HARQ timing bits are not 00, but are 01, 10, or 11, one of the values transferred from the higher layer signaling may be used.

After decoding the downlink control signal, the terminal identifies the specific x bits in the DCI, and determines whether the specific x bit value is a specific value (3620). The specific value may be, for example, 00. If the x bit value is 00, the terminal transmits the second signal to the base station in accordance with the predetermined or SIB-configured default timing (3630). That is, if the first signal is received at the n-th TTI, the terminal transmits the second signal corresponding to the first signal to the base station at the (n+k)-th TTI or (n+f+a)-th TTI, and the term "k" or "a" may be predetermined or may be an SIB-configured value. The term "f" may be a reference value for the offset, and may be a predetermined fixed value between the base station and the terminal, or may be transmitted from the base station to the terminal on the SIB.

If the x bit value is not 00, the terminal identifies the "k" value or the offset value "a" for the second signal transmission timing from the x bits. Thereafter, if the first signal is received at the n-th TTI, the terminal transmits the second signal corresponding to the first signal to the base station at the (n+k)-th TTI or (n+f+a)-th TTI (3640). The term "f" may be a reference value for the offset, and may be a predetermined value through the higher layer signaling or between the base station and the terminal, or may be transmitted from the base station to the terminal on the SIB.

As an example, if x is 2, that is, if 2 bits of the DCI is information for the second signal transmission timing, the base station may notify the "k" value for the second signal transmission timing as in Table 42 below.

TABLE 42

| HARQ timing bits | k |
|---|---|
| 00 | Fixed (0‖: fixed in specification or SIB) |
| 01 | 6 |
| 10 | 7 |
| 11 | 8 |

TABLE 43

| HARQ timing bits | a |
|---|---|
| 00 | 0 |
| 01 | 4 |
| 10 | 5 |
| 11 | 6 |

The offset may be used to find the second signal transmission timing in addition to the default timing known to the terminal on the SIB.

Further, in determining the "k" value or the offset value "a" for the second signal transmission timing, the base station may determine the value with reference to the terminal capability that the terminal reports to the base station.

(3-2-2)-th Embodiment

Figure 37:
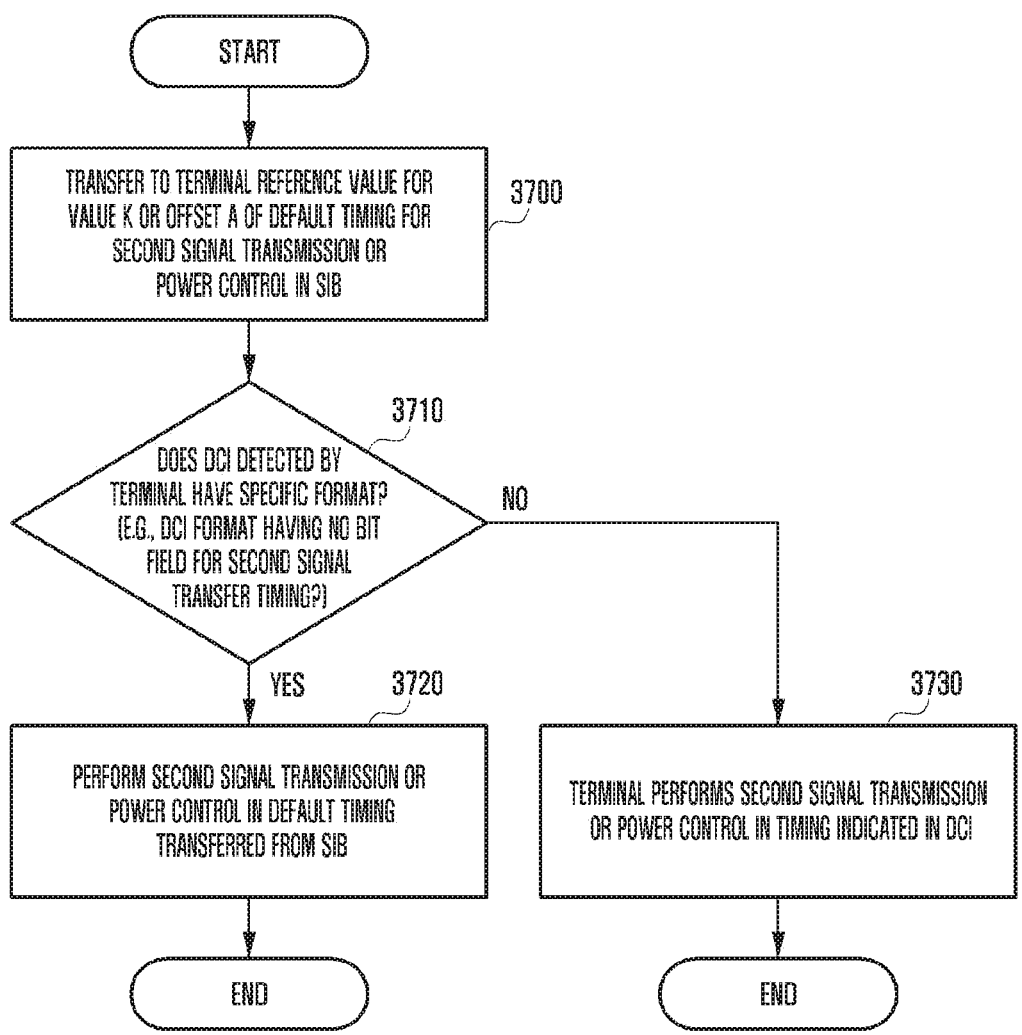
FIG. 37 is a diagram illustrating the (3-2-2)-th embodiment.

The (3-2-2)-th embodiment provides a method in which if the detected DCI is of a specific format or a bit field related to the second signal transmission timing does not exist in the DCI when the base station indicates to the terminal the timing in which the second signal is transmitted from the terminal through the DCI or the timing in which power control starts in the (3-2)-th embodiment, an always fixed value is used for the second signal transmission timing. FIG. 37 is a diagram illustrating the (3-2-2)-th embodiment. The fixed value may be default timing.

The base station transmits to the terminal the reference timing (i.e., it may mean "f") for using the "k" value or the offset value "a" of the default timing for the second signal transmission on the SIB, and transmits to the terminal a set of values that may be the "k" value or the offset value "a" for the second signal transmission through the higher layer signaling (3700). The base station determines the timing in which the terminal transmits the second signal, and transmits the timing to the terminal using specific x bits in the DCI transmitted when the first signal is transmitted to the terminal if the timing is not the default timing. If the timing is the default timing, the base station transmits the DCI that does not include the timing bit field (this may be understood to use a specific DCI format that does not include the timing bit field). Further, if the default timing is one of timing values that the base station transfers to the terminal through the configured higher layer signaling, the base station may transmit the DCI including the timing bit field (indicating the default timing).

The terminal attempts DCI detection, and identifies whether the timing bit field exists in the detected DCI (3710). If the timing bit field exists in the DCI, the terminal identifies specific x bits in the DCI after decoding the downlink control signal, and identifies the "k" value or the offset value "a" for the second signal transmission timing from the specific x bit value. Thereafter, if the first signal is received at the n-th TTI, the terminal transmits the second signal corresponding to the first signal to the base station at the (n+k)-th TTI or (n+f+a)-th TTI in accordance with the "k" value or the offset value "a" (3730). The term "f" may be a reference value for the offset, and may be transmitted to the terminal through the higher layer signaling or the SIB.

On the other hand, if the terminal attempts the DCI detection, and if the timing bit field does not exist in the detected DCI, the terminal transmits the second signal in the default timing transferred on the SIB (3720). That is, the terminal may transmit the second signal in accordance with the "k" or "a" value indicated by the SIB.

(3-2-3)-th Embodiment

Figure 38:
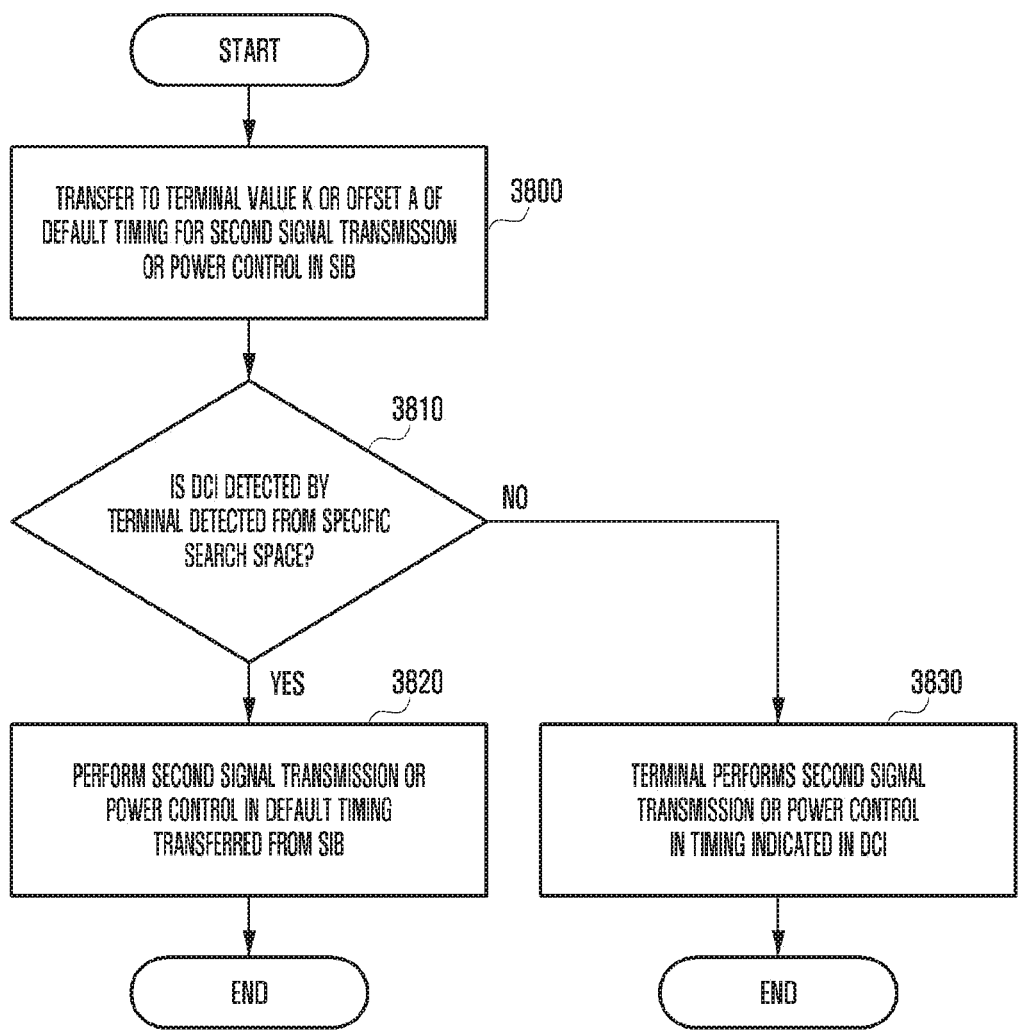
FIG. 38 is a diagram illustrating the (3-2-3)-th embodiment.

The (3-2-3)-th embodiment provides a method in which if DCI is detected in a specific search space when the base station indicates to the terminal the timing in which the second signal is transmitted from the terminal through the DCI or the timing in which power control starts in the (3-2)-th embodiment, an always fixed value is used for the second signal transmission timing. FIG. 38 is a diagram illustrating the (3-2-3)-th embodiment. The fixed value may be default timing.

The base station transmits to the terminal the default timing to use the "k" value or the offset value "a" of the default timing for the second signal transmission using the SIB, and transmits to the terminal a set of values that may be the "k" value or the offset value "a" for the second signal transmission through the higher layer signaling (3800). The base station pre-engages with the terminal to map the first signal for the second signal to be transmitted in the default timing to a specific search space. The base station determines the timing in which the terminal transmits the second signal, and if the timing is not the default timing, it transfers the timing to the terminal using specific x bits in the DCI transmitted when the first signal is transmitted to the terminal. If the timing is not the default timing, the base station maps the DCI to another search space that is not the specific search space for the default timing, whereas if the timing is the default timing, the base station maps the DCI to the specific search space for the default timing.

The terminal attempts DCI detection, and identifies whether the DCI is detected in the specific search space for the default timing (3810). If the DCI is detected from another search space that is not the specific search space for the default timing, the terminal identifies specific x bits in the DCI after decoding the downlink control signal, and identifies the "k" value or the offset value "a" for the second signal transmission timing from the specific x bit value. Thereafter, if the first signal is received at the n-th TTI, the terminal transmits the second signal corresponding to the first signal to the base station at the (n+k)-th TTI or (n+f+a)-th TTI (3830). The term "f" may be a reference value for the offset, and may be transmitted to the terminal through the higher layer signaling or the SIB.

On the other hand, if the terminal attempts the DCI detection, and if the DCI is detected in the specific search space for the default timing, the terminal transmits the second signal in the default timing transferred on the SIB (3820). That is, the terminal may transmit the second signal in accordance with the "k" or "a" value indicated by the SIB.

(3-3)-th Embodiment

Figure 39:
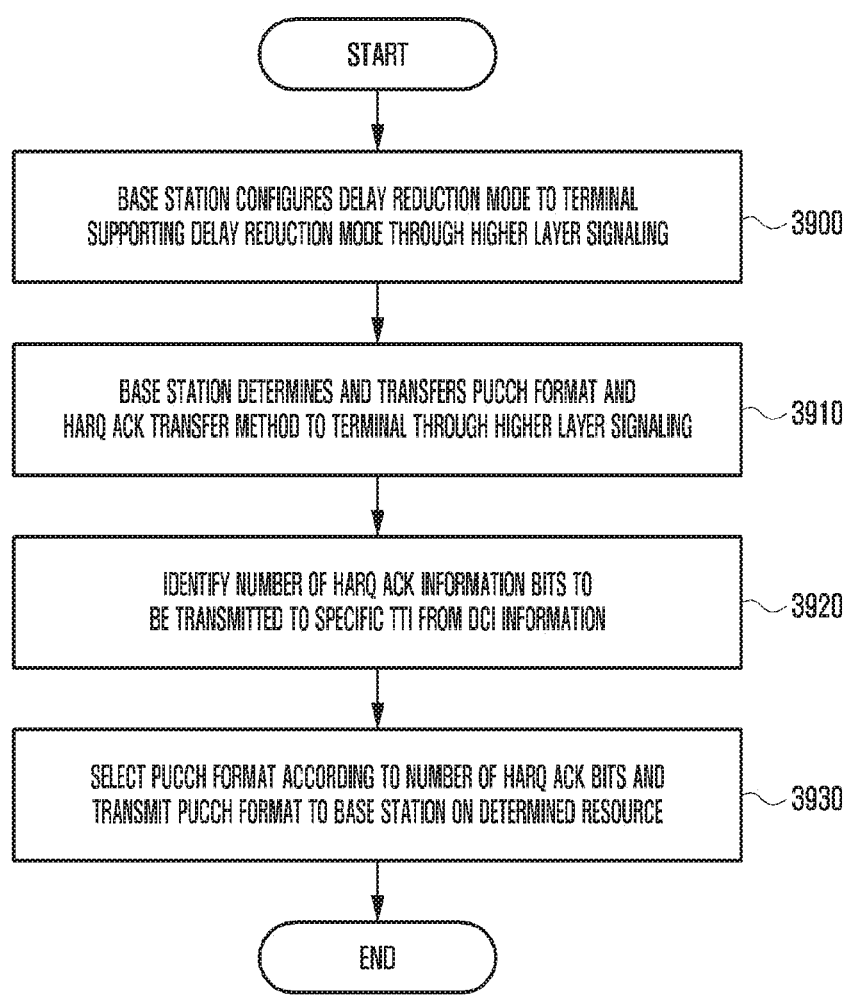
FIG. 39 is a diagram illustrating the (3-3)-th embodiment.

The (3-3)-th embodiment provides a method in which the terminal transmits HARQ ACK/NACK information for downlink data transmitted at several TTIs in accordance with the HARQ timing change to an uplink at one TTI. FIG. 39 illustrates the (3-3)-th embodiment.

As in the (3-1)-th embodiment and the (3-2)-th embodiment, if downlink data is transferred to the terminal in which a latency reduction mode is configured (3900), and there exist one or plural pieces of downlink data corresponding to the HARQ ACK/NACK that the terminal should transmit to the base station at specific TTI n, it is necessary to provide a method for transmitting different uplink control signals. As an example, if the latency reduction mode is used in an LTE system, and there is one PDSCH corresponding to the HARQ ACK/NACK to be transmitted in subframe n, PUCCH format 1a or format 1b may be used, and if there are two or more PDSCHs, HARQ-ACK bundling or HARW-ACK multiplexing may be used depending on the configuration. The HARQ-ACK bundling, multiplexing configuration, and PUCCH format to be used may be configured from the base station to the terminal through higher layer signaling (3910).

If the HARQ-ACK bundling is configured in case where the terminal transmits HARQ ACK/NACK corresponding to two or more PDSCHs, the terminal generates ACK if ACK/NACK information corresponding to respective code words on two PDSCHs are all ACK, whereas the terminal generates NACK and generates maximally two pieces of HARQ ACK/NACK information otherwise (i.e., only one ACK or all NACK). The generated HARQ ACK/NACK information may be transmitted using PUCCH format 1a or 1b. For example, if PDSCHs transmitted from two or more subframes include only one code word, the HARQ ACK/NACK information generated by the terminal through the HARQ-ACK bundling is of one bit, and this is transmitted to the PUCCH format 1a. Further, if any one of PDSCHs transmitted at two or more TTIs includes two code words, the HARQ ACK/NACK information generated by the terminal through the HARQ-ACK bundling is of two bits, and this is transmitted to the PUCCH format 1b.

If the HARQ-ACK multiplexing is configured in case where the terminal transmits HARQ ACK/NACK corresponding to two or more PDSCHs, the terminal generates ACK information only in case of ACK with respect to all code words of the respective PDSCHs, and generates NACK otherwise. For example, in case of the PDSCHs transmitted at maximally M TTIs, the terminal generates M-bit HARQ ACK/NACK information. The generated M-bit HARQ ACK/NACK information may be transferred to the base station using PUCCH format 1b with channel selection or PUCCH format 3. According to the PUCCH format 1b with channel selection, PUCCH transmission resource $n_{PUCCH,i}^{(1)}$ and 2 bits b(0) and b(1) used for the PUCCH format 1b may be determined in a method as presented in Table 44 to Table 49 below. The term "i" may be an integer that is 1, 2, or 3. The number of HARQ ACK information bits to be transmitted by the terminal may be transferred through the DCI (e.g., DAI value on the DCI) in the method as described above in the (3-4)-th embodiment (3920).

Table 44 and Table 49 are tables for channel selection of PUCCH format 1b in case of M=2, Table 45 and Table 48 are tables for channel selection of PUCCH format 1b in case of M=3, and Table 46 and Table 49 are tables for channel selection of PUCCH format 1b in case of M=4.

TABLE 44

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | No transmission | |

TABLE 45

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | No transmission | |

TABLE 46

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | No transmission | |

TABLE 47

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

TABLE 48

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

TABLE 49

| HARQ-ACK(0), HARQ-ACK(1), HARQ-ACK(2), HARQ-ACK(3) | $n_{PUCCH}^{(1)}$ | B(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |

TABLE 49-continued

| HARQ-ACK(0), HARQ-ACK(1), HARQ-ACK(2), HARQ-ACK(3) | $n_{PUCCH}^{(1)}$ | B(0)b(1) |
|---|---|---|
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

There are various methods for determining the PUCCH transmission resource $N_{PUCCH,i}^{(1)}$. For example, if the PUCCH to be transmitted at TTI n should include HARQ-ACK of PDSCH transmitted at (n−1)-th, (n−2)-th, (n−3)-th, and (n−4)-th TTIs, it is considered that M=4, and $k_1=4$, $k_2=3$, $k_3=2$, and $k_4=1$. CCE, is the number of first CCE to which a control channel for scheduling the PDSCH transmitted at TTI n-$k_i$ is mapped. If it is considered that $N_c$=max $\{0, \lfloor [N_{RB}^{DL} \cdot (N_{sc}^{RB} \cdot c - 4)]/36 \rfloor\}$, "c" is the number that satisfies the condition $N_c \leq n_{CCE,i} < N_{c+1}$ among 0, 1, 2, and 3. In this case, the PUCCH transmission resource $N_{PUCCH,i}^{(1)}$ may be determined as in mathematical expression 4 below.

$$n_{PUCCH,i}^{(1)} = (M-i-1) \cdot N_c + i \cdot N_{c+1} + n_{CCE,i} + N_{PUCCH}^{(1)} \quad \text{[Mathematical expression 4]}$$

As described above, $N_{PUCCH}^{(1)}$ may be configured to the terminal through the higher layer signaling.

In the above-described embodiment, a method for selecting PUCCH format 1a or 1b or channel 1b is proposed in order to transmit HARQ ACK/NACK information on downlink data transmitted at several TTIs to the base station through an uplink at one TTI.

Hereinafter, a method using PUCCH format 3, 4, or 5 will be described. In case of transmitting PUCCH or PUSCH, the terminal determines the number of pieces of HARQ ACK/NACK information to be transmitted. The determination may be determined with reference to a downlink assignment index (DAI) value included in control information to be transferred during previous downlink data transmission or PUSCH scheduling. In case of configuring the HARQ ACK/NACK information from the HARQ ACK/NACK information of the first transmitted PDSCH to the HARQ ACK/NACK information of the lately transmitted PDSCH, the terminal may determine the number of HARQ ACK/NACK bits from the DAI value. The terminal may transmit the HARQ ACK/NACK information to the base station using PUCCH format 3, 4, or 5. The terminal for which the latency reduction mode is configured to use the PUCCH format 3, 4, or 5 may be configured through the higher layer signaling (3910). The PUCCH format 3, 4, or 5 may be defined from the LTE-A or LTE-A Pro in the related art. As described above, in case of configuring the HARQ ACK/NACK information from the HARQ ACK/NACK information of the first transmitted PDSCH to the HARQ ACK/NACK information of the lately transmitted PDSCH, if HARQ-ACK bundling is configured, the terminal can configure ACK only in case where the code words on the PDSCH transmitted at a time are all ACK.

(3-4)-th Embodiment

The (3-4)-th embodiment provides a DAI value configuration method in which the amount of HARQ ACK/NACK information that is transmitted by the terminal for which the latency reduction mode is configured can be known by the base station and the terminal as the same value.

In case of transmitting uplink scheduling control information, such as DCI format 0 or 4 to the terminal for uplink scheduling, the base station includes the amount of HARQ ACK/NACK information to be simultaneously transmitted by the terminal in the control information to be transmitted to the terminal as value $V_{DAI}^{UL}$ when the uplink transmission is performed.

Further, in case of transmitting the control information (i.e., downlink scheduling control information (DCI)) for downlink data transmission to the terminal, the base station includes $V_{DAI,c}^{UL}$ value in the control information to be transmitted to the terminal in order to indicate which HARQ ACK/NACK to be transmitted by the terminal in a serving cell c the downlink transmission corresponds to. As an example, if a PDSCH, on which the terminal should transmit the corresponding HARQ ACK/NACK to the base station at TTI n, is first transmitted, it is possible for a control signal for scheduling the PDSCH to include $V_{DAI,c}^{UL}$ value corresponding to "1", and if a PDSCH, on which the corresponding HARQ ACK/NACK should be transmitted at TTI n, corresponds to the second PDSCH, it is possible for the control signal for scheduling the second PDSCH to include $V_{DAI,c}^{UL}$ value corresponding to "2".

The number of downlink data transmissions indicated by the value $V_{DAI}^{UL}$ and the $V_{DAI,c}^{UL}$ value may be predetermined. However, even with respect to the $V_{DAI}^{UL}$ value and the $V_{DAI,c}^{UL}$ value of 2 bits or more, a predetermined value may be changed through easy modification, and it may be possible to use 3 or 4 bits rather than 2 bits on the DCI for the DAI information.

(3-5)-th Embodiment

Figure 40:
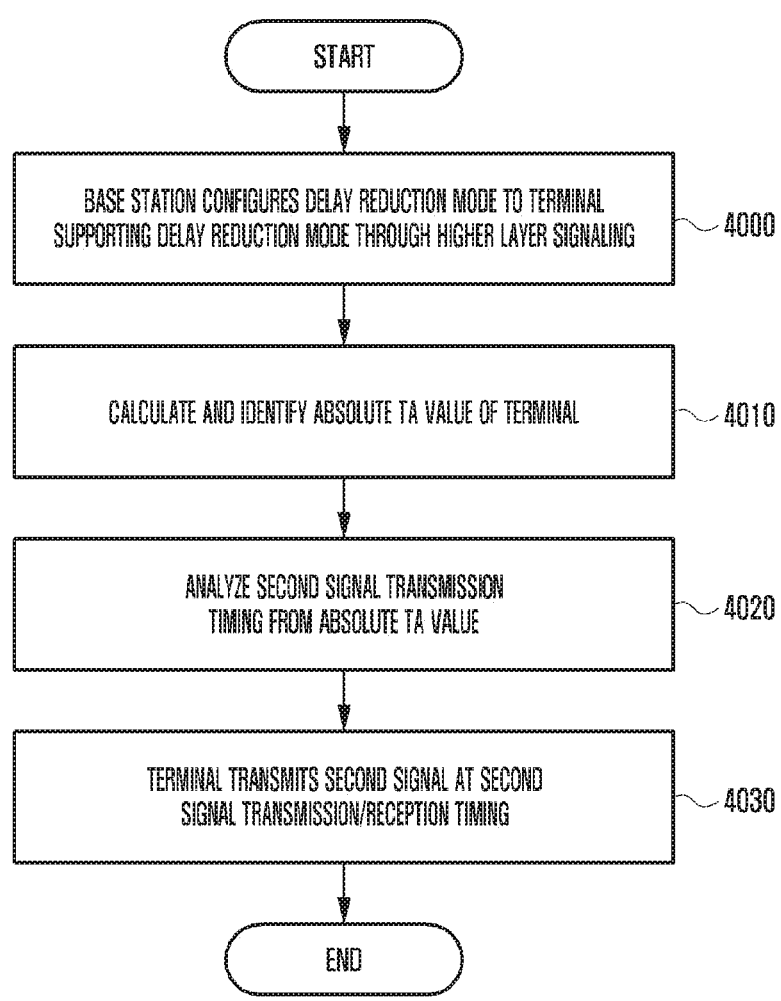
FIG. 40 is a diagram illustrating the (3-5)-th embodiment.

The (3-5)-th embodiment provides a method for determining the timing in which the second signal is transmitted from the terminal to the base station using an absolute value of TA of the terminal for which a latency reduction mode is configured. FIG. 40 is a diagram illustrating the (3-5)-th embodiment.

The base station configures the latency reduction mode to the terminal through higher layer signaling (4000), and calculates an absolute value of TA of the corresponding terminal (4010). When the terminal performs an initial access, the base station may calculate an absolute value of TA by reflecting (through addition or subtraction) the variation of the TA value transferred through upper signaling thereafter based on the TA value first transferred to the terminal in a random access process. Even the terminal calculates an absolute value of the TA in the same manner as the method of the base station, or may calculate the absolute value of TA by subtracting a start time of the n-th TTI (i.e., downlink) corresponding to the signal received by the terminal from the start time of the n-th TTI (i.e., uplink) corresponding to the signal transmitted by the terminal. Hereinafter, the TA absolute value may be called an NTA.

As described above, the base station and the terminal can be aware of the NTA, and can connect the NTA to the second signal transmission timing using arbitrary mapping. Using the mapping relationship, the base station and the terminal can be aware of the second signal transmission timing using the NTA (4020), and in the second signal transmission timing, the terminal can transmit the second signal, and the base station can receive and decode the second signal transmitted by the terminal (4030). As an example, in a method as indicated in Table 50 below, the second signal transmission timing k can be determined based on the NTA.

TABLE 50

| $N_{TA}$ | k |
|---|---|
| $N_{TA}$ > threshold | x |
| $N_{TA}$ ≤ threshold | y |

In Table 50, the equality sign of the inequality sign may be excluded or added, and x and y that are k values according to the NTA can be configured by the base station to the terminal during configuration of the latency reduction mode, or x is fixed to 4 and y is fixed to 2 or 3, or they may differ depending on the configuration. The table 50 is merely exemplary, and the k value according to the NTA value may be determined in various methods. Further, the offset value a may be determined based on the NTA instead of the k value for notifying of the second signal transmission timing. Further, the k or a value may also be determined based on an absolute time length instead of the NTA that becomes the reference. Further, the k or a value may be changed according to variation of the TA value for a determined time instead of the NTA becoming the reference.

(3-6)-th Embodiment

The (3-6)-th embodiment provides an operation method of a terminal for which a latency reduction mode and a CA using one or more carriers are configured. The terminal for which the latency reduction mode and the CA using one or more carriers are configured and the terminal for which the latency reduction mode is configured perform blind decoding of PDCCH or EPDCCH only in a primary cell (PCell). Further, if it is configured that the terminal transmits HARQ ACK/NACK information of the PDSCH transmitted in subframe n to the base station in subframe n+2 during the latency reduction mode configuration, the terminal may be limited to perform the blind decoding of the PDCCH or EPDCCH only in the primary cell.

(3-7)-th Embodiment

The (3-7)-th embodiment provides a method in which the terminal supporting a latency reduction mode differently performs a DCI detection method in accordance with the latency reduction mode configuration. Here, the latency reduction mode may mean transmission using shortened TTI.

In case of detecting a DCI, the terminal performs decoding on the assumption of a predetermined DCI size. The DCI may include bits for HARQ process number, and for example, since 8 HARQ processes exist for the terminal operating in a normal mode, a bit field for 3-bit HARQ process number may exist in the DCI for scheduling the corresponding terminal. In contrast, the terminal operating at shortened TTI may require a larger number of HARQ processes. For example, for the terminal in a shortened TTI mode operating for 2-symbol or 3-symbol, 16 HARQ processes may exist, and 4 bits are required to transfer the HARQ process number information to the DCI.

If the base station is configured to share and use HARQ process numbers of the normal mode and the shortened TTI mode, 16 HARQ processes can be used even in a normal mode, and thus 4-bit HARQ process number bit field is required even for the DCI transmitted to the terminal in the normal mode. Accordingly, the terminal should determine that the number of bits of the HARQ process number included in the DCI transferred in the normal mode may differ in case where the latency reduction mode configuration is made to perform the shortened TTI operation and in case where the latency reduction mode configuration is not made and thus the shortened TTI operation is not performed.

In case of transmitting the DCI to the terminal for scheduling, the base station includes x-bit HARQ process number information bit field in the DCI if the latency reduction mode is configured in the terminal, and includes y-bit HARQ process number information bit field if the latency reduction mode is not configured. The terms x and y may be equal to each other or in general, they may differ from each other. For example, x may be composed of 3 bits, and y may be composed of 4 bits.

If the latency reduction mode is configured in the terminal in case of detecting the DCI for data transmission, the terminal performs DCI decoding on the assumption of the x-bit HARQ process number information bit field, and if the latency reduction mode is not configured, the terminal performs DCI decoding on the assumption of the y-bit HARQ process number information bit field. The terms x and y may be equal to each other or in general, they may differ from each other. For example, x may be composed of 3 bits, and y may be composed of 4 bits.

In this embodiment, although only the bit field for the HARQ process number information has been described, a method for analyzing the length of other information of the DCI or the DCI may be changed depending on whether the latency reduction mode is configured.

Figure 41:
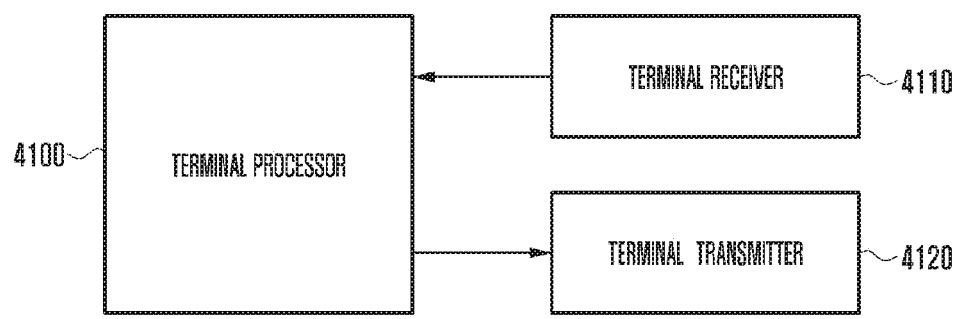
FIGS. 41 and 42 are diagrams illustrating the configurations of a terminal and a base station for performing the above-described embodiments.
Figure 42:
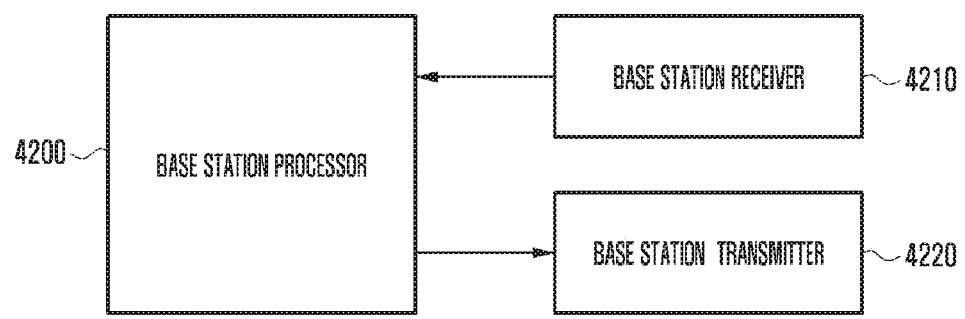

FIGS. 41 and 42 are diagrams illustrating the configurations of a terminal and a base station for performing the above-described embodiments. In the (3-1)-th to (3-6)-th embodiments, methods by a base station and a terminal for determining second signal transmission/reception timing and terminal transmission power and performing corresponding operations have been described, and in order perform this, base station and terminal receivers, processors, and transmitters should operate in accordance with the respective embodiments.

Specifically, FIG. 41 is a block diagram illustrating the internal structure of a terminal according to an embodiments of the present disclosure. As illustrated in FIG. 41, a terminal according to the present disclosure may include a terminal receiver 4110, a terminal transmitter 4120, and a terminal processor 4100. In an embodiment of the present disclosure, the terminal receiver 4110 and the terminal transmitter 4120 may be commonly called a transceiver.

The transceiver may transmit and receive signals with a base station, and the signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the terminal processor 4100, and transmit the signal output from the terminal processor 4100 through the radio channel.

The terminal processor 4100 may control a series of processes so that the terminal can operate according to the embodiments of the present disclosure. For example, the terminal receiver 4110 may receive the signal including the second signal transmission timing information from the base station, and the terminal processor 4100 may control to analyze the second signal transmission timing. Thereafter, the terminal transmitter 4120 transmits the second signal in the above-described timing.

FIG. 42 is a block diagram illustrating the internal configuration of a base station according to an embodiment of the present disclosure. As illustrated in FIG. 42, a base station according to the present disclosure may include a base station receiver 4210, a base station transmitter 4220, and a base station processor 4200. In an embodiment of the present disclosure, the base station receiver 4210 and the base station transmitter 4220 may be commonly called a transceiver.

The transceiver may transmit and receive signals with a terminal. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the base station processor 4200, and transmit the signal output from the base station processor 4200 through the radio channel.

The base station processor 4200 may control a series of processes so that the base station can operate according to the above-described embodiments of the present disclosure. For example, the base station processor 4200 may control to determine the second signal transmission timing and to generate the second transmission timing information to be transferred to the terminal. Thereafter, the base station transmitter 4220 transfers the timing information to the terminal, and the base station receiver 4210 receives the second signal in the above-described timing.

Further, according to an embodiment of the present disclosure, the base station processor 4200 may control to generate DCI including the second signal transmission timing information. In this case, the DCI may indicate the second signal transmission timing information.

On the other hand, embodiments of the present disclosure have been presented to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein. Further, the respective embodiments may be combined with each other to be operated. For example, parts of the (3-1)-th embodiment, the (3-2)-th embodiment, and the (3-3)-th embodiments may be combined with each other to be operated by the base station and the terminal. Further, although the above-described embodiments are presented based on the LTE/LTE-A system, other modifications based on the technical idea of the above-described embodiments can be embodied in other systems, such as 5G and NR systems.

Fourth Embodiment

Up to now, a wireless communication system has been evolved mainly to take aim at improvement of transmission speed and transmission efficiency. In contrast, according to the 5$^{th}$ generation (5G) mobile communication requirements recently proposed in ITU-R, it is prescribed to support all of enhanced mobile broadband (eMBB) that is a service requiring high transmission speed unlike the existing service, ultra-reliability and low-latency communication (URLLC) that is a service requiring short transmission latency, and massive machine type communication (mMTC) that is a service requiring high connection density. For this, various technologies, such as signal transmission technology using new waveforms, non-orthogonal multiple access technology, and massive multi-antenna technology using ultra-high frequency band, have been discussed.

Figure 43:
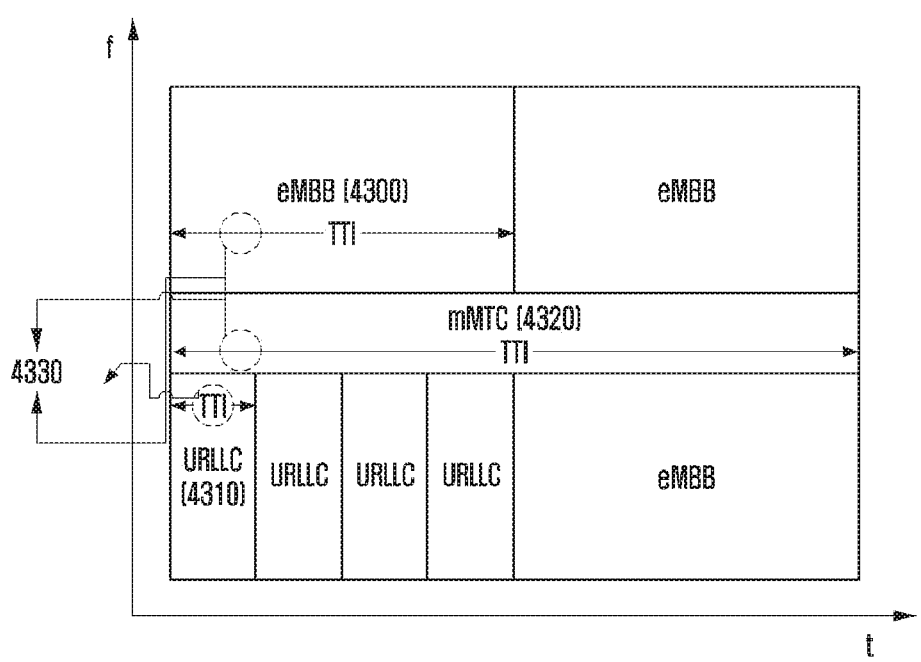
FIG. 43 is a diagram illustrating an example in which eMBB, URLLC, and mMTC that are three services of 5G are multiplexed and transmitted in one system.

FIG. 43 is a diagram illustrating an example in which eMBB 4300, URLLC 4310, and mMTC 4320 that are three services of 5G are multiplexed and transmitted in one system.

Since a 5G system is oriented to one radio access technology accommodating all of three prescribed service scenarios, it is intended to establish a flexible system that is different from the existing system. For example, in order to satisfy different frequency bands and requirements, services can be simultaneously provided by giving scalability to a numerology such as subcarrier spacing during generation of an OFDM signal. Further, by adjusting transmission time intervals (TTI) to match the situation, it becomes possible to configure the latency and requirements to match respective services.

FIG. 43 illustrates a case where eMBB 4300, URLLC 4310, and mMTC 4320 are configured at different TTIs 4330. Further, in consideration of forward compatibility, the 5G system is oriented to be designed so that services to be designed later are not limited by the current system. In order to establish such a flexible system, it is intended to maximally exclude various always-on signals existing in the existing LTE system and fixed signals being spread and transmitted over the whole system band.

In an LTE system, a physical downlink control channel (PDCCH) that is one of physical channels to transmit downlink control information (DCI) is transmitted for each subframe over the whole system band. Further, as a reference signal for decoding the PDCCH, a cell-specific reference signal (CRS) is used, and the CRS is a representative always-on signal that is always transmitted regardless of existence/nonexistence of downlink traffic. In other words, the PDCCH structure that is currently used in the LTE system is unable to be flexibly configured, and if the existing PUCCH structure is used as it is in the 5G system, there occurs difficulty in supporting various services to match the requirements or in securing forward compatibility.

Figure 44:
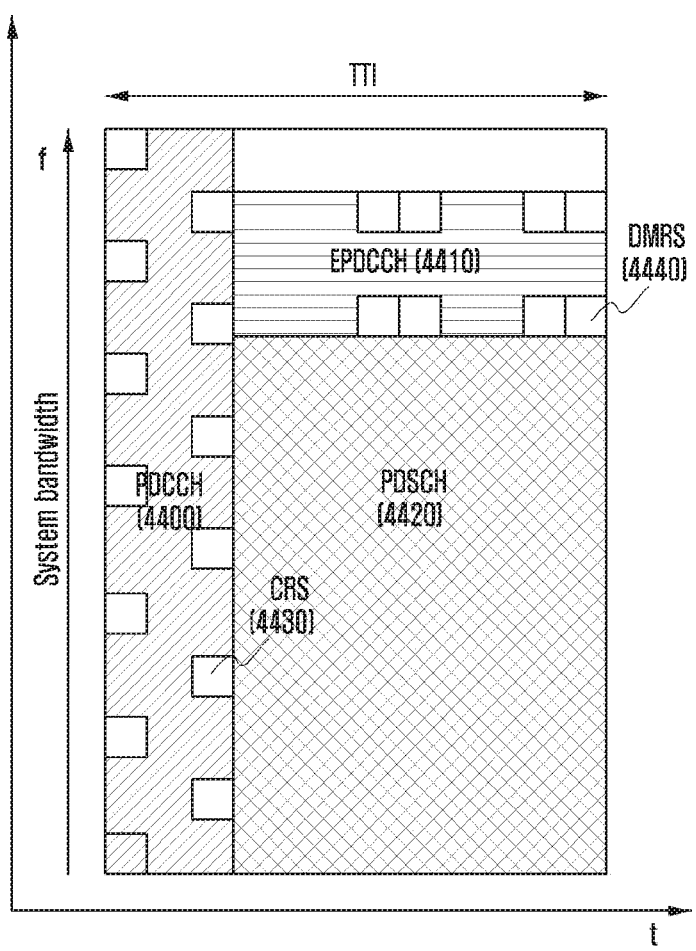
FIG. 44 is a diagram illustrating PDCCH and EPDCCH that are downlink physical channels on which DCI of LTE is transmitted.

The downlink control channel existing in the LTE system will be described in more detail. FIG. 44 is a diagram illustrating PDCCH 4400 and enhanced PDCCH (EPDCCH) 4410 that are downlink physical channels on which the DCI of the LTE is transmitted. Referring to FIG. 44, the PDCCH 4400 is time-division-multiplexed (TDM) with PDSCH 4420 that is a data transmission channel, and is transmitted over the full system bandwidth. The region of the PDCCH 4400 is expressed by the number of OFDM symbols, and this is indicated to the terminal by a control format indicator (CFI) transmitted through a physical control format indicator channel (PCFICH). By allocating the PDCCH 4400 at a head portion of the subframe, the terminal can decode downlink scheduling allocation as quickly as possible, and through this, decoding delay for a downlink shared channel (DL-SCH), that is, decoding delay for downlink data, can be reduced to cause the whole downlink transmission delay to be reduced.

The DCI transmitted through the PDCCH 4400 includes the followings.

Downlink scheduling assignment: PDSCH resource designation, transmission format, HARQ information, and control information related to spatial multiplexing Uplink scheduling grant: PUSCH resource designation, transmission format, HARQ information, and PUSCH power control Power control command for terminal set Different pieces of control information generally have different DCI message sizes, and they are classified in different DCI format. The downlink scheduling allocation information is transmitted in DCI formats 1, 1A, 1B, 1C, 1D, 2, 2A, 2B, and 2C, the uplink scheduling grant is transmitted in DCI formats 0 and 4, and the power control command is transmitted in DCI formats 3 and 3A. One PDCCH 4400 carries one message having a type according to one of the DCI formats. In general, since a plurality of terminals are simultaneously scheduled on the downlink and the uplink, respective scheduling messages are transmitted on respective PDCCHs 4400, and thus transmission of the plurality of PDCCHs 4400 is simultaneously performed.

A cyclic redundancy check (CRC) bit is added to a DCI message payload, and the CRC is scrambled to a radio network temporary identifier (RNTI) corresponding to the identity of the terminal. In accordance with the purpose of the DCI message, for example, in accordance with UE-specific data transmission, power control command, or random access response, different RNTIs are used. The RNTI is not explicitly transmitted, but is included in a CRC calculation process to be transmitted. If the DCI message transmitted on the PDCCH is received, the terminal identifies the CRC using the allocated RNTI, and if the CRC result is correct, it can be known that the corresponding message has been transmitted to the terminal.

The resource allocation of the PDCCH 4400 is based on a control channel element (CCE), and one CCE is composed of 9 resource element groups (REG), that is, 36 resource elements (REs) in total. The number of CCEs required for a specific PDCCH 4400 may be 1, 2, 4, or 8, and this may differ in accordance with the channel coding rate of the DCI message payload. As described above, the number of different CCEs is used to implement link adaptation of the PDCCH 4400.

The terminal should detect the signal in a state where it does not know information on the PDCCH 4400, and in an LTE system, a search space indicating a set of CCEs has been defined for blind decoding as described above. The search space is composed of a plurality of sets according to the aggregation level of each CCE, and this is not explicitly signaled, but is implicitly defined through a function by the terminal identity and the subframe number. In the respective subframes, the terminal performs decoding with respect to all possible PDCCHs that can be made from the CCEs in the configured search space, and processes information declared to be valid to the corresponding terminal through the CRC.

The search space is classified into a UE-specific search space and a common search space. Terminals in a specific group or all terminals may search the common search space of the PDCCH in order to receive cell common control information, such as dynamic scheduling for the system information or paging message. For example, scheduling allocation information of DL-SCH for transmission of system information block (SIB)-1 including service provider information of the cell can be received by searching the common search space of the PDCCH. In general, since the system message should reach a cell edge, the common search space is defined only with respect to the CCE aggregation level of 4 and 8 and the DCI format, such as 0, 1A, 3, 3A, or 1C, that is the smallest DCI format.

As described above, as a reference signal for PDCCH decoding, the CRS 4430 is used. The CRS 4430 is transmitted for each subframe over the full band, and its scrambling and resource mapping are determined to differ in accordance with a cell identity (ID). The multi-antenna transmission technique for the PDCCH 4400 is limited to open-loop transmission diversity.

As various technologies, such as carrier aggregation (CA) and coordinated multipoint (CoMP), are supported in the LTE system in the related art, it becomes difficult to obtain sufficient transmission capacity for transmitting downlink control signal only on the existing PDCCH 4400. Accordingly, in LTE Release 11, EPDCCH 4410 is added as a physical channel for transmitting the DCI. The EPDCCH 4410 has been designed in a direction in which the following requirements are satisfied.

Control channel transmission capacity increase

Frequency axis adjacent cell interference control

Frequency-selective scheduling

MBSFN subframe support

Coexistence with the existing LTE terminal

As illustrated in FIG. 44, the EPDCCH 4410 is frequency-division-multiplexed (FDM) with the PDSCH 4420 to be transmitted. The base station may properly allocate resources of the EPDCCH 4410 and PDSCH 4420 through scheduling, and due to this, coexistence of data transmission for the existing LTE terminal and the EPDCCH can be effectively supported. However, since the EPDCCH 4410 is allocated to one whole subframe on time axis, a loss occurs from the viewpoint of transmission delay time. A plurality of EPDCCHs 4410 constitute one EPDCCH set, and allocation of the EPDCCH set is performed in the unit of a physical resource block (PRB) pair. The location information of the EPDCCH set is UE-specifically configured, and is transmitted through radio resource control (RRC) signaling. Two maximum EPDCCH sets may be configured to each terminal, and one EPDCCH set is simultaneously multiplexed and configured to different terminals.

Resource allocation of the EPDCCH 4410 is based on an enhanced CCE (ECCE), and one ECCE may be composed of 4 or 8 enhanced REGs (EREGs), and the number of EREGs for each ECCE differs in accordance with a cyclic prefix (CP) length and subframe configuration. One EREG is composed of 9 REs, and 16 EREGs may exist for each PRB pair. The EPDCCH transmission type is divided into localized/distributed transmissions in accordance with the RE mapping type of the EREG. The ECCE aggregation level may be 1, 2, 4, 8, 16, or 32, and this is determined by at least one of a CP length, subframe configuration, EPDCCH format, and transmission type.

The EPDCCH 4410 supports only UE-specific search space. Accordingly, the terminal intending to receive a system message should search the common search space on the existing PDCCH 4400. As a reference signal for decoding the EPDCCH 4410, a demodulation reference signal (DMRS) 4440 is used. The EPDCCH 4410 supports transmission using 4 antenna ports at maximum. Since the DMRS 4400 is used, the base station can configure precoding of the EPDCCH 4410, and the terminals may perform decoding of the EPDCCH even if the terminals do not know what precoding is used on the EPDCCH.

From the foregoing, the downlink control channel in the existing LTE system has been described. The downlink control channel in the 5G system should be designed differently from the downlink control channel in the LTE system. As described above, the control channel of the 5G system should satisfy the following requirements.

Satisfy the requirements of eMBB, URLLC, and mMTC
Simultaneously support various TTIs
Support simultaneous services of different numerologies
Secure forward compatibility It is difficult to satisfy the above-described requirements only with the existing control channel structure. For example, since the PDCCH is transmitted on the full band, it is not suitable to the mMTC that supports only a narrow band. Since the EPDCCH is transmitted for one subframe, it is not suitable to the URLLC that requires low latency. In order to support various numerologies and TTIs and to secure forward compatibility, it is required for the control channel to be flexibly allocated in time and frequency domains, but it is difficult to flexibly allocate the existing PDCCH and EPDCCH. Accordingly, there is a need for design of a control channel having a new structure for the 5G system.

As described below, it may be understood that the control channel transmission is to transmit the control information on the control channel, and the data channel transmission is to transmit data on the data channel.

Hereinafter, preferred embodiments of the present disclosure will be described in detail with reference to the accompanying drawings. In the accompanying drawings, it is to be noted that the same reference numerals are used for the same constituent elements. Further, a detailed description of known functions and configurations will be omitted if it obscures the subject matter of the present disclosure.

Further, in explaining embodiments of the present disclosure in detail, although LTE and 5G systems will be the main subject, the primary subject matter of the present disclosure can be applied to other communication systems having similar technical backgrounds and channel types with slight modifications that do not greatly deviate from the scope of the present disclosure, and this will be able to be done by the judgement of those skilled in the art to which the present disclosure pertains.

First, a downlink control channel structure according to the (4-1)-th embodiment of the present disclosure will be described.

(4-1)-th Embodiment

Figure 45:
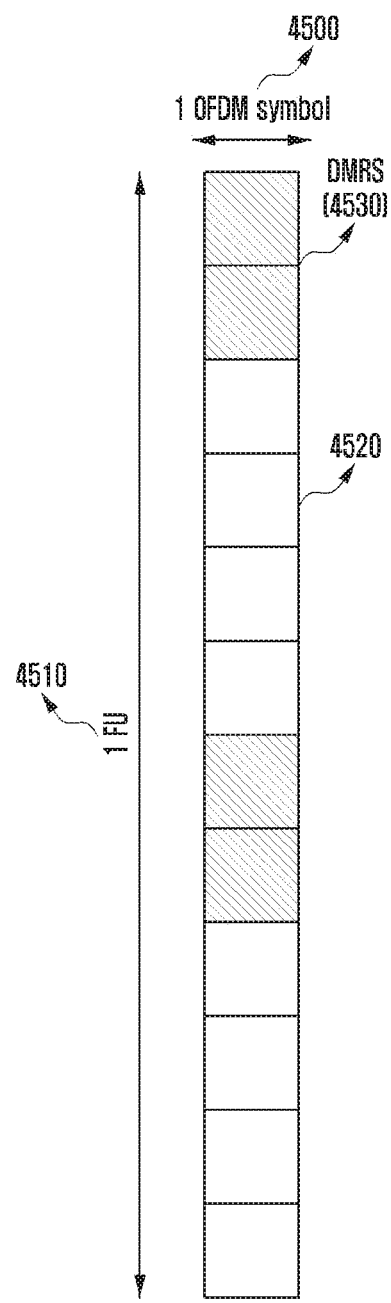
FIG. 45 is a diagram illustrating an example of a basic unit of time and frequency resources constituting a downlink control channel proposed in the present disclosure.

FIG. 45 is a diagram illustrating an example of a basic unit of time and frequency resources constituting a downlink control channel proposed in the present disclosure. Referring to FIG. 45, the basic unit of time and frequency resources configuring a control channel may be called a resource element group (REG), and new radio resource element group (NR-REG). In the present disclosure, for convenience, it is called NR-REG. The NR-REG is composed of 1 OFDM symbol 4500 on time axis, and is composed of 1 frequency unit (FU) 4510 on frequency axis. In this case, 1 FU is defined as a basic unit of a frequency resource for performing scheduling from a base station to a terminal. As an example, if scheduling is performed in a frequency domain with 12 subcarriers as a basic unit, 1 FU may be defined with a size corresponding to 12 subcarriers (i.e., 12 REs).

The downlink control channel to be described in the present disclosure has a structure that can be flexibly allocated in accordance with the requirements of services requested by the respective terminals. By connecting the basic unit of the control channel illustrated in FIG. 45, a control channel region having various sizes can be configured. As an example, if the basic unit to which the control channel is allocated is CCE, 1 CCE may be composed of a plurality of NR-REGs. For example, the NR-REB illustrated in FIG. 44 may be composed of 12 REs, and if 1 CCE is composed of 3 NR-REGs, it means that 1 CCE is composed of 36 REs. If a downlink control region is configured, the corresponding region may be composed of a plurality of CCEs, and a specific downlink control channel may be mapped to one or a plurality of CCEs to be transmitted in accordance with the aggregation level (AL) in the control region. The CCEs in the control region are discriminated by numbers, and in this case, the number may be given in accordance with a logical mapping type. Actual physical resource allocation for the CCE may be mapped in the unit of an NR-REG, and in this case, in order to strengthen the control channel, a block interleaver and a cell-specific cyclic shift may be additionally used.

If it is assumed that the time-axis basic unit is 1 OFDM symbol in configuring the basic unit of the control channel, the data channel and the control channel can be TD-multiplexed in one subframe. By locating the control channel in front of the data channel, user's processing time can be reduced, and it is easy to satisfy latency requirements. Further, by configuring the frequency-axis basic unit of the control channel to 1 FU, the FDM between the control channel and the data channel can be performed more efficiently. If the basic unit of frequency axis is composed of a specific number of subcarriers that is smaller than 1 FU, it is required to indicate the frequency-axis start point for the scheduled data in the unit of subcarrier.

Further, the basic unit of the downlink control channel illustrated in FIG. 45 may be composed of a region 4520 to which the DCI is mapped and a region to which DMRS 4530 that is a reference signal for decoding the same is mapped. In this case, the DMRS 4530 may be efficiently transmitted in consideration of an overhead according to RS allocation. As an example, the DMRS may be turned on/off according to antenna port configurations used in the base station and downlink control channel allocation. In other words, the specific control channel basic unit, that is, the DMRS 4530 in the NR-REG, may be transmitted or may not be transmitted. If the DMRS 4530 is not transmitted, the corresponding region may be used for DCI mapping.

Figure 46:
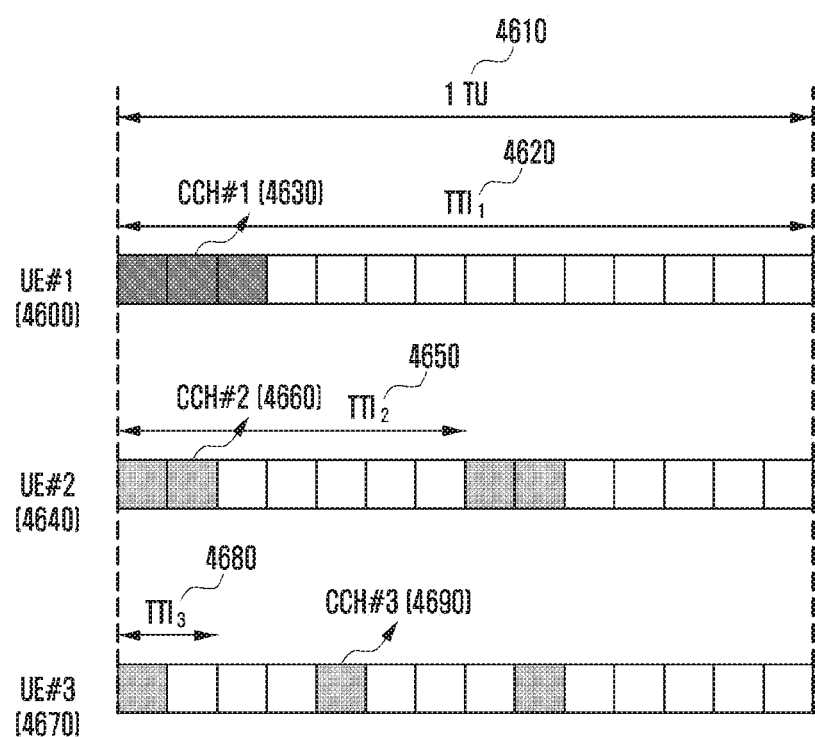
FIG. 46 is a diagram illustrating an example of downlink control channel configuration according to the (4-1)-th embodiment of the present disclosure.

FIG. 46 is a diagram illustrating an example of downlink control channel configuration according to the (4-1)-th embodiment of the present disclosure. FIG. 46 illustrates an example in which downlink control channels are differently configured with respect to subframes for supporting services having three different TTIs. Referring to FIG. 46, $TTI_1$ 4620 is composed of 14 OFDM symbols, $TTI_2$ 4650 is composed of 7 OFDM symbols, and $TTI_3$ 4680 is composed of 2 OFDM symbols. Referring to FIG. 46, total 3 OFDM symbols 4630 are configured as downlink control channels (CCHs) in terminal (UE) #1 4600 having $TTI_1$ (i.e., the terminal transmits/receives signals using $TTI_1$), total 2

OFDM symbols 4660 are configured as downlink control channels (CCHs) in terminal #2 4660 having $TTI_2$, and total 1 OFDM symbol 4680 is configured as a downlink control channel (CCH) in terminal #3 4670 having $TTI_3$. Although FIG. 46 illustrates an example in which downlink control channels are differently configured for respective terminals, it is to be noted that the downlink control channels may be configured in the unit of a terminal or a terminal group in consideration of the complexity and efficiency of the control channel configuration. In other words, the term "terminal" used in the present disclosure may be analyzed as a terminal group or a term having similar meanings.

Time unit (TU) 4610 inscribed in FIG. 46 denotes a basic time unit for scheduling. The TU 4610 may be defined as a time unit, such as a transmission time interval (TTI), subframe, slot, or mini-slot. In an example of FIG. 46, it is assumed that 1 TU is composed of 14 OFDM symbols. In case where the base station services terminal #1 4600, terminal #2 4640, and terminal #3 4670, through OFDMA, subframe corresponding to 1 $TTI_1$ is scheduled with respect to terminal #1 4600, subframe corresponding to 2 $TTI_2$ is scheduled with respect to terminal #2 4640, and subframe corresponding to 7 $TTI_3$ is scheduled with respect to terminal #3 4670. Further, referring to FIG. 46, with respect to terminal #1 4600 and terminal #2 4640, one control channel is configured for each TTI, and with respect to terminal #3 4670, one control channel is configured for a plurality of TTIs. In this case, on the control channel allocated to terminal #3 4670, control information for a plurality of TTIs are bundled and transmitted, and on the control channel received before a plurality of TTIs, scheduling for a plurality of TTIs can be indicated at a time.

In FIG. 46, configuration of the control channel region is merely exemplary, and the control channel region may be differently configured in accordance with TTIs and other various system parameters.

Figure 47:
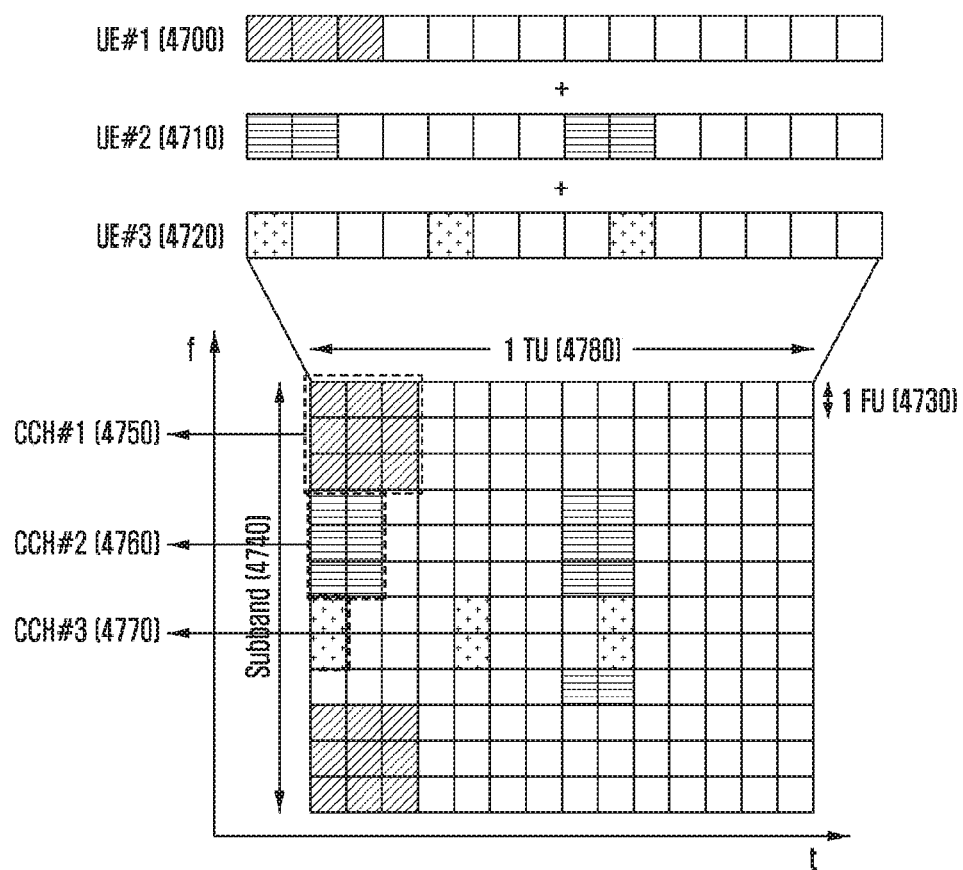
FIG. 47 is a diagram illustrating an example of time and frequency axis resource configuration for a downlink control channel according to the (4-1)-th embodiment of the present disclosure.

FIG. 47 is a diagram illustrating an example of time and frequency axis resource configuration for a downlink control channel according to the (4-1)-th embodiment of the present disclosure. In FIG. 47, a time-axis resource is indicated in the unit of an OFDM symbol, and is illustrated as much as 1 TU 4780, and a frequency-axis resource is illustrated as much as one subband 4740 in the unit of 1 FU 4730. In an example of FIG. 47, it is assumed that subframes of terminal #1 4700, terminal #2 4710, and terminal #3 4720 in FIG. 46 are multiplexed in the form of an OFDMA.

As shown in FIG. 47, control channel CCH #1 4750 of terminal #1, control channel CCH #2 of terminal #2, and control channel 4770 of terminal #3 are differently configured not only on the time resource but also on the frequency resource. The control channel allocation is performed through connection of the basic unit illustrated in FIG. 45. As a result, the control channel region is provided as a specific pattern on time and frequency axes. The base station may indicate information on the configured control channel pattern to respective terminals through RRC signaling. Further, the control channel pattern may be indicated to respective terminals through a control signal transmitted to a plurality of terminals, such as a common control signaling or UE group control signaling. Further, the control channel pattern may be implicitly indicated through functions using, for example, RNTI, TTI length, and service kind.

As described above, in case of using the downlink control channel structure according to the (4-1)-th embodiment, resources can be efficiently utilized so as to satisfy the requirements for respective services by variably allocating the control channel region in accordance with the service situation for the respective terminals. In this case, if the control information to be transmitted does not exist, the resource configured to the control channel is used for data transmission to further heighten the resource efficiency. In this case, necessary detailed base station and terminal operations are described below.

Figure 48:
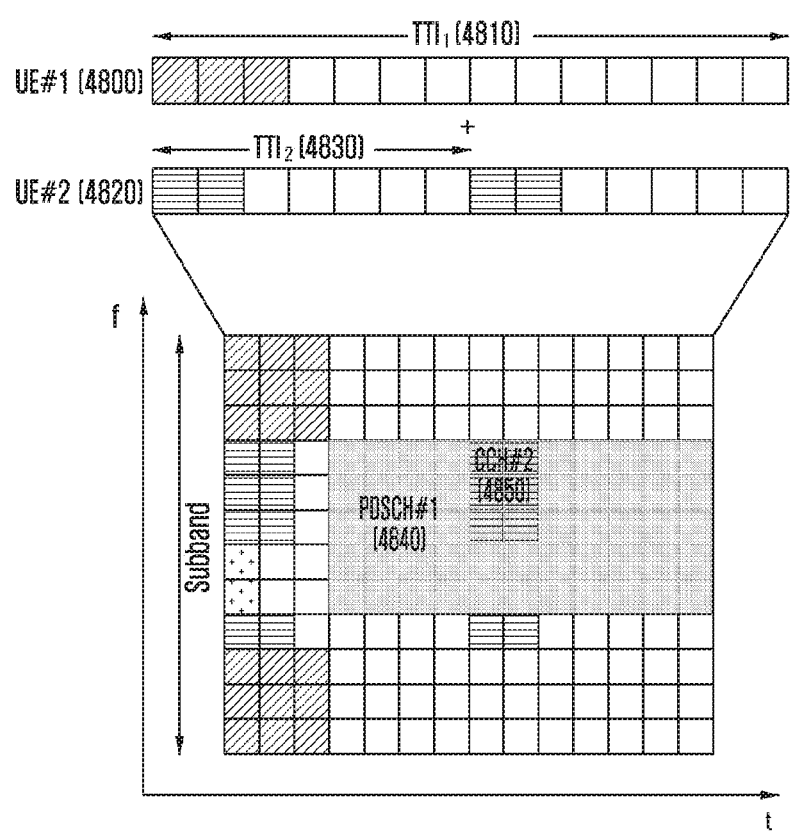
FIG. 48 is a diagram illustrating an example of downlink transmission according to the (4-1)-th embodiment of the present disclosure.

FIG. 48 is a diagram illustrating an example of downlink transmission according to the (4-1)-th embodiment of the present disclosure.

FIG. 48 illustrates transmission of terminal #1 4800 and terminal #2 4810 having different TTI lengths. The TTI lengths of terminal #1 4800 and terminal #2 4810 are respectively configured as $TTI_1$ 4810 and $TTI_2$ 4830. In an example of FIG. 48, PDSCH #1 4840 of terminal #1 4800 is allocated to a part of a subband. In this case, as illustrated in FIG. 48, a part of the resource allocated to PDSCH #1 4840 may overlap a part of the resource preconfigured for CCH #2 4850 that is the control channel existing at the second TTI of terminal #2 4820. If the control information to be transmitted through CCH #2 4850 does not exist, CCH #2 4850 is inactivated, and PDSCH #1 4840 may be successfully decoded by terminal #1 4820. However, if the control information to be transmitted through CCH #2 1850 exists, collision may occur between PDSCH #1 4840 and CCH #2 4850, and thus base station and terminal operations to solve this are necessary.

(4-1-1)-th Embodiment

If PDSCH #1 4840 that is a data channel and CCH #2 4850 that is a control channel collide with each other as illustrated in FIG. 48, the base station may protect CCH #2 4850 by puncturing a part of PDSCH #1 4840 with respect to the resource on which PDSCH #1 4840 and CCH #2 4850 collide with each other. In this case, puncturing means not to map data channels with respect to the resource on which the data channel and the control channel collide with each other.

Figure 49A:
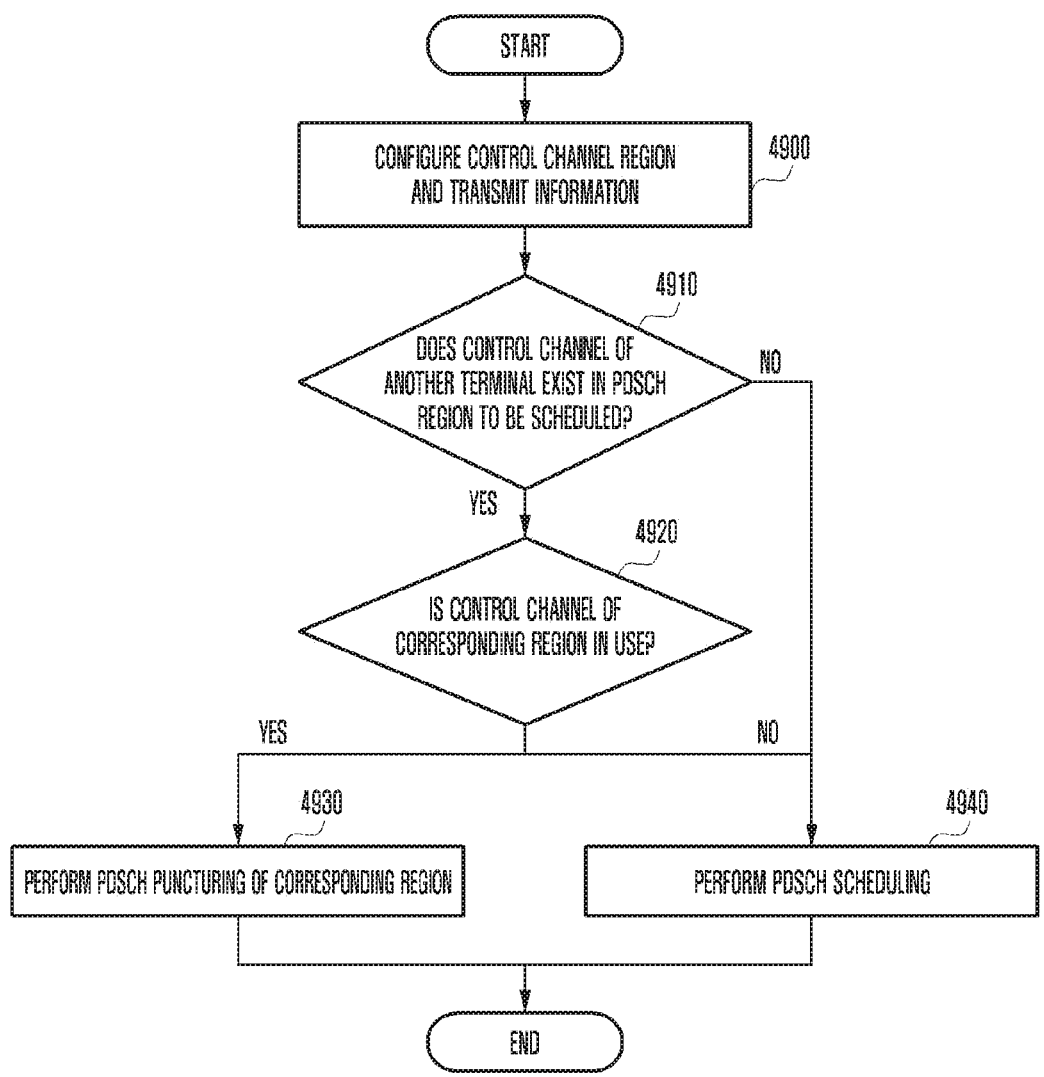
FIGS. 49A and 49B are diagrams illustrating base station and terminal procedures according to the (4-1-1)-th embodiment of the present disclosure.
Figure 49B:
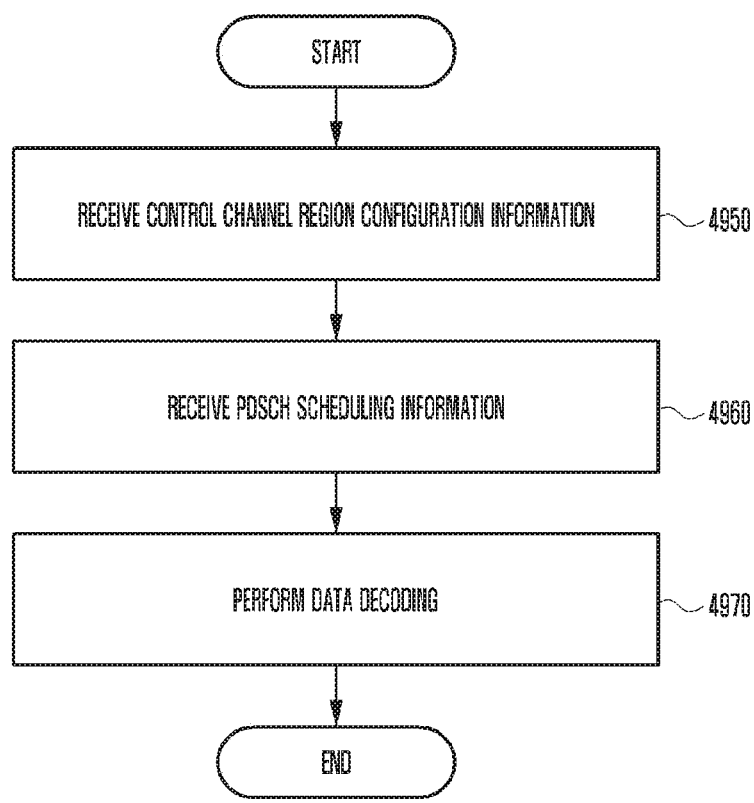

FIGS. 49A and 49B are diagrams illustrating base station and terminal procedures according to the (4-1-1)-th embodiment of the present disclosure.

First, referring to FIG. 49A, a base station procedure according to the present disclosure will be described. At operation 4900, the base station performs configuration of respective control channel regions, and transmits information on the configured control channel pattern to the respective terminals through RRC signaling or implicit method. At operation 4910, the base station determines whether a preconfigured control channel exists on the resource for allocating PDSCH when performing scheduling for the PDSCH. If the control channel region does not exist, the base station allocates the PDSCH as it is (4940). If the control channel region exists, the base station, at operation 4920, determines once again whether the control channel of the corresponding region is used. If the control channel of the control channel has been activated, the base station, at operation 4930, performs scheduling after puncturing a part of the PDSCH of the corresponding region. If the control channel of the corresponding region is not in use even in case of the resource on which the control channel is configured, the PDSCH can be scheduled to the corresponding resource as it is (4940).

Next, referring to FIG. 49B, a terminal procedure according to the present disclosure will be described. At operation 4950, the terminal receives control channel region configuration information from the base station. At operation 4960, the terminal acquires scheduling information for the PDSCH by decoding the control channel of the terminal itself. At operation 4970, the terminal may perform decoding of the PDSCH. In this case, since the PDSCH is not simply mapped to the colliding resource, the terminal receives and decodes the control channel on the predetermined control channel region, and receives and decodes the PDSCH on the resource that does not overlap the control channel.

(4-1-2)-th Embodiment

As illustrated in FIG. 48, if the data channel and the control channel collide with each other, the base station can avoid the collision with the control channel by re-performing the scheduling for PDSCH #1 4840. The base station may allocate PDSCH #1 4840 only to a region that avoids the control channel of another terminal that is activated in the process of performing resource allocation of PDSCH #1 4840.

Figure 50A:
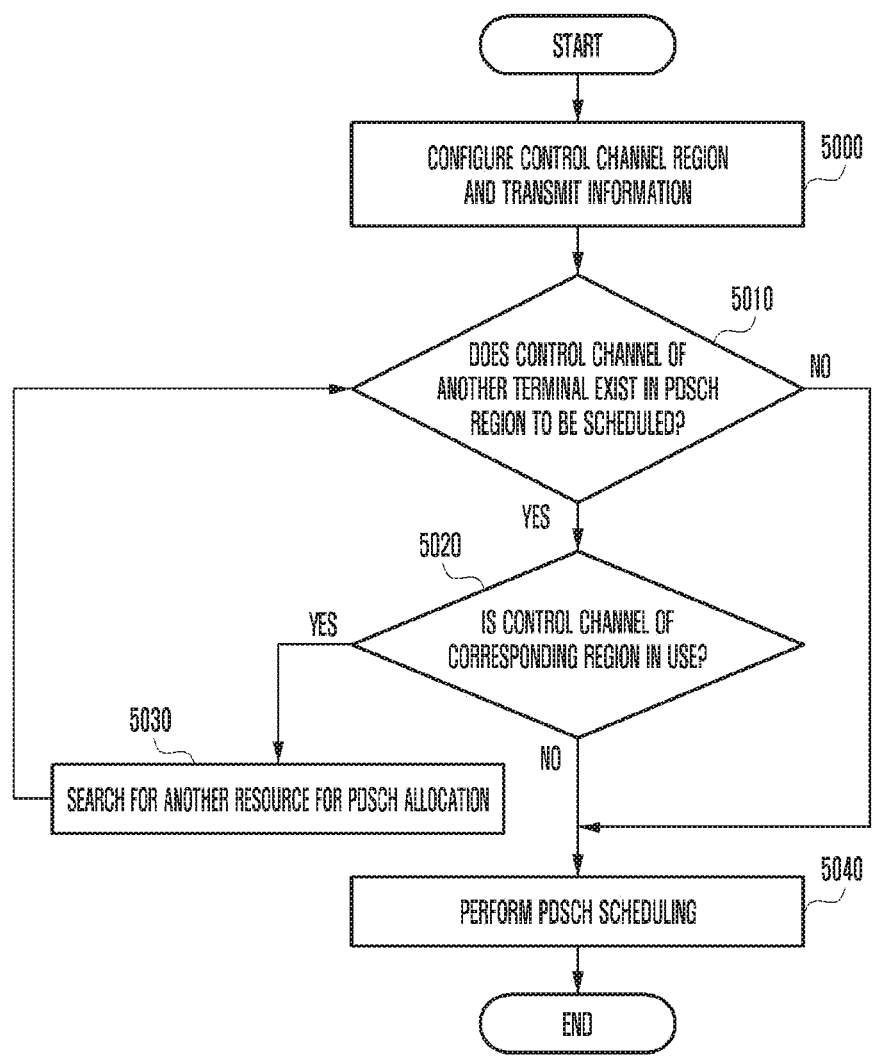
FIGS. 50A and 50B are diagrams illustrating base station and terminal procedures according to the (4-1-2)-th embodiment of the present disclosure.
Figure 50B:
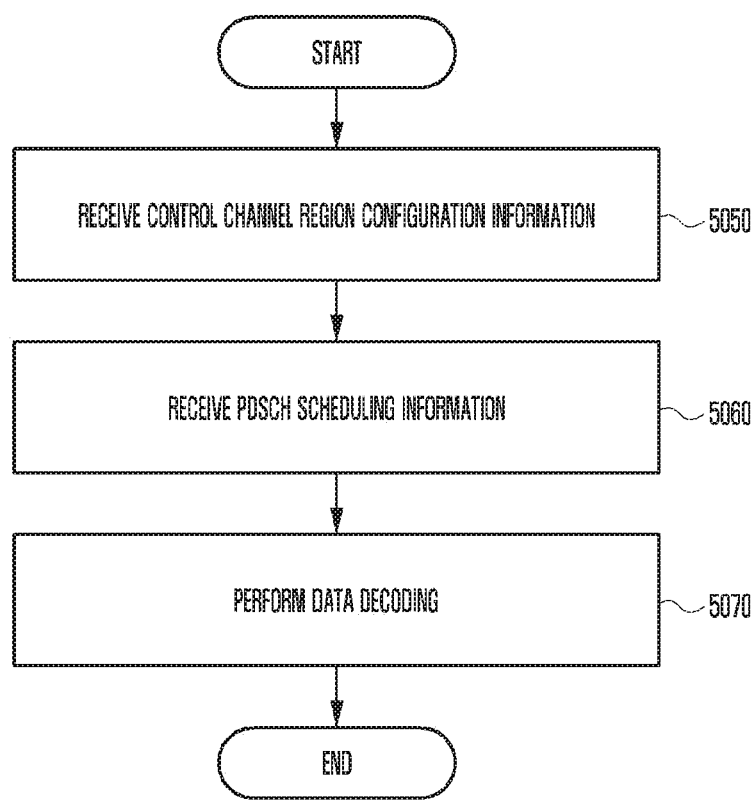

FIGS. 50A and 50B are diagrams illustrating base station and terminal procedures according to the (4-1-2)-th embodiment of the present disclosure.

First, referring to FIG. 50A, a base station procedure according to the present disclosure will be described. At operation 5000, the base station performs configuration of a control channel region, and transmits this to the terminal. At operation 5100, the base station determines whether the resource intending to schedule the PDSCH overlaps the predetermined control channel region (5010), and if the resource does not overlap the control channel region, the PDSCH can be scheduled as it is (5040). If overlapping resource exists, the base station determines whether to use the control channel of the corresponding region (5020). If the control channel of the corresponding region is used, the base station, at operation 5030, searches for another resource for the PDSCH allocation, and if the control channel of the corresponding region is not in use, the base station, at operation 5040, perform PDSCH allocation.

Next, referring to FIG. 50B, a terminal procedure according to the present disclosure will be described. At operation 5050, the terminal receives configuration information on the control channel region, and at operation 5060, the terminal acquires scheduling information on the PDSCH of the terminal itself from the downlink control information obtained by decoding the control channel of the terminal itself. At operation 5070, the terminal performs decoding of the PDSCH. If the control channel and the data channel collide with each other, the base station newly maps the PDSCH to the resource on which no collision occurs, and transmits the downlink control information for scheduling the PDSCH to the terminal. Accordingly, the terminal can decode the PDSCH based on the downlink control information, and this may be a newly mapped PDSCH.

(4-1-3)-th Embodiment

AS illustrated in FIG. 48, if the data channel and the control channel collide with each other, considering the amount of resource on which PDSCH #1 4840 and CCH #2 4850 collide with each other, the base station can allocate the resource of the PDSCH #1 4840 not to use the resource which CCH #2 4850 is allocated to by performing rate matching with respect to PDSCH #1 4840. In this case, for successful decoding of the PDSCH #1 4840, additional signaling for notifying that the PDSCH is rate-matched and thus a part of the resource has not been used is necessary. Respective users can be aware of the configured control channel pattern in the current subframe from the RRC signaling of the base station. In this case, the base station may include an indicator indicating whether to use the control channel of another terminal existing in a region to which the PDSCH of terminal #1, for example, CCH #2 4850 in the DCI to be transmitted. The terminal can be aware of what resource is not used in the region to which the PDSCH of the terminal itself is allocated through the preconfigured control channel pattern and the indicator indicating whether the control channel of another terminal has been used received through the DCI. Accordingly, the terminal may perform decoding on the assumption that the PDSCH has been allocated to the remaining part excluding the corresponding region.

Figure 51A:
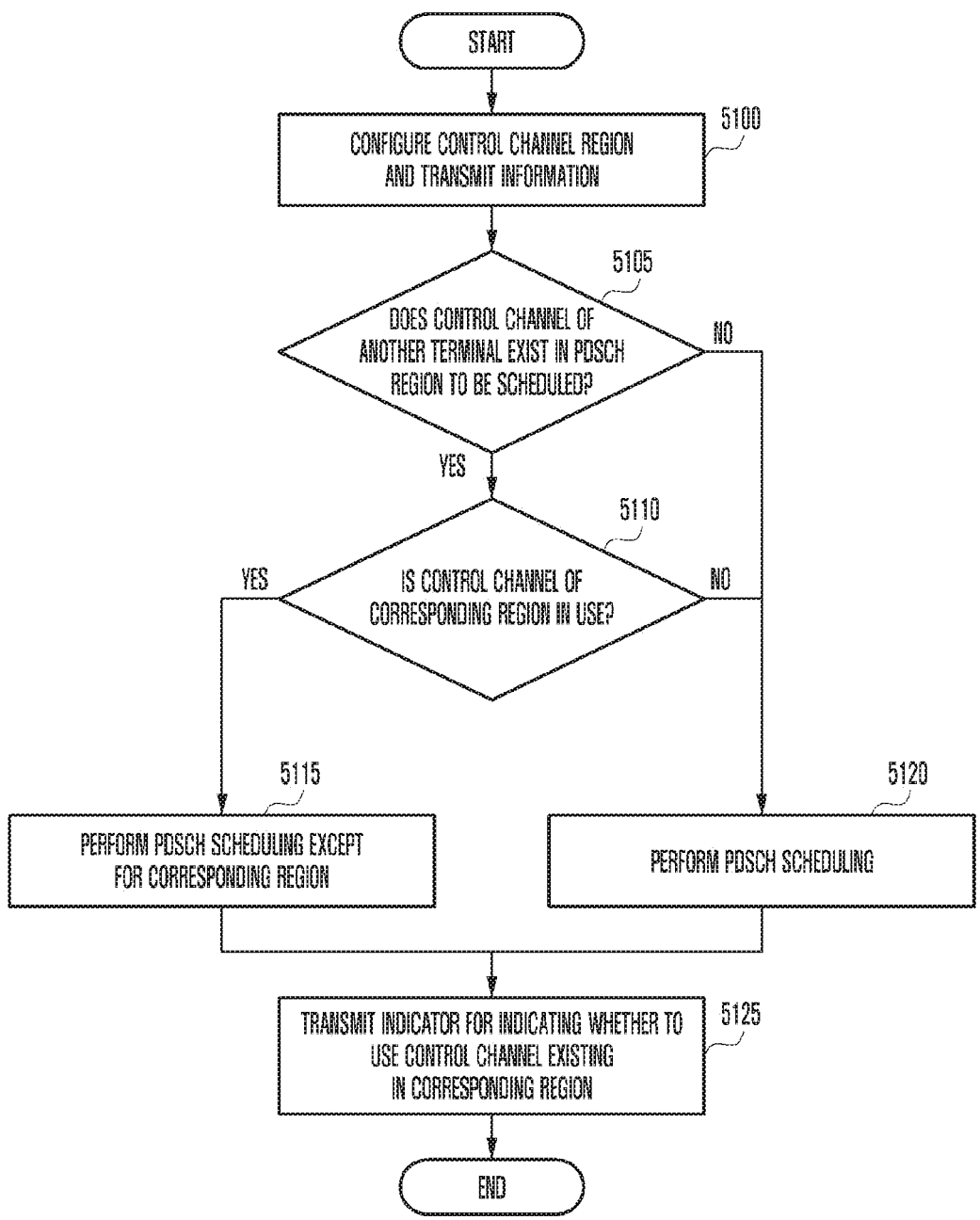
FIGS. 51A and 51B are diagrams illustrating base station and terminal procedures according to the (4-1-3)-th embodiment of the present disclosure.
Figure 51B:
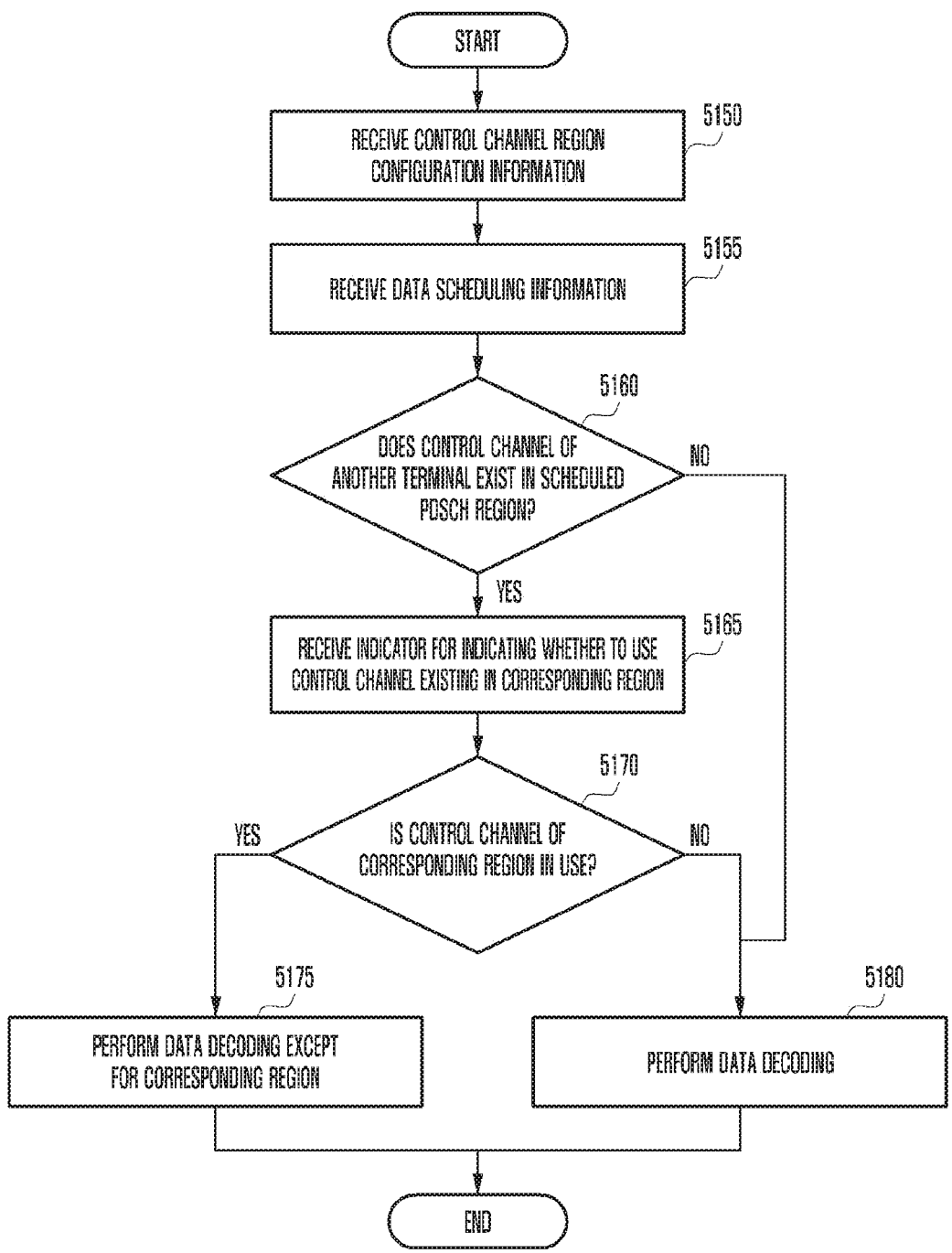

FIGS. 51A and 51B are diagrams illustrating base station and terminal procedures according to the (4-1-3)-th embodiment of the present disclosure.

First, referring to FIG. 51A, a base station procedure according to the present disclosure will be described. The base station performs configuration of a control channel region, and transmits this to the terminal (5100). The base station determines whether the control channel is configured in the region to schedule the PDSCH (5105), and if the control channel has been configured, the base station determines whether the corresponding control channel is in use (5110). If the PDSCH and the control channel resource do not collide with each other or if the PDSCH and the control channel of another terminal do not collide with each other due to nonuse of the control channel even if the resource collides, the base station schedules the PDSCH as it is (5120). If the control channel of the corresponding region is in use, the base station, at operation 5115, performs scheduling of the PDSCH by performing rate matching of data to be transmitted excluding the corresponding region. At operation 5125, the base station transmits to the terminal an indicator indicating whether to use the control channel with respect to the region in which the PDSCH and the control channel collide with each other. If there is no region in which the PDSCH and the control channel collide with each other, it means that there is not an activated control channel, and thus the indicator indicating whether to use the control channel may be used as it is.

Next, a terminal procedure according to the present disclosure will be described based on FIG. 51B. The terminal receives configuration information on the control channel region (5150), and acquires scheduling information on the PDSCH from the control channel of the terminal itself (5155). At operation 5160, the terminal determines whether the control channel of another terminal has been configured among resources on which the PDSCH of the terminal itself has been scheduled based on the configuration information on the control channel region. If the control channel of another terminal does not exist, the terminal receives the PDSCH as it is in accordance with the data scheduling information and decodes the received PDSCH (5180). If the control channel of another terminal exists, the terminal acquires information on whether the corresponding control channel has been used through the indicator indicating whether the control channel existing in the corresponding region has been used (5165). If the terminal receives the indicator indicating whether the control channel of the corresponding region has been used at operation 5170, the terminal receives and decodes the PDSCH excluding the corresponding region in accordance with the data scheduling information (5175). If the indicator indicating that the control channel of the corresponding region is not in use is received, the terminal performs the PDSCH decoding as it is (5180).

Figure 52:
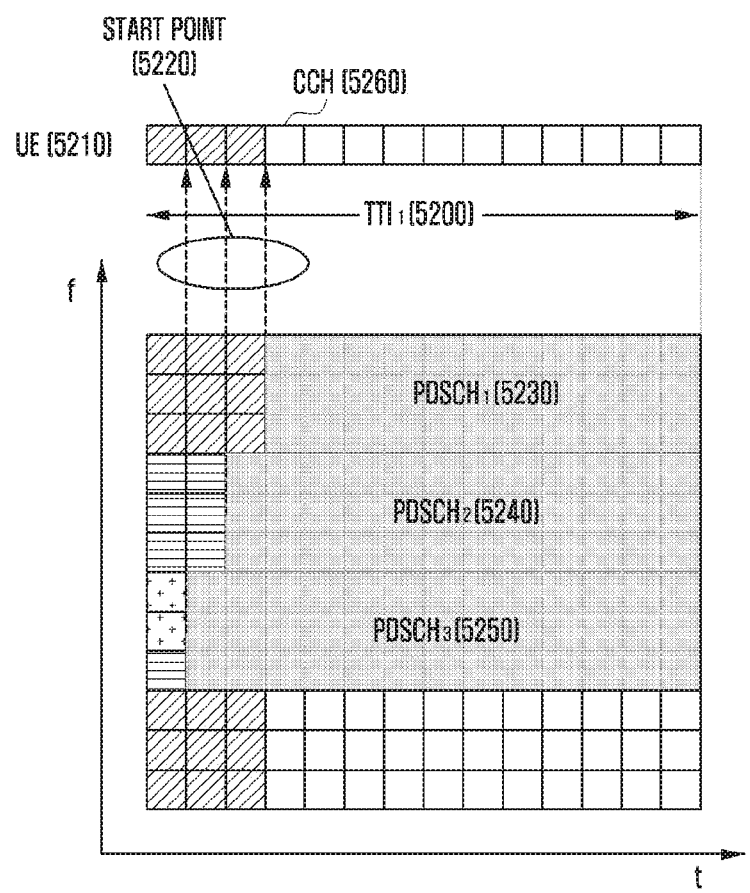
FIG. 52 is a diagram illustrating an example of downlink transmission according to the (4-1)-th embodiment of the present disclosure.

FIG. 52 is a diagram illustrating an example of downlink transmission according to the (4-1)-th embodiment of the present disclosure.

FIG. 52 illustrates an example of PDSCH transmission of a terminal 5210 having a length of $TTI_1$ 5200. In the same manner as described above, if control information to be transmitted to the corresponding control channel does not exist with respect to the resource on which the control channel is configured, a transmitter (i.e., base station) may use the corresponding resource to transmit the PDSCH. Accordingly, as illustrated in FIG. 52, the start point 5220 of the PDSCH may differ depending on the location of the frequency resource to which the PDSCH is allocated.

More specifically, if the terminal 5210 receives scheduling of the $PDSCH_1$ 5230 from the base station, the start point of the $PDSCH_1$ 5230 becomes the fourth OFDM symbol. In the same manner, in case of $PDSCH_2$ 5240, the start point of the PDSCH becomes the third OFDM symbol, and in case of $PDSCH_3$ 5250, the start point of the PDSCH becomes the second OFDM symbol. Although a control channel 5260 is allocated to 3 OFDM symbols on time axis, the downlink control channel according to the (4-1)-th embodiment of the present disclosure supports FDM with the PDSCH, and thus both the control channel and the data channel can exist in one OFDM symbol. Accordingly, in an example of FIG. 52, the point at which the PDSCH can start may become the first, second, third, or fourth OFDM symbol. In order for the terminal to successfully decode the PDSCH, it is required to know the start point of the PDSCH of the terminal itself and for this, additional base station and terminal operations are necessary.

(4-1-4)-th Embodiment

In case of scheduling the PDSCH, the base station may allocate the PDSCH resource to the OFDM symbol that comes always next to the control channel of the corresponding terminal. In this case, the terminal can assume that the PDSCH of the terminal itself always comes next to the control channel, and thus it can perform decoding of the PDSCH without signaling of the additional PDSCH start point.

Figure 53A:
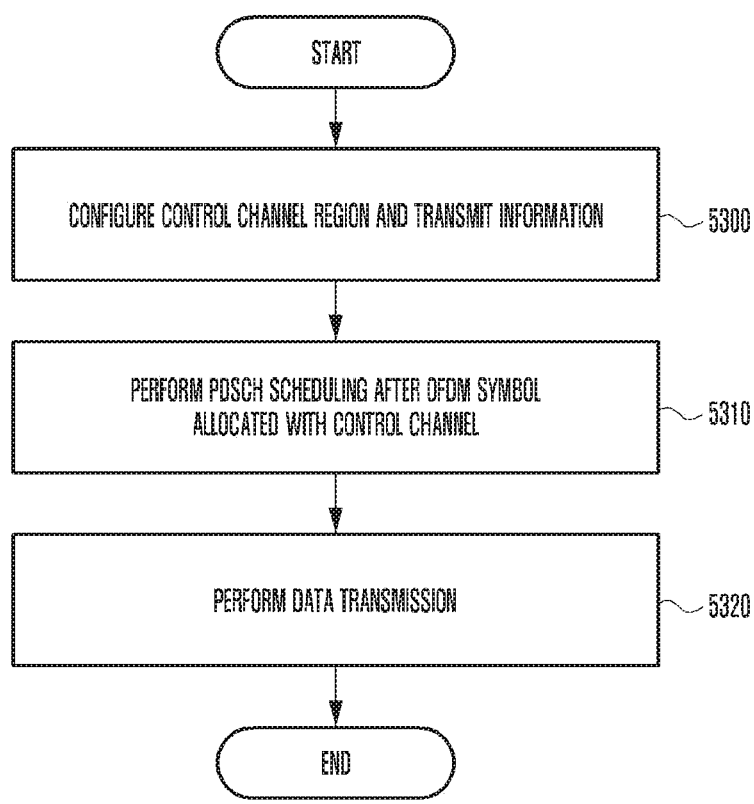
FIGS. 53A and 53B are diagrams illustrating base station and terminal procedures according to the (4-1-4)-th embodiment of the present disclosure.
Figure 53B:
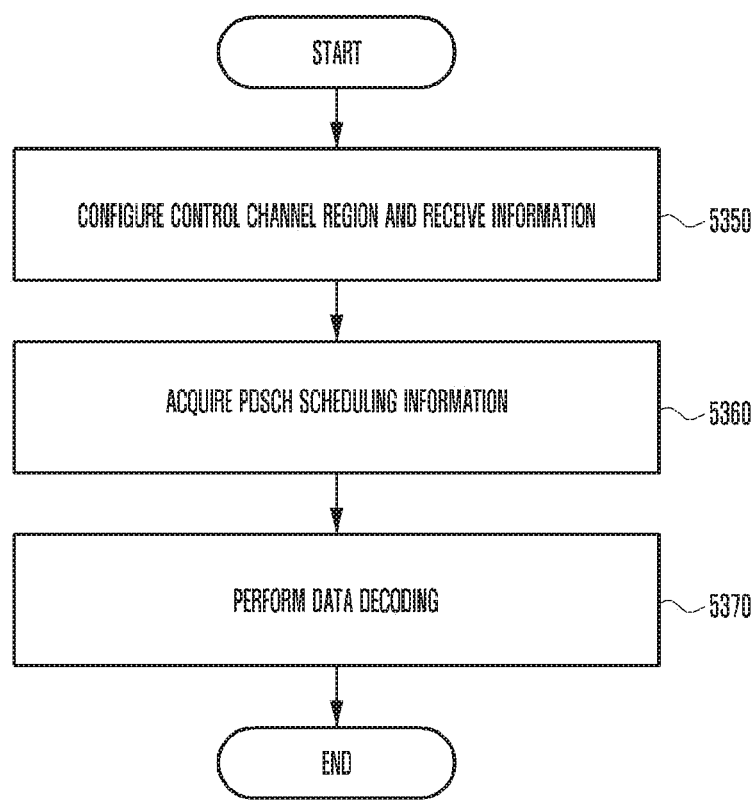

FIGS. 53A and 53B are diagrams illustrating base station and terminal procedures according to the (4-1-4)-th embodiment of the present disclosure.

First, referring to FIG. 53A, a base station procedure according to the present disclosure will be described. At operation 5300, the base station configures a control channel region, and transmits information on this to the terminal. At operation 5310, in case of scheduling PDSCH of a certain terminal, the base station schedules the PDSCH on a symbol next to the OFDM symbol to which the control channel is allocated in consideration of the time domain in which the control channel of the corresponding terminal is configured. For example, if the control channel of the terminal is configured in n OFDM symbols, the PDSCH can be allocated from the (n+1)-th symbol. Thereafter, the base station transmits data on the PDSCH (5320).

Next, referring to FIG. 53B, a terminal procedure according to the present disclosure will be described. At operation 5350, the terminal receives control channel region configuration information from the base station. The terminal acquires frequency-axis scheduling information of PDSCH from its control channel (5360), and receives and decodes the PDSCH after assuming that the start point of the PDSCH is the OFDM symbol next to the control channel of the terminal itself (5370).

(4-1-5)-th Embodiment

In case of scheduling the PDSCH, the base station may add an indicator for the start point of the PDSCH to the DCI providing scheduling information of the PDSCH. In this case, a candidate group of the PDSCH start point is determined by the size of the control channel time region of the corresponding user. For example, if the control channel is allocated to n OFDM symbols, the PDSCH can start at first to (n+1)-th OFDM symbols. As a result, respective users can receive the indicator for the PDSCH start points having different sizes. In this case, message bits having different sizes may be added with respect to the PDSCH start point by newly defining the DCI format. Further, the message bit number for the PDSCH start point may be fixed, and surplus bits may not be used. In this case, the message bit number for the PDSCH start point may be $Ceil(log_2(n_{max}+1))$. Here, Ceil(x) means a ceiling function, and is determined as a function corresponding to the smallest integer that is larger than or equal to an input value x. Here, $n_{max}$ denotes the maximum number of OFDM symbols that can be allocated to the control channel. In this case, the existing DCI format can be used as it is without defining an additional DCI format.

Figure 54A:
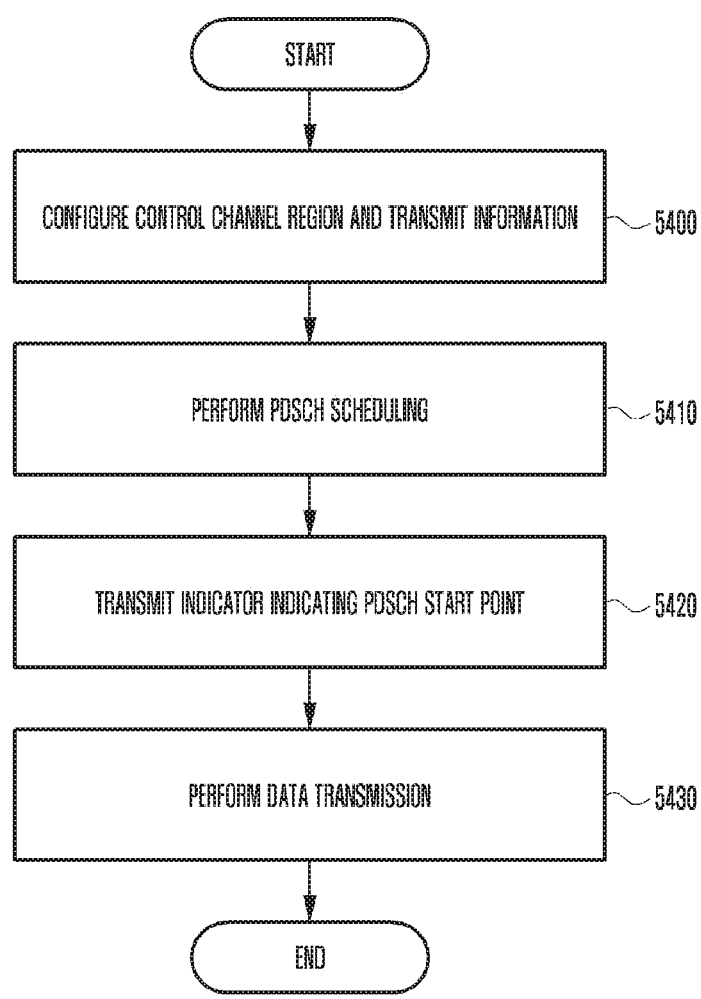
FIGS. 54A and 54B are diagrams illustrating base station and terminal procedures according to the (4-1-5)-th embodiment of the present disclosure.
Figure 54B:
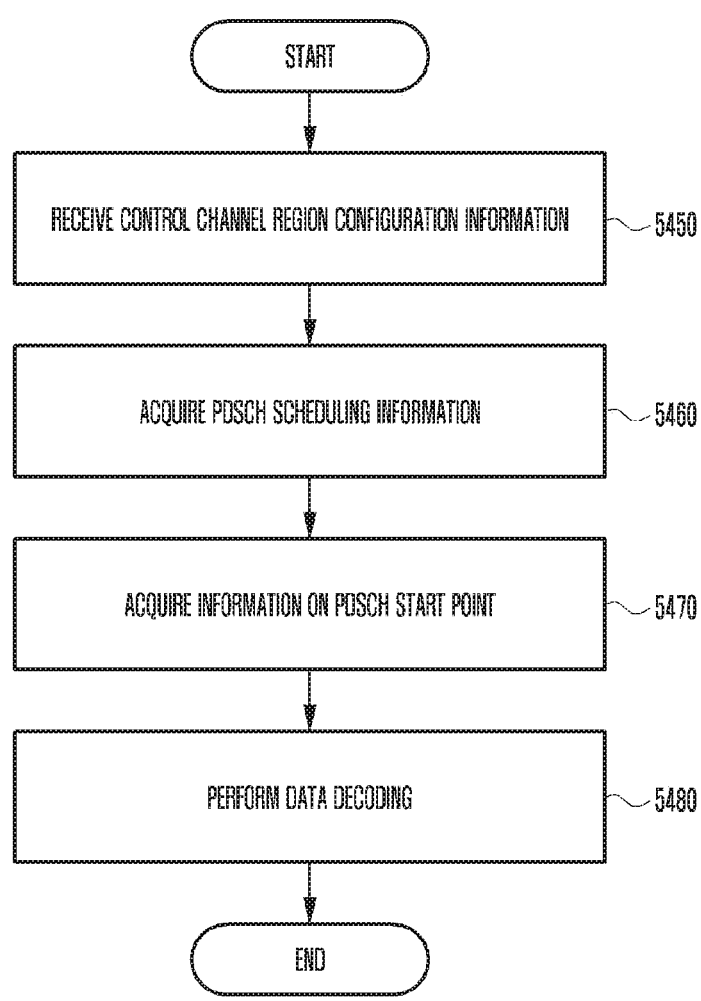

FIGS. 54A and 54B are diagrams illustrating base station and terminal procedures according to the (4-1-5)-th embodiment of the present disclosure.

First, referring to FIG. 54A, a base station procedure according to the present disclosure will be described. The base station configures a control channel region, and transmits corresponding information to the terminal (5400). At operation 5410, the base station schedules the PDSCH, and at operation 5420, the base station may add an indicator for the PDSCH start point to the DCI to be transmitted. Thereafter the base station transmits the scheduled data on the PDSCH (5430).

Next, referring to FIG. 54B, a terminal procedure according to the present disclosure will be described. The terminal receives control channel region configuration information (5450), and acquires frequency-axis scheduling information of the PDSCH from its control channel (5460). At operation 5470, the terminal may additionally acquire information on the start point that is the time-axis scheduling information, and may receive and decode the PDSCH based on the information (5480).

Next, a downlink control channel according to the (4-2)-th embodiment of the present disclosure.

(4-2)-th Embodiment

Before describing the (4-2)-th embodiment, DCI will be described in more detail. As described above, in accordance with data transmission type and purpose, various DCI formats exist, and among them, DCI format 2C that is one of DCI formats for transmitting downlink scheduling allocation information will be described as an example. The DCI format 2C includes scheduling allocation information for the PDSCH supporting closed-loop type multi-antenna transmission for 8 layers at maximum. More specifically, the DCI format 2C includes the following messages.

Carrier indicator
Resource allocation header
Resource block allocation

Power control command for PUCCH
Downlink allocation index
HARQ process number
RS configuration information: antenna port, scrambling sequence, and the number of layers
Sounding reference signal (SRS) request
MCS for transport block 1, new data indicator, and redundancy version
MCS for transport block 2, new data indicator, and redundancy version
(When being transmitted on EPDCCH) HARQ-ACK resource offset During transmission of downlink data, the terminal acquires the control information by first decoding the control channel. The terminal can be aware of the location at which its PDSCH is allocated from the resource block allocation information, and can decode data based on the MCS and other multi-antenna configuration information.

Figure 55:
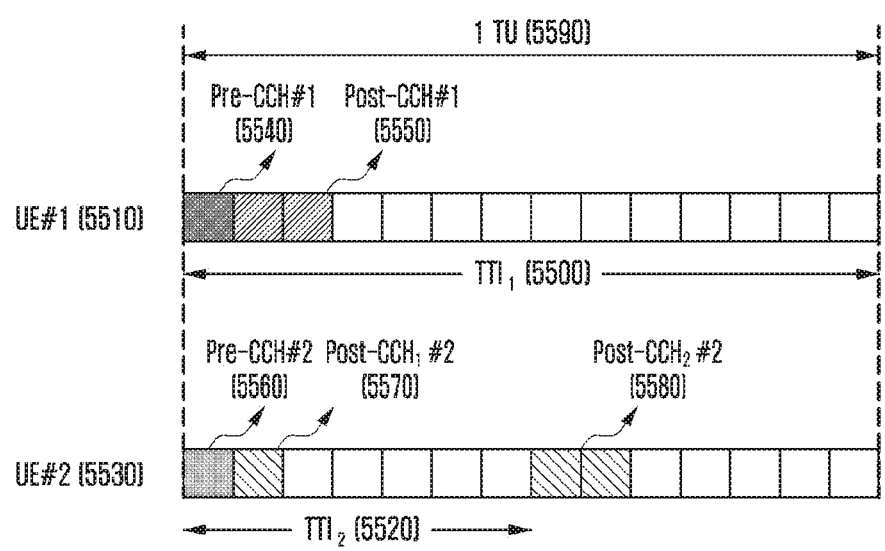
FIG. 55 is a diagram illustrating the (4-2)-th embodiment of the present disclosure.

FIG. 55 is a diagram illustrating the (4-2)-th embodiment of the present disclosure.

FIG. 55 illustrates a subframe structure of terminal #1 5510 having TTI length of $TTI_1$ 5500 and terminal #2 5530 having $TTI_2$ 5520. Referring to FIG. 55, the downlink control channel according to the (4-2)-th embodiment of the present disclosure is composed of a pre-control channel (Pre-CCH) and a post-control channel (Post-CCH). The subframe structure of terminal #1 5510 exemplifies allocation of the control channel if the length of $TTI_1$ 5500 is equal to 1 TU 5590. Referring to FIG. 55, Pre-CCH #1 5540 of terminal #1 5510 may be allocated to the first OFDM symbol, and Post-CCH #1 5550 may be allocated to the second and third OFDM symbols. In case of terminal #1 5510, the length of TTI is equal to the length of TU, and thus one control channel can be configured for 1 TU.

The subframe structure of terminal #2 5530 exemplifies allocation of the control channel if the length of $TTI_2$ 5520 is smaller than 1 TU. In this case, Pre-CCH #2 5560 of terminal #2 5530 is allocated to the first OFDM symbol of the first TTI, but is not allocated to the second TTI. As a result, in the same manner as terminal #1 5510, one Pre-CCH #2 5560 of terminal #2 5530 is configured for 1 TU. In contrast, the post-control channel of terminal #2 5530 may be configured one by one for each TTI, and in an example of FIG. 55, Post-$CCH_1$ #2 5570 is allocated to the second OFDM symbols of the second TTI, and Post-$CCH_2$ #2 5580 is allocated to the first and second OFDM symbols of the second TTI. As a result, if terminal #1 5510 and terminal #2 5530 are FD-multiplexed to be transmitted, the pre-control channel may be transmitted through the first OFDM symbol of ITU in the same manner.

Figure 56:
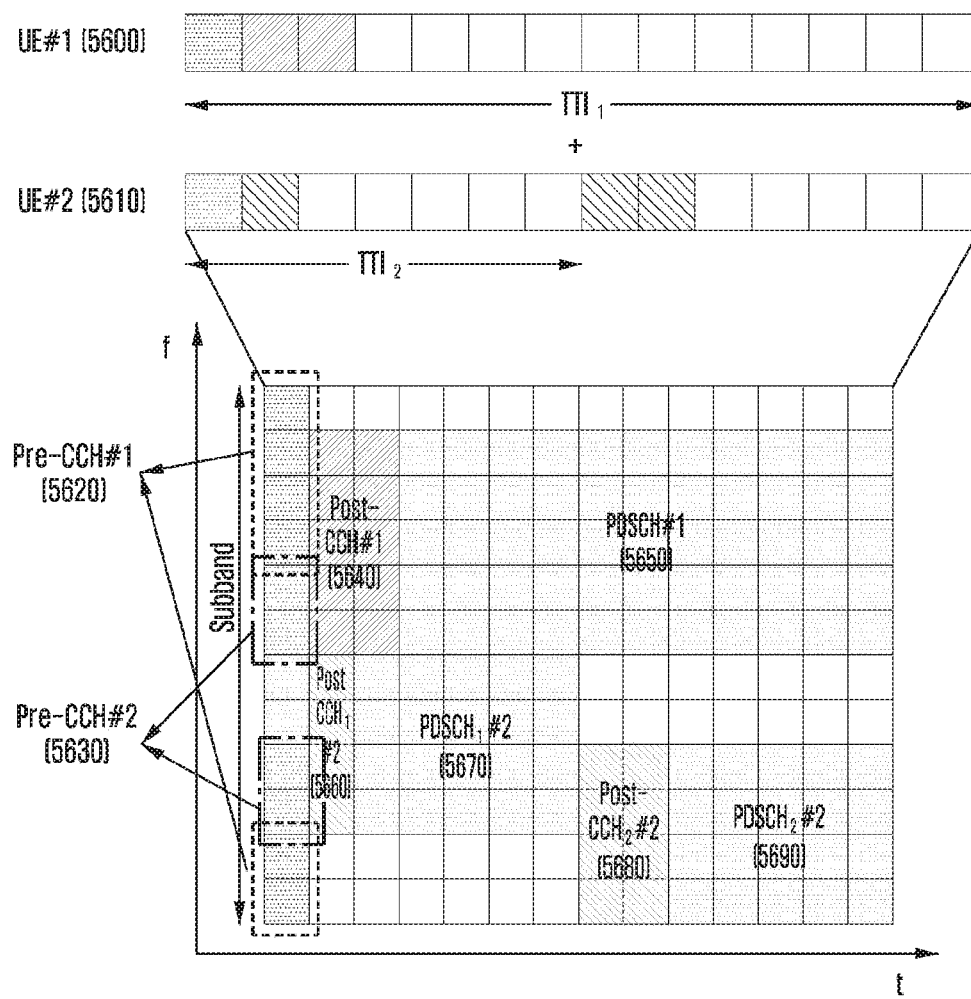
FIG. 56 is a diagram illustrating an example of time-frequency resource allocation for a control channel according to the (4-2)-th embodiment of the present disclosure.

FIG. 56 is a diagram illustrating an example of time-frequency resource allocation for a control channel according to the (4-2)-th embodiment of the present disclosure.

FIG. 56 illustrates an example of time and frequency allocation of the control channel with respect to terminal #1 5510 and terminal #2 5530 considered in FIG. 55. Referring to FIG. 56, Pre-CCH #1 5620 that is the pre-control channel of terminal #1 5600 and Pre-CCJ #2 5630 that is the pre-control channel of terminal #2 5610 may be allocated to a partial region of the subband of the first OFDM symbol. The pre-control channels 5620 and 5630 illustrated in FIG. 56 have basically the same structure as the structure of the control channel according to the (4-1)-th embodiment of the present disclosure. The pre-control channels may be configured with different sizes in consideration of various kinds of system parameters corresponding to respective terminals or terminal groups based on the same basic unit of resource allocation as that explained with reference to FIG. 45. In this case, in allocating the time-axis resource of the pre-control channel, it is preferable to allocate the resource to the minimum OFDM symbols. This is advantageous to lower complexity of decoding by reducing the latency up to the control channel decoding through reception of the pre-control channel in possible short time and reducing the size of the region to be searched for blind decoding of the terminal. In an example of FIG. 56, The pre-control channels 5620 and 5630 of terminal #1 5600 and terminal #2 5610 are all allocated to one OFDM symbol. In the same manner as the (4-1)-th embodiment, the frequency-axis allocation of the pre-control channels 5620 and 5630 may be performed with different sizes in a specific region of the subband in accordance with the requirements of the terminal.

In the (4-2)-th embodiment of the present disclosure, the pre-control channel can be allocated with an independent resource, but the post-control channel is transmitted through the PDSCH (i.e., to a data region). In FIG. 56, Post-CCH #1 5640 of terminal #1 5600 is allocated to the same frequency resource as that of PDSCH #1 5650. In the same manner, in case of terminal #2 5610, Post-$CCH_1$ #2 5660 is allocated to the same frequency resource as that of $PDSCH_1$ #2 5670, and Post-$CCH_2$ #2 5680 is allocated to the same frequency resource as that of $PDSCH_2$ #2 5690. In other words, the post-control channel may be mapped to a partial region of PDSCH that is a data channel to be transmitted.

The control channel according to the (4-2)-th embodiment of the present disclosure is composed of two control channels, and the respective control channels have different mapping types. According to the (4-2)-th embodiment, in the same manner as the (4-1)-th embodiment, it is possible to variably allocate the control channel to match the service requirements of the respective terminals. In addition, in case of the post-control channel resource allocation, in the same manner as the pre-control channel resource allocation, it is not preconfigured to specific time and frequency resources, but the resource can be allocated to various locations in accordance with PDSCH allocation/non-allocation. Through this, the post-control channel has the advantage that it can be freely allocated without limiting the scheduling for the PDSCH in the remaining portion excluding the resource on which the pre-control channel is allocated. Accordingly, as compared with the (4-1)-th embodiment, more flexible system operation becomes possible.

In case of the pre-control channel, the respective terminals can be aware of the location of the control region thereof by signaling the configured control region to the terminal through the base station, whereas in case of the post-control channel, it is mapped to a part of the resource region of scheduled PDSCH to be transmitted, and thus indication of the resource allocation may be necessary. Accordingly, there is a need for detailed base station and terminal operations for configuring the pre-control channel and the post-control channel, and various embodiments thereof are described below.

(4-2-1)-th Embodiment

Figure 57:
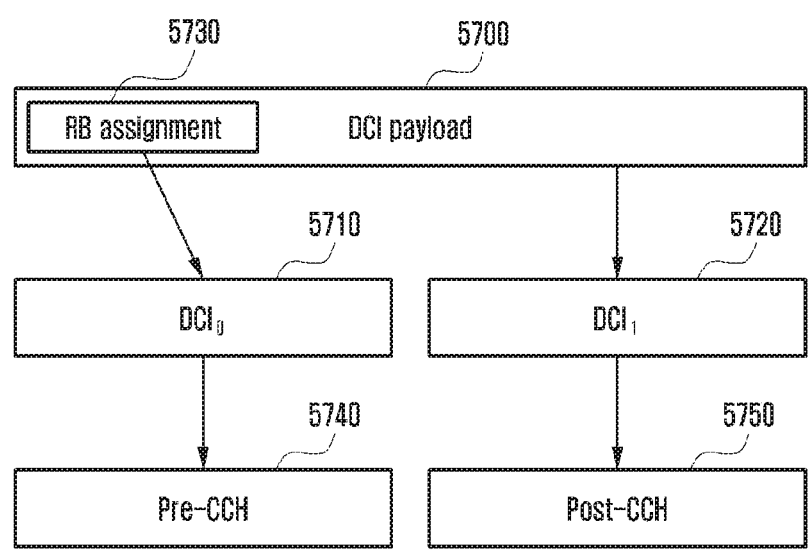
FIG. 57 is a diagram illustrating an example of DCI division according to the (4-2-1)-th embodiment of the present disclosure.

FIG. 57 is a diagram illustrating an example of DCI division according to the (4-2-1)-th embodiment of the present disclosure.

Referring to FIG. 57, the whole DCI 5700 may be divided into $DCI_0$ 5710 and $DCI_1$ 5720. In an example of FIG. 57, $DCI_0$ 5710 includes resource block allocation information 5730 for PDSCH, and $DCI_1$ 5720 includes various downlink control information for data decoding and terminal operation, such as other MCS, new data indicator, and redundancy version. $DCI_0$ 5710 may be transmitted through the pre-control channel 5740, and $DCI_1$ 5720 may be transmitted through the post-control channel 5750.

According to the (4-2-1)-th embodiment illustrated in FIG. 57, the pre-control channel 5740 includes PDSCH resource allocation information 5730. Accordingly, the terminal can be aware of the PDSCH location by decoding the pre-control channel, and this is the same as a case where the location of the post-control channel 5750 transmitted through the PDSCH can be known. As a result, since the terminal is aware of the resource allocation information for the post-control channel 5750 that is indicated by the pre-control channel 5740, it is not necessary to transmit the resource allocation information from a predetermined region, differently from the pre-control channel. Accordingly, more flexible control channel configuration becomes possible.

Figure 58A:
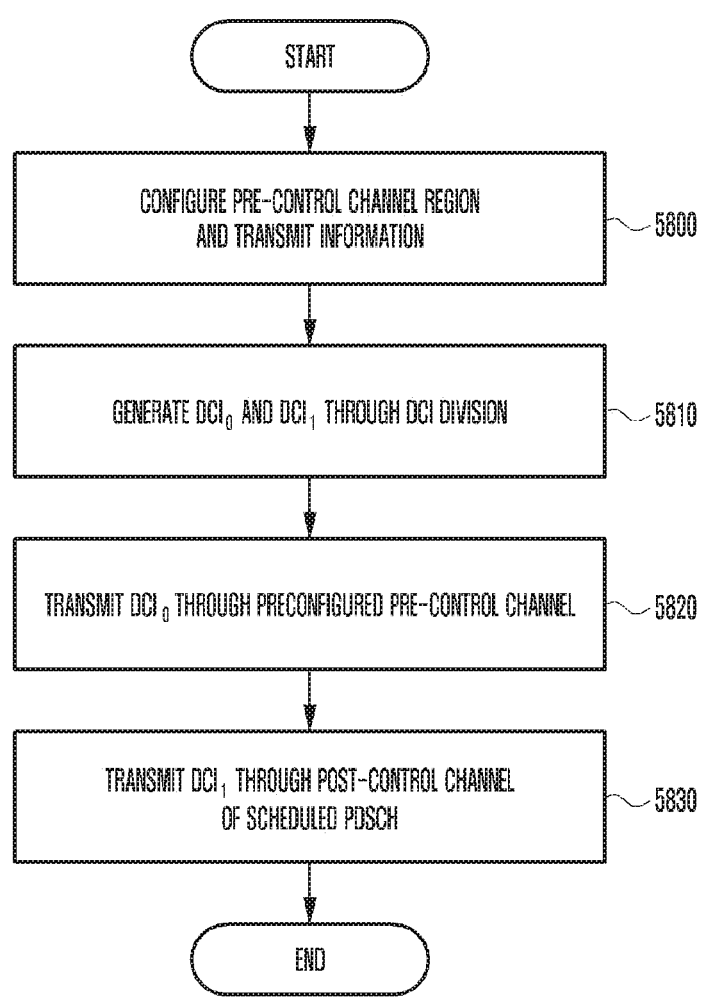
FIGS. 58A and 58B are diagrams illustrating base station and terminal procedures according to the (4-2-1)-th embodiment of the present disclosure.
Figure 58B:
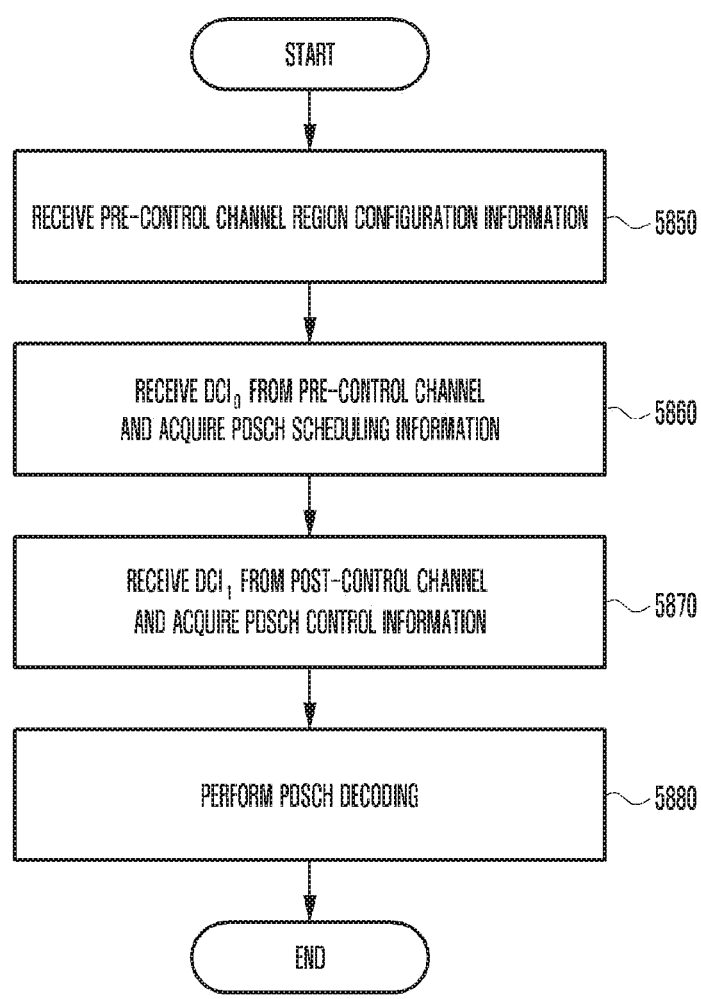

FIGS. 58A and 58B are diagrams illustrating base station and terminal procedures according to the (4-2-1)-th embodiment of the present disclosure.

First, referring to FIG. 58A, a base station procedure according to the present disclosure will be described. At operation 5800, the base station perform region configuration for the pre-control channel and information transmission. At operation 5810, the base station may generate $DCI_0$ and $DCI_1$ through DCI division. At operation 5820, the base station transmit $DCI_0$ to the base station through a preconfigured pre-control channel. At operation 5830, the base station transmits $DCI_1$ to the terminal through the post-control channel mapped to the scheduled PDSCH.

Next, referring to FIG. 58B, a terminal procedure according to the present disclosure will be described. At operation 5850, the terminal receives configuration information on the pre-control channel region. At operation 5860, the terminal receives $DCI_0$ by decoding the pre-control channel, and acquires scheduling information for the PDSCH therefrom. At operation 5870, the terminal may receive $DCI_1$ by decoding the post-control channel allocated to a partial region among scheduled PDSCH, and may acquire the remaining downlink control information therefrom. The terminal receives the PDSCH in accordance with the acquired downlink control information, and performs decoding (5880).

(4-2-2)-th Embodiment

Figure 59:
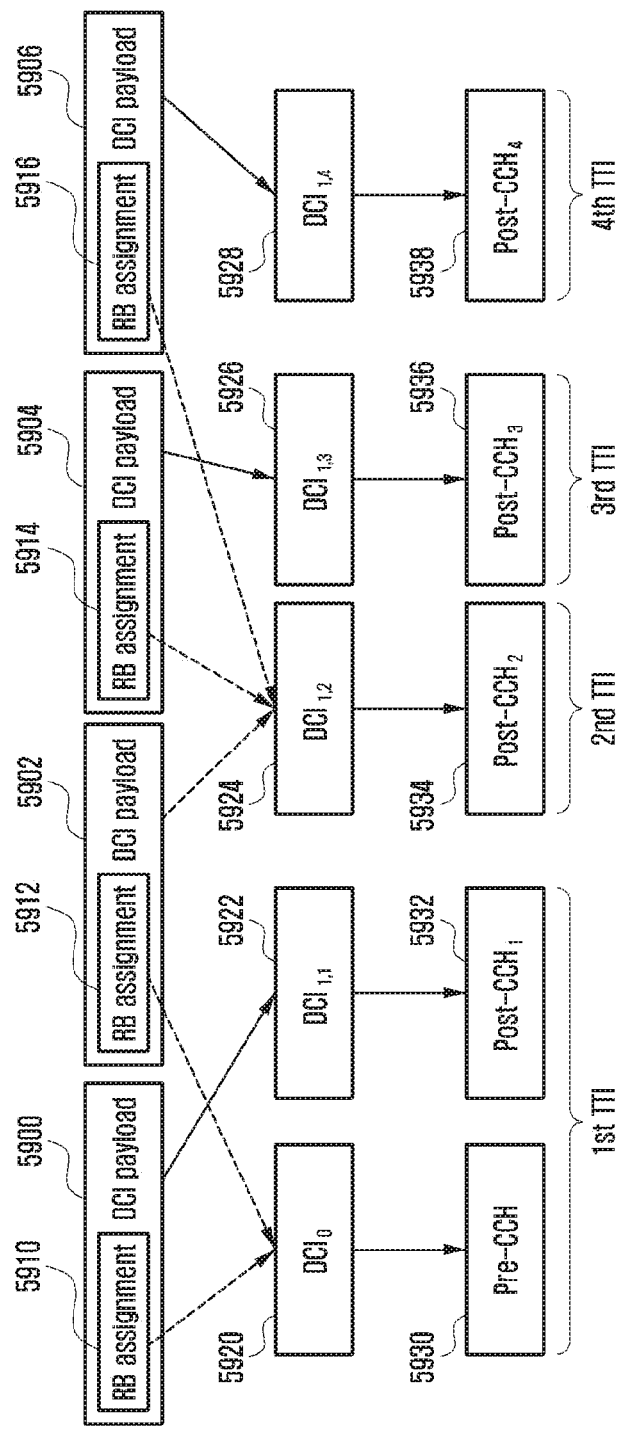
FIG. 59 is a diagram illustrating an example of DCI division according to the (4-2-2)-th embodiment of the present disclosure.

FIG. 59 is a diagram illustrating an example of DCI division according to the (4-2-2)-th embodiment of the present disclosure.

FIG. 59 illustrates an example in which total 4 DCIs 5900, 5902, 5904, and 5906 are divided. FIG. 59 exemplifies a case where necessary control channels are transmitted four times in total in a state where services corresponding to 4 TTIs should be transmitted for 1 TU. Referring to FIG. 59, The four DCIs may be divided into one $DCI_0$ 5920 and four $DCI_1$ is 5922, 5924, 5926, and 5928. PDSCH resource allocation information 5910 in the first DCI 5900 and PDSCH resource allocation information 5912 in the second DCI 5902 may be divided into $DCI_0$ 5920 messages. In the same manner, PDSCH resource allocation information 5914 in the third DCI 5906 and PDSCH resource allocation information 5916 in the fourth DCI 5906 are divided into $DCI_{1,2}$ 5924. Further, the remaining DCI information excluding the resource allocation information for 4 PDSCHs in total may be divided into messages of $DCI_{1,1}$ 5922, $DCI_{1,2}$ 5924, $DCI_{1,3}$ 5926, and $DCI_{1,4}$ 5928.

In this case, $DCI_0$ 5920 is mapped to the pre-control channel 5930 transmitted at the first TTI, and $DCI_{1,1}$ 5922 is mapped to the post-control channel 5932 transmitted at the first TTI. In the same manner, $DCI_{1,2}$ 5924, $DCI_{1,3}$ 5926, and $DCI_{1,4}$ 5928 are mapped to Post-$CCH_2$ 5934, Post-$CCH_3$ 5936, and Post-$CCH_4$ 5938 that are post-control channels corresponding to the following TTIs to be transmitted. Here, the important point is that both the pre-control channel and the post-control channel are transmitted only at the first TTI, and only the post-control channel is transmitted at the subsequent TTI. This may be considered as the same case as the case of terminal #2 5530 and 5610 in FIGS. 55 and 56.

In the (4-2-2)-th embodiment of the present disclosure, unlike the (4-2-1)-th embodiment as described above, several control channels can be transmitted for 1 TU. In this case, it is important to properly divide the plurality of DCIs transmitted for 1 TU. In the (4-2-2)-th embodiment, PDSCH resource allocation information may be mapped to not only $DCI_0$ (mapped to the pre-control channel) but also $DCI_1$ (mapped to the post-control channel). In transmitting services corresponding to a plurality of TTIs, if resource allocation information for all PDSCHs is mapped to $DCI_0$, overhead weighted to $DCI_1$ becomes too high, and this may exceed the transmission capacity provided by $DCI_0$. In consideration of this, FIG. 59 illustrates an example in which PDSCH resource allocation information corresponding to the third and fourth TTIs are divided into $DCI_{1,2}$ 5924 to be transmitted. If the terminal operates in accordance with the example illustrated in FIG. 59, it can be aware of the resource regions of Post-$CCH_1$ 5932 and Post-$CCH_2$ 5934 from the pre-control channel 5930, and can be aware of the resource regions of Post-$CCH_3$ 5936 and Post-$CCH_4$ 5938 from Post-$CCH_2$ 5934. Through other control signals, the terminal can successfully perform the decoding of 4 PDSCHs in total.

Figure 60A:
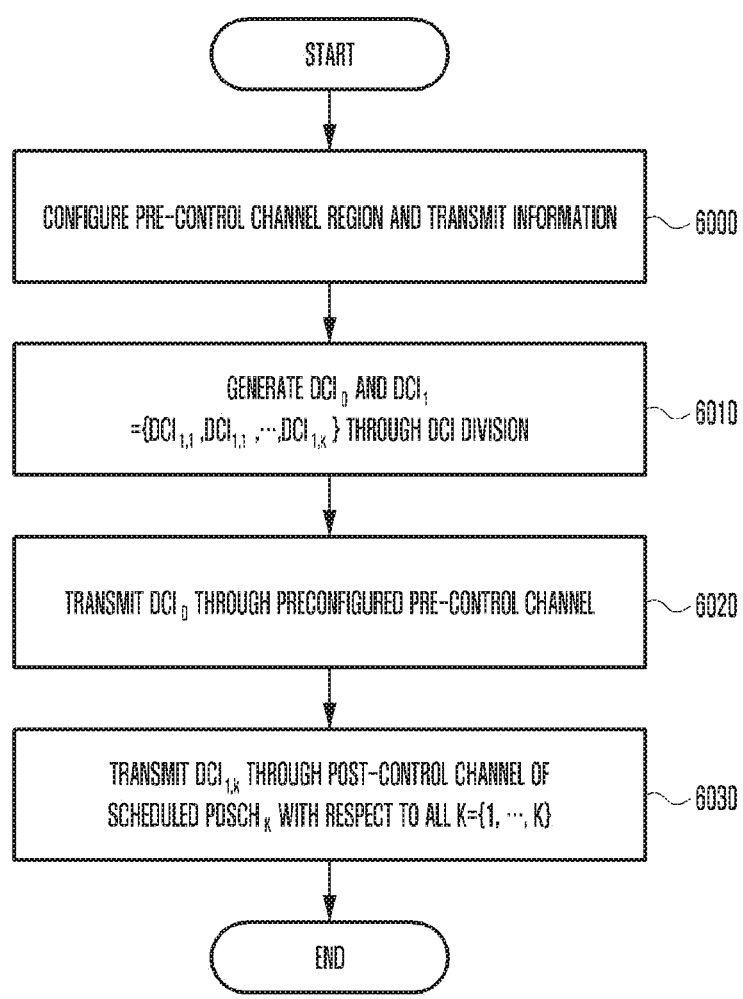
FIGS. 60A and 60B are diagrams illustrating base station and terminal procedures according to the (4-2-2)-th embodiment of the present disclosure.
Figure 60B:
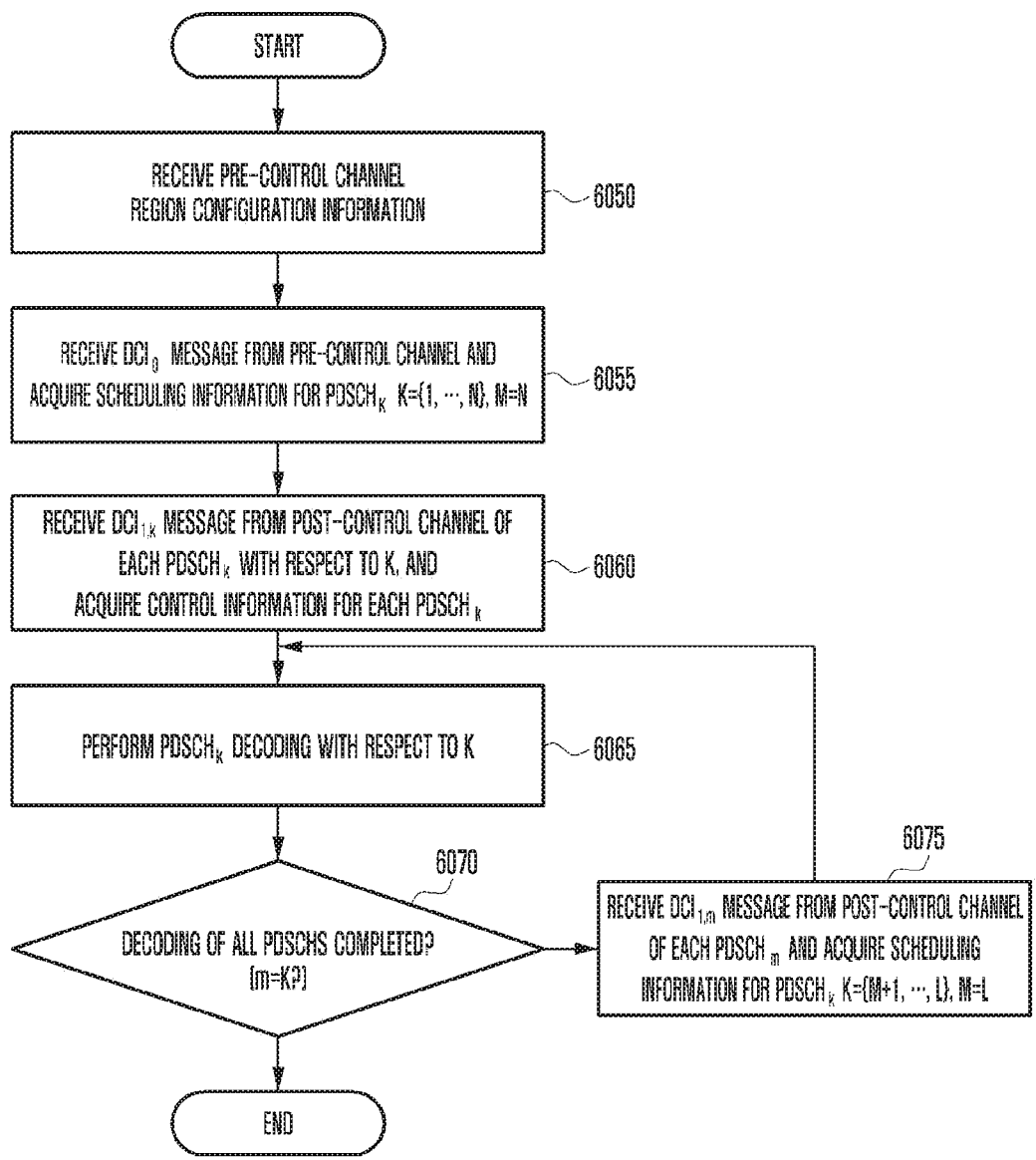

FIGS. 60A and 60B are diagrams illustrating base station and terminal procedures according to the (4-2-2)-th embodiment of the present disclosure. In FIGS. 60A and 60B, it is assumed that K PDSCHs are transmitted for 1 TU.

First, referring to FIG. 60A, a base station procedure according to the present disclosure will be described. At operation 6000, the base station configures a region for the pre-control channel, and transmits information on this to a terminal. At operation 6010, the base station generates one $DCI_0$ and K $DCI_1$ messages through DCI division. In this case, $DCI_0$ may include resource allocation information of $PDSCH_k$ (k=1, ..., n). The base station transmits $DCI_0$ message through the preconfigured pre-control channel (6020), and transmits $DCI_{1,k}$ through the post-control channel mapped to K $PDSCH_k$ (6030).

Next, referring to FIG. 60B, a terminal procedure according to the present disclosure will be described. At operation 6050, the terminal receives region configuration information on the pre-control channel. The terminal can acquire scheduling information on $PDSCH_k$ (k=1, ..., n) from $DCI_0$ of the pre-control channel (6055). At operation 6060, the terminal receives $DCI_{1,k}$ messages from the post-control channels of the respective $PDSCH_k$, and acquires the remaining control information on the respective $PDSCH_k$. At operation 6065, the terminal performs decoding of $PDSCH_k$ using the control information. The terminal determines whether k value is equal to n (6070). That is, the terminal determines whether all PDSCHs have been decoded. If not, the terminal acquires scheduling information on $PDSCH_k$ existing thereafter from the last $PDSCH_k$ having the scheduling information, that is, $DCI_{1,m}$ existing in $PDSCH_m$ (6075). The terminal repeats the above-described process until the decoding of all PDSCHs is completed. If decoding of all PDSCHs is completed, the terminal ends its operation.

The above-described (4-2-2)-th embodiment presents a specific example for easy explanation of the technical contents of the present disclosure and understanding of the present disclosure, and thus other modifications based on the technical idea of the present disclosure can be embodied without limit.

(4-2-3)-th Embodiment

Figure 61:
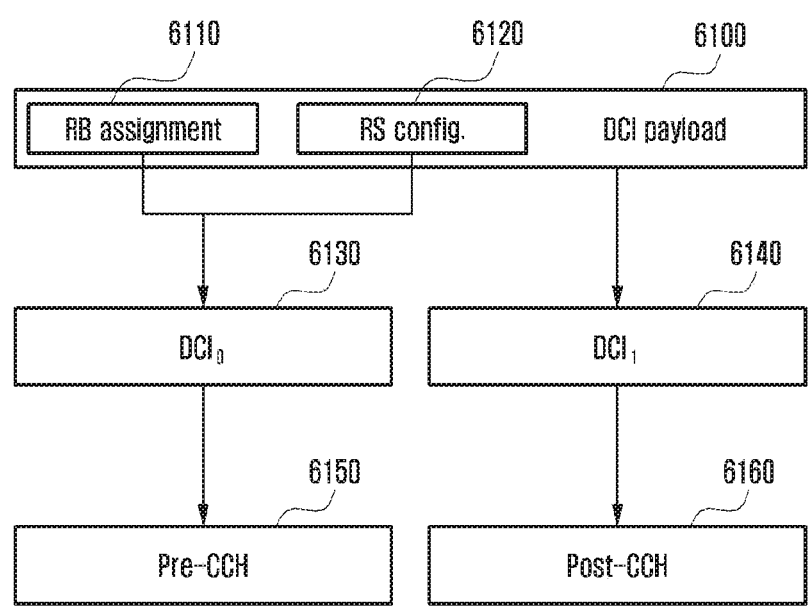
FIG. 61 is a diagram illustrating an example of DCI division according to the (4-2-3)-th embodiment of the present disclosure.

FIG. 61 is a diagram illustrating an example of DCI division according to the (4-2-3)-th embodiment of the present disclosure.

According to an example illustrated in FIG. 61, PDSCH resource allocation information 6110 for PDSCH and reference signal (RS) configuration information (or multi-antenna configuration information) 6120 may be divided from the whole DCI 6100. It is exemplified that the PDSCH resource allocation information 6110 and the multi-antenna configuration information 6120 are divided into $DCI_0$ 6130, and other remaining control information are divided into $DCI_1$ 6140. $DCI_0$ 6130 is mapped to the pre-control channel 6150 to be transmitted, and $DCI_1$ 6140 is mapped to the post-control channel 6160 to be transmitted.

According to an example illustrated in FIG. 61, in the (4-2-3)-th embodiment, unlike the (4-2-1)-th embodiment or the (4-2-2)-th embodiment, not only the PDSCH resource allocation information but also the RS configuration information is divided into $DCI_0$. As described above, the RS configuration information may include information on antenna port, scrambling sequence, and layer numbers.

Figure 62:
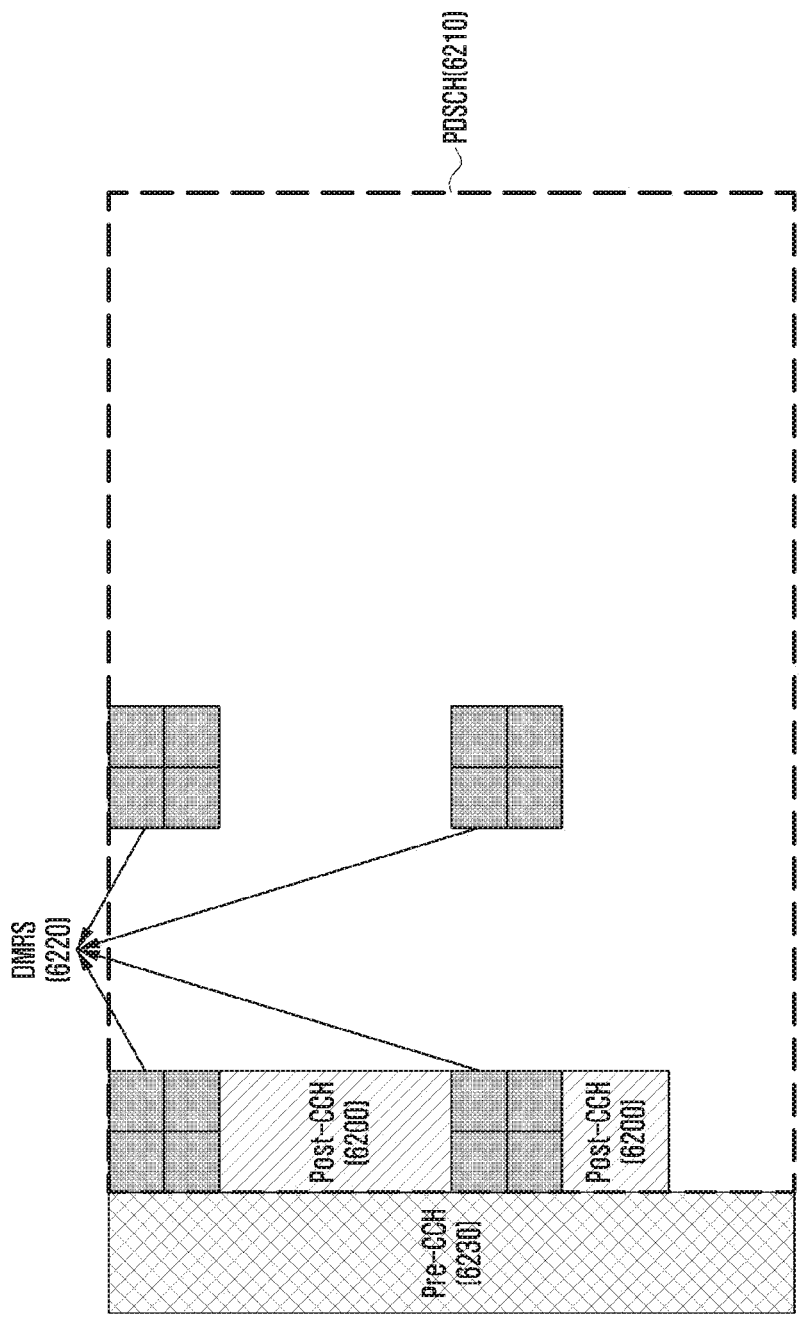
FIG. 62 is a diagram illustrating an example of a frame structure according to the (4-2-3)-th embodiment of the present disclosure.

FIG. 62 is a diagram illustrating an example of a frame structure according to the (4-2-3)-th embodiment of the present disclosure.

In FIG. 62, a post-control channel 6200, PDSCH 6210 on which the post-control channel is transmitted, DMRS 6220 that is a reference signal required for decoding, and a pre-control channel 6230 are illustrated. As illustrated in FIG. 62, the downlink control channel described in the present disclosure can basically support decoding based on the DMRS. For example, since the pre-control channel 6230 is configured on independent time and frequency resources, an individual reference signal for decoding the pre-control channel 6230 is necessary. If the post-control channel 6200 is transmitted in the same manner as the pre-control channel 6230, an individual DMRS for the post-control channel 6200 is necessary. However, in the (4-2)-th embodiment of the present disclosure, since the post-control channel 6200 is mapped to a partial region of the PDSCH to be transmitted, the post-control channel may be transmitted in the same manner as the PDSCH. In this case, by sharing and using the DMRS 6220 of the PDSCH 6210 without configuring individual DMRS on the post-control channel 6200, the terminal can decode the post-control channel 6200. In this case, additional RS for the post-control channel 6200 is not required, and thus RS overhead can be reduced.

In order for the post-control channel 6200 to use the DMRS 6220 of the PDSCH 6210, configuration information on the DMRS 6220 should be first received. Accordingly, as illustrated in FIG. 61, the RS configuration information is divided into $DCI_0$, and is transmitted through the pre-control channel 6230, and the terminal can acquire DMRS configuration information for decoding the post-control channel by decoding the pre-control channel 6230.

Figure 63A:
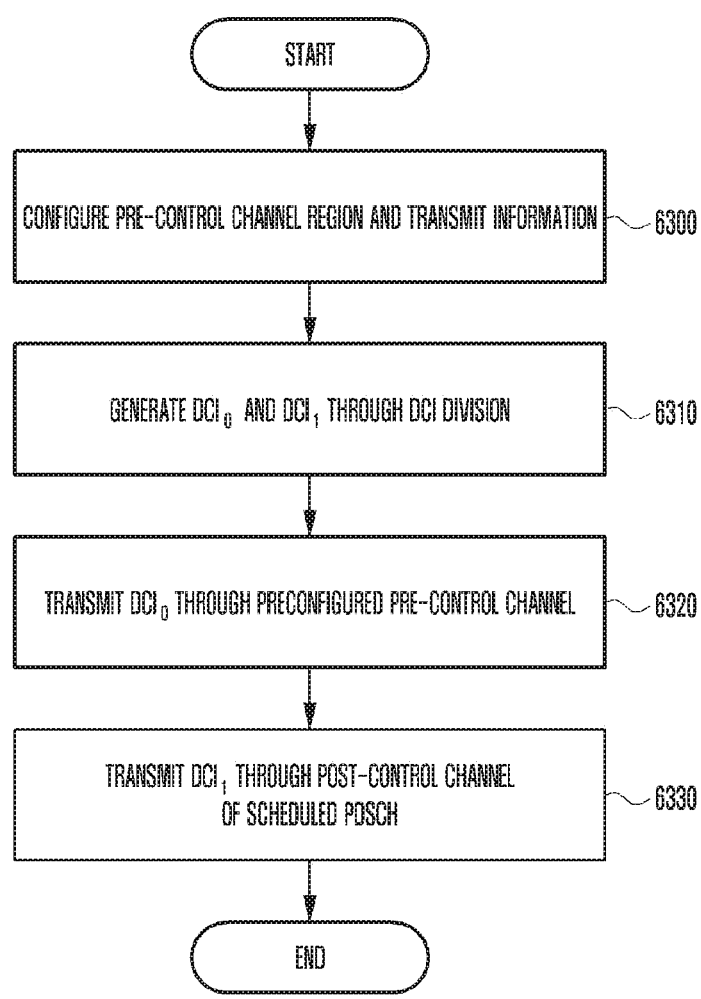
FIGS. 63A and 63B are diagrams illustrating base station and terminal procedures according to the (4-2-3)-th embodiment of the present disclosure.
Figure 63B:
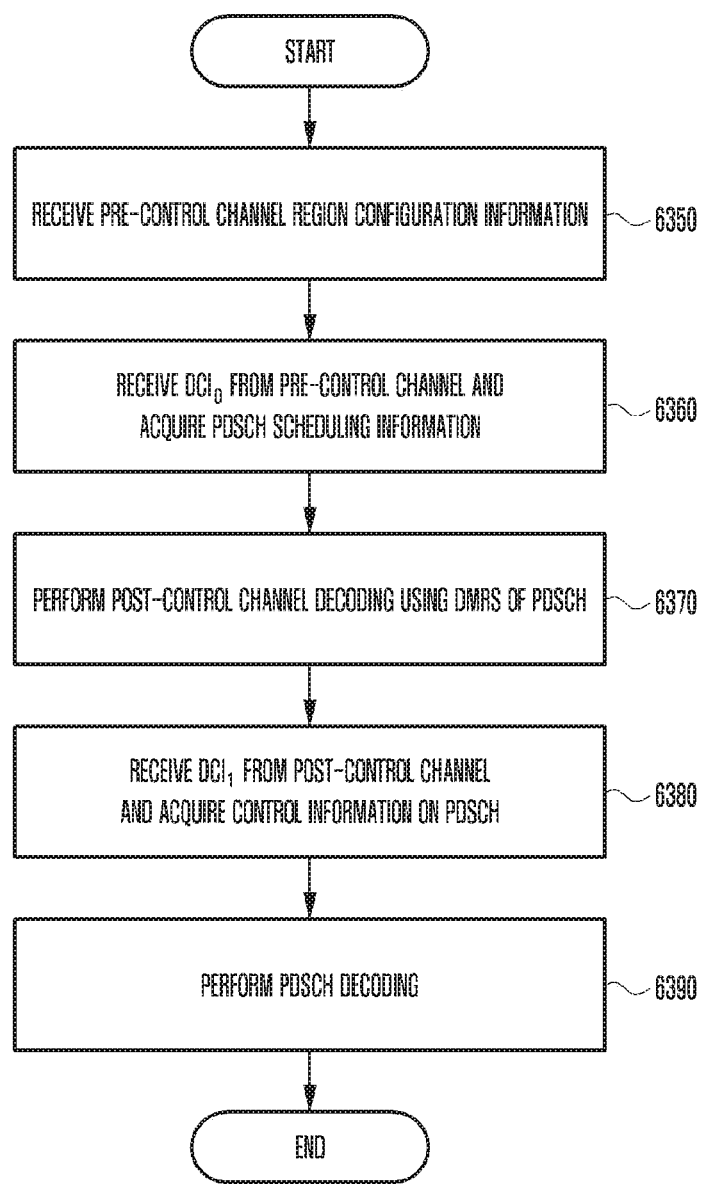

FIGS. 63A and 63B are diagrams illustrating base station and terminal procedures according to the (4-2-3)-th embodiment of the present disclosure.

First, referring to FIG. 63A, a base station procedure according to the present disclosure will be described. At operation 6300, the base station configures a region for the pre-control channel, and transmits information to a terminal. At operation 6310, the base station generates $DCI_0$ and $DCI_1$ by dividing DCI. The base station transmits $DCI_0$ through the pre-control channel (6320), and transmits $DCI_1$ through the post-control channel of the scheduled PDSCH (6330).

Next, referring to FIG. 63B, a terminal procedure according to the present disclosure will be described. At operation 6350, the terminal receives pre-control channel region configuration information. The terminal receives $DCI_0$ from its pre-control channel, and acquires its own PDSCH scheduling information and RS configuration information from the received information (6360). At operation 6370, the terminal performs decoding of the post-control channel using the RS configuration information acquired from $DCI_1$. The terminal acquires $DCI_1$ from the post-control channel, and through this, acquires the remaining control information on the PDSCH (6380). Thereafter, the terminal can perform decoding of the PDSCH based on the control information.

(4-2-4)-th Embodiment

A CRC bit is inserted in order to identify whether DCI error has occurred. More specifically, in case where the size of a payload corresponding to a DCI message is of A bits, a CRC parity bit having the size of L bits may be inserted, and the whole bit sequence having the length of B(=A+L) bits in total passes through a channel encoder to generate coded bits. Additional scrambling is performed with respect to the bit corresponding to the CRC when the CRC is inserted. As an example, the CRC bit may be scrambled through modulo operation with the bit sequence corresponding to a radio network temporary identifier (RNTI). The terminal receives the DCI through monitoring of the PDCCH, performs decoding, and identifies whether an error has occurred in the decoded DCI through the CRC operation. According to the (4-2-1)-th embodiment, the (4-2-2)-th embodiment, and the (4-2-3)-th embodiment, the whole DCI may be divided into $DCI_0$ and $DCI_1$ and then transmitted through the pre-control channel and the post-control channel. In this case, the terminal should be able to identify whether an error has occurred with respect to $DCI_0$ received through the pre-control channel and $DCI_1$ received through the post-control channel. Accordingly, the CRC (called $CRC_0$) for $DCI_0$ and the CRC (called $CRC_1$) for $DCI_1$ should be inserted. In the present disclosure, the following methods for inserting CRC are proposed.

As the first method, the base station may insert $CRC_0$ with respect to the payload bit sequence of $DCI_0$, and may insert $CRC_1$ with respect to the payload bit sequence of $DCI_1$. According to the first method, identification of whether an error has occurred in respective DCI messages being divided and transmitted is independently performed with respect to $DCI_0$ and $DCI_1$. More specifically, if the error occurrence is identified through $CRC_0$, this means that error exists in the decoded $DCI_0$, and if the error occurrence is identified through $CRC_1$, this means that error exists in the decoded $DCI_1$. If it is assumed that sizes of $CRC_0$ and $CRC_1$ are bits of $L_0$ and $L_1$, respectively, the values of $L_0$ and $L_1$ may be differently configured in consideration of various system parameters (e.g., requirements for pre-control channel and post-control channel). In case where the base station performs scrambling with respect to $CRC_0$ and $CRC_1$, the scrambling can be performed using the whole or a part of the RNTI in accordance with the values of $L_0$ and $L_1$.

As the second method, $CRC_0$ is inserted into the payload bit sequence of $DCI_0$, and $CRC_1$ is generated with respect to the whole payload bit sequences of $DCI_0$ and $DCI_1$. The generated $CRC_1$ may be used as CRC of $DCI_1$. According to the second method, $CRC_0$ may be used to identify whether an error has occurred with respect to $DCI_0$, and $CRC_1$ may be used to identify whether an error has occurred with respect to the whole DCI bits (i.e., $DCI_0+DCI_1$). More specifically, if the error occurrence is identified through $CRC_0$, this means that error exists in the decoded $DCI_0$, and if the error occurrence is identified through $CRC_1$, this means that error exists in the decoded $DCI_0$ or $DCI_1$. According to the second method, the error occurrence identification is performed twice with respect to $DCI_0$, and thus false alarm with respect to $DCI_0$ can be strongly prevented. Here, the term "false alarm" means that an error has actually occurred, but the terminal determines that the error has not occurred.

As an example, if an error has actually occurred, but the error occurrence is not sensed through identification of $CRC_0$, that is, the false alarm occurs with respect to $DCI_0$, the terminal performs decoding of $DCI_1$, and then identifies the error occurrence through $CRC_1$. Here, $CRC_1$ detects the error in case where the error exists in $DCI_0$, $DCI_1$, and both $DCI_0$ and $DCI_1$. Accordingly, in case of applying the second method, the terminal can identify the error occurrence once more through the post-control channel decoding even if the false alarm occurs in the pre-control channel. If it is assumed that sizes of $CRC_0$ and $CRC_1$ are $L_0$ and $L_1$, respectively, the values of $L_0$ and $L_i$ may be differently configured in consideration of various system parameters (e.g., requirements for pre-control channel and post-control channel). In case where the base station performs scrambling with respect to $CRC_0$ and $CRC_1$, the scrambling can be performed using the whole or a part of the RNTI in accordance with the values of $L_0$ and $L_1$.

Figure 64:
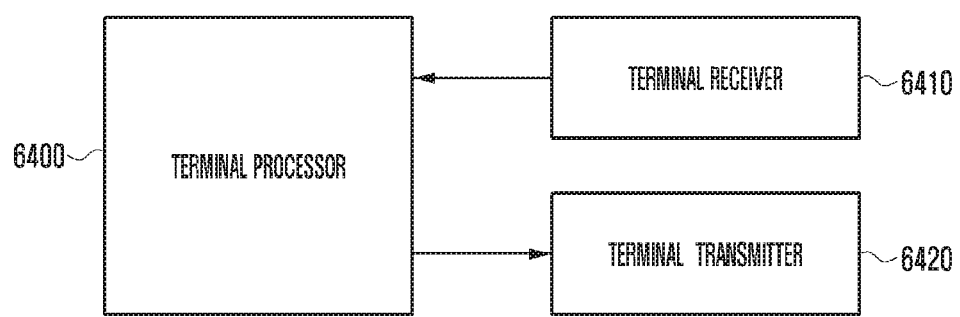
FIG. 64 is a block diagram illustrating the internal structure of a terminal according to an embodiment of the present disclosure.
Figure 65:
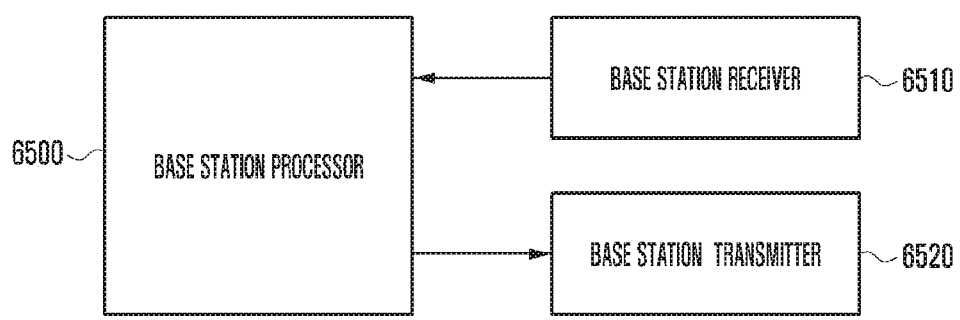
FIG. 65 is a block diagram illustrating the internal structure of a base station according to an embodiment of the present disclosure.

FIGS. 64 and 65 are diagrams illustrating the configurations of a terminal and a base station for performing the above-described embodiments. In the embodiments of the present disclosure, transmission/reception methods by a base station and a terminal for performing configuration of the corresponding downlink control channel and transmission/reception operations have been described, and in order perform this, base station and terminal transmitters, receivers, and processors should operate in accordance with the respective embodiments.

Specifically, FIG. 64 is a block diagram illustrating the internal structure of a terminal according to an embodiments of the present disclosure. As illustrated in FIG. 64, a terminal according to the present disclosure may include a terminal receiver 6410, a terminal transmitter 6420, and a terminal processor 6400.

The terminal processor 6400 may control a series of processes so that the terminal can operate according to the embodiments of the present disclosure. For example, the terminal processor 6400 may differently control the terminal operation in accordance with the downlink control channel configuration information according to an embodiment of the present disclosure.

In an embodiment of the present disclosure, the terminal receiver 6410 and the terminal transmitter 6420 may be commonly called a transceiver. The transceiver may transmit and receive signals with a base station, and the signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the terminal processor 6400, and transmit the signal output from the terminal processor 6400 through the radio channel.

FIG. 65 is a block diagram illustrating the internal configuration of a base station according to an embodiment of the present disclosure. As illustrated in FIG. 65, a base station according to the present disclosure may include a base station processor 6500, a base station receiver 6510, and a base station transmitter 6520.

The base station processor 6500 may control a series of processes so that the base station can operate according to the above-described embodiments of the present disclosure. For example, the base station processor 6500 may differently control the base station operation in accordance with the downlink control channel configuration information according to an embodiment of the present disclosure. Further, the base station controller may perform scheduling with respect to the downlink control channel and data channel, and may indicate the configuration information on the downlink control channel to the terminal.

In an embodiment of the present disclosure, the base station receiver 6510 and the base station transmitter 6520 may be commonly called a transceiver. The transceiver may transmit and receive signals with a terminal. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the base station processor 6500, and transmit the signal output from the base station processor 6500 through the radio channel.

On the other hand, embodiments of the present disclosure have been presented to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein. Further, the respective embodiments may be combined with each other to be operated.

The invention claimed is:

1. A method performed by a base station in a wireless communication system, the method comprising:
   transmitting information on a plurality of control channel resources on radio resource control (RRC) signaling, the information on the plurality of control channel resources indicating a specific pattern on a frequency domain and on a time domain of each control channel resource;
   transmitting, to a terminal, downlink control information (DCI), the DCI including resource allocation information indicating a resource for downlink data and an indicator for a rate matching of the downlink data, wherein the indicator indicates whether a control channel resource which overlaps with the resource for the downlink data is unavailable for the downlink data, and wherein the control channel resource is one of the plurality of control channel resources and is for another terminal; and transmitting the downlink data corresponding to the resource allocation information and the indicator, wherein in case that the indicator indicates that the control channel resource is unavailable for the downlink data, the downlink data is rate-matched not to be mapped on the control channel resource.

2. The method of claim 1, wherein in case that the indicator indicates the control channel resource is available for the downlink data, the downlink data is mapped on the control channel resource.

3. The method of claim 1, wherein the downlink data is not mapped on other control channel resources.

4. A method performed by a terminal in a wireless communication system, the method comprising:
- receiving information on a plurality of control channel resources on radio resource control (RRC) signaling, the information on the plurality of control channel resources indicating a specific pattern on a frequency domain and on a time domain of each control channel resource;
- receiving, from a base station, downlink control information (DCI), the DCI including resource allocation information indicating a resource for downlink data and an indicator for a rate matching of the downlink data, wherein the indicator indicates whether a control channel resource which overlaps with the resource for the downlink data is unavailable for the downlink data, and wherein the control channel resource is one of the plurality of control channel resources and is for another terminal; and
- receiving the downlink data based on the resource allocation information and the indicator, wherein in case that the indicator indicates that the control channel resource is unavailable for the downlink data, the downlink data is rate-matched not to be mapped on the control channel resource.

5. The method of claim 4, wherein in case that the indicator indicates that the control channel resource is available for the downlink data, the downlink data is mapped on the control channel resource.

6. The method of claim 4, wherein the downlink data is not mapped on other control channel resources.

7. A base station in a wireless communication system, the base station comprising:
- a transceiver; and
- a controller coupled with the transceiver and configured to:
  - transmit information on a plurality of control channel resources on radio resource control (RRC) signaling, the information on the plurality of control channel resources indicating a specific pattern on a frequency domain and on a time domain of each control channel resource,
  - transmit, to a terminal, downlink control information (DCI), the DCI including resource allocation information indicating a resource for downlink data and an indicator for a rate matching of the downlink data, wherein the indicator indicates whether a control channel resource which overlaps with the resource for the downlink data is unavailable for the downlink data, and wherein the control channel resource is one of the plurality of control channel resources and is for another terminal, and
  - transmit the downlink data corresponding to the resource allocation information and the indicator, wherein in case that the indicator indicates that the control channel resource is unavailable for the downlink data, the downlink data is rate-matched not to be mapped on the control channel resource.

8. The base station of claim 7, wherein in case that the indicator indicates the control channel resource is available for the downlink data, the downlink data is mapped on the control channel resource.

9. The base station of claim 7, wherein the downlink data is not mapped on other control channel resources.

10. A terminal for receiving downlink data in a wireless communication system, the terminal comprising:
- a transceiver; and
- a controller coupled with the transceiver and configured to:
  - receive information on a plurality of control channel resources on radio resource control (RRC) signaling, the information on the plurality of control channel resources indicating a specific pattern on a frequency domain and on a time domain of each control channel resource,
  - receive, from a base station, downlink control information (DCI), the DCI including resource allocation information indicating a resource for downlink data and an indicator for a rate matching of the downlink data, wherein the indicator indicates whether a control channel resource which overlaps with the resource for the downlink data is unavailable for the downlink data, and wherein the control channel resource is one of the plurality of control channel resources and is for another terminal, and
  - receive the downlink data based on the resource allocation information and the indicator, wherein in case that the indicator indicates that the control channel resource is unavailable for the downlink data, the downlink data is rate-matched not to be mapped on the control channel resource.

11. The terminal of claim 10, wherein in case that the indicator indicates that the control channel resource is available for the downlink data, the downlink data is mapped on the control channel resource.

12. The terminal of claim 10, wherein the downlink data is not mapped on other control channel resources.

* * * * *